Jan. 11, 1966     E. J. BETZOLD, JR., ETAL     3,229,072
COMPUTER DEVICES

Filed May 1, 1961                                     46 Sheets-Sheet 1

*INVENTORS.*
EDWARD J. BETZOLD, JR.,
ALLAN W. LINDBERG,
ROBERT J. O'DONNELL, AND
RONALD M. WROB

BY *Alfred W. Petchaft*
ATTORNEY

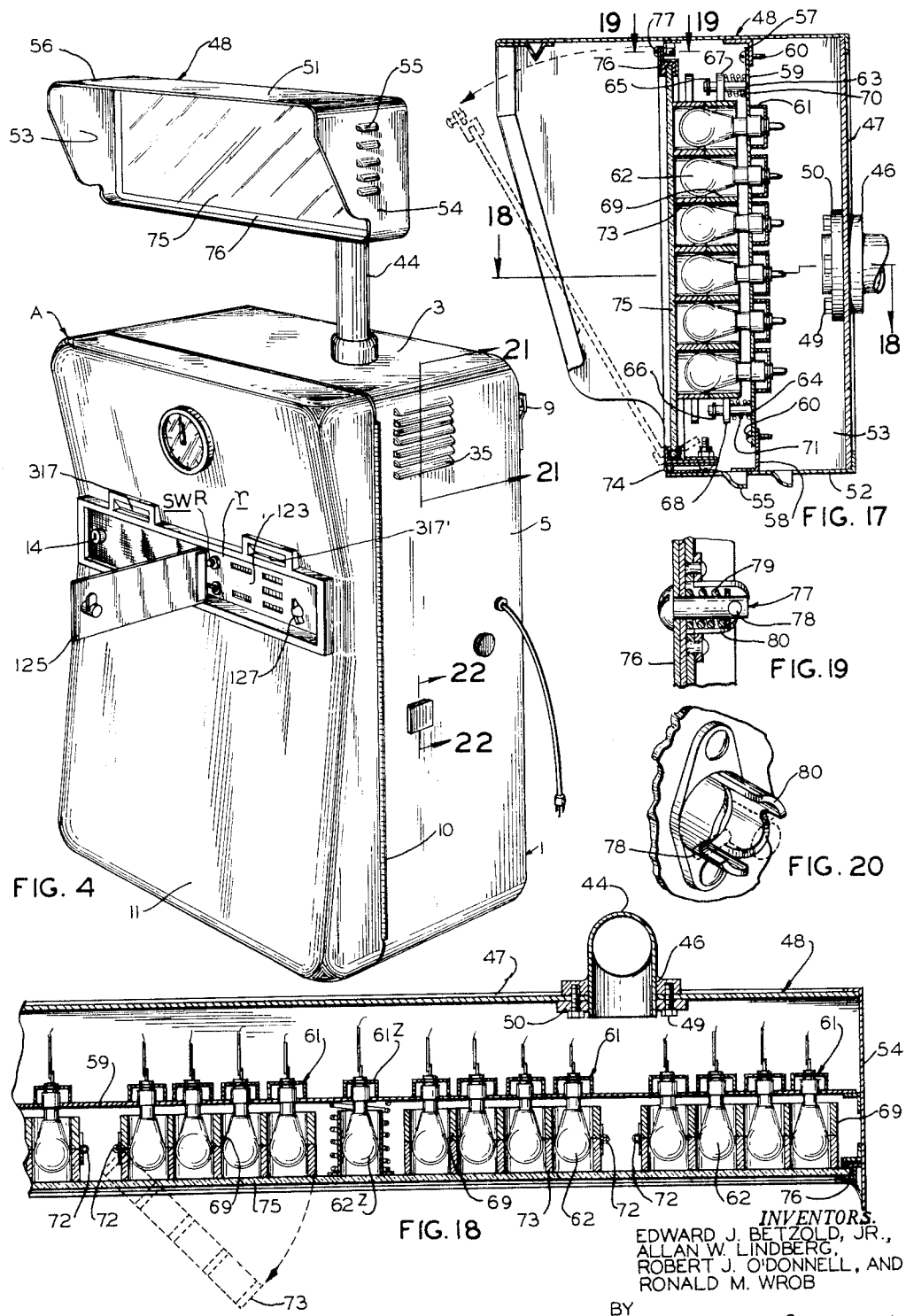

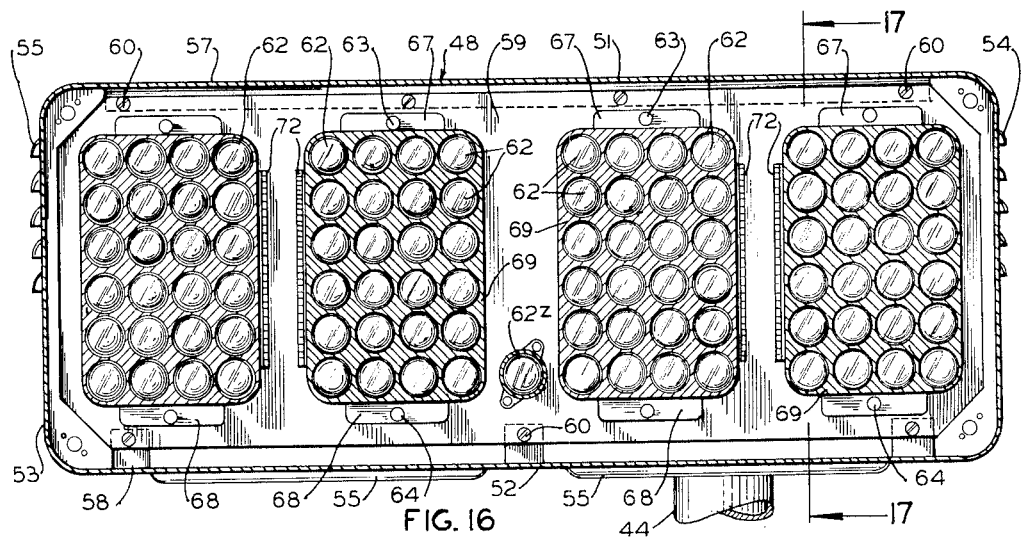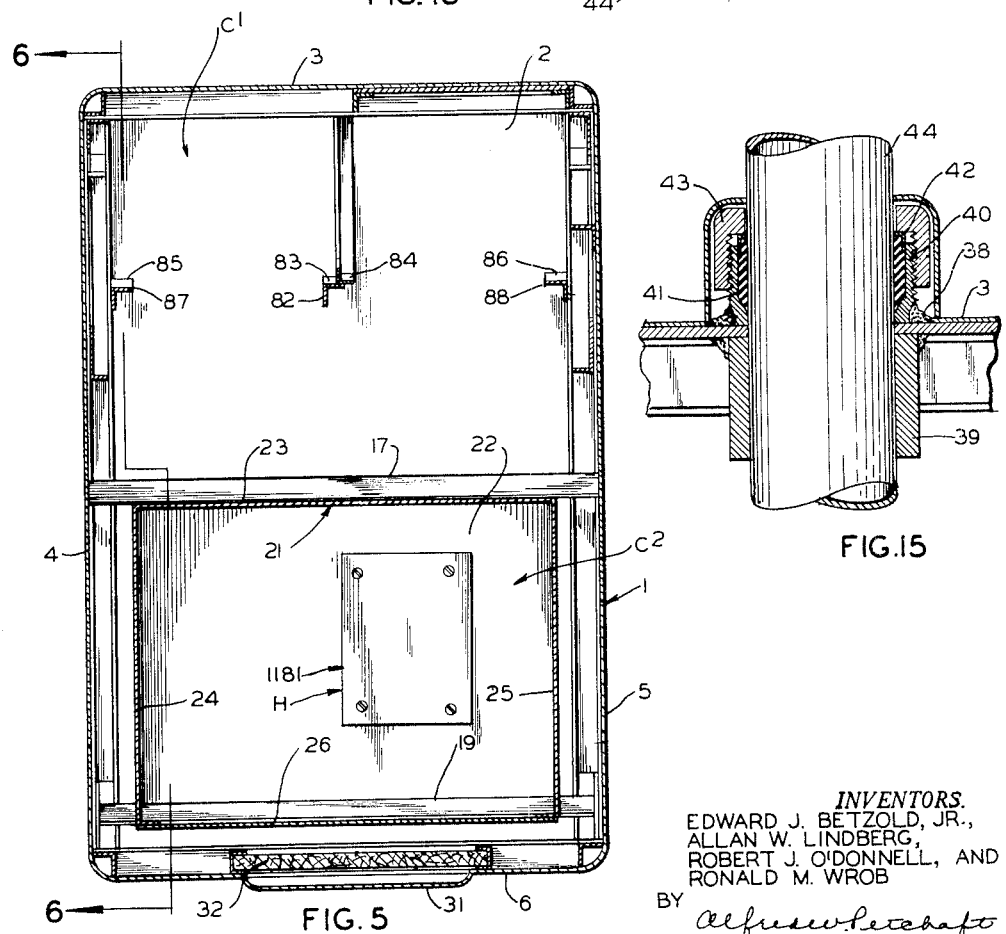

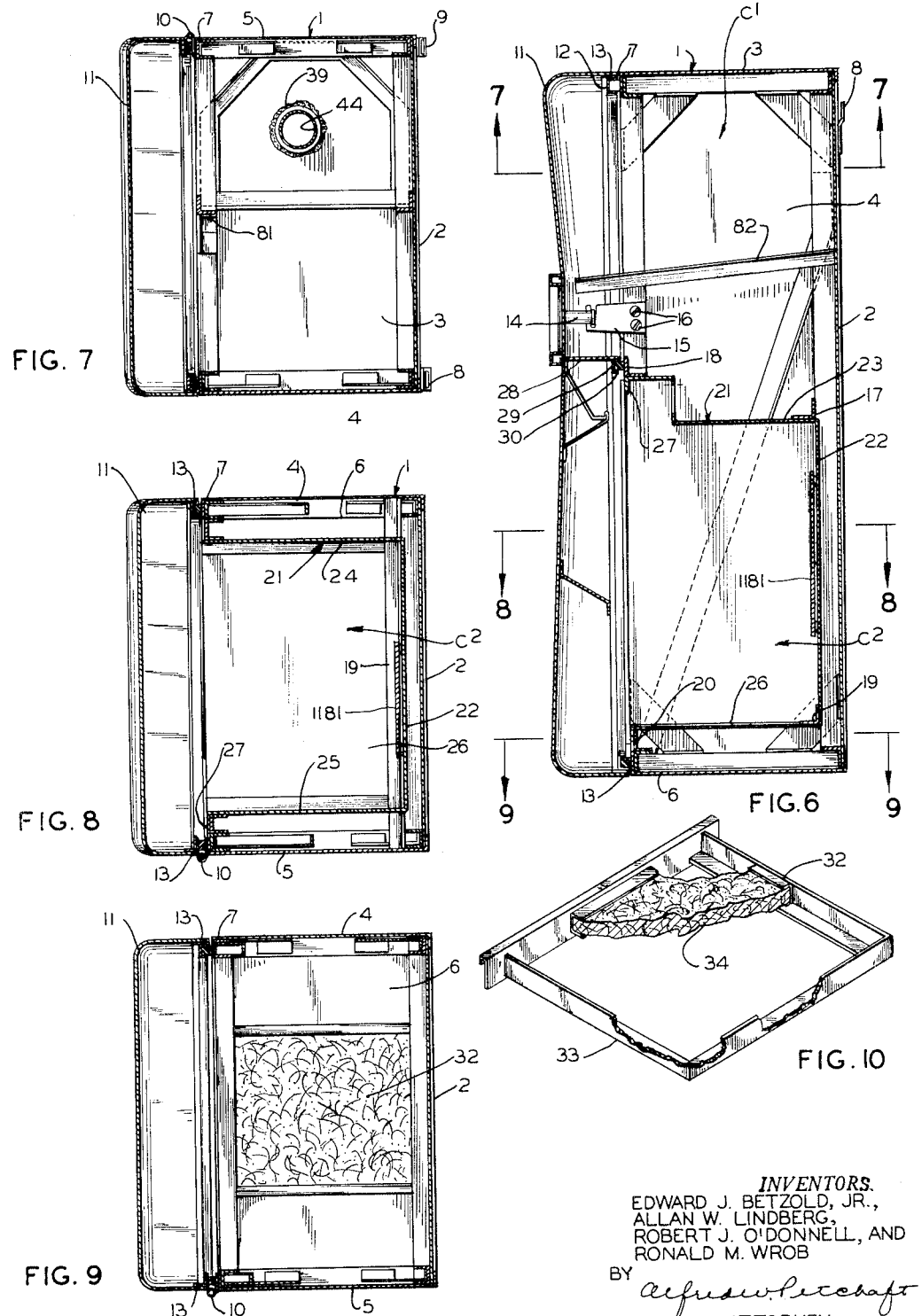

Jan. 11, 1966 E. J. BETZOLD, JR., ETAL 3,229,072
COMPUTER DEVICES
Filed May 1, 1961 46 Sheets-Sheet 5
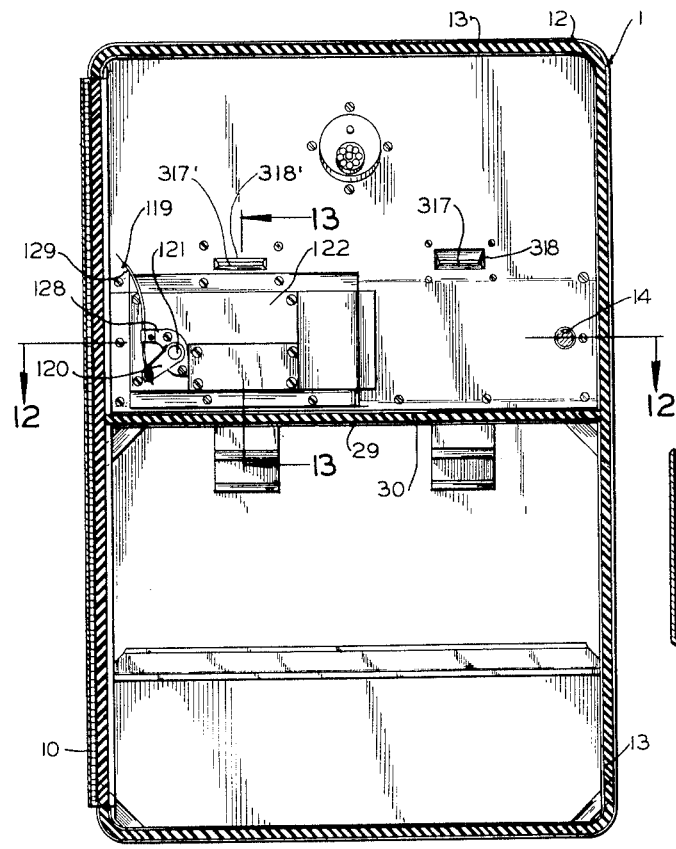
FIG. 11
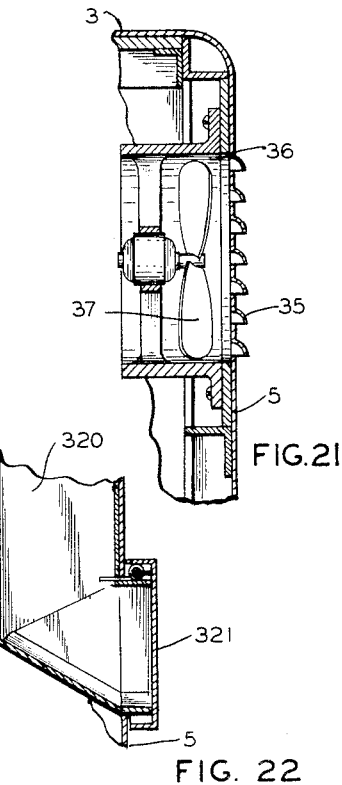
FIG. 21
FIG. 22
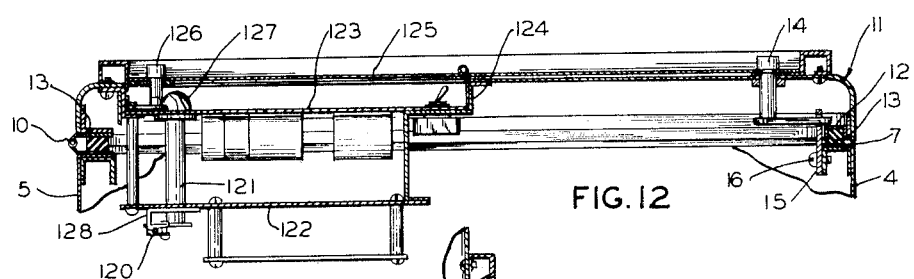
FIG. 12
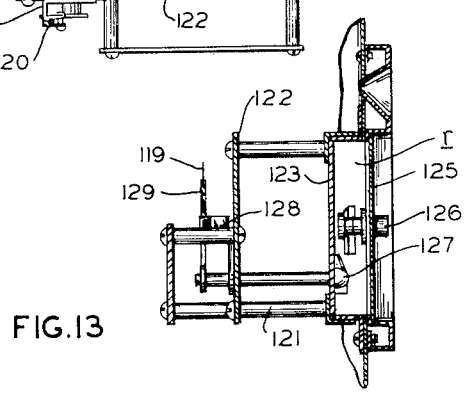
FIG. 13
INVENTORS.
EDWARD J. BETZOLD, JR.,
ALLAN W. LINDBERG,
ROBERT J. O'DONNELL, AND
RONALD M. WROB
BY
ATTORNEY INVENTORS.
EDWARD J. BETZOLD, JR.,
ALLAN W. LINDBERG,
ROBERT J. O'DONNELL, AND
RONALD M. WROB
BY
ATTORNEY

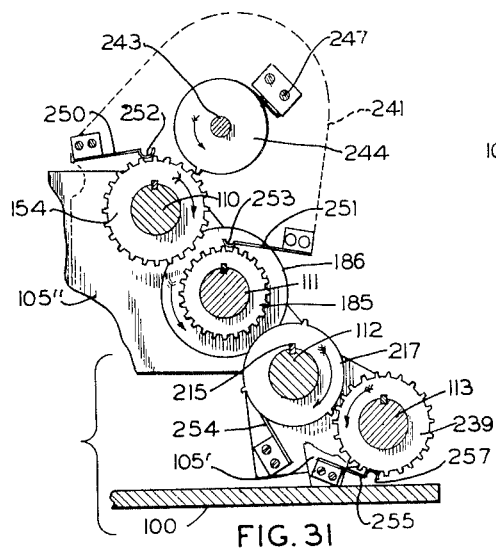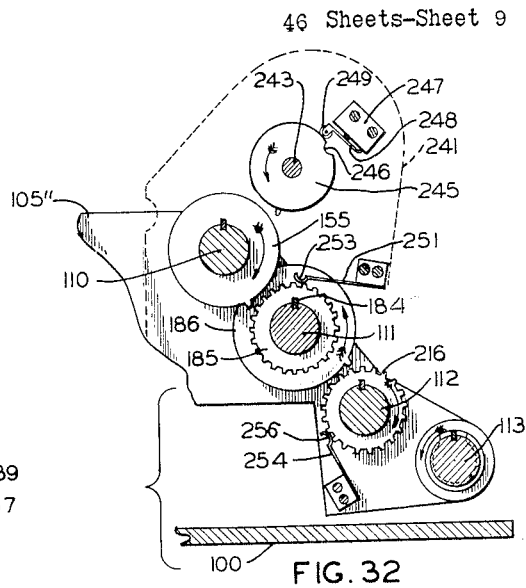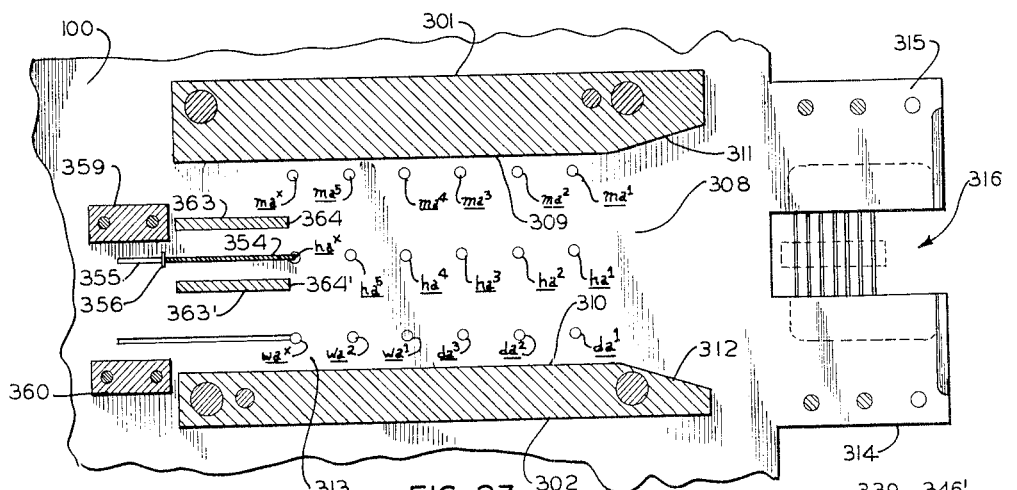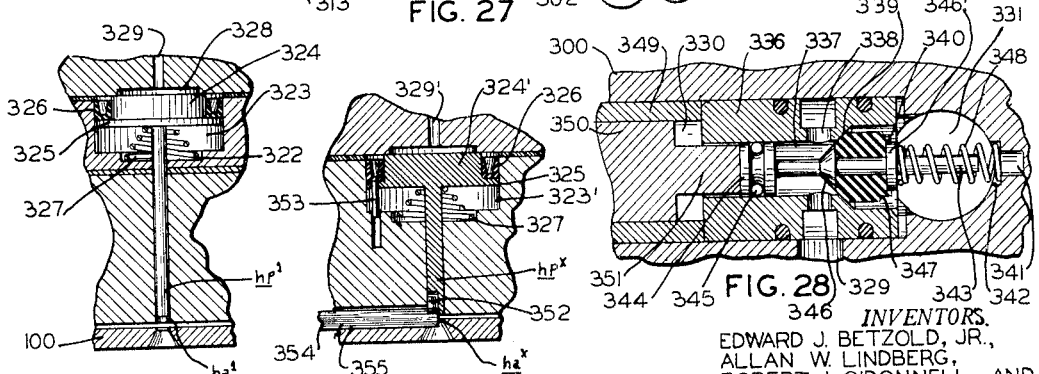

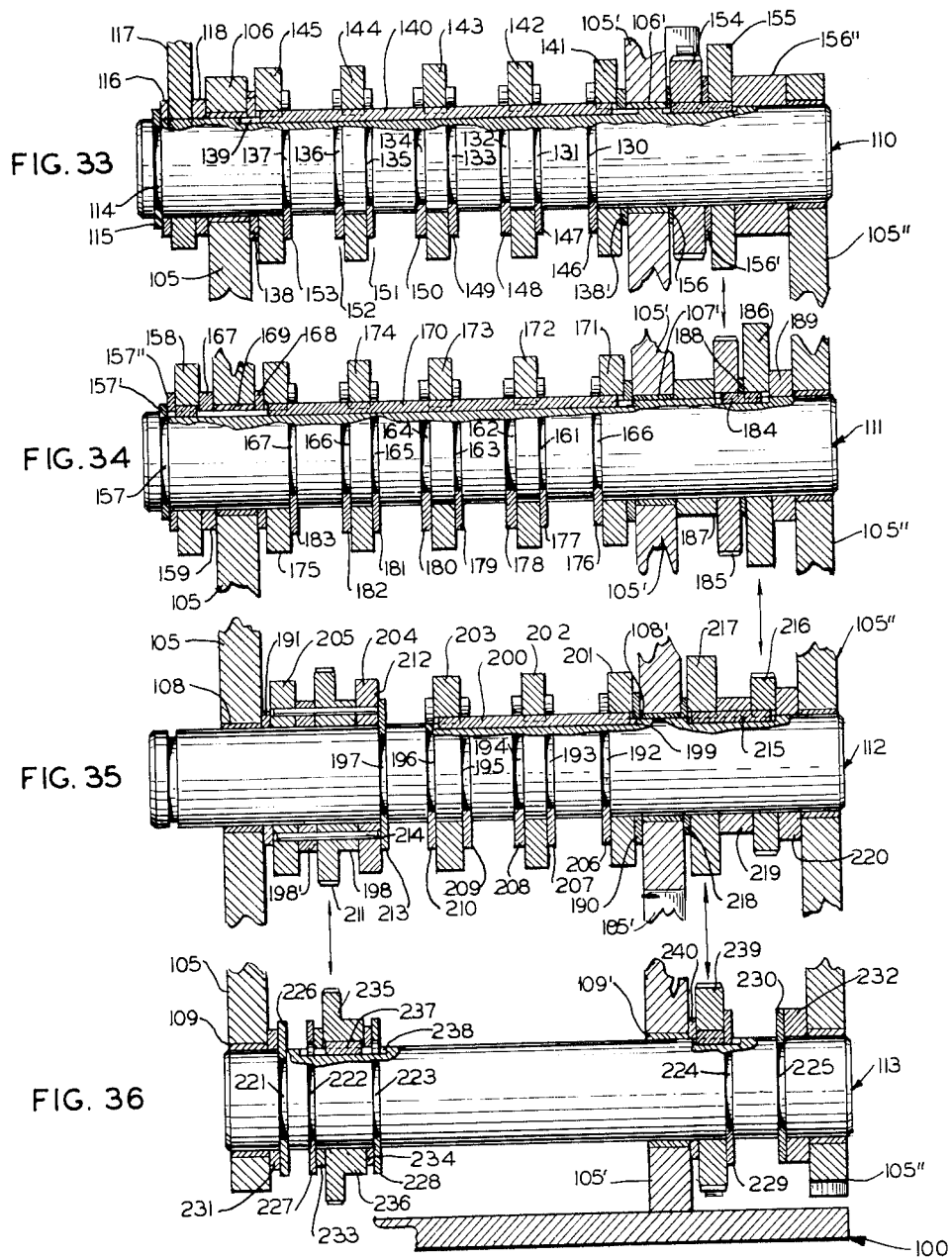

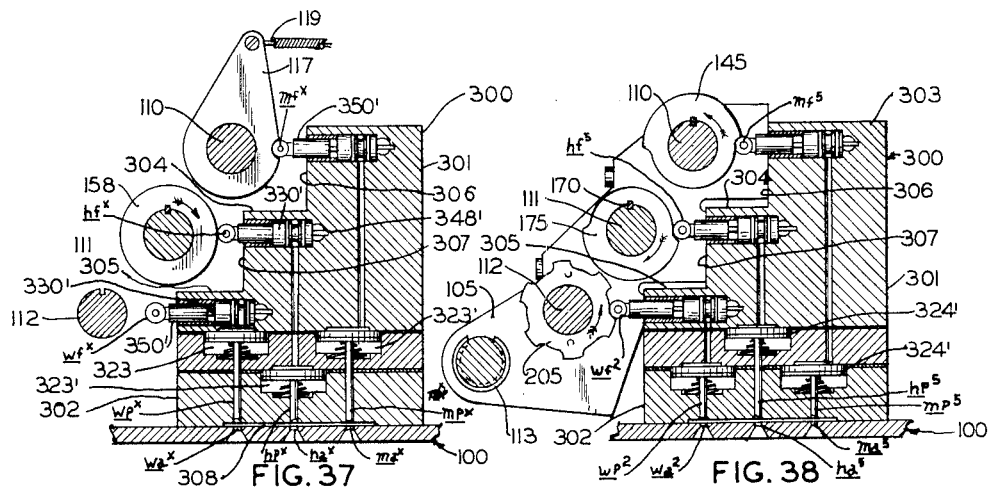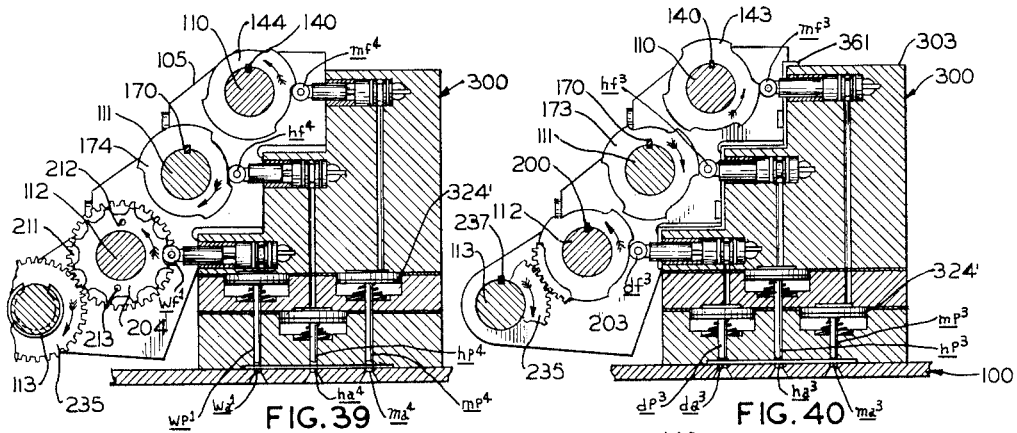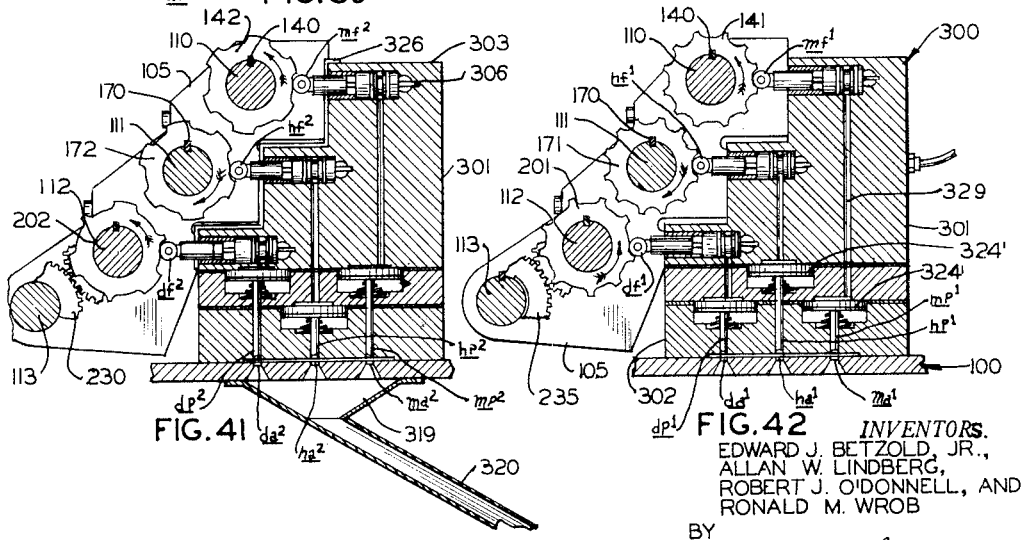

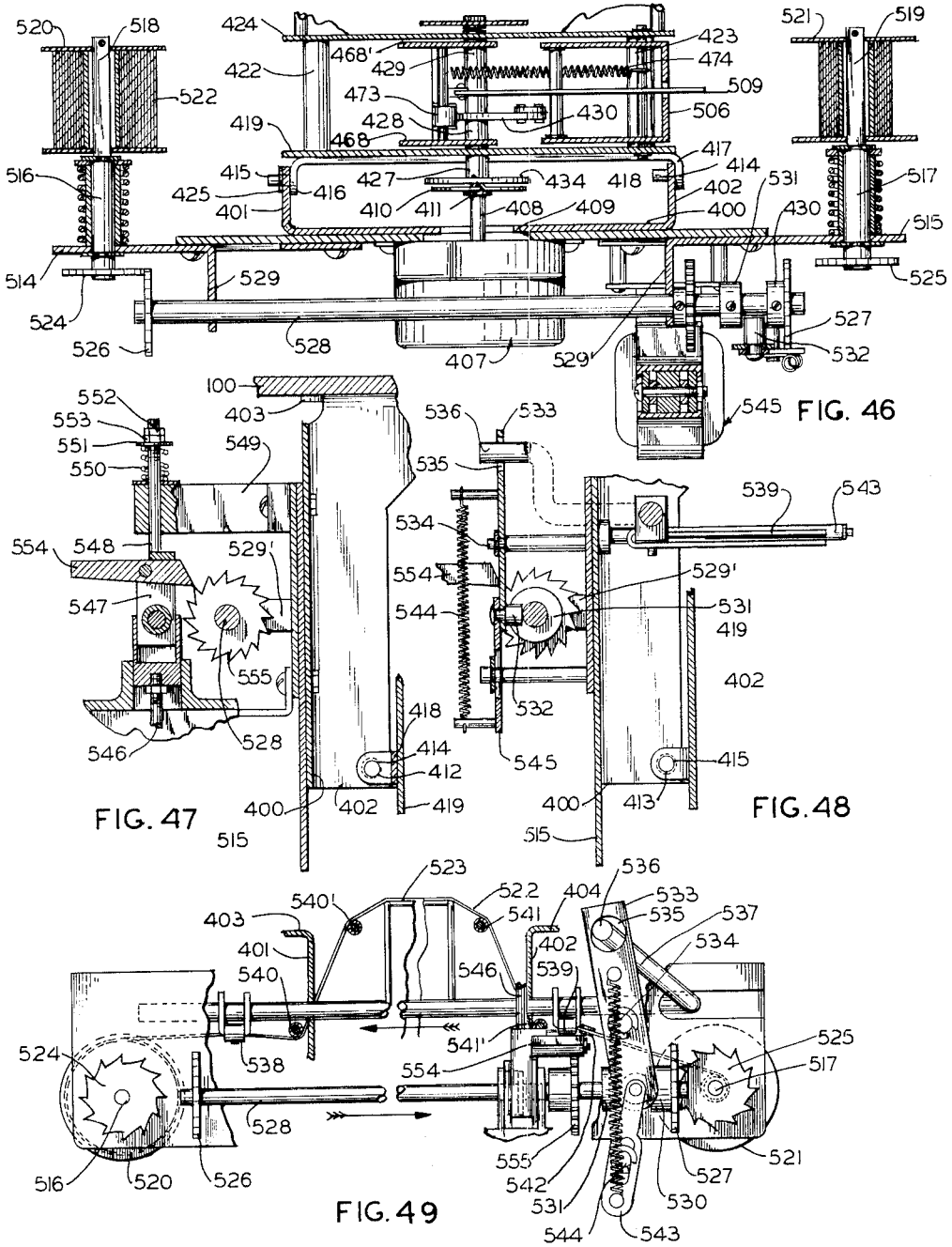

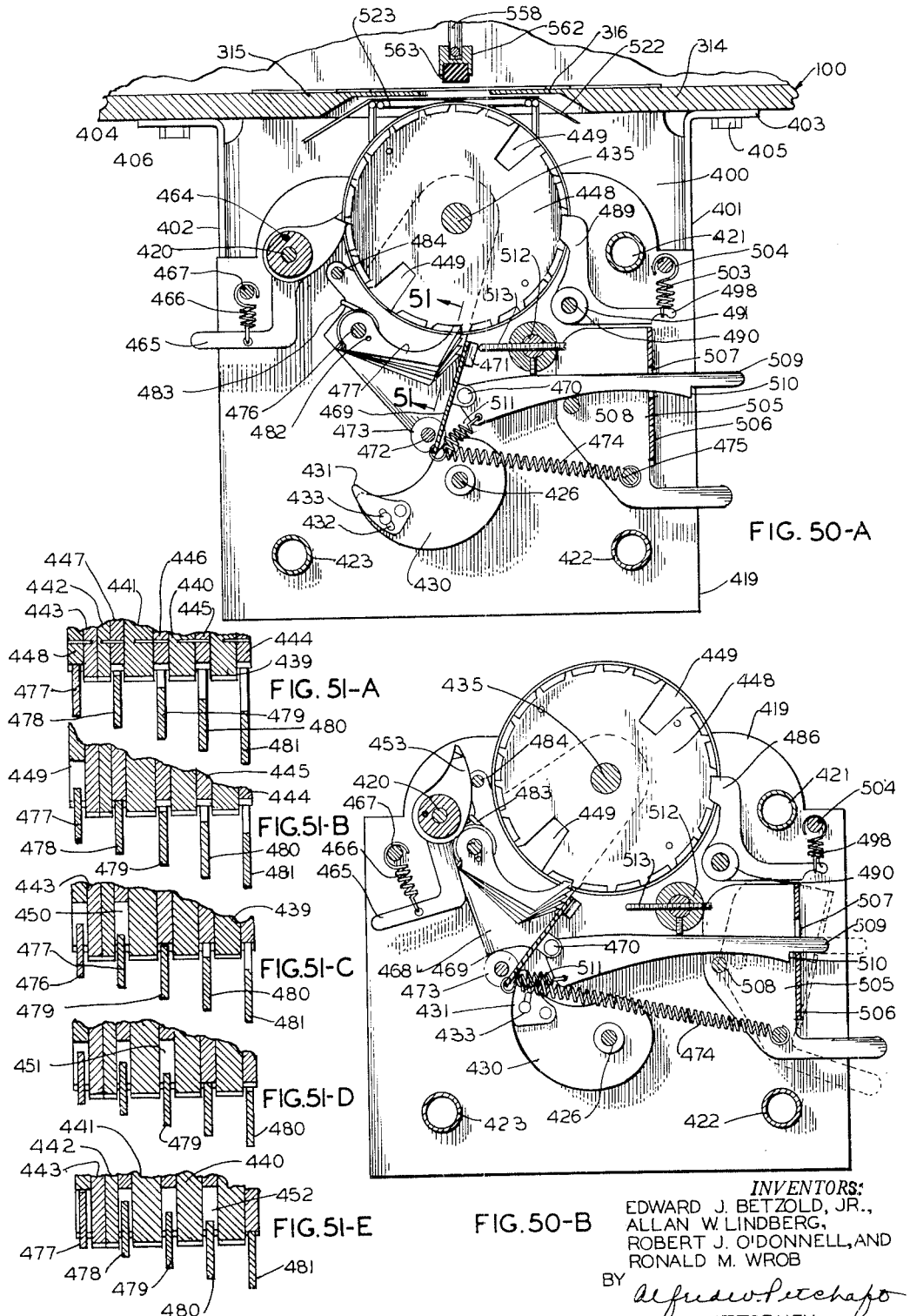

Jan. 11, 1966   E. J. BETZOLD, JR., ETAL   3,229,072
COMPUTER DEVICES
Filed May 1, 1961   46 Sheets-Sheet 15

INVENTORS:
EDWARD J. BETZOLD, JR.
ALLAN W. LINDBERG,
ROBERT J. O'DONNELL, AND
RONALD M. WROB
BY
ATTORNEY

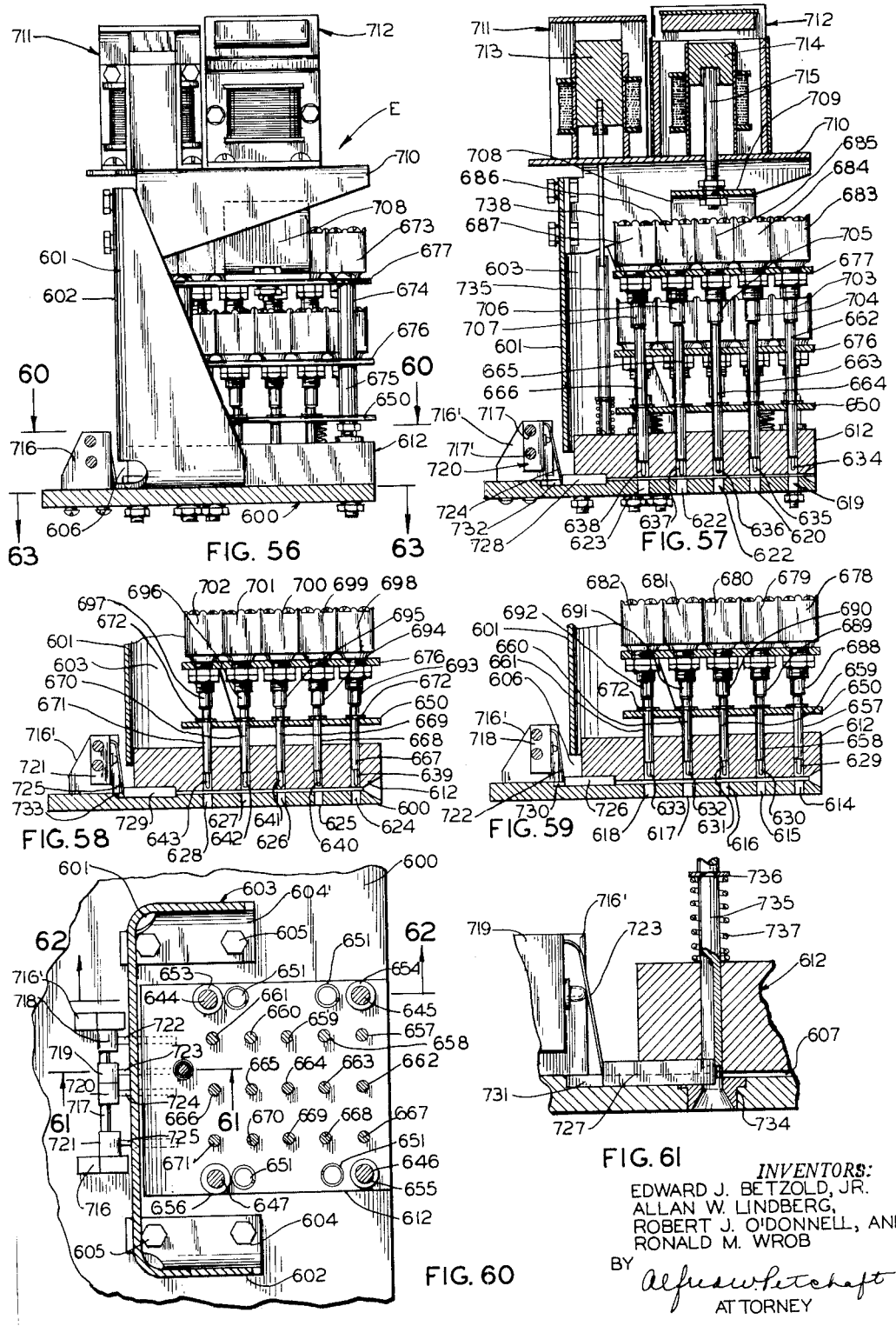

Jan. 11, 1966   E. J. BETZOLD, JR., ETAL   3,229,072
COMPUTER DEVICES

Filed May 1, 1961   46 Sheets-Sheet 17

*INVENTORS:*
EDWARD J. BETZOLD, JR.
ALLAN W. LINDBERG,
ROBERT J. O'DONNELL, AND
RONALD M. WROB

BY *Alfred W. Petcheff*
ATTORNEY

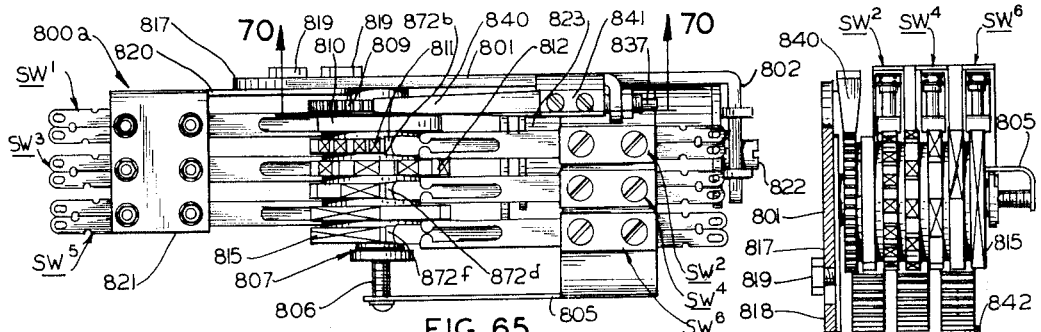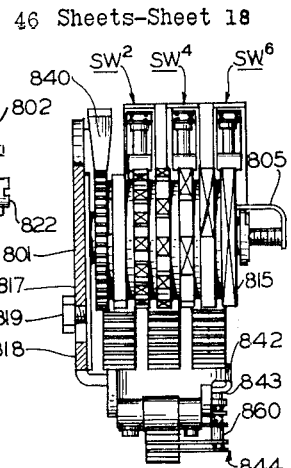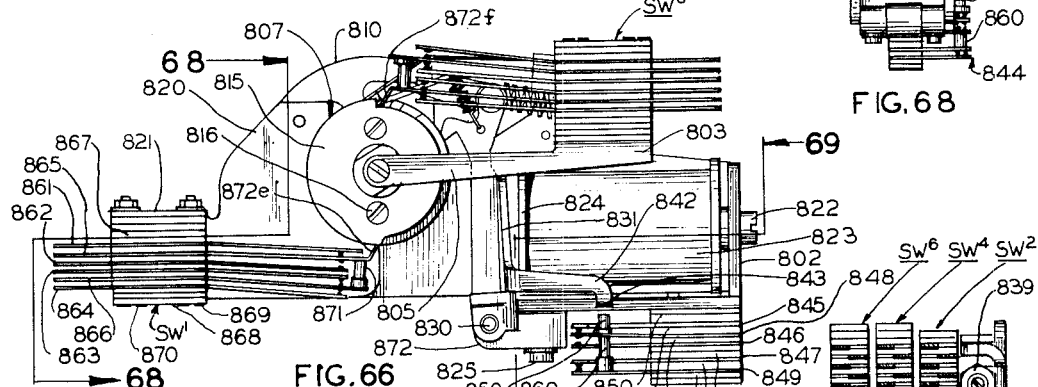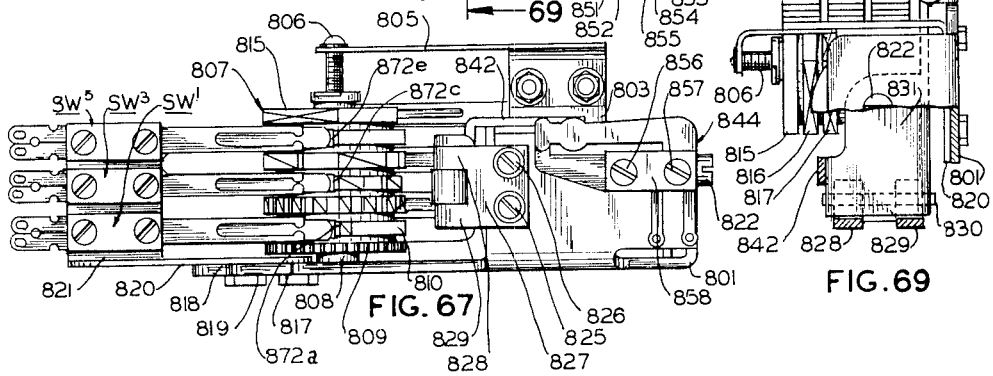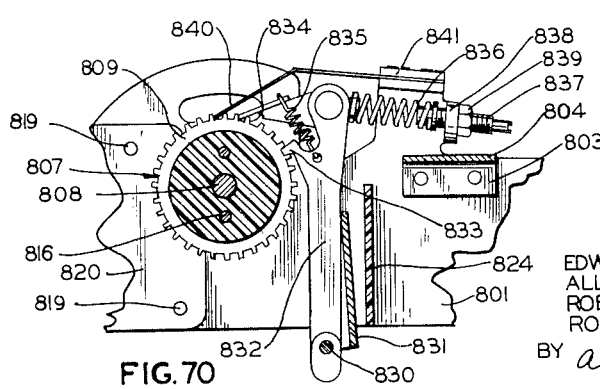

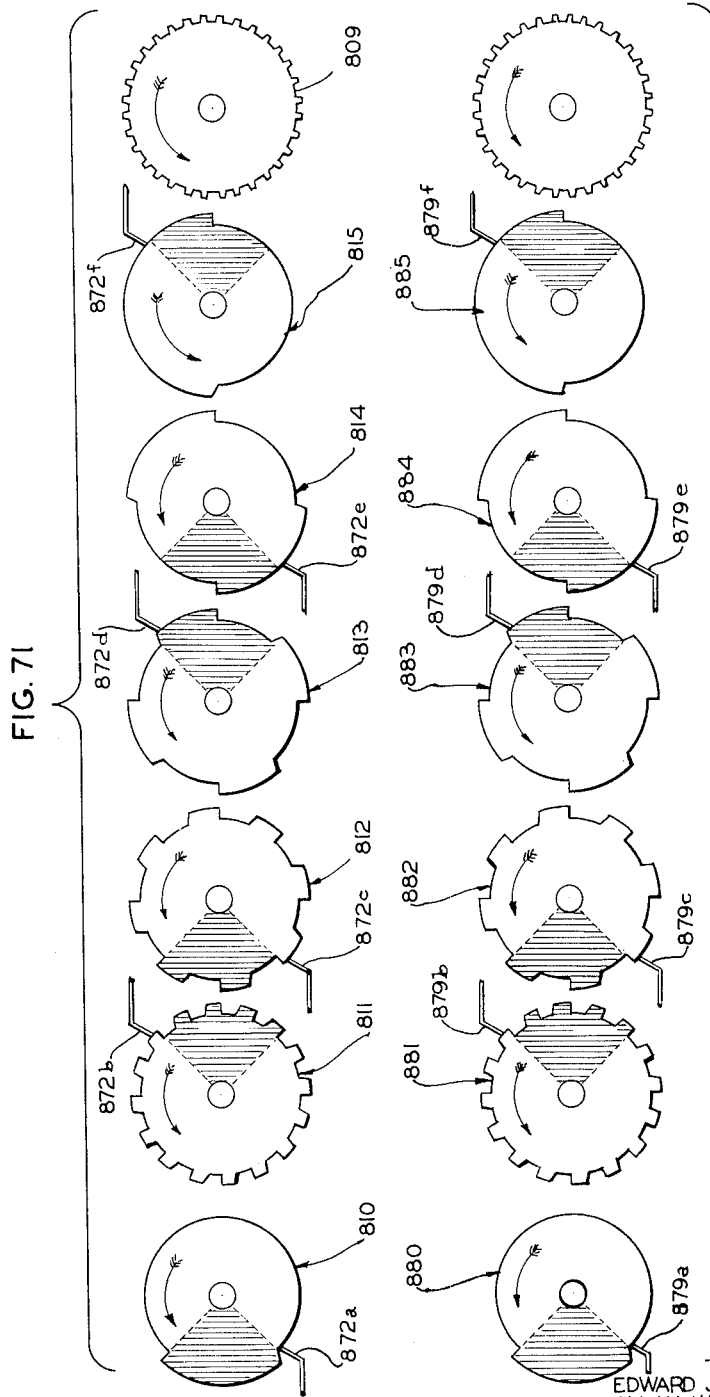

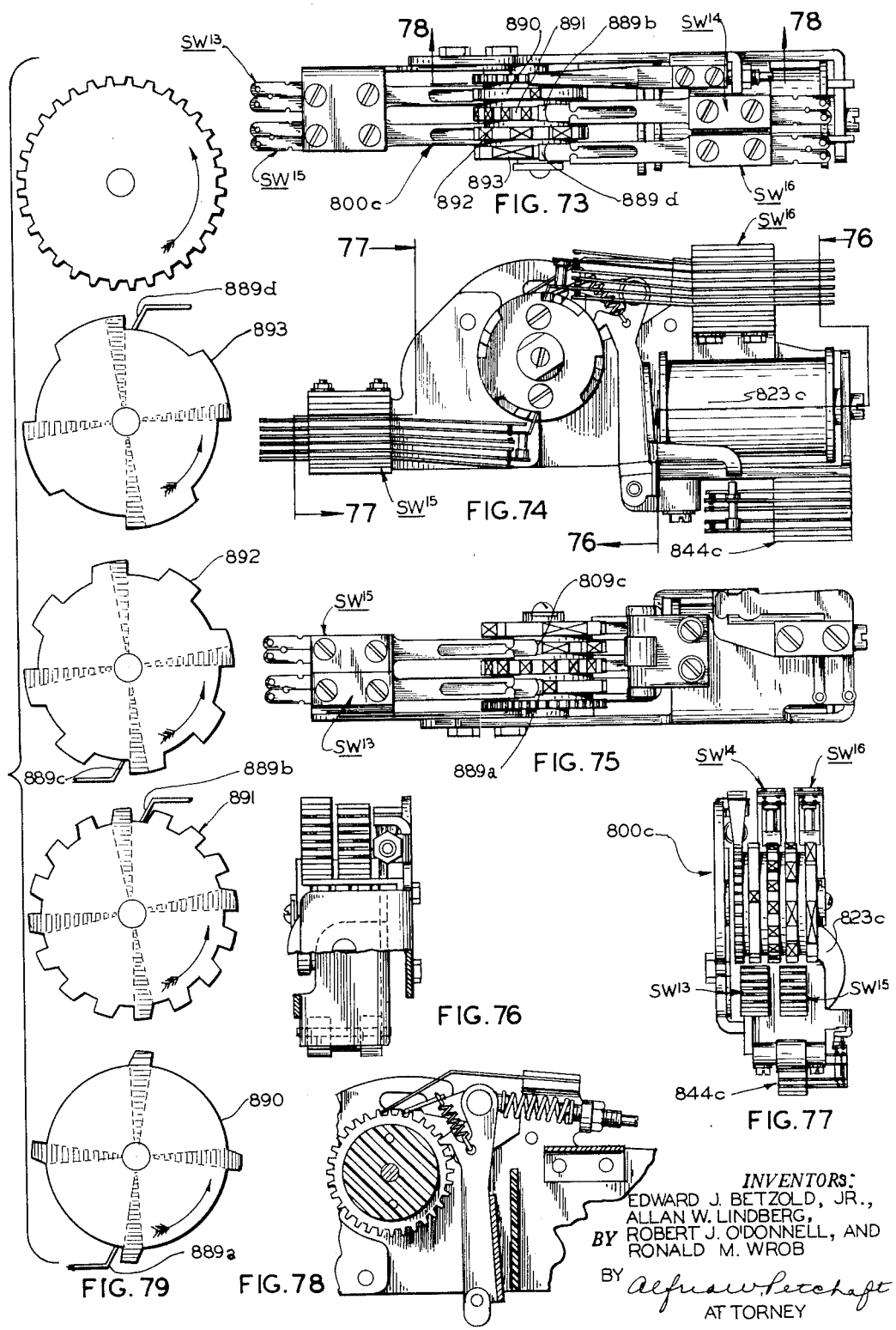

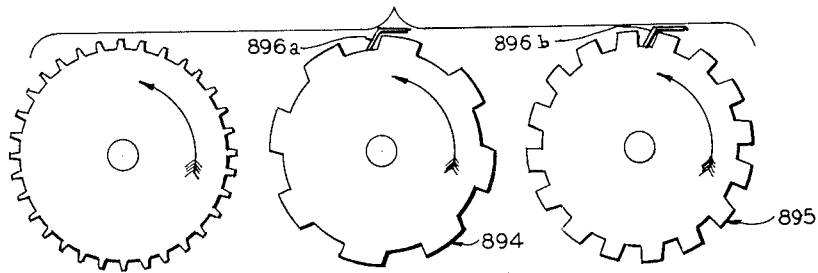
FIG. 85
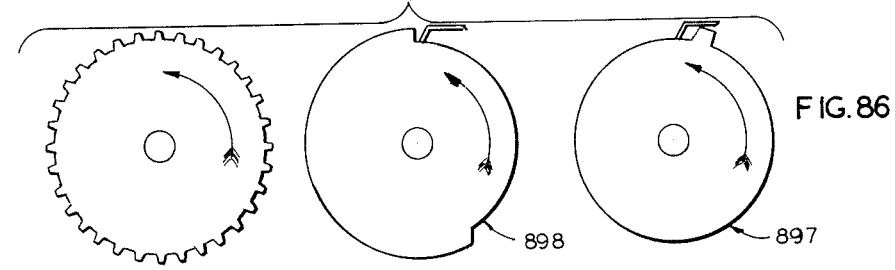
FIG. 86
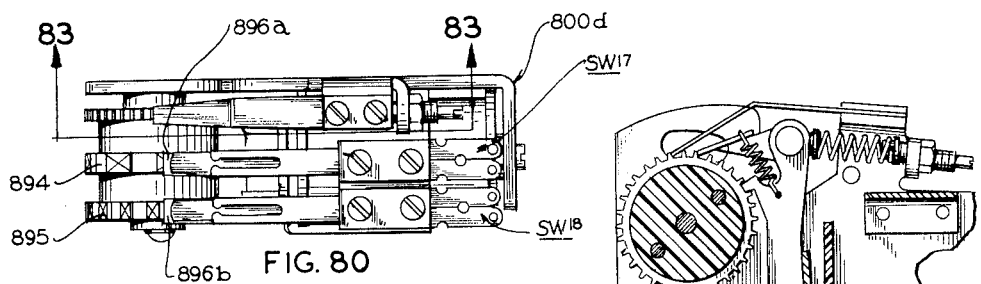
FIG. 80
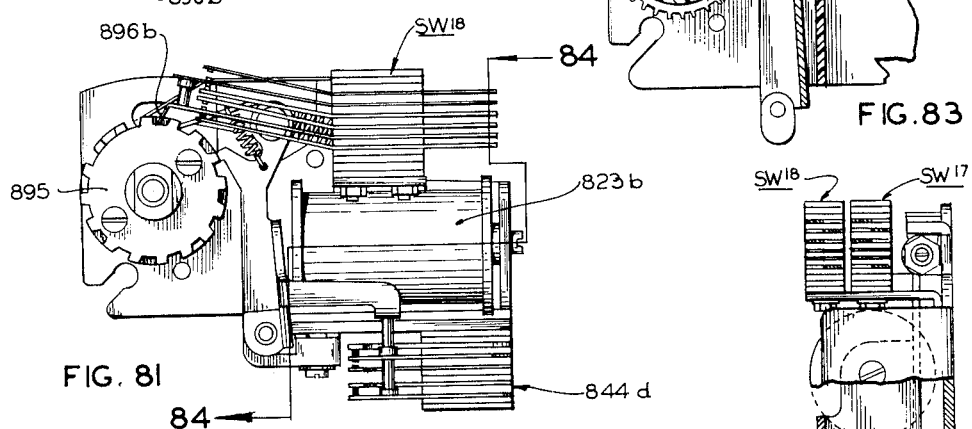
FIG. 81
FIG. 83
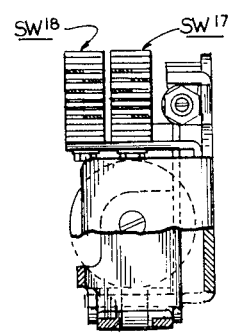
FIG. 84
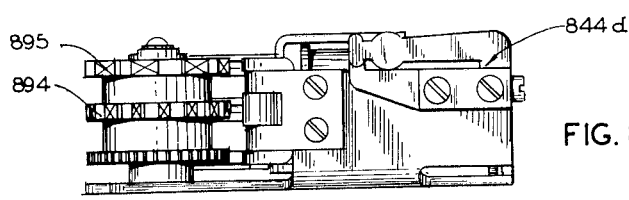
FIG. 82

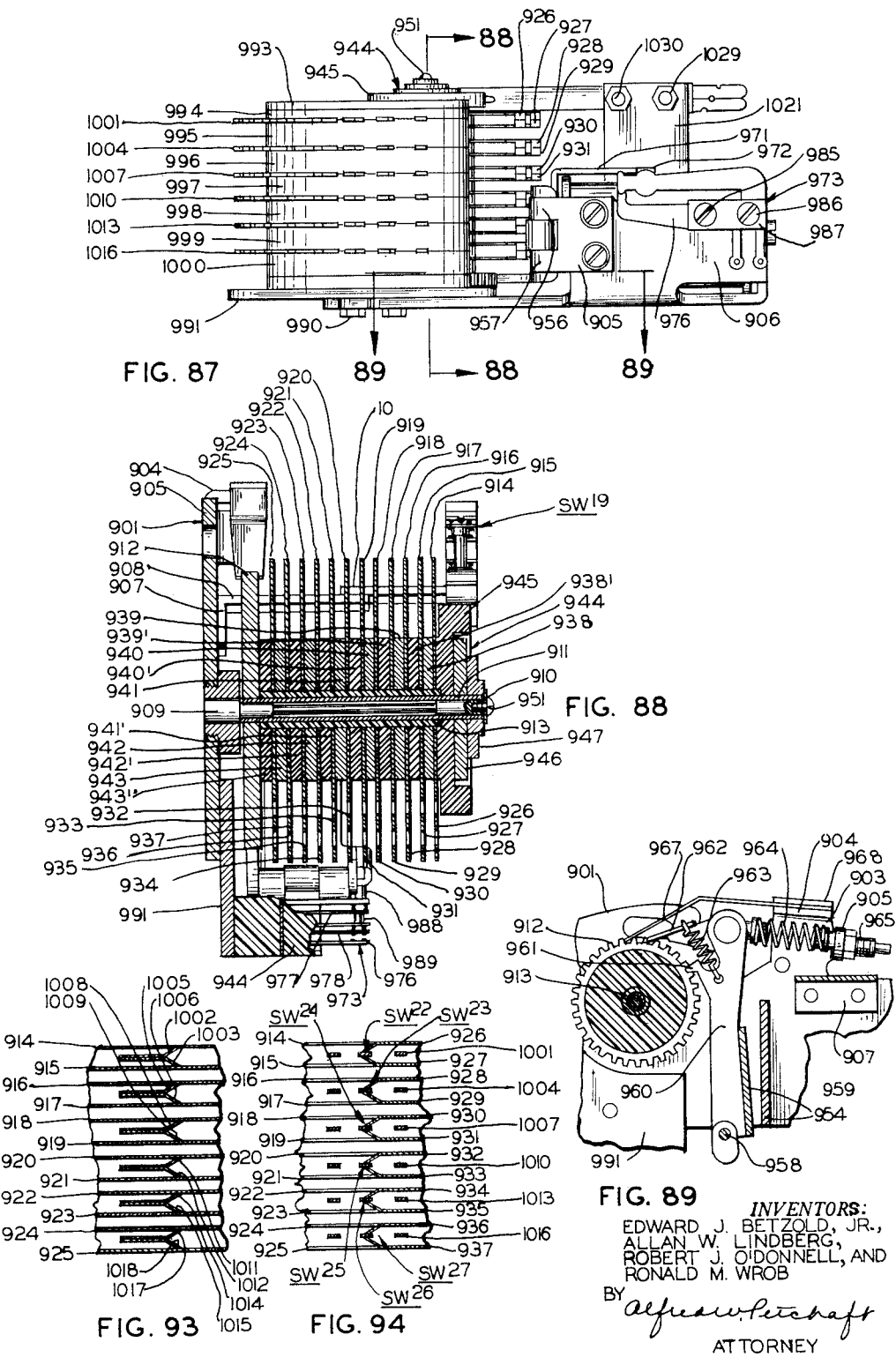

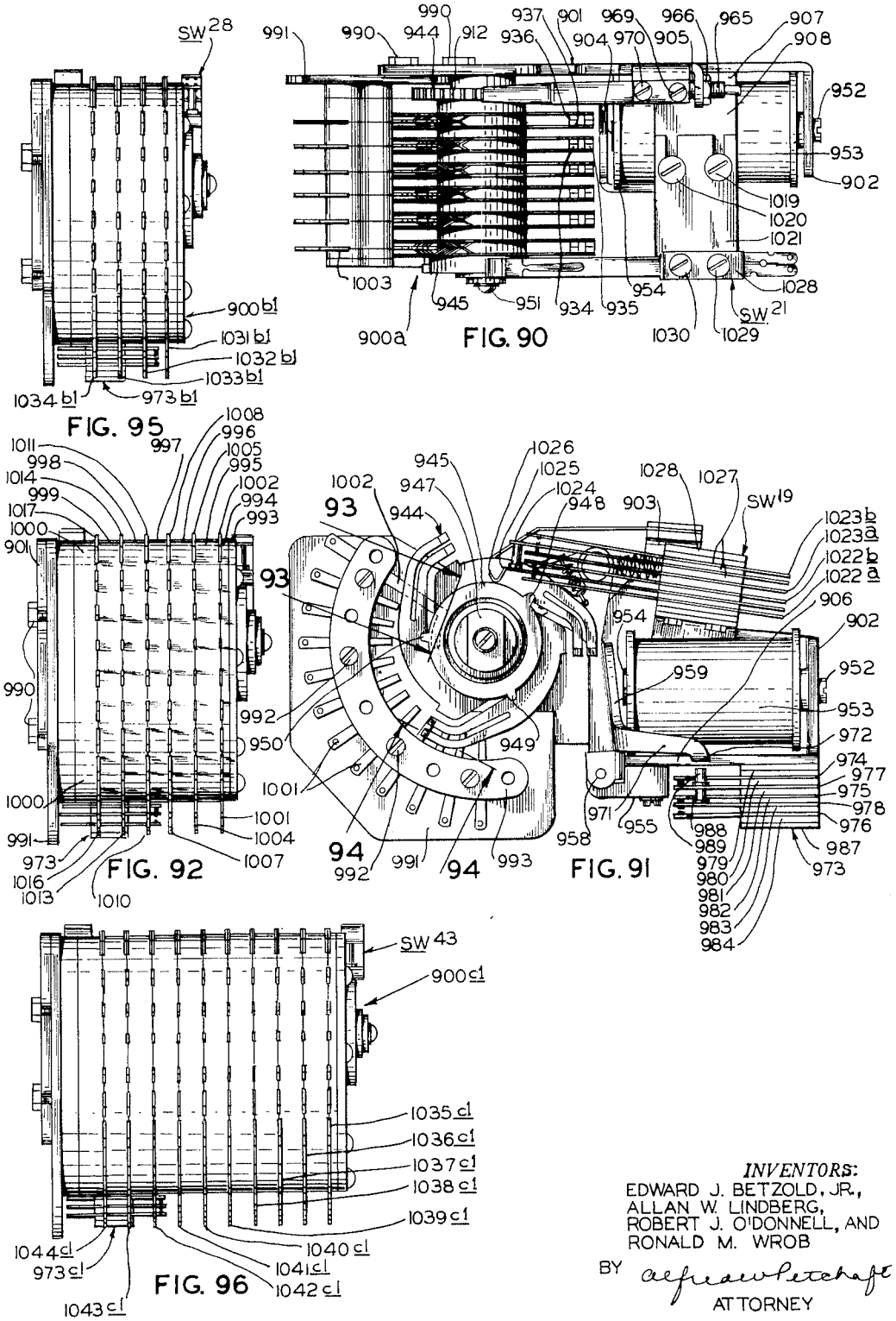

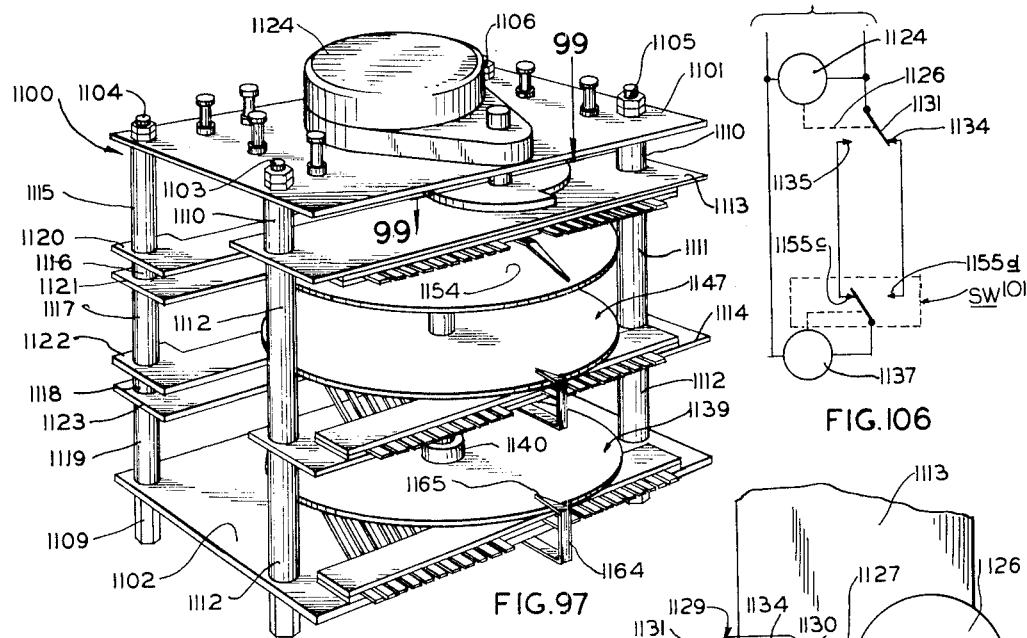
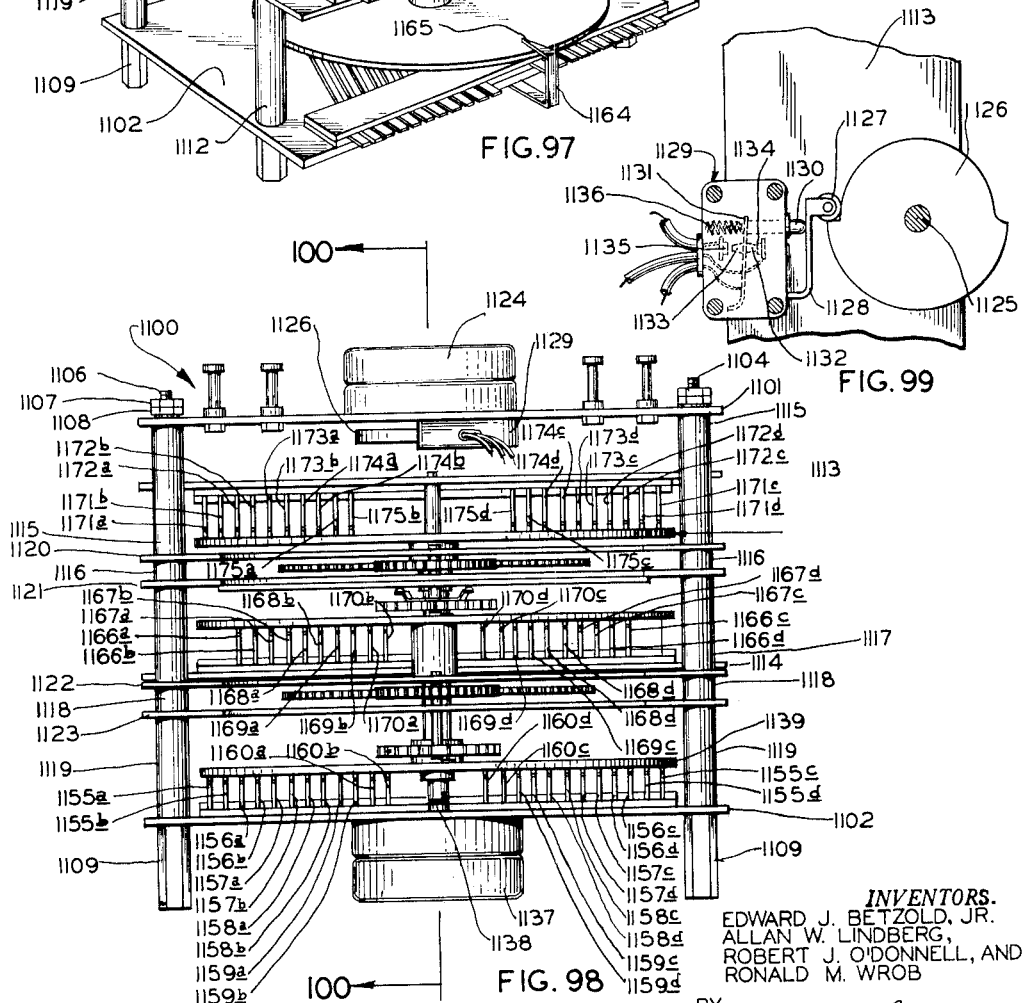

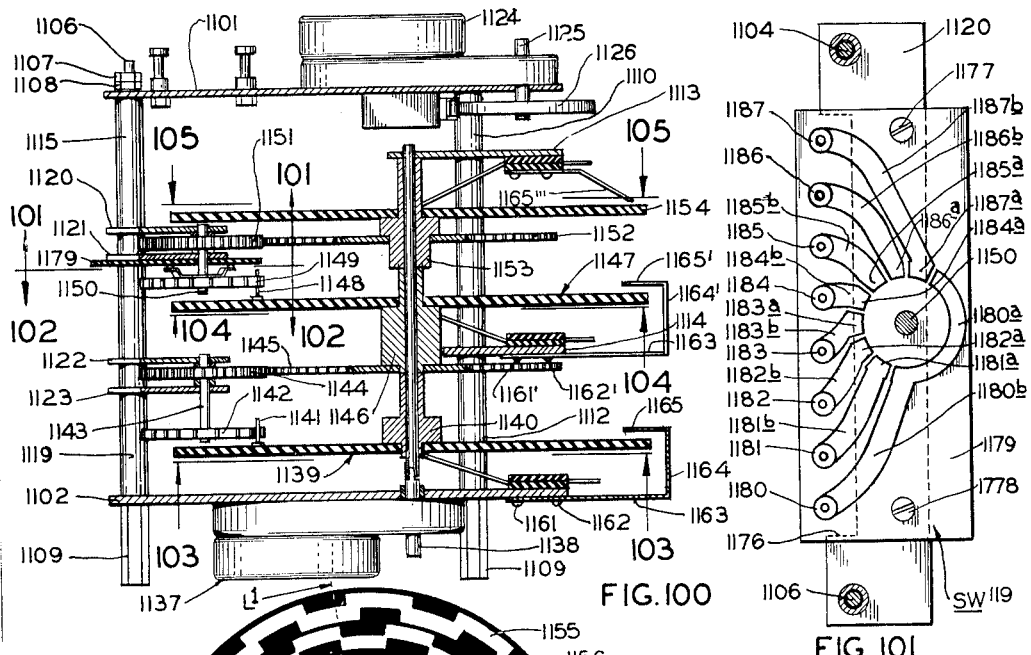
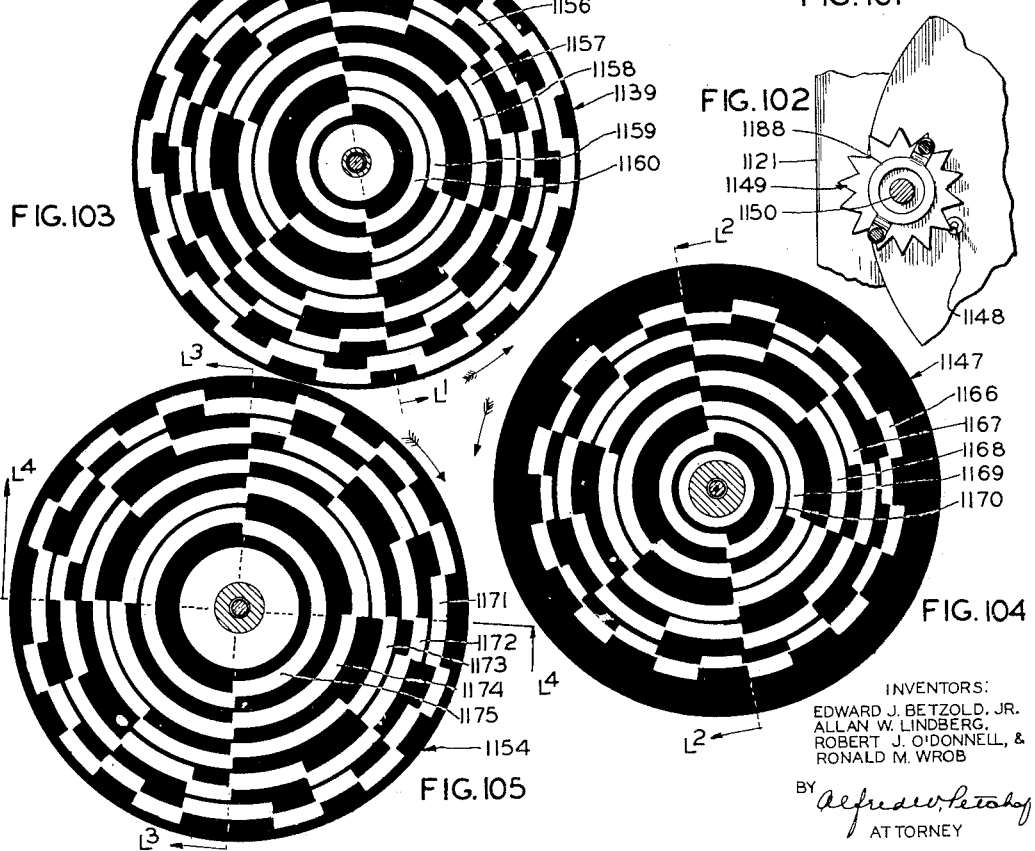

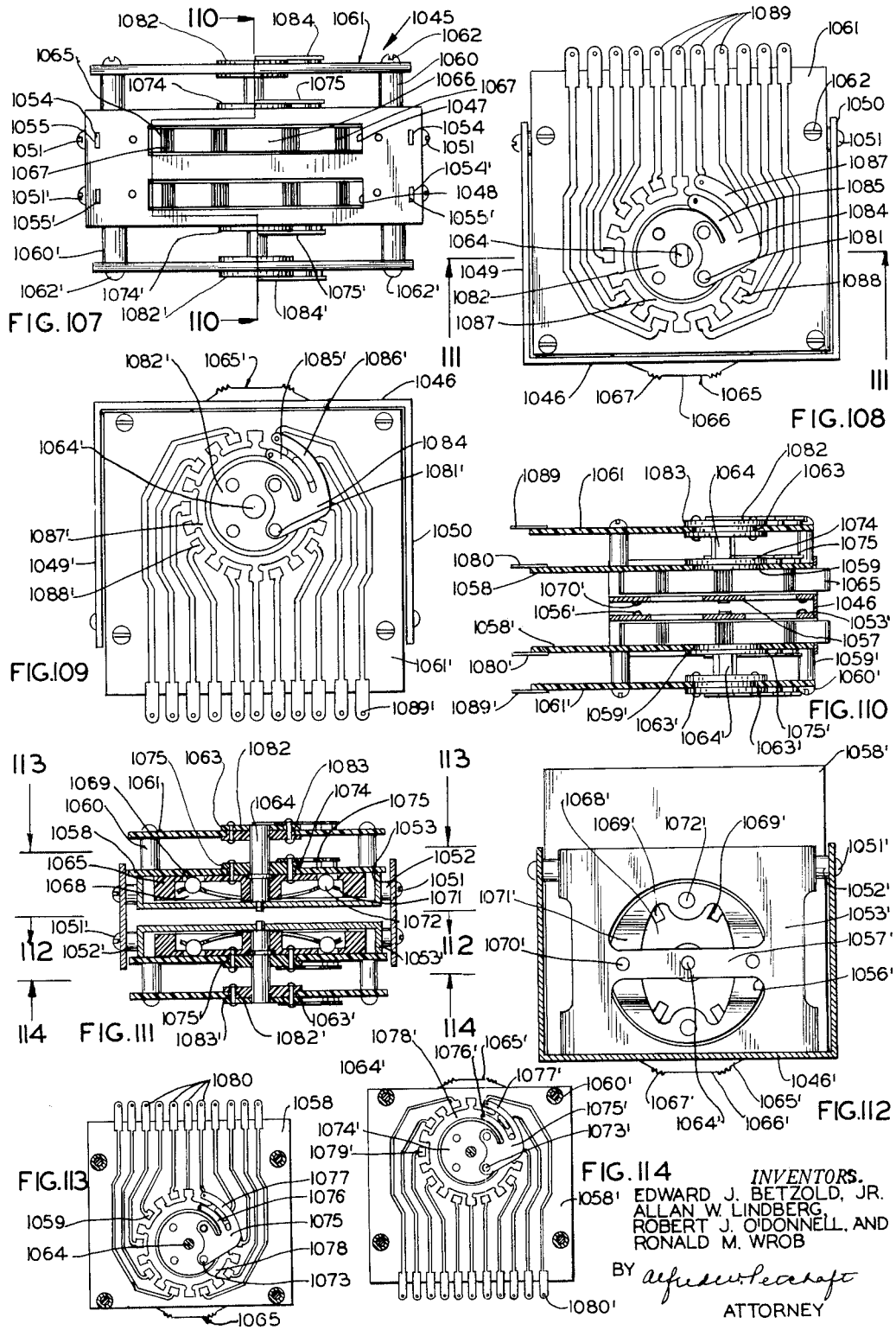

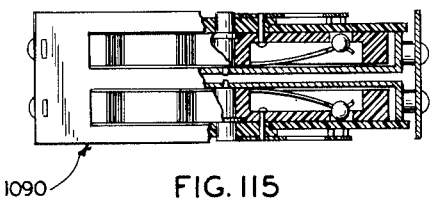
FIG. 115
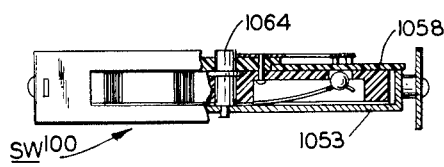
FIG. 116
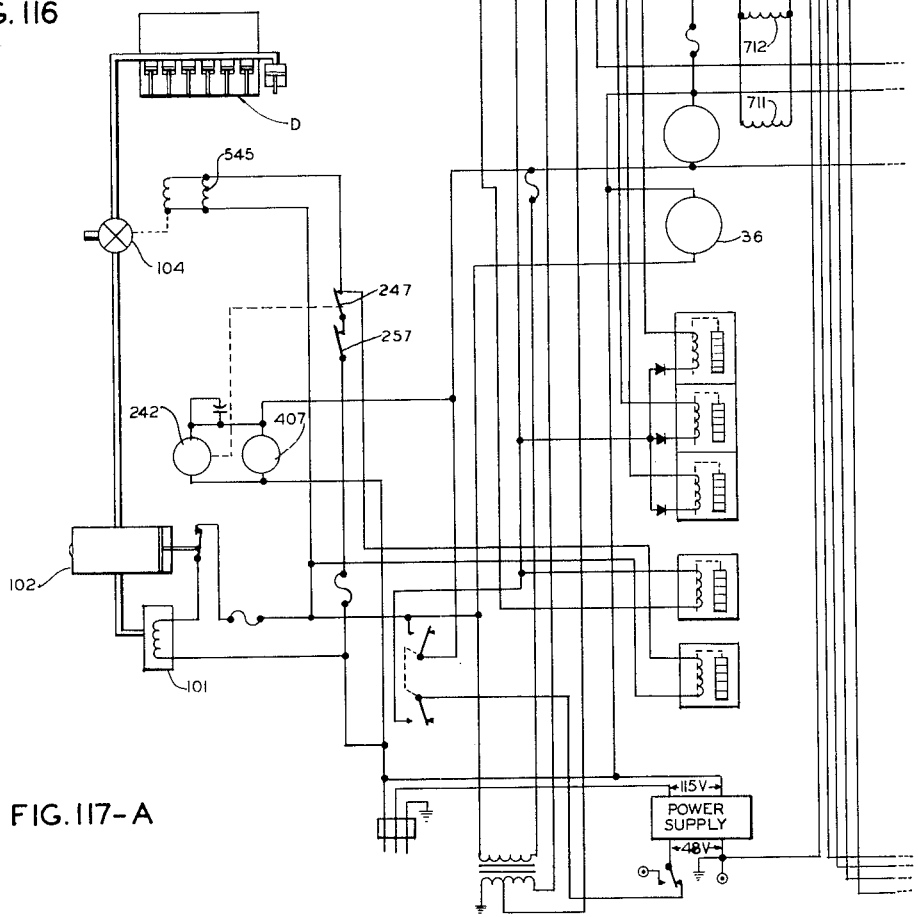
FIG. 117-A
*INVENTOR.*
EDWARD J. BETZOLD, JR.
ALLAN W. LINDBERG,
ROBERT J. O'DONNELL, AND
RONALD M. WROB
BY Alfred W. Petchaft
ATTORNEY

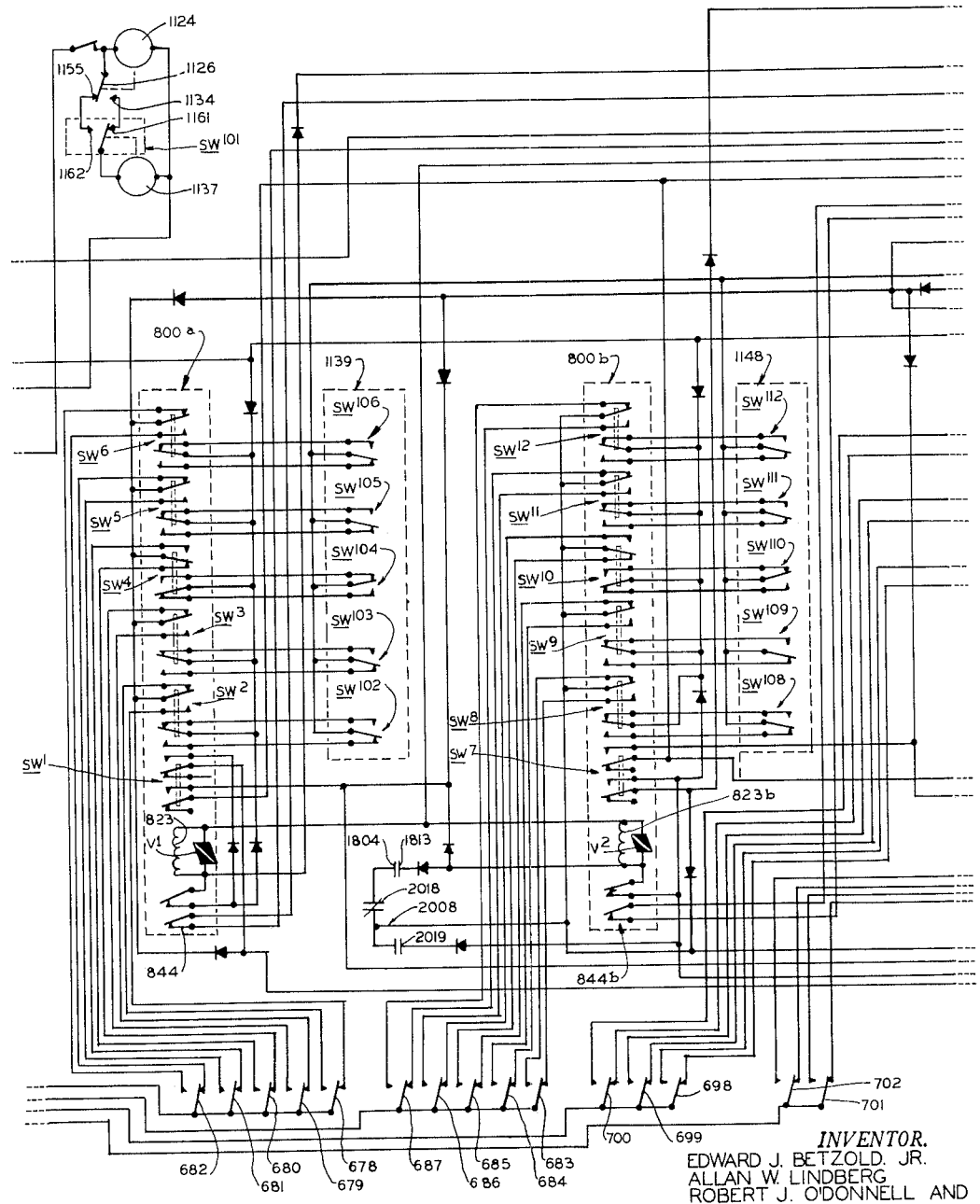
FIG. 117-B

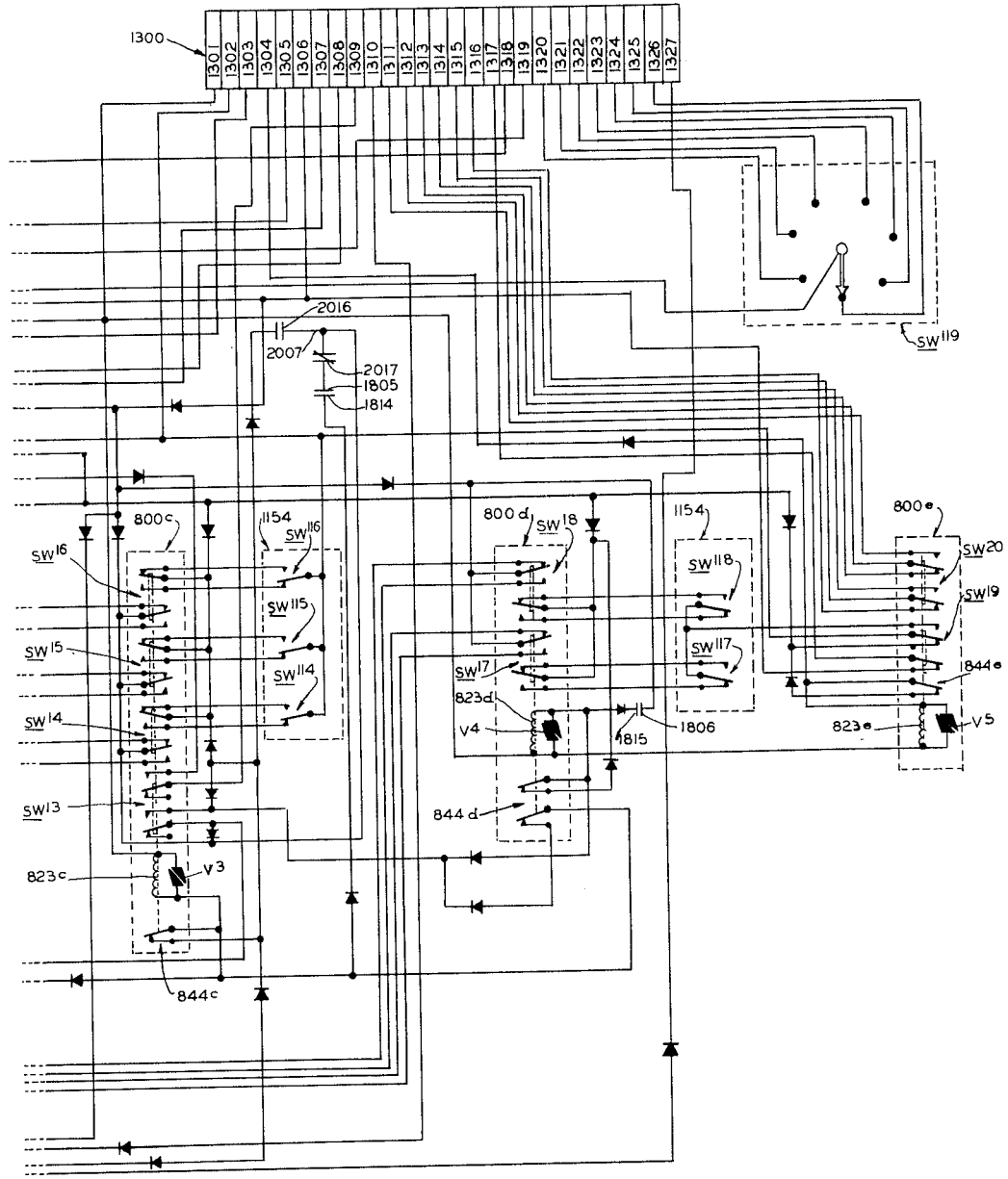
FIG. 117-C
INVENTORS:
EDWARD J. BETZOLD, JR.,
ALLAN W. LINDBERG,
ROBERT J. O'DONNELL, AND
RONALD M. WROB
BY *Alfred W Petchaft*
ATTORNEY Jan. 11, 1966 E. J. BETZOLD, JR., ETAL 3,229,072
COMPUTER DEVICES
Filed May 1, 1961 46 Sheets-Sheet 30
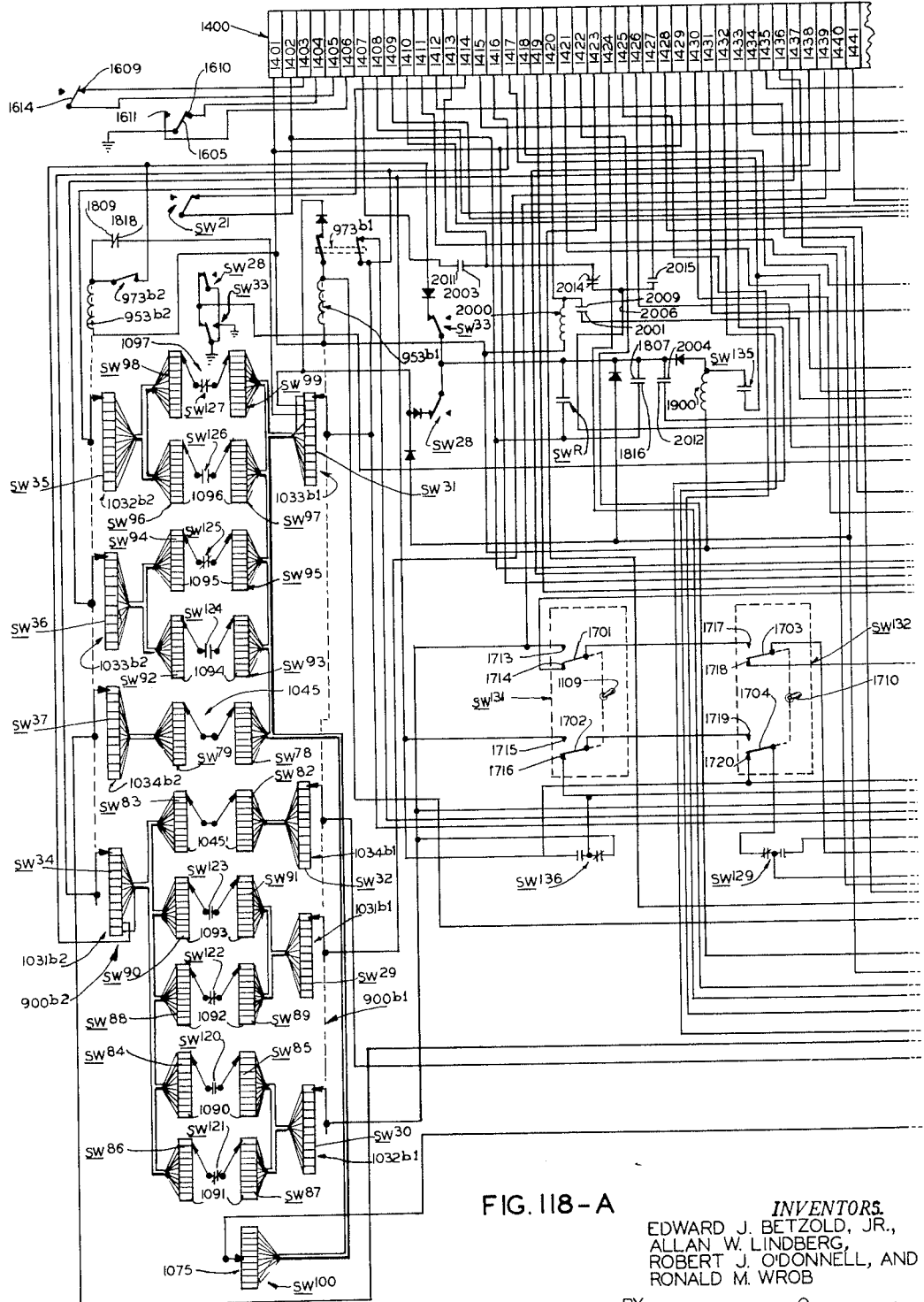
FIG. 118-A
INVENTORS.
EDWARD J. BETZOLD, JR.,
ALLAN W. LINDBERG,
ROBERT J. O'DONNELL, AND
RONALD M. WROB
BY Alfred W. Petchaft
ATTORNEY

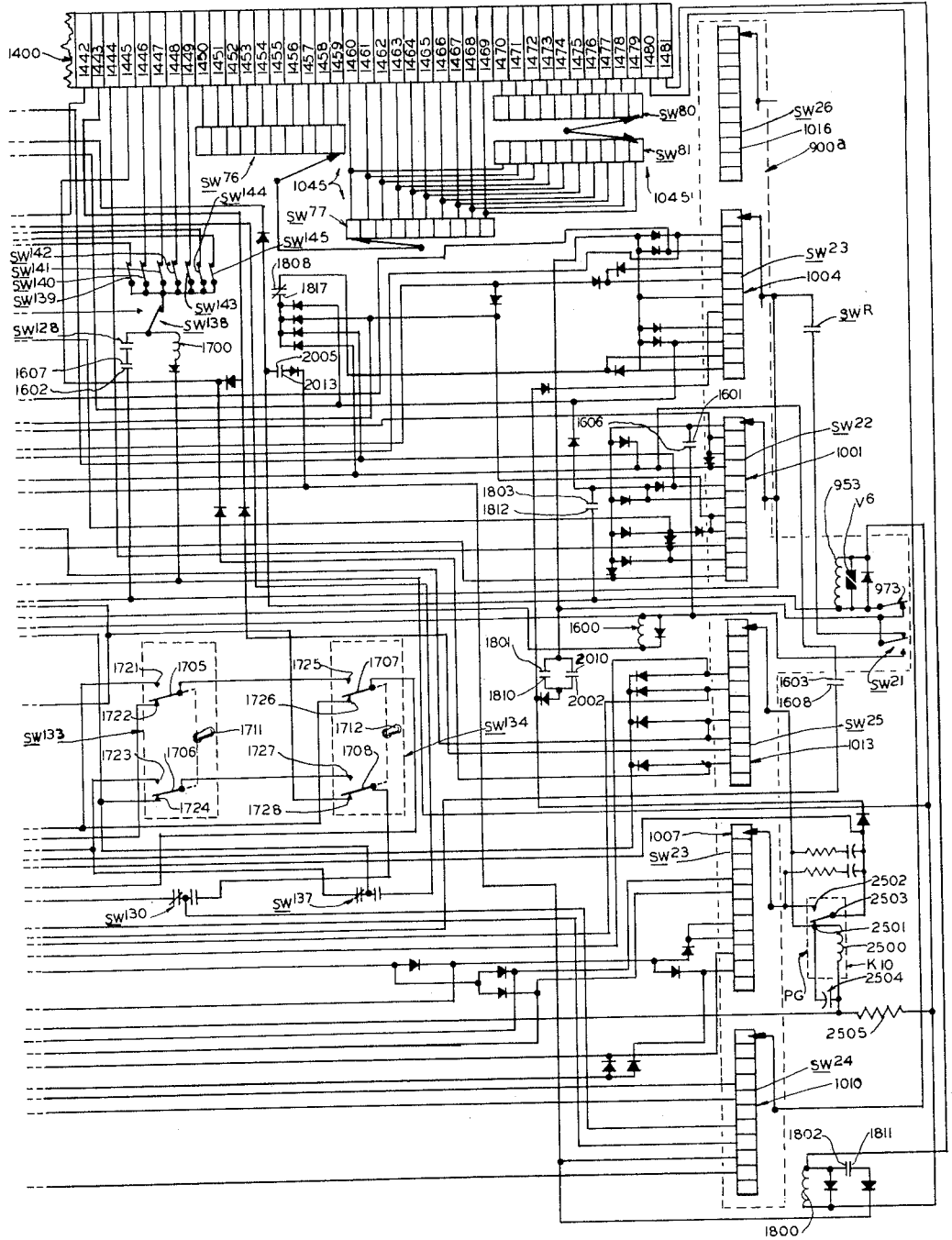
FIG.118-B

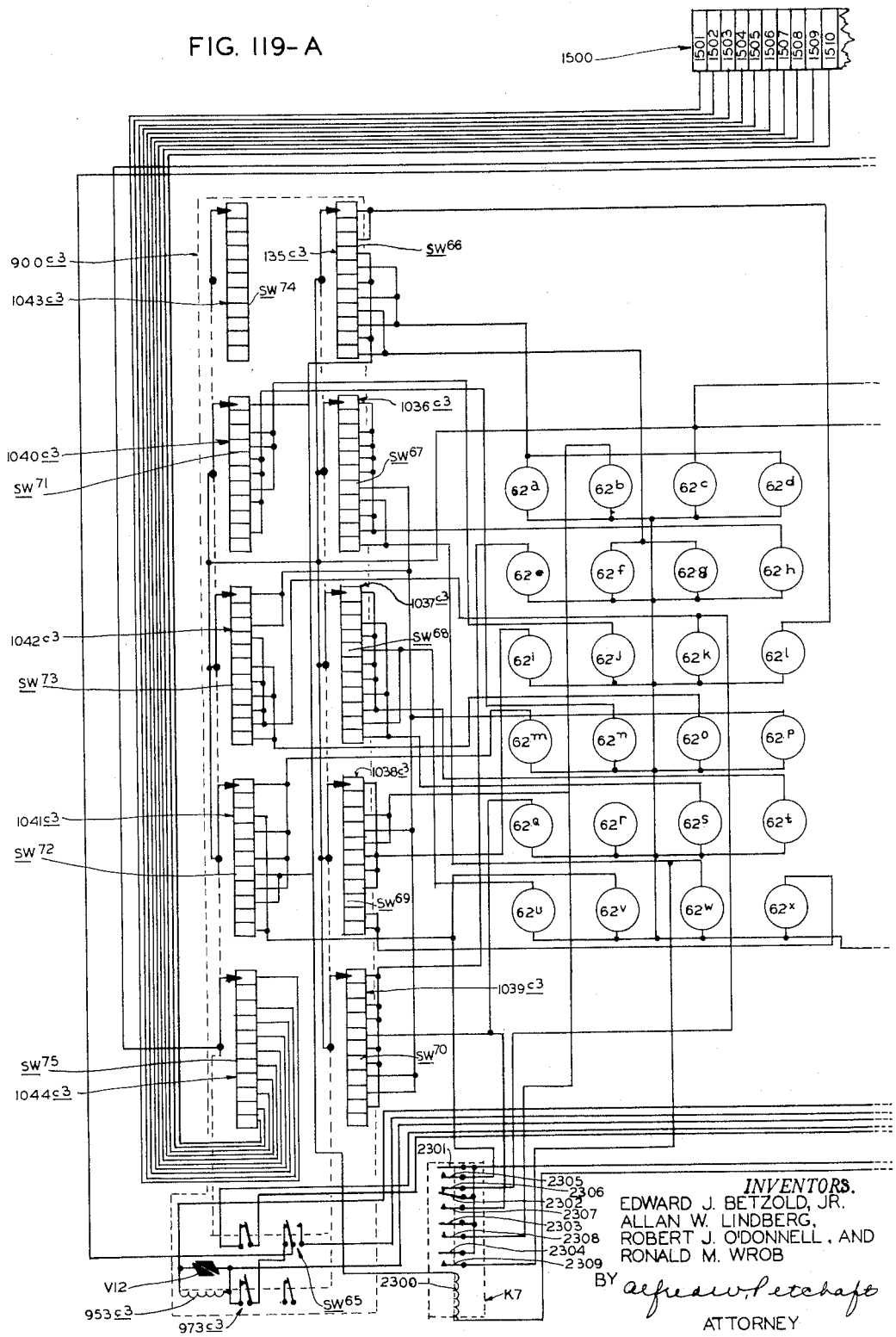
FIG. 119-A
INVENTORS.
EDWARD J. BETZOLD, JR.
ALLAN W. LINDBERG,
ROBERT J. O'DONNELL, AND
RONALD M. WROB
BY Alfred W. Petchaft
ATTORNEY

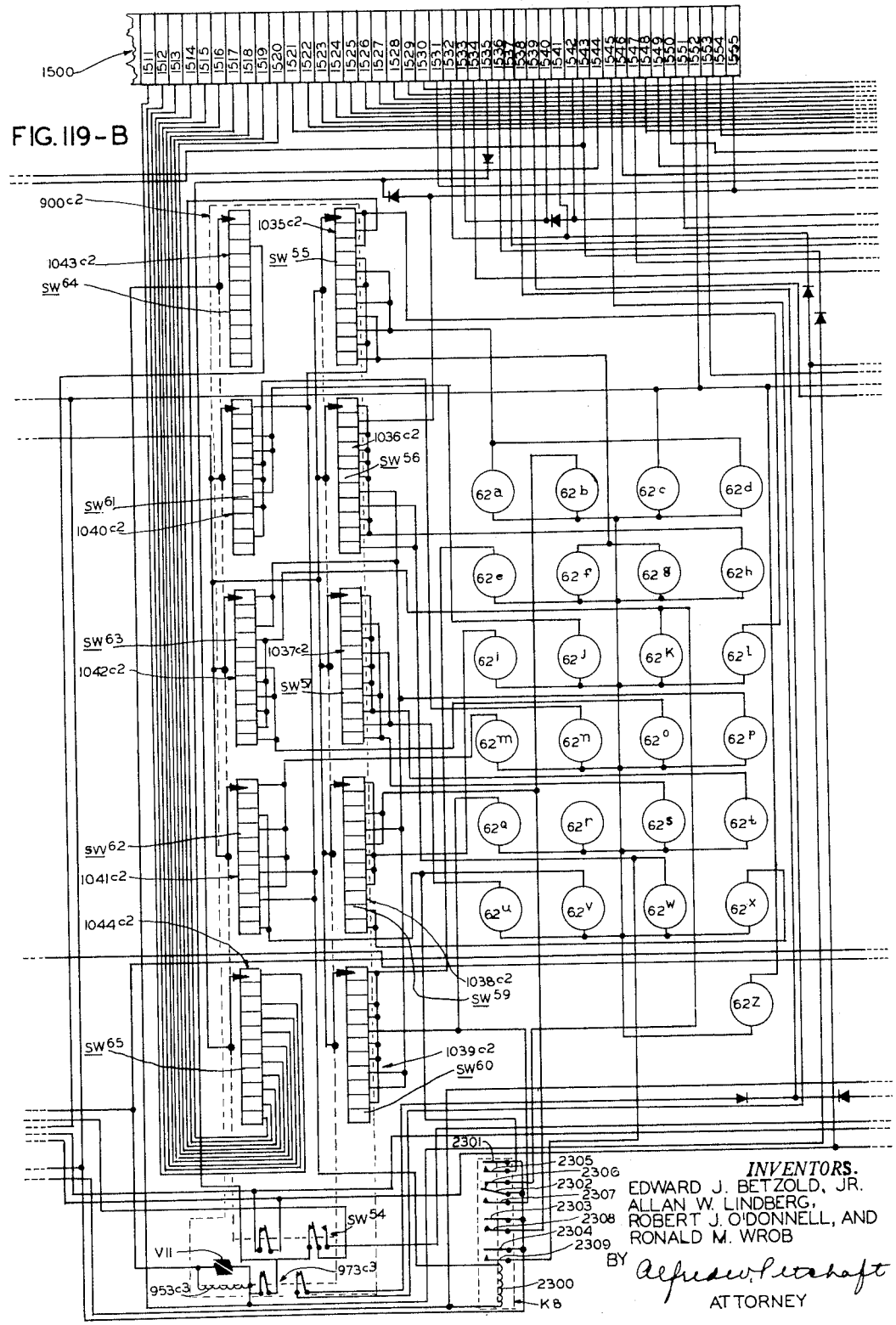

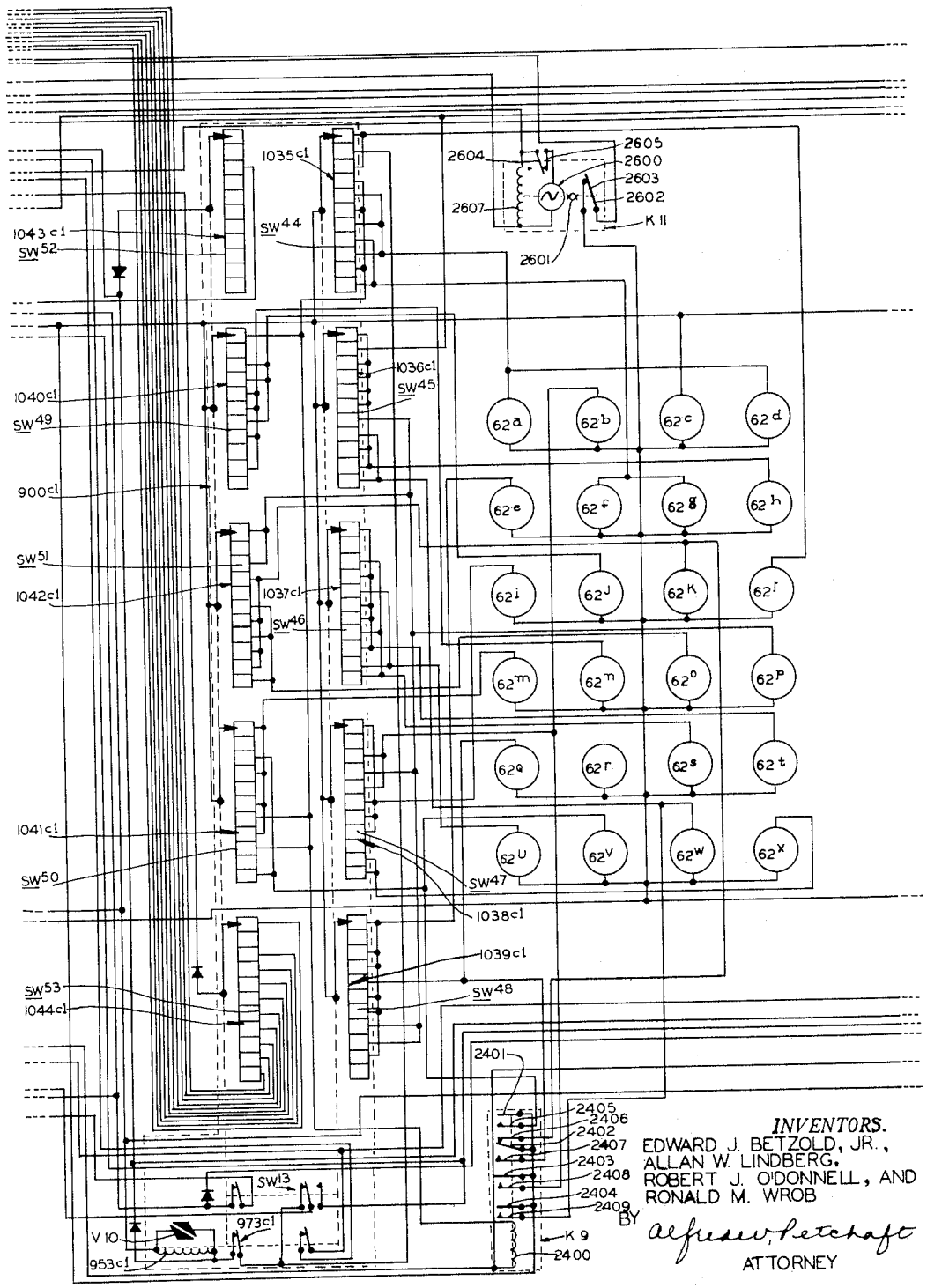
FIG. 119-C

Jan. 11, 1966  E. J. BETZOLD, JR., ETAL  3,229,072
COMPUTER DEVICES
Filed May 1, 1961  46 Sheets-Sheet 35
FIG. 119-D
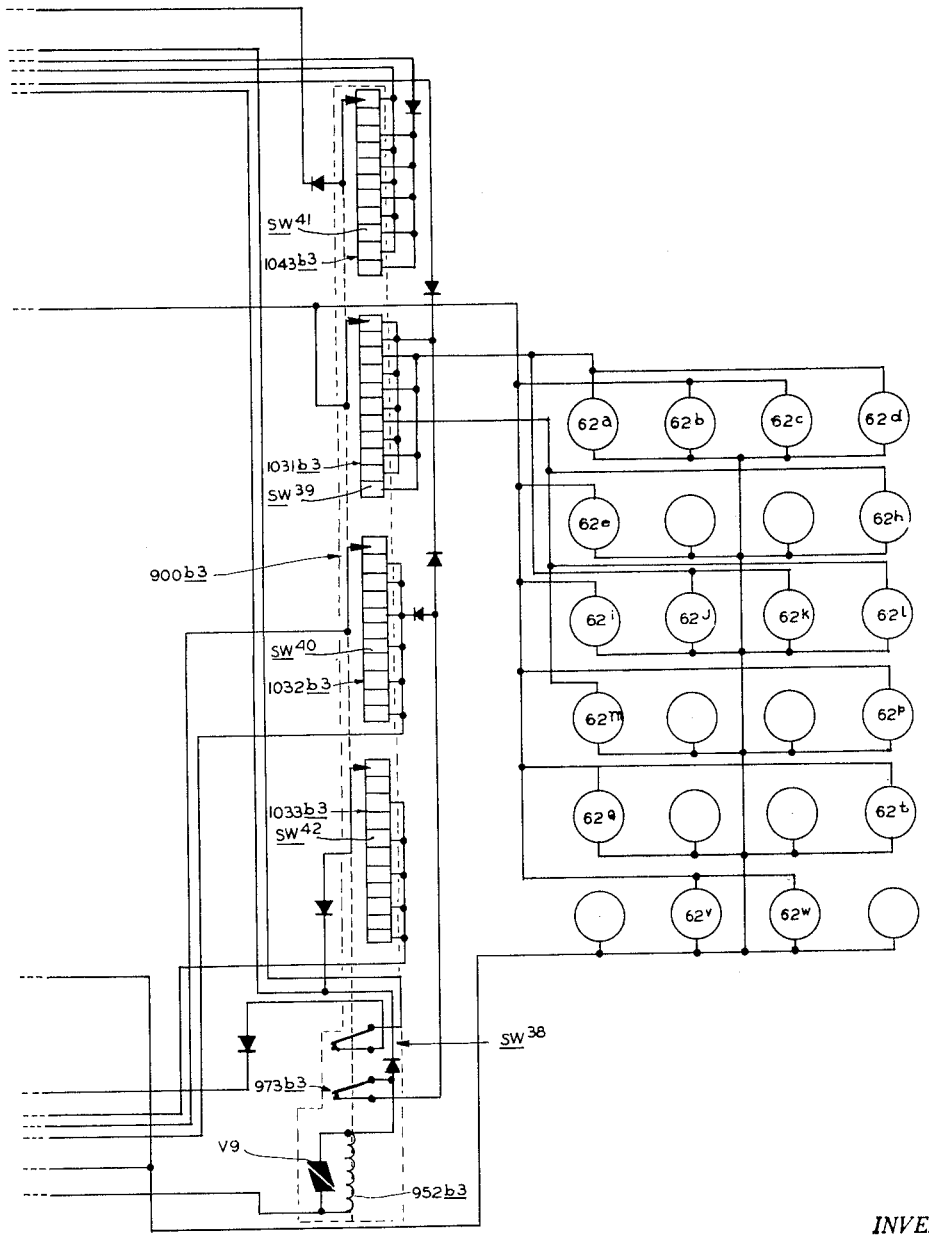
INVENTORS.
EDWARD J. BETZOLD, JR.
ALLAN W. LINDBERG,
ROBERT J. O'DONNELL, AND
RONALD M. WROB
BY *Alfred W. Petchaft*
ATTORNEY Jan. 11, 1966  E. J. BETZOLD, JR., ETAL  3,229,072
COMPUTER DEVICES
Filed May 1, 1961  46 Sheets-Sheet 41

INVENTORS:
EDWARD J. BETZOLD, JR.,
ALLAN W. LINDBERG,
ROBERT J. O'DONNELL, AND
RONALD M. WROB

BY
ATTORNEY

INVENTORS.
EDWARD J. BETZOLD, JR.,
ALLAN W. LINDBERG,
ROBERT J. O'DONNELL, AND
RONALD M. WROB

BY *Alfred W. Petchaft*
ATTORNEY

Jan. 11, 1966  E. J. BETZOLD, JR., ETAL  3,229,072
COMPUTER DEVICES

Filed May 1, 1961  46 Sheets-Sheet 43

*INVENTOR.*
EDWARD J. BETZOLD, JR.,
ALLAN W. LINDBERG
ROBERT J. O'DONNELL AND
RONALD M. WROB

BY Alfred W. Petchaft
ATTORNEY

Jan. 11, 1966   E. J. BETZOLD, JR., ETAL   3,229,072
COMPUTER DEVICES
Filed May 1, 1961   46 Sheets-Sheet 46

INVENTORS:
EDWARD J. BETZOLD, JR.,
ALLAN W. LINDBERG,
ROBERT J. O'DONNELL, AND
RONALD M. WROB

BY Alfred W. Petchaft
ATTORNEY

United States Patent Office 3,229,072
Patented Jan. 11, 1966

3,229,072
COMPUTER DEVICES
Edward J. Betzold, Jr., Affton, Allan W. Lindberg and Robert J. O'Donnell, St. Louis, and Ronald M. Wrob, Sunset Hills, Mo., assignors to Universal Match Corporation, Ferguson, Mo., a corporation of Delaware
Filed May 1, 1961, Ser. No. 109,236
19 Claims. (Cl. 235—61.6)

This invention relates in general to computer systems and to computer equipment adapted for use in such systems. More particularly, this invention relates to a computer system adapted for handling business transactions involving various periods of elapsed time which must be computed and totalized at either constant rates or at different rates for different periods within the total period of elapsed time.

There are a number of business or commercial transactions which require the computation of a period of elapsed time at one or more selected rates. Such computations are commonly made in payroll departments of factories wherein the workers are employed at some selected hourly rate with some different rate for overtime. Similarly, in machine shops where a time card is kept on each job or piece of work as it progresses and different workmen may perform various operations over different periods of elapsed time at various charge-rates, the total cost of machining or otherwise processing the job will normally involve the totalization of charges for all the various periods of elapsed time at different applicable rates. There are many other business and accounting situations requiring time-rate computations of this general type, but, perhaps the most commonly familiar type of transaction involving such computations is the charging system employed on automobile parking lots. Most parking lots record the time of entry of an automobile and charge for the elapsed time during which the automobile is on the parking lot in accordance with some established rate structure. These rate structures vary widely from locality to locality. For example, it is quite common in heavily trafficked metropolitan areas for parking lots to charge twenty-five cents for the first half hour and twenty cents for each subsequent half hour of fraction thereof, in which instance, the rate structure of the parking lot would involve an initial half hourly charge rate and a different constant half hourly charge rate. In other localities where parking space is not at quite such a premium the charge might be twenty-five cents for the first hour and fifteen cents for each succeeding hour or fraction thereof, in which instance the rate structure would involve an initial hourly charge rate and a different constant hourly charge rate. It is also possible to have a rate structure in which the charge for the first hour and each succeeding hour are the same or in which the charges for the first half hour and each succeeding half hour are the same, in which instances the initial charge rate and the constant charge rate are the same. Parking lot accounting is further complicated by reason of the fact that most parking lots employ maximum rates, such as a maximum daily rate or a maximum weekly rate. For instance, if a parking lot were to charge a constant rate of fifty cents for each hour or fraction thereof, the total charge for a twenty-four hour day would run up to twelve dollars which, for ordinary purposes, would be a prohibitive rate structure. In such case, the parking lot owner might superimpose upon his contant hourly rate structure a maximum daily rate of three dollars per day. A similar situation is encountered on parking lots which may have cars stored for one or more weeks. If the daily rate of three dollars per day were applied to a full week, the total charge would come to twenty-one dollars, and this weekly charge conceivably might be unacceptable for the particular area and locality in which such lot is located. Therefore, the parking lot proprietor might superimpose upon his rate structure a weekly maximum of ten dollars.

Except for so-called "honor system" parking lots, of which there are very few, practically all parking lots require one or more attendants who will issue a parking check or ticket to each customer entering the parking lot. Ordinarily, such parking checks or parking tickets are time-stamped and placed under the windshield wiper or in some other convenient location on the automobile. It is also customary to hand the customer a stub by which he can identify and claim his automobile when he returns to drive away. At the time the vehicle is driven away, either the parking check, the customer's stub, or both are time-stamped and the attendant must mentally compute the elapsed time by deducting the initial time of entry from the time of departure and then mentally compute the total charge for such period of elapsed time at the rate structure applicable for the particular parking lot. This series of mental computation slows down the departure of vehicles from the parking lot and, in rush hours, creates quite a traffic jam within the exit lanes of the parking lot. Moreover, parking lot attendants usually are not highly educated personnel with a prodigious capacity for mental arithmetic and, consequently, many mistakes occur. When the mistake is in favor of the parking lot owner, the customer usually does not realize the error, if at all, until some time after he has driven away from the parking lot and, of course, it is then too late to return for purposes of complaint. Indeed, the amount involved is usually not sufficient to warrant the lost time which would be required to drive back to the parking lot and register such complaint. Consequently, the customer is merely irritated and the parking lot proprietor suffers in terms of public relations and patronage. On the other hand, if the error is in favor of the customer, the parking lot owner will suffer in terms of lost revenue. Finally, there is always a possibility of petty pilferage on the part of parking lot attendants. It is possible for parking lot attendants deliberately and knowingly to overcharge a customer by the amount of an extra half hour or hour and pocket the overcharge. If the customer immediately senses the error and complains, the attendant will immediately correct the "mistake" with appropriate apology. Usually, however, the customer does not sense the mistake, if at all, until some time after departure and, again, it is to late for complaint, with the result that the parking lot owner will suffer in terms of public relations and patronage.

It is, therefore, the primary object of the present invention to provide a computer system which is capable of establishing or sensing a period of elapsed time and computing the charge for such period in accordance with a predetermined rate structure.

It is another object of the present invention to provide a computer system which is capable of mechanically recording the initial time which marks the beginning of an elapsed period, and, subsequently, by sensing the initial recorded time, determine the elapsed period which will then be used in the computation performed by the computer according to some predetermined rate structure or series of arithmetical factors.

It is also an object of the present invention to provide computer equipment for use in a computing system of the type stated, which computing equipment is capable of mechanical recording an initial time, subsequently sensing the initial time to establish the elapsed period and finally calculating a result as a function of the elapsed period and a predetermined rate or series of rates.

It is an additional object of the present invention to provide a computer system and equipment for use in connection therewith by which a ticket is issued bearing a mechanically applied record of the time of issuance, which record can be subsequently sensed at a later time, thereby establishing an elapsed time period which will then be used in a computation performed by the equipment.

It is a further object of the present invention to provide a computer of the type stated in which the rate factor settings may be changed to conform to a wide variety of different rate structures commonly in use.

It is a further object of the present invention to provide a computer which, when used, for example, in connection with a parking lot, is capable of performing all of the requisite accounting operations associated with a parking transaction, including the issuance of a ticket bearing a record of the time of issuance, subsequently computing the period of elapsed time connected with the parking transaction represented by such ticket, and finally computing the monetary amount chargeable for such period of elapsed time, according to whatever rate structure is employed on the particular parking lot which is being monitored by the computer.

It is also an object of the present invention to provide a computer of the type stated which is extremely rugged in construction and highly reliable in performance.

It is also an object of the present invention to provide a computer of the type stated which is comparatively compact and is relatively inexpensive, both as to initial cost and maintenance, so that its application becomes economically feasible for a number of common-place time-rate accounting operations, such as those employed on parking lots, and the like.

It is a further object of the present invention to provide a computer of the type stated which is modular in construction and is, therefore, extremely flexible in terms of initial assemlby, convenient modification for variety of application, and simplicity of maintenance.

It is also an object of the present invention to provide a computer having visible indicator means for displaying the computed results.

It is an additional object of the present invention to provide a computer adapted for monitoring commercial customer-transactions in such a manner that the computed result will be visibly displayed to the customer at the time the transaction is completed.

With the above and other objects in view, our invention resides in the novel features of form, construction, arrangement, and combination of parts presently described and pointed out in the claims.

In the accompanying drawings (forty-five sheets)—

FIG. 4 is a perspective view of the computer shown in FIG. 1;

FIG. 5 is a vertical sectional view taken along line 5—5 of FIG. 2, the section being taken in such manner as to show only the details of construction of the outer housing or cabinet;

FIG. 6 is a vertical sectional view taken along line 6—6 of FIG. 5, the computer components not being shown in order to illustrate the cabinet structure;

Figure 2:
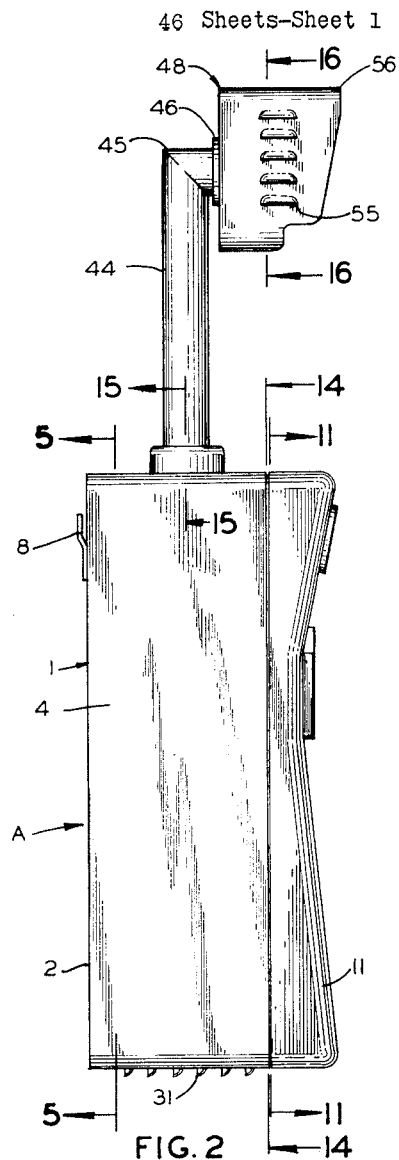
FIG. 2 is a side elevational view of the computer shown in FIG. 1.
Figure 3:
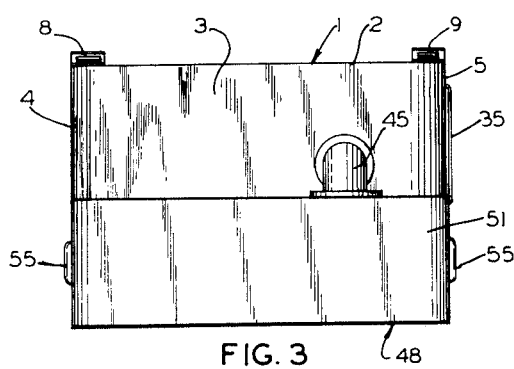
FIG. 3 is a top plan view of the computer shown in FIG. 1.
Figure 14:
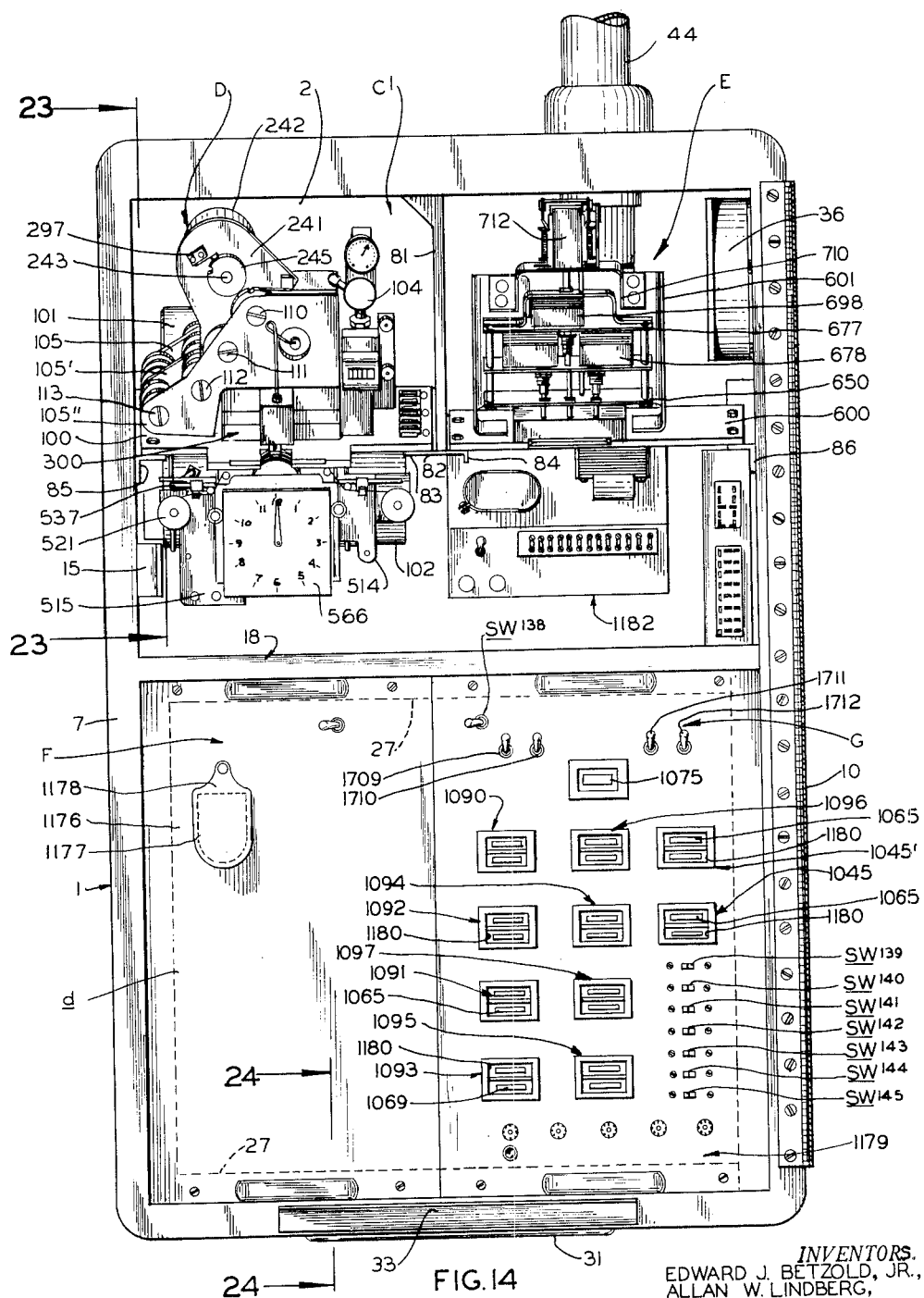
Figure 23:
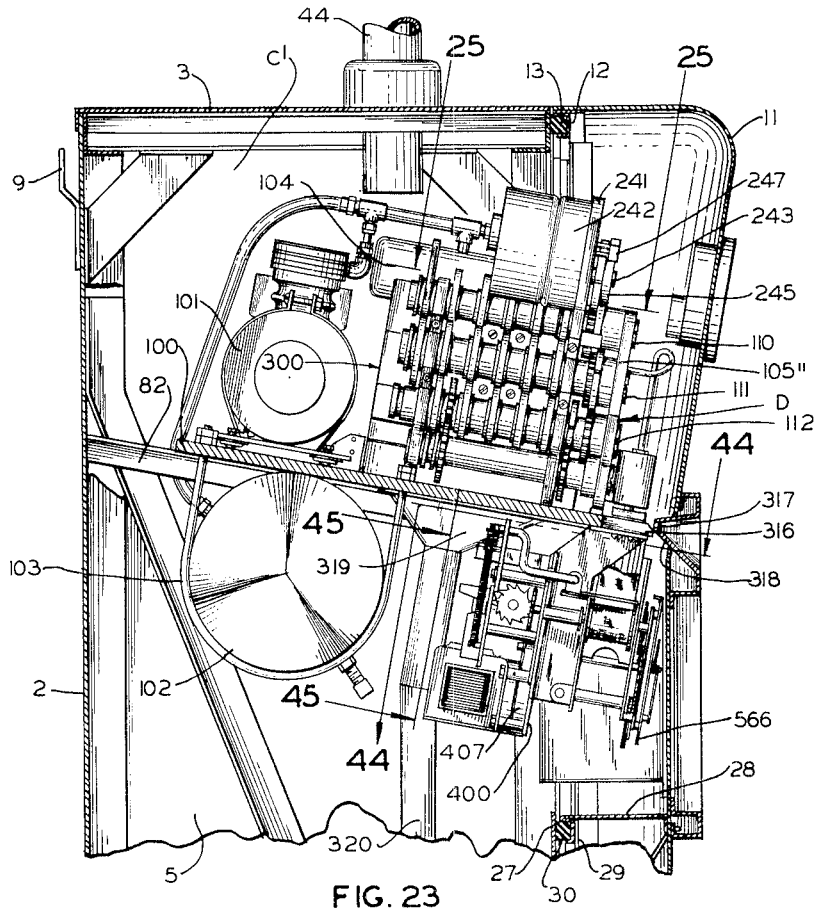
Figure 24:
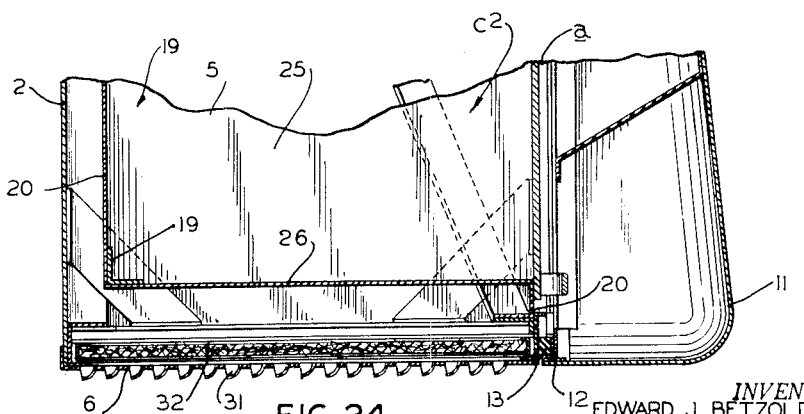
Figure 25:
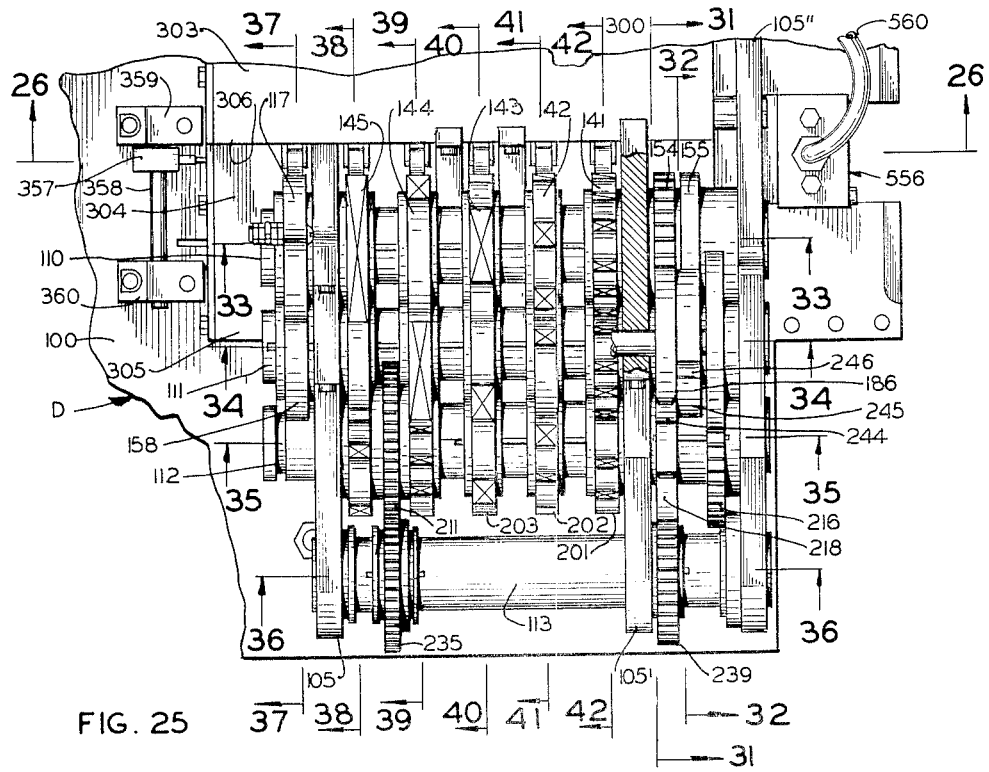
Figure 26:
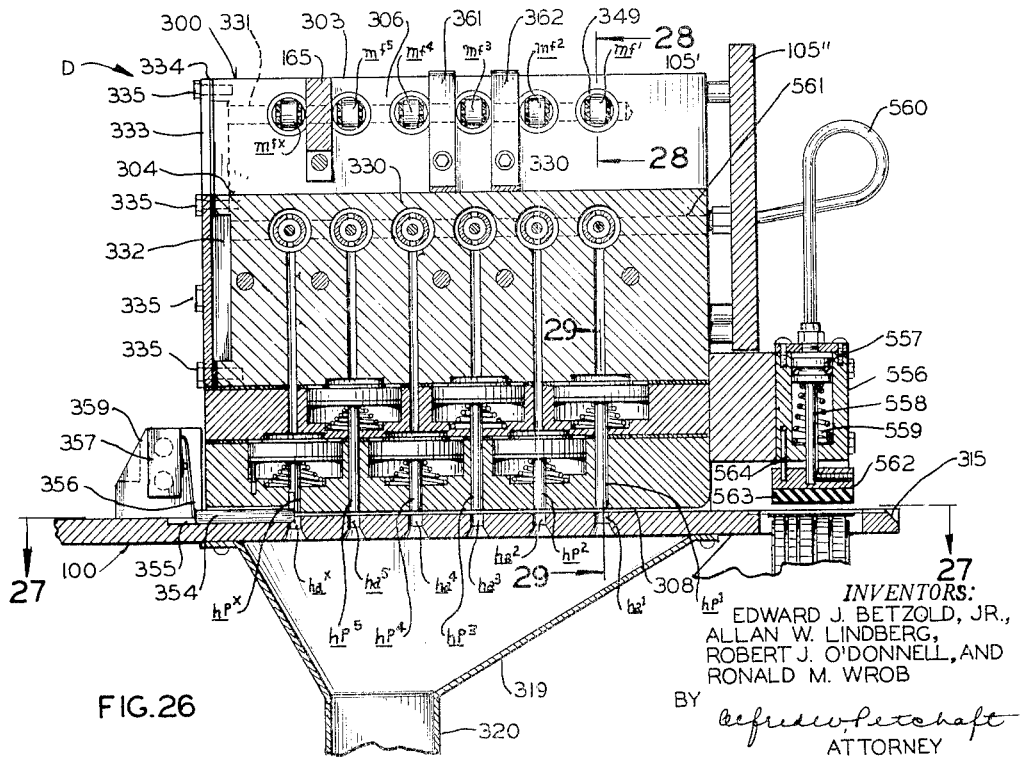
Figure 44:
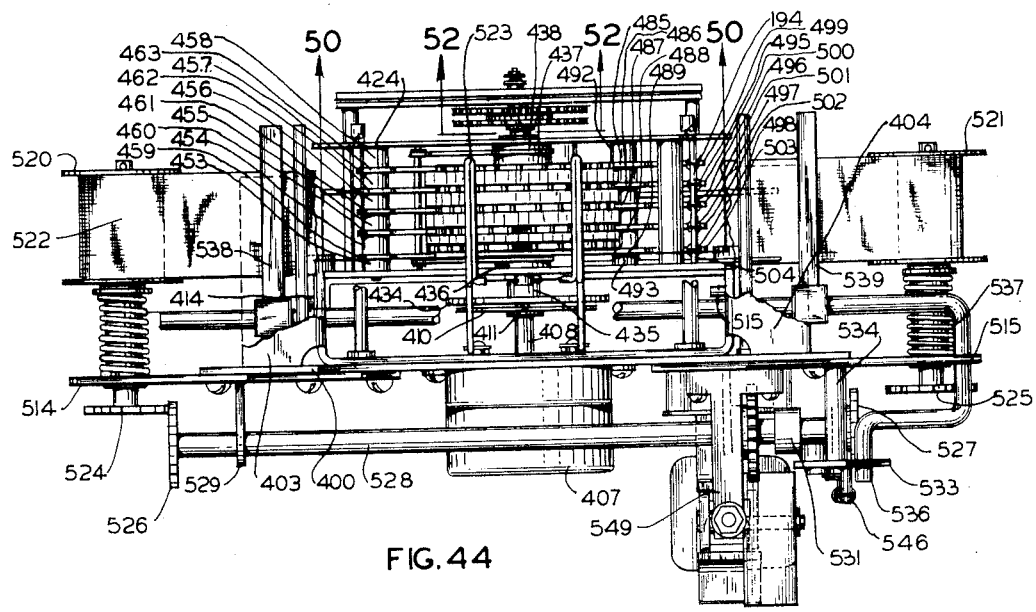
Figure 45:
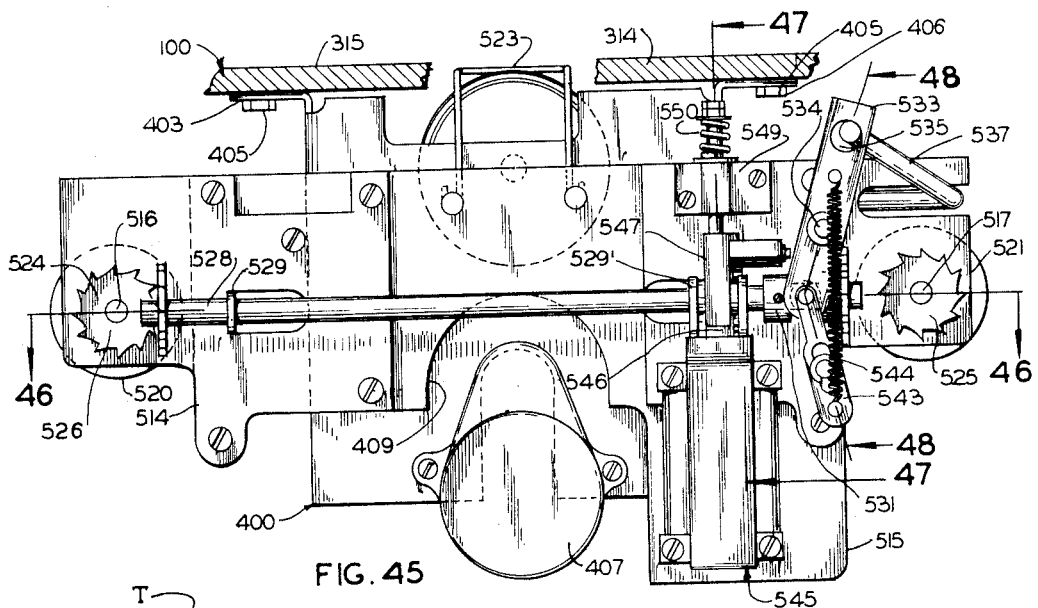
Figure 43:
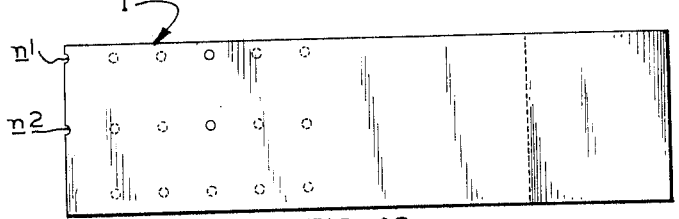
Figures 52, 53, 54:
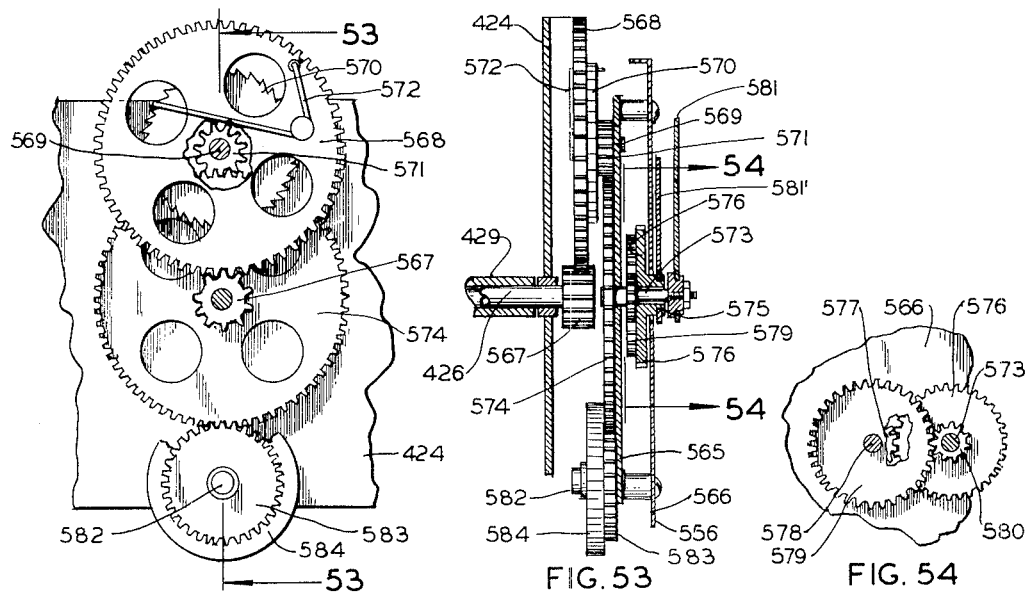
Figure 55:
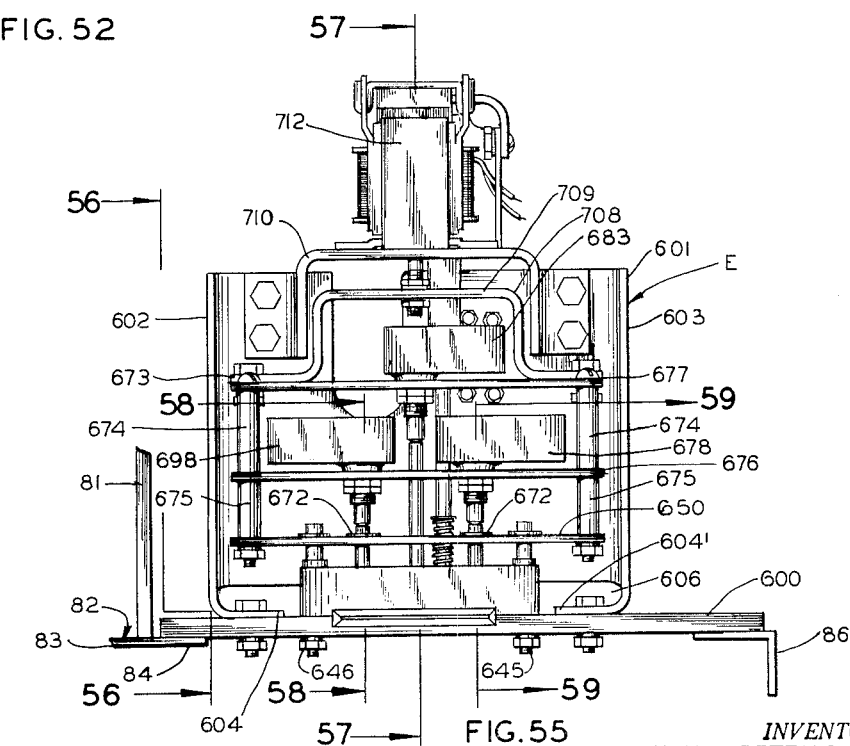
Figure 62:
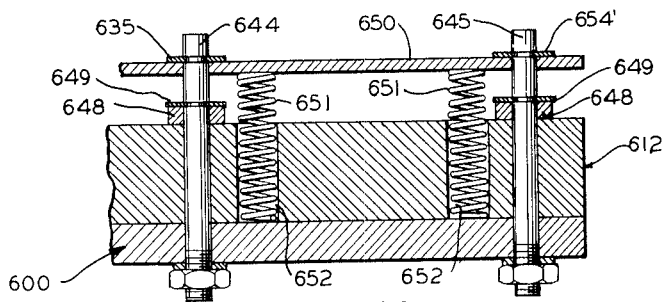
Figure 63:
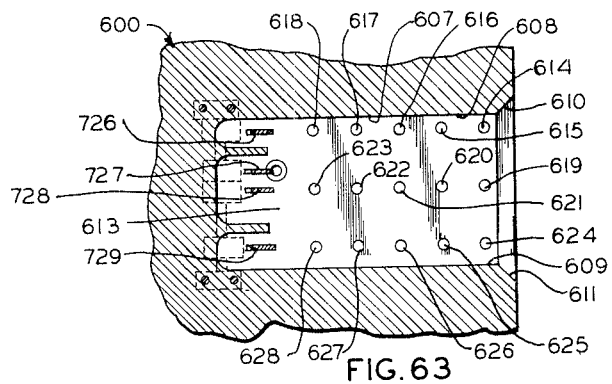
Figure 64:
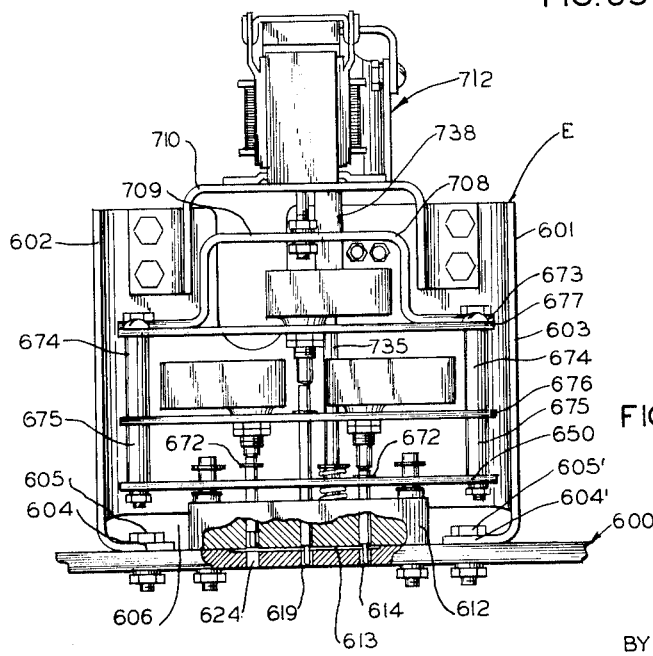

FIGS. 7, 8, and 9 are horizontal sectional views taken along lines 7—7, 8—8, and 9—9, respectively, of FIG. 6;

FIG. 10 is a fragmentary perspective view of the air-filter tray employed in and forming a part of the present invention;

FIG. 11 is a vertical sectional view taken along line 11—11 of FIG. 2;

FIGS. 12 and 13 are fragmentary transverse sectional views taken along lines 15—15 and 16—16, respectively, of FIG. 11;

FIG. 14 is a vertical sectional view taken along line 14—14 of FIG. 2;

FIGS. 15 and 16 are fragmentary vertical sectional views taken along lines 15—15 and 16—16, respectively, of FIG. 2;

FIG. 17 is a fragmentary sectional view taken along line 17—17 of FIG. 16;

FIGS. 18 and 19 are fragmentary sectional views taken along lines 18—18 and 19—19, respectively of FIG. 17;

FIG. 20 is a fragmentary perspective view of a keeper socket for a pin-latch employed in and forming part of the present invention;

FIGS. 21 and 22 are fragmentary sectional views taken along lines 21—21 and 22—22, respectively, of FIG. 4;

FIGS. 23 and 24 are fragmentary sectional views taken along lines 23—23 and 24—24, respectively, of FIG. 14;

FIG. 25 is a fragmentary sectional view taken along line 25—25 of FIG. 23;

FIG. 26 is a transverse sectional view taken along line 26—26 of FIG. 25;

FIGS. 27, 28, and 29 are fragmentary sectional views taken along lines 27—27, 28—28, and 29—29, respectively, of FIG. 26;

FIG. 30 is an enlarged sectional view of the rearward punch-mechanism shown in FIG. 26 (the left side of FIG. 26 being the rearward side);

FIGS. 31, 32, 33, 34, 35, 36, 37, 38, 39, 40, 41, and 42 are fragmentary sectional views taken along lines 31—31, 32—32, 33—33, 34—34, 35—35, 36—36, 37—37, 38—38, 39—39, 40—40, 41—41, and 42—42, respectively, of FIG. 25;

FIG. 43 is a fragmentary plan view of a ticket forming a record of a transaction which can be computed in accordance with the present invention;

FIGS. 44 and 45 are transverse fragmentary sectional views taken along lines 44—44 and 45—45, respectively, of FIG. 23;

FIGS. 46, 47, and 48 are fragementary sectional views taken along lines 46—46, 47—47, and 48—48, respectively, of FIG. 45;

FIG. 49 is a fragmentary sectional view similar to FIG. 45 showing the ribbon-feed mechanism in an alternative position;

FIGS. 50–A and 50–B are fragmentary sectional views both taken along line 50—50 of FIG. 44 and respectively showing the printing mechanism in two different operative positions;

FIGS. 51–A, 51–B, 51–C, 51–D, and 51–E are fragmentary sectional views, all taken along line 51—51 of FIG. 50–A, showing the incremental pawls in various positions of operations;

FIG. 52 is a fragmentary sectional view taken along line 52—52 of FIG. 44;

FIG. 53 is a fragmentary sectional view taken along line 53—53 of FIG. 52;

FIG. 54 is a fragmentary sectional view taken along line 54—54 of FIG. 53;

FIG. 55 is a front elevational view of the ticket-reading component employed in and forming a part of the present invention;

FIGS. 56, 57, 58, and 59 are fragmentary sectional views taken along lines 56—56, 57—57, 58—58, and 59—59, respectively, of FIG. 55;

FIG. 60 is a fragmentary transverse sectional view taken along line 60—60 of FIG. 56;

FIGS. 61 and 62 are fragmentary sectional views taken along lines 61—61 and 62—62, respectively, of FIG. 60;

FIG. 63 is a fragmentary sectional view taken along line 63—63 of FIG. 56;

FIG. 64 is a front elevational view partly broken away and in section, of the ticket-reading component showing the latter in ticket-reading or "down" position;

FIG. 65 is a top plan view of one typical so-called count-back steppers forming a part of the present invention;

FIG. 66 is a side elevational view of the count-back steppers;

FIG. 67 is a bottom plan view of the count-back steppers;

FIGS. 68 and 69 are fragmentary sectional views taken along lines 68—68 and 69—69, respectively, of FIG. 66;

FIG. 70 is a fragmentary sectional view taken along line 70—70 of FIG. 65;

FIG. 71 is a schematic view of the several switching cams used in a count-back stepper for counting minutes;

FIG. 72 is a schematic view of the several switching cams used in a count-back stepper for counting hours;

FIGS. 73, 74, and 75 are, respectively, a top plan view, a side elevational view and a bottom plan of another typical count-back stepper;

FIGS. 76 and 77 are fragmentary sectional views taken along lines 76—76 and 77—77, respectively, of FIG. 74.

FIG. 78 is a fragmentary sectional view taken along line 78—78 of FIGURE 73;

FIG. 79 is a schematic view of the several cams employed in the count-back stepper shown in FIGS. 73 to 78 for counting days;

FIGS. 80 and 81 are respectively top plan and side elevational views of another typical count-back stepper forming a part of the present invention;

FIG. 82 is a bottom plan view of the cam switch shown in FIG. 80;

FIG. 83 is a fragmentary sectional view taken along line 83—83 of FIG. 80;

FIG. 84 is a fragmentary section view taken along line 84—84 of FIG. 81;

FIG. 85 is a schematic view of the several cams employed in the stepping switch of the type shown in FIGS. 80 to 84 for counting weeks;

FIG. 86 is a schematic view of several cams employed in the count-back stepper shown in FIGS. 80 to 84 for counting elapsed minutes;

FIG. 87 is a bottom plan view of a typical stepping switch or so-called "digital stepper" forming a part of the present invention;

FIG. 88 is a vertical sectional view taken along line 88—88 of FIG. 87;

FIG. 89 is a transverse sectional view taken along line 89—89 of FIG. 87;

FIG. 90 is a top plan view of the digital stepper switch shown in FIG. 87;

FIG. 91 is a front elevational view of the digital stepper shown in FIG. 87;

FIG. 92 is a side elevational view of the digital stepper shown in FIG. 87;

FIGS. 93 and 94 are fragmentary sectional views taken along lines 93—93 and 94—94, respectively, of FIG. 91;

FIG. 95 is a side elevational view of a digital stepper of the general type shown in FIGS. 87 and 88 except that it has four banks of contacts;

FIG. 96 is a side elevational view of a digital stepper of the general type shown in FIGS. 87 and 88 except that it has ten banks of contacts;

FIG. 97 is a perspective view of a binary clock employed in and forming part of the present invention;

FIG. 98 is a rear elevational view of the binary clock;

FIG. 99 is a fragmentary view taken along line 99—99 of FIG. 97;

FIG. 100 is a vertical sectional view taken along line 100—100 of FIG. 98;

FIGS. 101, 102, 103, 104, and 105 are fragmentary sectional views taken along lines 101—101, 102—102, 103—103, 104—104, and 105—105, respectively, of FIG. 100;

FIG. 106 is a schematic wiring diagram of the internal motor circuitry of the binary clock;

FIG. 107 is a side elevational view of a typical four-bank rotary switch employed in the present invention;

FIGS. 108 and 109 are, respectively, top and bottom plan views of the rotary switch;

FIG. 110 is a sectional view taken along lines 110—110 of FIG. 107;

FIG. 111 is a sectional view taken along lines 111—111 of FIG. 108;

FIGS. 112, 113, and 114 are transverse sectional views taken along lines 112—112, 113—113, and 114—114 of FIG. 111;

FIG. 115 is a front elevational view, partly broken away and in section, of a typical two-bank rotary switch employed in the present invention;

FIG. 116 is a front elevational view, partly broken away and in section, of a typical one-bank rotary switch employed in the present invention;

FIGS. 117–A, 117–B, and 117–C are interrelated figures and taken together constitute the wiring diagram of the time-comparator module forming a part of the present invention;

FIGS. 118–A, 118–B are interrelated figures and taken together constitute the wiring diagram of the rate-setting module forming a part of the present invention;

FIGS. 119–A, 119–B, and 119–C, 119–D are interrelated figures and taken together constitute the wiring diagram of the charge-display module forming a part of the present invention; and FIGS. 120 to 130, inclusive, are schematic wiring diagrams of the eleven successive circuit-configurations or so-called modes through which the circuitry of the present invention passes during the course of a single computing cycle.

Broadly speaking, the computing system of the present invention comprises time-controlled ticket-punching means which is adapted to record on a ticket by a suitable punch-code the exact time at the beginning of a period of elapsed time. In the embodiment herein described, a binary code is used, but other codes, such as the seven-hole decimal code and the inverted binary, or so-called "Grey" code may also be used. Preferably, thought not necessarily, the time may also be printed legibly upon the ticket. Subsequently, when the ticket is again inserted in the computer at the end of the period of elapsed time, means is provided to sense or "read" the ticket, and, by comparison of the initial record with the exact time at which the ticket is "read," determine the amount of time which has elapsed. This means also includes a binary clock which is keeping in step with the clock-controlled ticket-punching means. Means are also provided for multiplying the period of elapsed time by some preselected rate or series of rates which may be varied to fit the requirements of the commercial transaction being monitored. In addition, visible indicator means are provided for displaying the computed result. Preferably these inter-related components are separately constructed as modules and electrically connected by terminal blocks and plug-in connectors associated therewith. Thus, the complete system can be assembled within a single housing or, if desirable, some components can be located at a remote position with respect to other components.

Referring now in more detail and by reference characters to the drawings which illustrate a preferred embodiment of the present invention, A designates a parking-lot computer device comprising an outer housing 1 having a rear wall 2, a top wall 3, side walls 4, 5, and a bottom wall 6, the forward margins of the walls 3, 4, 5, and 6 defining a rectangular door-opening d bordered or framed by a continuous rectangular facing-strip 7 formed preferably of a channel having U-shaped cross-section.

Welded to the rearwardly presented face of the back wall 2 are hanger brackets 8, 9 by which the housing can be supported from a building wall or other similar structure. In this connection, it will, of course, be obvious that the housing 1 can also be conventionally supported by legs or some similar pedestal-like structure which rises from the ground or floor but, since such structures are entirely conventional, no effort has been made to illustrate or describe the particular manner in which the housing is supported.

Swingably mounted along the forward vertical margin of the side wall 5 preferably by means of a piano-type hinge 10 is a front door 11 which is of such marginal size as to register precisely with the perimentral margins of the housing 1. The door 11 is relatively thick and hollow, being provided around its rearwardly presented peripheral margins with a U-shaped framing channel 12 having a rearwardly projecting continuous rubber sealing gasket 13 adapted to form a pressure-fitting seal against the facing strip 7 of the housing 1. The door 11 is also provided with a key-locked latch member 14 which is adapted for locking engagement in a keeper 15 rigidly mounted to a lateral face of the facing-strip 7 by means of screws 16, all as best seen in FIG. 6.

Welded or otherwise rigidly secured at their ends to, and extending horizontally across the interior of, the housing 1 are transverse beams 17, 18, 19, 20 formed preferably of angle-iron, theb eams 18, 20 having their vertical flanges flush with the front plane of the housing 1. Supported upon the beams 17, 18, 19, 20 is an inner housing 21 having a rear wall 22, a top wall 23, side walls 24, 25, and a bottom wall 26. Around its forwardly presented margins the inner housing 21 is provided with a perimetral flange 27, the forward face of which lies within the front plane of the housing 1 so as to be effectively sealed by the gasket 13 when the door 11 is closed. In order to complete the seal, the door 11 is provided with a horizontal shelf-like plate 28 which is provided with a rearwardly opening horizontal channel 29 having an intermediate cross-gasket 30 which bears against the flange of the beam 18 when the door 11 is closed, thereby sealing the upper margin of the inner housing 21.

The walls 22, 24, 25, 26 of the inner housing are spaced inwardly from the walls 2, 4, 5, 6 by a sufficient distance to allow free circulation of air around the inner housing 21 and, of course, the top wall 23 of the housing 21 is spaced downwardly by a substantial distance from the top wall 3 of the housing 1. Thus, the housing 1 is, in effect, subdivided into an upper compartment $C^1$ and a lower air-tight compartment $C^2$.

As shown in FIG. 5, the bottom wall 6 of the housing 1 is provided with air-intake louvers 31 which open upwardly to the interior of the housing 1 through a removable air-filter 32, consisting of a rectangular frame 33 and relatively thick mat 34 formed preferably of glass fibers suitably coated with a tacky liquid of the type conventionally used for filtration media of this type. As best seen in FIG. 21, the side wall 5 of the housing 1 is also provided with air-discharge louvers 35 which open inwardly to the upper portion of the compartment $C^1$ through a tubular sleeve 36 which supports an exhaust fan 37, connected through a thermostat to a source of electric current so as to be "on" when the temperature within the housing 1 exceeds a predetermined upper limit, and thereby draw cooling air through the louvers 31 around the inner housing 21 and through the compartment $C^1$. Since thermostatically-controlled fans are conventional, the thermostat and electrical circuit associated therewith are not shown or specifically described herein. Since the compartment $C^2$ is air-tight, the cooling of its interior and the computer-components therein contained will take place by means of heat exchange through the walls 22, 23, 24, 25, 26 of the inner housing 21 and it is, therefore, desirable that these walls be made of heat-conductive material.

The top wall 3 of the housing 1 is provided with a circular aperture 38 which is rimmed on its underside with a short cylindrical sleeve 39 welded to the underface of the top wall 3. Similarly welded to the upper face of the top wall 3 in concentric registration with the aperture 38 is an externally threaded sleeve 40 which is internally provided with a rubber clutch-ring 41 having an upwardly presented steel collar 42 which bears against an annular clamping nut 43 threaded downwardly upon the sleeve 40. Shiftably mounted within and extending through the aperture 38 and the sleeves 39, 40 is a tubular post 44 opening at its lower end to the interior of the compartment $C^1$ and being provided at its upper end with a short right-angle bend 45 having an annular flange 46 welded externally thereto. The bend 45 projects slightly beyond the flange 46 and extends through the rear wall 47 of an oblong rectangular display-box 48 being rigidly secured thereto by bolts 49 and a reinforcing collar 50, all as best seen in FIG. 18.

The display-box 48 is formed preferably of sheet metal and includes, in addition to the rear wall 47, a top wall 51, a bottom wall 52, and side walls 53, 54, the walls 52, 53, 54, being provided with louvers 55 to permit circulation of air through the interior of the display-box 48. The top wall 51 and side walls 53, 54 project forwardly in common to provide a hood 56. Welded to the interior faces of the top wall 51 and bottom wall 52 are angle-bars 57, 58, which are spaced forwardly of the rear wall 47 and are in vertical alignment for supporting a vertical panel 59 secured thereto along its upper and lower horizontal margins by means of screws 60. Conventionally seated in the panel 59 are four spaced sets of bulb-sockets 61 of the type commonly employed in automobile lighting circuits for receiving conventional small-sized light bulbs 62. There are twenty-four sockets 61 and bulbs 62 in each set and these are arranged in four vertical rows of six. Since all sets are alike, one such set may be described in detail and, for purposes of clarification, the twenty-four bulbs are numbered $62^a$, $62^b$, $62^c$, $62^d$, $62^e$, $62^f$, $62^g$, $62^h$, $62^i$, $62^j$, $62^k$, $62^l$, $62^m$, $62^n$, $62^o$, $62^p$, $62^q$, $62^r$, $62^s$, $62^t$, $62^u$, $62^v$, $62^w$, $62^x$, in the following order:

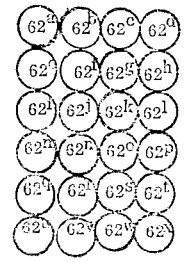

and by lighting various bulbs by circuitry presently to be described, it is possible to establish various configurations, or light patterns representing the digits "0" to "9," inclusive. For the digit "0," the light pattern is:

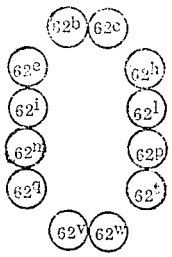

For the digit "1," the light pattern is:

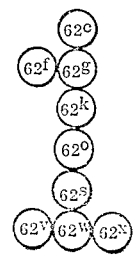

For the digit "2," the light pattern is:

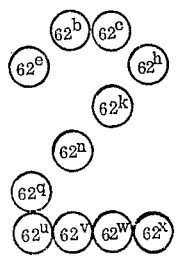

For the digit "3," the light pattern is:

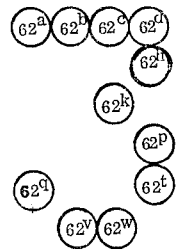

For the digit "4," the light pattern is:

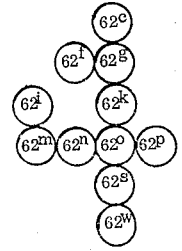

For the digit "5," the light pattern is:

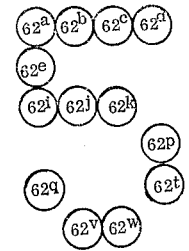

For the digit "6," the light pattern is:

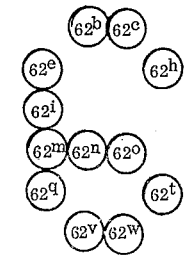

For the digit "7," the light pattern is:

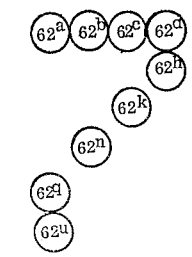

For the digit "8," the light pattern is:

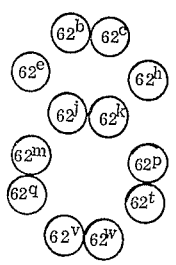

For the digit "9," the light pattern is:

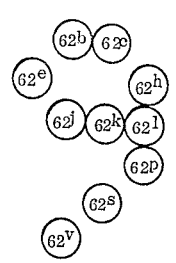

Rigidly mounted in, and projecting horizontally forwardly from, the panel 59 above and below each set of sockets 61, are pins 63, 64, respectively provided at their outer ends with annularly enlarged snap-rings 65, 66. Shiftably mounted on and supported from the pins 63, 64 by means of ears 67, 68 is a twenty-four celled, light baffle 69 which encloses the bulbs 62 and is biased outwardly away from the panel 59 by means of springs 70, 71, encirclingly disposed around the pins 63, 64, respectively. Each of the light baffles 69 is provided along one vertical margin with a hinge 72 which supports a matching auxiliary light baffle 73, the combined thickness of the two baffles being sufficient to encase the bulbs 62 as shown in FIG. 17.

Swingably mounted, by means of a hinge 74, upon the bottom wall 52 is a glass cover plate 75 having a rectangular metal frame 76 which is releasably held in closed position by means of locking elements 77 rotatably mounted in and extending through the upper portions of the frame 76. Each of the locking elements 77 is provided at its inner end with a diametrally projecting 78 and a compression spring 79 adapted for entry into and retentive engagement with a tubular detent sleeve 80, all as best seen in FIGS. 19 and 20.

When the cover plate 75 is in closed position, as shown in FIG. 17, it will press against the outer faces of the auxiliary light baffles 73 and the latter will be biased outwardly into snug abutment against the cover plate 75 by the springs 70, 71, so that each bulb 62 will provide a discrete well-defined round area of light when lit. If one or more of the bulbs 62 should happen to burn out and need replacement, the cover plate 75 can be easily released and swung outwardly as shown in dotted lines in FIG. 17 and the auxiliary light baffles 73 can be swung outwardly as shown in dotted lines in FIG. 18. This permits manual access to the bulbs 62 so that those which happen to be burned out can be easily replaced.

Mounted upon the panel 59 in between the middle two sets of sockets 61 is a single socket $61^z$ and bulb $62^z$ which is always lighted when any of the bulbs 62 are lighted so as to serve as a decimal point. The right-hand set of light bulbs 62 (as viewed in FIG. 16), i.e., those which indicate the lowest order of "cents" digits, is preferably limited to reading "0" and "5" since, for convenience, computations are carried out in five-cents steps or multiples thereof. Thus, the display box 48 can read up to $99.95 if necessary, although such a large amount is ordinarily not encountered in parking-lot transactions.

The upper compartment C¹ is, in effect, subdivided into a right and left half (as viewed in FIG. 14) by means of a vertical hanger bar 81 which is welded or otherwise suitably attached at its lower end to an angularly disposed rail 82 which slants upwardly and rearwardly from the plane of the front or door-opening to the rear wall 2 and is rigidly secured thereto. As will be seen by reference to FIG. 14, the rail 82 extends laterally on opposite sides of the hanger bar 81 so as to afford inclined supporting flanges 83, 84. Similarly secured to the interior faces of the side walls 53, 54, are angle-iron rails 85, 86, respectively, having lateral flanges 87, 88, which are coplanar with the flanges 83, 84, whereby to support a ticket-punching module D and a ticket-reading module E which are slidably seated thereon and bolted or otherwise conventionally secured thereto for quick convenient removal.

TICKET-PUNCHING MODULE

The ticket-punching module D, in general, consists of a mechanism having a plurality of punches which can form holes in a ticket in varying configurations according to a selected code, the configuration of the punched holes being changed from interval to interval by a timing device so that exact chronological time will be recorded by such configuration. In the preferred embodiment herein described, the timing device is a synchronous electric motor and the punches are operated pneumatically, but it should be understood that alternative mechanisms such as a spring-powered clockworks and mechanical or electrical punch-actuating means may be employed without departing from the scope of the present invention.

Thus, when a ticket is inserted into the module D, a punching cycle will be initiated so that a series of holes will be punched into the ticket which will record the time at which such punching operation occurred. The coding preferably employed for the present invention is based on two-and-one-half minute periods, thus dividing the hour into twenty-four intervals. These intervals are accumulated into days of twenty-four hours each and, in turn, the days are accumulated into weekly periods of seven days each. Ultimately four successive weeks are carried as an accounting period. No effort is made to record months on the conventional calendar basis, it being assumed that any customer who parks longer than twenty-eight days would ordinarily be a monthly tenant and be charged on a flat monthly rental rate. However, for convenience, the printing mechanism has a printing element which keeps track of twenty-six weeks, or, in other words, a half-year.

The following table illustrates the minutes-coding system using a binary-number code in which five punches in adjacent columns or so-called "orders" respectively represent the binary-numbers "one," "two," "four," "eight," and "sixteen," and the symbol "X" is used to designate a punched hole. A combination of one or more holes punched in the ticket by a set of punches will represent any one of twenty-four discrete two-and-one-half minute intervals covering the hour. In order to simplify explanation, these intervals have been given consecutive numerical designations. Moreover, to prevent falsification of the ticket by extraneously or manually punched holes, a secrecy constant is preferably introduced into the binary code so that the punched holes cannot be readily interpreted through visual inspection by parking lot attendants or customers. For present purposes, the secrecy constant which has been selected is "three." Thus, the interval designating number equals the binary-number minus 3 (interval designation=$bn-3$).

*Table I*

| Minutes Interval | Actual Time, Mins. | Binary-Number | | | | |
|---|---|---|---|---|---|---|
| | | "Sixteen" | "Eight" | "Four" | "Two" | "One" |
| 1 | 0–2½ | | | X | | |
| 2 | 2½–5 | | | X | | X |
| 3 | 5–7½ | | | X | X | |
| 4 | 7½–10 | | | X | X | X |
| 5 | 10–12½ | | X | | | |
| 6 | 12½–15 | | X | | | X |
| 7 | 15–17½ | | X | | X | |
| 8 | 12½–20 | | X | | X | X |
| 9 | 20–22½ | | X | X | | |
| 10 | 22½–25 | | X | X | | X |
| 11 | 25–27½ | | X | X | X | |
| 12 | 27½–30 | | X | X | X | X |
| 13 | 30–32½ | X | | | | |
| 14 | 32½–35 | X | | | | X |
| 15 | 35–37½ | X | | | X | |
| 16 | 37½–40 | X | | | X | X |
| 17 | 40–42½ | X | | X | | |
| 18 | 42½–45 | X | | X | | X |
| 19 | 45–45½ | X | | X | X | |
| 20 | 47½–50 | X | | X | X | X |
| 21 | 50–52½ | X | X | | | |
| 22 | 52½–55 | X | X | | | X |
| 23 | 55–57½ | X | X | | X | |
| 24 | 57½–60 | X | X | | X | X |

In the above table, the columns are arranged in descending order from left to right to conform with the arranged of the cam-disks representing these order in FIGURE 33, as will be presently more fully discussed. Thus, for example, the sixth interval, namely, the minutes interval from the time twelve-and-one-half minutes after the hour to time fifteen minutes after the hour (or, in other words, "interval six") will be coded by a punched hole in the first order, representing the binary-number "one," and a punched hole in fourth order, representing the binary-number "eight." The total of these binary-numbers is "nine" and the result after subtraction of the constant will be "six," hence the code binary-number "nine" actually designates the interval "six." Similarly, the sixteenth interval, namely, the interval from time thirty-seven and one-half minutes past the hour to time forty minutes past the hour (or, in other words, interval "sixteen") will be coded by punched holes in the first, second, and fifth orders, representing binary-numbers "one," "two," and "sixteen." The total of these numbers is "nineteen" and the result after subtraction of the constant will be "sixteen," hence the code binary-number "nineteen" actually designates the interval "sixteen."

The following table illustrates the hours coding system in which five punches located in adjacent columns or so-called "orders" also respectively represent the binary-numbers "one," "two," "four," "eight" and "sixteen" and a combination of one or more holes punched in the ticket by a second set of punches will represent any one of the twenty-four hours in a day. For convenience, these hours are given consecutive numerical designations and the symbol "X" is used to indicate a punched hole.

*Table II*

| Hours Interval | Actual Time | Binary-Number ||||| 
|---|---|---|---|---|---|---|
| | | "Sixteen" | "Eight" | "Four" | "Two" | "One" |
| First Hour | Midnight to 1 a.m. | | | X | | |
| Second Hour | 1 a.m. to 2 a.m. | | | X | | X |
| Third Hour | 2 a.m. to 3 a.m. | | | X | X | |
| Fourth Hour | 3 a.m. to 4 a.m. | | | X | X | X |
| Fifth Hour | 4 a.m. to 5 a.m. | | X | | | |
| Sixth Hour | 5 a.m. to 6 a.m. | | X | | | X |
| Seventh Hour | 6 a.m. to 7 a.m. | | X | | X | |
| Eighth Hour | 7 a.m. to 8 a.m. | | X | | X | X |
| Ninth Hour | 8 a.m. to 9 a.m. | | X | X | | |
| Tenth Hour | 9 a.m. to 10 a.m. | | X | X | | X |
| Eleventh Hour | 10 a.m. to 11 a.m. | | X | X | X | |
| Twelfth Hour | 11 a.m. to Noon | | X | X | X | X |
| Thirteenth Hour | Noon to 1 p.m. | X | | | | |
| Fourteenth Hour | 1 p.m. to 2 p.m. | X | | | | X |
| Fifteenth Hour | 2 p.m. to 3 p.m. | X | | | X | |
| Sixteenth Hour | 3 p.m. to 4 p.m. | X | | | X | X |
| Seventeenth Hour | 4 p.m. to 5 p.m. | X | | X | | |
| Eighteenth Hour | 5 p.m. to 6 p.m. | X | | X | | X |
| Nineteenth Hour | 6 p.m. to 7 p.m. | X | | X | X | |
| Twentieth Hour | 7 p.m. to 8 p.m. | X | | X | X | X |
| Twenty-First Hour | 8 p.m. to 9 p.m. | X | X | | | |
| Twenty-Second Hour | 9 p.m. to 10 p.m. | X | X | | | X |
| Twenty-Third Hour | 10 p.m. to 11 p.m. | X | X | | X | |
| Twenty-Fourth Hour | 11 p.m. to Midnight | X | X | | X | X |

In the above table the same descending order of columnar arrangement has been employed to conform with the arrangement of the cam-disks representing these orders in FIG. 34. Since there are twenty-four hours in a day just as the hour has been subdivided into twenty-four two-and-one-half-minute intervals, the coding system (including the secrecy constant three) is the same for hours as that above-described for minutes.

The days coding and weeks coding are arranged so as to utilize a third set of punches and such coding is illustrated in the following two tables which are superposed to show that punches in the last three orders are used for days coding and punches in the first two orders are used for weeks coding. This arrangement is merely a preferable matter of mechanical convenience and other arrangements can be used equally as well. It will also be noted that the columns are arranged in descending orders from left to right in order to conform to the arrangement of cam-disks in FIG. 35.

*Table III*

| Days Interval | Actual Day | Binary-Numbers |||
|---|---|---|---|---|
| | | "Four" | "Two" | "One" |
| First | Sunday | | | |
| Second | Monday | | | X |
| Third | Tuesday | | X | |
| Fourth | Wednesday | | X | X |
| Fifth | Thursday | X | | |
| Sixth | Friday | X | | X |
| Seventh | Saturday | X | X | |

*Table IV*

| Weeks Interval | Actual Week | Binary-Numbers ||
|---|---|---|---|
| | | "Two" | "One" |
| First | First Week | | |
| Second | Second Week | | X |
| Third | Third Week | X | |
| Fourth | Fourth Week | X | X |

In these tables, the symbol "X" has again been used to designate punched holes. Since Sunday is binarily coded as "zero," no secrecy constant is employed. Thus, Monday will be coded by a punched hole in the order representing the binary-number "one." Tuesday will be coded by punched hole in the order representing the binary-number "two." Saturday, for example, will be coded by punched holes in the second and third orders representing the binary-numbers "two," and "four," the total of these numbers being "six." Similarly, the First Week is binarily coded as "zero," the Second Week as "one," and so on.

Inasmuch as the coded holes cannot be readily interpreted by a customer, the ticket-punching module D also is preferably provided with a ticket printing mechanism which is activated contemporaneously with operation of the punching mechanism and will imprint upon the ticket in Arabic numbers a legible record of the actual time of issuance so that the customer may read it and be assured that the time is correct.

The ticket-punching module D preferably comprises a flat base-plate 100, the lateral margins of which are secured, as above stated, to the inclined supporting rails 82, 85, in such position that the forward transverse margin is proximate to the inwardly presented face of the door 11 and the rear transverse margin is spaced forwardly a short distance from the rear wall 2. Rigidly mounted upon the upper face of the base-plate 100 is an electric motor-driven air compressor 101 which discharges air under moderately high pressure (i.e. 80 to 120 p.s.i.) into a surge tank 102, which is supported beneath the base-plate 100 by means of underslung U-bolts 103. The surge tank 102 serves as a reservoir of compressed aid which is delivered, through a solenoid valve 104, to the various pneumatic components of the ticket coder D, presently to be described. In this connection, it should be noted that the compressor 101 and related elements of the compressed air supply, such as check-valves, relief-valves, automatic pressure-responsive controls, and the like, do not, per se, form a part of the present invention, and, therefore, are not shown or described in detail herein. It is merely sufficient for present purposes to state that a source of compressed air is present.

Also rigidly mounted upon the upper face of the base-plate 100 forward of the compressor 101 are two spaced parallel journal plates 105, 105', which are parallel to the transverse margins of the base-plate 100, and are provided with four sets of axially aligned journal sleeves 106, 106', 107, 107', 108, 108', 109, 109', for operatively supporting horizontal main shafts 110, 111, 112, and an idler shaft 113, the longitudinal axes or center lines of which lie in planes which are perpendicular to the plane of the door-opening d. Similarly mounted on the base-plate 100 in forwardly spaced parallel relation to the plate 105' is a retainer plate 105" having clearance holes 106", 107", 108", 109" for loosely receiving the forward ends of the shafts 110, 111, 112, 113.

It will be noted, moreover, that the center lines of the shafts 110, 111, 112, and 113, are downwardly and laterally spaced from each other in the inclined relation shown in FIGS. 37–42 for reasons presently more fully appearing.

The shaft 110 projects at one end beyond the plate 105 and on such projecting end is provided with an annular groove 114 for receiving a spring-steel C-ring 115, which bears against a washer 116. Rotatably mounted on, and supported by, the outwardly projecting end of the shaft 110 is a cam-lever 117 which operatively bears against the inwardly presented faces of the washer 116 and a thrust collar 118 which may, if desired, be fabricated from some suitable anti-friction material and, in turn, also bears against the side face of the plate 105, thereby holding the cam-lever 117 in outwardly spaced relation thereto. As will be seen by reference to FIG. 37, the cam-lever 117 projects upwardly from the shaft 110 and at its upper end is rockably connected to one end of a pull-rod 119 formed of flexible shafting and operatively connected at its other end to a rocking link 120 which is, in turn, rigidly secured to a rock-shaft 121 suitably journaled in and extending horizontally between plates 122, 123, forming part of the door structure, as shown in FIGS. 11, 12, and 13. The plate 123 forms the back vertical wall of a rearwardly indented horizontal recess r formed in and extending across the central area of the door structure. The recess r is, in effect, framed by an elongated rectilinear frame-member 124 which hingedly supports an oblong-rectangular door 125 adapted to swing closurewise across the recess r, being retained in closure-forming position by means of a conventional key-operated lock 126.

The rock-shaft 121 projects forwardly beyond the plate 123 and, on its forward projecting end, is rigidly provided with a manually operable special-setting knob 127 for purposes presently more fully appearing. Suitably bolted or otherwise rigidly secured upon the rear face of the plate 122 is a rearwardly projecting bracket-arm 128 which clampingly secures the end of the tubular sheath 129 extending around and containing the flexible pull-rod 119.

Between the plates 105, 105′, the shaft 110 is provided with a series of annular grooves 130, 131, 132, 133, 134, 135, 136, 137. The grooves 131–132, 133–134, and 135–136 are respectively paired and such pairs arranged at uniformly spaced distances along that portion of the shaft 110 which extends between the plates 105, 105′. Operatively mounted on the shaft 110 for bearing respectively against the inwardly presented faces of the plates 105, 105′, are two thrust washers 138, 138′, and it will be noted, by reference to FIG. 33, that the spacing between the groove 130 and the thrust washer 138′, as well as the spacing between the groove 137 and the thrust washer 138 is substantially identical with the spacing between the grooves 131, 132, which, incidentally, is the same as the spacing between the grooves 133, 134, and the spacing between the grooves 135, 136. The shaft 110 is also provided, between the plates 105, 105′, with an elongated axially extending key-way 139 which is adapted to receive an elongated key 140. In this connection, it should be pointed out that the above-described uniform spacing, as well as the use of the single elongated key-way 139, is merely a matter of manufacturing convenience and can be varied if desired.

Mounted on the shaft 110 between the plates 105, 105′, are five uniformly spaced cam-disks 141, 142, 143, 144, 145, which are held in place by C-shaped spring steel snap-rings 146, 147, 148, 149, 150, 151, 152, and 153, which are respectively seated in the grooves 130, 131, 132, 133, 134, 135, 136, and 137. It will be noted that the snap-rings 146 and 153 hold the cam-disks 141 and 145, respectively, against the thrust washers 138′, 138, whereas the cam-disk 142 is held in place between paired snap-rings 147, 148. Similarly, the cam-disk 143 is held in place between paired snap-rings 149, 150, and the cam-disk 144 is held in place between paired snap-rings 151, 152. The cam-disks 141, 142, 143, 144, and 145 are, furthermore, secured to the shaft 110 for rotation therewith by means of the key 140. The position of the cam-disks 141, 142, 143, 144, and 145 represent five columns or orders in the binary-coding system previously explained.

Keyed to the shaft 110 between the plates 105′ and 105″ is a twenty-four tooth gear-wheel 154 and a single tooth transfer gear-wheel 155, the gear-wheels 154, 155, being held in desired axial position along the shaft 110 by means of spacing collars 156, 156′, 156″.

The shaft 111 projects at one end beyond the plate 105 and on such projecting end is provided with an annular groove 157 for receiving a spring steel C-ring 157′ which bears against a washer 157″. Keyed upon and supported by the outwardly projecting end of the shaft 111 is a lot-identification cam-disk 158 which operatively bears against the inwardly presented face of the washer 157″ and a thrust collar 159 which may, if desired, be fabricated through some suitable anti-friction material and, in turn, also bears against the side face of the plate 105, thereby holding the cam-disk 158 in outwardly spaced relation thereto.

Between the plates 105, 105′, the shaft 111 is provided with a series of annular grooves 160, 161, 162, 163, 164, 165, 166, and 167. The grooves 161–162, 163–164, and 165–166 are respectively paired and such pairs are arranged at uniformly spaced distances which match the spacing on the comparable portion of the shaft 110.

Operatively mounted on the shaft 111 for bearing respectively against the inwardly presented faces of the plates 105, 105′, are two thrust washers 168, 168′. It will be noted by reference to FIG. 34 that the spacing between the grooves 160 and the thrust washer 168, as well as the spacing between the groove 167 and the thrust washer 168′ is substantially identical with the spacing between the grooves 161, 162, which, incidentally is the same as the spacing between the grooves 163, 164, and the spacing between the grooves 165, 166. The shaft 111 is also provided, between the plates 105, 105′, with an elongated axially extending key-way 169 which is adapted to receive an elongated key 170.

Mounted on the shaft 111 between the plates 105, 105′ are five uniformly spaced cam-disks 171, 172, 173, 174, and 175, held in place by C-shaped spring steel snap rings 176, 177, 178, 179, 180, 181, 182, and 183, which are respectively seated in the grooves 160, 161, 162, 163, 164, 165, 166, and 167. It will be noted that the snap rings 176 and 183 hold the cam-disks 171 and 175, respectively, against the thrust washers 168′, 168, whereas the cam-disk 173 is held in place between paired snap rings 179, 180, and the cam-disk 174 is held in place between paired snap rings 181, 182. The cam-disks 171, 172, 173, 174, and 175 are, furthermore, secured to the shaft 110 for rotation therewith by means of the key 170. The position of the cam-disks 171, 172, 173, 174, and 175 represent five columns or orders in the binary coding system previously explained.

Secured, by means of a key 184, upon the shaft 111 between the plates 105′, 105″, is a twenty-four tooth gear-wheel 185, and a single tooth transfer gear-wheel 186 axially positioned by means of spacing collars 187, 188, 189.

As will be seen by reference to FIGS. 33 and 34, the twenty-four tooth gear-wheel 185 is located on the shaft 111 in position for meshing engagement with the single tooth transfer gear-wheel 155, and the single tooth transfer gear-wheel 186 is, in turn, located outwardly with respect to the gear-wheel 185 (i.e., to the right as shown in FIG. 34).

Between the plates 105, 105′, the shaft 112 is provided with spacing collars 190, 191, which respectively bear against the inwardly presented faces of the plates 105, 105'. The shaft 112 is also provided with a series of annular grooves 192, 193, 194, 195, 196, and 197, and freely rotating spacer-sleeves 198, 198'. The shaft 112 is also provided with an axially extending key-way 199 which is adapted to receive an elongated key 200.

Mounted on the shaft 112 between the plates 105, 105', and secured thereto by the key 200, are five uniformly spaced cam-disks 201, 202, 203, 204, 205, which are located in the same positional alignment as the cam-disks 141, 142, 143, 144, 145, and the cam-disks 171, 172, 173, 174, 175, respectively. The cam-disks 201, 202, 203 are secured in relative position along the shaft 112 by means of snap rings 206, 207, 208, 209, and 210, which are respectively disposed in the grooves 193, 194, 195, 196, and 197. Located between the cam-disks 204, 205, and held in spaced relation thereto by means of the sleeves 198, 198', is a gear-wheel 211 which rotates freely upon the shaft 112 but is staked to the cam-disks 204, 205, and the spacer-sleeves 198, 198', by means of axial pins 212, 213. As will be seen by reference to FIG. 35, the unit consisting of the cam-disks 204, 205, the gear-wheel 211, and the spacer-sleeves 198, 198', is held in axial position along the shaft 112 by means of a snap ring 214 which is engaged in the groove 197.

Secured, by means of a key 215 to the portion of the shaft 112 which extends between the plates 105', 105'', is a twenty-one tooth gear-wheel 216 and a three tooth transfer gear-wheel 217 which are held in suitably spaced axial position upon the shaft 112 by means of spacing collars 218, 219, and 220. The gear-wheel 216 is in meshing engagement with the transfer gear-wheel 186 and the gear-wheel 217 is located inwardly from the gear-wheel 216 (i.e., to the left, as shown in FIG. 35) so as to be in line with the spacing collar 187 and, therefore, having no direct engagement with the shaft 111 except through the intermittent driving engagement between the single tooth gear-wheel 186 and the twenty-one tooth gear-wheel 216.

The shaft 113 is provided, adjacent the plate 105, with three annular grooves 221, 222, 223, and is also provided along that portion of its length which extends between the plates 105', 105'', with two additional annular grooves 224, 225, for respectively receiving snap rings 226, 227, 228, 229, and 230. The snap rings 226 and 230, respectively, bear against thrust collars 231, 232, thereby holding the shaft 113 against longitudinal translation. Similarly, the snap rings 227, 228 bear against spacing collars 233, 234, which, in turn, bear respectively against the side faces of a gear-wheel 235 and its integral hub 236 so as to position the gear-wheel 235 for meshing engagement with the gear-wheel 211, the gear-wheel 235 being secured to the shaft 113 for rotation therewith by means of a key 237 located in a key-way 238 milled axially into the shaft 113. The gear-wheels 211 and 235 have the same diameters and numbers of teeth or, in other words, have a one-to-one ratio. The snap ring 229 bears against a twenty-four tooth gear-wheel 239 which is, in turn, operatively spaced from the lateral face of the plate 105' by means of a thrust collar 240 and is thereby held in position for meshing engagement with the transfer gear-wheel 217.

The plate 105' is integrally provided along its upper margin with an upwardly projecting extension 241 which supports a synchronous electric motor 242 disposed in upwardly spaced parallel relation above the shaft 110. This synchronous motor 242 is of conventional construction and is, therefore, not described in specific detail herein. It is sufficient for present purposes merely to point out that the synchronous motor 242 includes an axially projecting drive shaft 243 which extends through the plate-extension 241 and is provided, on such extended end, with a single tooth gear-wheel 244 located for meshing engagement with the twenty-four tooth gear-wheel 154 of the shaft 110. Also rigidly mounted on the projecting end of the shaft 243 in outwardly spaced relation to the single tooth gear-wheel 244 is a cam-wheel 245 having a single notch or indentation 246 located one-hundred-eighty degrees from the position of the single tooth on the single tooth gear-wheel 244. Bolted or otherwise rigidly secured upon the side face of the plate-extension 241 in outwardly spaced, peripherally superposed, relation to the cam-wheel 245 is a micro-switch 247 having an actuator arm 248 which is provided at its outer end with a cam follower 249 adapted to ride upon the periphery of the cam-wheel 245 and drop into the notch or indentation 246 thereof once during every revolution of the cam-wheel 245, all as best seen in FIG. 22 and for purposes presently and more fully appearing.

Also bolted or otherwise rigidly secured upon the same lateral face of the plate-extension 241 are two spring blades 250, 251, respectively provided at their outer ends with arcuately deformed prongs 252, 253, respectively. The prong 252 is located for position-retentive engagement between the teeth of the twenty-four tooth gear-wheel 154 of the shaft 110, thereby holding the gear-wheel 154 and shaft 110 against unauthorized or accidental rotation. Similarly, the prong 253 is located for engagement with the twenty-four tooth gear-wheel 185 of the shaft 111 thereby holding the gear-wheel 185 and shaft 111 against unauthorized or accidental rotation. Also bolted or otherwise rigidly mounted upon the lateral face of the plate 105'' are spring blades 254, 255, respectively provided at their outer ends with arcuately deformed prongs 256, 257. The prong 256 is located in position-retentive engagement with the twenty-four tooth gear-wheel 216 of the shaft 112 for holding the gear-wheel 216 and the shaft 112 against unauthorized or accidental rotation. Finally, the prong 257 is located for position-retentive engagement with the gear-wheel 239 of the idler shaft 113 for holding the gear-wheel 239 and idler shaft 113 against unauthorized or accidental rotation.

The synchronous motor 242 is conventionally connected to a source of 110 v. 60 A.C. electrical current and is timed in the usual or conventional manner so as to rotate the gear-wheel 244 once for each two and one-half minute intervals of actual time, thereby advancing the twenty-four tooth gear-wheel 154 one-twenty-fourth of a revolution for each such interval. In other words, the shaft 110 will turn one complete revolution for each hour and will, in effect, count off each hour in twenty-four successive two and one-half minute intervals. The shaft 110 can, therefore, be referred to as the "minute" shaft.

The single tooth of the transfer gear-wheel 155 will, in turn, advance the twenty-four tooth gear-wheel 185 and its associated shaft 111 one-twenty-fourth of a revolution for each full revolution of the shaft 110. Since the shaft 110 turns one revolution for each hour, it follows that the shaft 111 will advance in twenty-four successive hourly increments, thereby making a single revolution in one day. Thus, the shaft 111 will count off hours and may be referred to as the "hours" shaft.

The single tooth transfer gear-wheel 186 will, similarly, advance the twenty-one tooth gear-wheel 216 one-twenty-first of a turn for each single revolution of the shaft 111. In other words, the shaft 112 will be advanced one such increment for each day and will, therefore, make one complete revolution for each twenty-one day interval or once every three weeks. At the same time, the three-toothed transfer gear-wheel 217, which makes one revolution every three weeks, will engage the gear-wheel 239 three times during each revolution, thereby rotating the gear-wheel 211 with its associated cam-disks 204, 205, one-twenty-fourth of a revolution each week. Since the cam disks 201, 202, 203, rotate with the shaft 112, thereby counting off days and, furthermore, since the cam-disks 204, 205, rotate upon the shaft 112 in such a manner as to count off weeks, the shaft 112 may be referred to as the "days-weeks" shaft.

Rigidly mounted upon the upper face of the base-plate 100, in laterally spaced relation to the bank of shafts 110, 111, 112, and 113, is a cylinder-block 300, which is provided with vertical side faces 301, 302, and a plurality of vertically spaced horizontal faces 303, 304, 305, which are connected by intermediate horizontally spaced vertical faces 306, 307. This stepped arrangement has been utilized in order to bring the cylinder-block 300 into compact positional alignment in relation to the shafts 110, 111, 112, and the various cam-disks carried thereby. Also for mechanical convenience, the cylinder-block 300 is subdivided into a plurality of vertically superposed horizontal sections which are conventionally gasketed and bolted together so that the various internal cylinder chambers and connecting passageways may be conveniently machined. This, however, is not, in and of itself, a part of the present invention and it should be understood that the cylinder-block 300 may be fabricated by any suitable or convenient manufacturing procedure.

On its underface, the cylinder-block 300 is provided with a longitudinally extending milled channel 308 which is of relatively shallow vertical height sufficient to accommodate the thickness of a ticket T made from a piece of cardstock or similar ticket-forming medium. The milled channel 308 is defined by two longitudinally extending vertical shoulder-faces 309, 310, which are flared outwardly at the forward ends to provide forwardly diverging guide faces 311, 312, all as best seen in FIG. 27 and for purposes presently more fully appearing.

The area of the base-plate 100 which is located directly beneath the milled channel 308 forms a bottom wall across the milled channel and encloses it, thereby forming a long flat open-ended ticket chamber 313. In this area, the base-plate 100 is provided with three uniformly spaced rearwardly extending rows of equidistant, preferably circular, apertures $ma^1$, $ma^2$, $ma^3$, $ma^4$, $ma^5$, $ma^x$, $ha^1$, $ha^2$, $ha^3$, $ha^4$, $ha^5$, $ha^x$, $da^1$, $da^2$, $da^3$, $wa^1$, $wa^2$, $wa^x$, forming a rectilinear pattern as best seen in FIG. 27. This particular designation of the apertures has been adopted for convenience in identifying them with the particular orders in the binary coding system above set forth. Thus, $ma^1$ (i.e., "minutes aperture one") is the aperture associated with the first order order on the minutes shaft 110 and corresponds to the cam-disk 141. Similarly, the apertures $ma^2$, $ma^3$, $ma^4$, $ma^5$ represent the second, third, fourth, and fifth orders on the minutes shaft 110 and respectively correspond to the cam-disks 142, 143, 144, 145. The aperture $ma^x$ is an extra aperture associated with the cam-lever 117. Similarly, the aperture $ha^1$ (i.e., "hours aperture one") is the aperture which is associated with the first order on the hours shaft 111 and corresponds to the cam-disk 171. Thus, the apertures $ha^2$, $ha^3$, $ha^4$, $ha^5$ represent the second, third, fourth, and fifth orders on the hours shaft 111 and respectively correspond to the cam-disks 172, 173, 174, 175. The aperture $ha^x$ is an extra aperture associated with the lot-identification cam 158. Similarly, the aperture $da^1$ (i.e., (days aperture one") is the aperture which is associated with the first day-counting order on the days-weeks shaft 112 and corresponds to the cam-disk 201. Thus, the apertures $da^2$, $da^3$ represent the second and third day-counting orders on the days-weeks shaft 112 and respectively correspond to the cam-disks 202, 203. The apertures $wa^1$, $wa^2$ (i.e., "weeks aperture one" and "weeks aperture two") are associated with the first and second weeks-counting orders on the days-weeks shaft 112 and respectively correspond to the cam-disks 204, 205. The aperture $wa^x$ is an extra aperture which, like the unused projecting end of the days-weeks shaft, has no function in the computer device A as herein described. However, it is necessary to render the computer device A unique so that a ticket punched in the ticket-punching module D thereof cannot be associated accidentally or purposely with a computer device A located on another parking lot. This can most readily be accomplished by using the aperture $wa^x$ as and for the aperture $ha^x$, in which case the cam 158 is mounted on the shaft 112 instead of the shaft 111. In this connection, it should be noted that the spacing or location of the apertures $ha^x$ and $wa^x$ can be varied to some non-uniform pattern also for the purpose of achieving uniqueness.

Formed integrally with and projecting forwardly from the base-plate 100 are two laterally spaced apron-tabs 314, 315, which define an intermediate bifurcation or slot 316. The apron-tabs 314, 315, extend forwardly to the inside face of the door and terminate adjacent to a ticket-slot 317 formed therein and defined by a rectilinear extension 318 of the frame-member 124.

On the underface of the base-plate 100, the various apertures $ma^1$, $ma^2$, $ma^3$, $ma^4$, $ma^5$, $ma^x$, $ha^1$, $ha^2$, $ha^3$, $ha^4$, $ha^5$, $ha^x$, $da^1$, $da^2$, $da^3$, $wa^1$, $wa^2$, $wa^x$ are flared outwardly and forwardly in the provision of enlarged discharge throats opening into a funnel-shaped catch-pan 319 which, in turn, discharges downwardly through a tubular chute 320 to a spring-closed trap door 321 on the external face of the housing side wall 5, as best seen in FIGS. 4 and 22. Thus, the small circular piece of paper punched out of the card or ticket (sometimes referred to as "confetti") will be caught and stored for periodic removal by an attendant or serviceman. It will be noted by reference to FIG. 27 that the hole pattern is asymmetrical with respect to the ticket chamber 313. In other words, the distance between the rows of apertures $ma^1$, $ma^2$, $ma^3$, $ma^4$, $ma^5$, $ma^x$ and the shoulder 309 is smaller than the distance between the row of apertures $da^1$, $da^2$, $da^3$, $wa^1$, $wa^2$, and the shoulder 310. This precludes accidental inversion of the ticket T, in the ticket "reading" means presently to be described.

Mounted for vertical reciprocation within the cylinder-block 300 and shaped for punching cooperation with the apertures $ma^1$, $ma^2$, $ma^3$, $ma^4$, $ma^5$, $ma^x$, $ha^1$, $ha^2$, $ha^3$, $ha^4$, $ha^5$, $ha^x$, $da^1$, $da^2$, $da^3$, $wa^1$, $wa^2$, $wa^x$ are eighteen punches $mp^1$, $mp^2$, $mp^3$, $mp^4$, $mp^5$, $mp^x$, $hp^1$, $hp^2$, $hp^3$, $hp^4$, $hp^5$, $hp^x$, $dp^1$, $dp^2$, $dp^3$, $wp^1$, $wp^2$, $wp^x$. The eighteenth punch $wp^x$ is not operative and ise merely a standby punch, inasmuch as the aperture $wa^x$ is merely a standby aperture and is not used in the presently described configuration of the ticket-punching module D. The several punches have, for convenience, been given the above literal designations to facilitate identifying them with the particular orders of the above-described binary coding system. Thus, the punch $mp^1$ (i.e. "minutes punch one") is the punch associated with the first order of the minutes shaft 110 and corresponds to the cam-disk 141. Similarly, the punches $mp^2$, $mp^3$, $mp^4$, $mp^5$ are associated with the second, third, fourth, and fifth, orders of the minutes shaft 110 and respectively correspond to the cams 142, 143, 144, 145. The punch $mp^x$ is associated with the cam-lever 117. Similarly, the punch $hp^1$ (i.e., "hours punch one") is the punch associated with the first order on the hours shaft 111 and corresponds to the cam-disk 171. The punches $hp^2$, $hp^3$, $hp^4$, $hp^5$ represent the second, third, fourth, and fifth orders of the hours shaft 111 and correspond to the cam-disks 172, 173, 174, 175. The punch $hp^x$ is associated with the lot-identifying cam-disk 158. The punches $dp^1$, $dp^2$, $dp^3$ (i.e., "days punch one," "days punch two," and "days punch three") are similarly associated with the first, second, and third day-counting orders on the days-weeks shaft 112 and the punches $wp^1$, $wp^2$ (i.e., "weeks punch one" and weeks punch two") are associated with the first, and second weeks-counting orders on the days-weeks shaft 112, respectively corresponding to the cam-disks 201, 202, 203, 204, 205.

Except for the length (which is merely a matter of manufacturing convenience), the sixteen punches $mp^1$, $mp^2$, $mp^3$, $mp^4$, $mp^5$, $mp^x$, $hp^1$, $hp^2$, $hp^3$, $hp^4$, $hp^5$, $dp^1$, $dp^2$, $dp^3$, $wp^1$, and $wp^2$ and the actuating mechanisms associated therewith are identical. Therefore, it is only necessary herein to describe a single punch actuating mechanism which is typical of all the others, as will be readily apparent from FIGS. 37 to 42, inclusive.

Typically, the punch $hp^1$ extends vertically upwardly and at its upper end projects through a concentric circular recess 322 and into a cylinder 323. Rigidly secured to the upper end of the punch $hp^1$ is a disk-shaped piston 324 which is peripherally undercut to provide an annular flange 325 for supporting a U-shaped piston ring 326 formed of neoprene or other similar sealer-ring material. The piston 324 is biased upwardly by means of a spring 327 and seats along its top face across a diametrically reduced clearance chamber 328 which opens into the lower end of an air-inlet duct 329 which, in turn, opens at its upper end to a horizontally extending cylinder valve chamber 330.

The valve chamber 330 opens at its outer end upon the side face 307 of the cylinder-block 300 in direct juxtaposition to the first-order hours cam-disk 171. At its inner end the valve chamber opens into the side of a rearwardly extending manifold duct 331 which, in turn, opens at its rearward end into a relatively large manifold chamber 332 suitably formed in the rear face of the cylinder-block 300 and closed by a cover plate 333 and gasket 334 which are held in place by a series of bolts 335. As will be seen by reference to FIG. 26, there are actually three such manifold cuts 331 for each of the three horizontal levels of valve chambers 330.

Immovably seated within the inner end of each valve chamber 330 adjacent to, but slightly outward from, the manifold duct 331 (i.e., to the left as shown in FIG. 30) is a poppet sleeve 336 provided with a coaxial bore 337 and a diametrally extending vertical bore 338, the latter serving to establish communication between the axial bore 337 and the vertical duct 329. At its inner end, which is toward the manifold duct 331, the axial bore 337 is diametrally enlarged to provide a frusto-conical seating face 339 and a poppet chamber 340, which opens directly into the manifold 331. The remote side face of the manifold duct 331 is drilled and counterbored to provide a cylindrical recess 341 and spring-retaining recess 342, both of which are coaxial with the poppet chamber 340 and bore 337 for slidably receiving the tail-end of a rod-like valve stem 343 which extends across the manifold duct 331 and coaxially through the poppet chamber 340 and bore 337, terminating in a piston-like end plug 344 which is annularly grooved for receiving an O-ring 345 seated peripherally against the interior cylindrical surface of the bore 337 for sliding movement therealong. The valve stem 343 is provided with two axially spaced annular abutment collars 346, 346', which endwise engage and hold an annular valve poppet 347 formed preferably of neoprene or other similar material and adapted to seat in valve-closing position against the frusto-conical seating face 339. Coiled about the tail-end of the valve stem 343 is a compression spring 348 which abuts at one end against the collar 346' and is seated at its other end within the recess 342 for normally biasing the valve poppet 347 into seated or closed position, all as best seen in FIG. 30.

Also immovably mounted within each valve chamber 330 along the outward end thereof is a tubular bushing 349. Shiftably mounted within and projecting beyond the tubular bushing 349 is a valve actuating rod 350 integrally provided at the inner end with a diametrally reduced coaxial contact finger 351 which fits into the bore 337 and abuts against the flat end face of the end plug 344. At its outer or external end the actuating rod 350 projects beyond the side face 307 of the cylinder-block 300 and is bufurcated for operatively receiving and supporting a roller-type cam follower $hf^1$ which bears against the periphery of the cam-disk 171. The notation $hf^1$ is employed as a convenient means of designating that this particular cam follower is the first-order hours follower.

The other two punches, namely, punch $hp^x$ and $wp^x$ are similar to all other punches in that they are actuated by pistons 324' operatively disposed in cylinders 323', as shown in FIG. 28. The valve cylinders 323' are, in turn, connected by air-inlet ducts 329' communicating with valve chambers 330'. Operatively mounted in the valve chambers 330 for actuating poppets 348' are horizontally shiftable valve actuating rods 350' having roller-type cam followers $hf^x$ and $wf^x$. The follower $hf^x$ operatively bears against the cam-disk 158. However, in the presently described configuration the follower $wf^x$ is idle. The cylinders 323', pistons 324', ducts 329', valve chambers 330', poppets 348' and valve actuating rods 350' are substantially identical in function and construction with the above-described cylinder 323, piston 324, duct 329, valve chamber 330, poppet 348, and valve actuating rod 350. As will be seen by reference to FIG. 37, the cam-disk 158 is actually a circular wheel having a "high" peripheral surface, that is to say, a surface which functions as a high lobe on a cam for 360° of the periphery and, therefore, holds the poppet 348' associated with cam-follower $hf^x$ open at all times.

The punch $hp^x$ is non-typical, however, in that it is not circular at its lower or punching end but is somewhat cusp-shaped to form a vertical slot 352 so that on the forward half of its periphery, it will have precise punching contact with the forward half of the peripheral eges of the aperture $ha^x$, $wa^x$. A pin 353 is set into the underface of the piston 324' and is slidably disposed in the lower face of the cylinder 323' for preventing axial rotation of the piston 324' and punch $hp^x$, so that the punch $hp^x$ is thereby restrained against rotation. The lower portion of the slot 352 is normally disposed directly above, and is shaped to clear, the forward end of a rectilinear bar 354 shiftably mounted in a slot 355 formed in the base-plate 100 and bearing, at its rear end, against the lower end of a spring-leaf actuator blade 356 of a conventional micro-switch 357 rigidly mounted upon a support rod 358 which is, in turn, supported above the base-plate 100 by means of blocks 359, 360. This micro-switch 357 is in series with the solenoid valve 104 and when closed completes an electrical circuit to the solenoid valve 104, whereby to cause the latter to open and admit air under pressure into the mainifold chamber 332. The punch $wp^x$ is identical with the punch $hp^x$.

As may be seen by reference to FIG. 26 the tubular bushings 349 in each bank of valve chambers 330 are locked in place by the adjacent vertical edges of the plates 105, 105', and by retainer straps 361, 362, which extend chord-wise over peripheral segments of the external end-face of the tubular bushings 349.

It will be noted by reference to FIG. 27 that the base-plate 100 is provided interiorly of the ticket chamber 313, with two thin stationary stop-bars 363, 363', respectively having forwardly presented abutment faces 364, 364', which are located on the transverse center-line of the apertures $ma^x$, $ha^x$. Moreover, the forward end of the bar 354 projects forwardly into the aperture $ha^x$ beyond this transverse center-line so that when a ticket is inserted through the ticket slot 317 into the ticket chamber 313, the rear edge of the ticket will engage the forward end of the bar 354, shifting it rearwardly and thereby closing the micro-switch 357 to admit air under pressure into the manifold chamber 332. Since the valve chamber 330' is always held in open position by the cam-disk 158, the punch $hp^x$ will be driven downwardly in a single punching stroke and will cut a semi-circular notch $n^1$ in the rear edge of the ticket T, as shown in FIG. 43.

Except when a special rate-setting is desired, as will be presently more fully discussed, the cam-lever 117 will assume and remain in the position shown in FIG. 37, and the valve chamber 330 associated with the punch $mp^x$ will be closed so that the punch $mp^x$ will remain inactive. If, however, the special rate-setting knob 127 is shifted to the opposite position, the cam-lever 117 will be swung up so that the cam follower $mf^x$ will ride up on a high portion of the periphery thereof and said valve chamber 330 will then be held open. In such instance, the punch $mp^x$ will be driven downwardly in a single punching stroke at the same time as the punch $hp^x$ and will cut another semi-circular notch $n^2$ in the rear edge of the ticket T. It will, of course, be obvious that the ticket T must be made of cardstock having sufficient substance to actuate the bar 354 and shift it rearwardly against the forward biasing force of the actuator blade 356.

All of the other valve chambers 330 are constructed in substantially identical manner and are provided with roller-type cam-followers $mf^1$, $mf^2$, $mf^3$, $mf^4$, $mf^5$, $mf^x$, $hf^2$, $hf^3$, $hf^4$, $hf^5$, $hf^x$, $af^1$, $df^2$, $df^3$, $wf^1$, $wf^2$, and $wf^x$. The cam-followers $mf^1$, $mf^2$, $mf^3$, $mf^4$, $mf^5$, $mf^x$, $hf^2$, $hf^3$, $hf^4$, $hf^5$, $hf^x$, $df^1$, $df^2$, $df^3$, $wf^1$, and $wf^2$ are respectively associated with and bear operatively against the cam-disks 141, 142, 143, 144, 145, 117, 171, 172, 173, 174, 175, 158, 201, 202, 203, 204, 205. Of course as above noted, the aperture $wa^x$ and punch $wp^x$ are standby elements and, accordingly, there is no cam for cooperative engagement with the cam-follower $wf^x$.

The relationships between the several punches, apertures, cam-followers, and cams, as well as the cam-patterns embodying the previously-described binary code, are exemplified in the following table, in which the various cam-pattern spaces are filled in with a large "X" to represent a high lobe and with a large "O" to represent blank spaces between the lobes.

(i.e., just after midnight on Sunday of the initial week in the month), and are respectively rotating in the directions shown by the arrows thereon. Thus, only the valve chambers 330 which are associated with cam-disks 143, 158, 173, and cam-followers $mf^3$, $hf^x$, $hf^3$, are open. Therefore, assuming that a ticket T is inserted into the ticket chamber 313 at this particular interval two holes and the notch $n^1$ will be punched therein as shown in full lines in FIG. 43, the dotted lines being used to designate the relative positions of other possible punchings and the notch $n^2$. It will, of course, be understood that actual holes will appear in different configurations or combinations at these various possible positions from interval to interval in accordance with the binary code, thereby recording chronological or actual time in binarily coded minutes, hours, days, and weeks.

The micro-switch 247 is also in series with the micro-switch 357 and the solenoid valve 104 so that, each time its cam-follower 249 drops into the motch 246 of the cam-wheel 245, the circuit to the solenoid valve 104 is momentarily interrupted. This interval of momentary circuit-interruption is a safety measure and occurs as the single-tooth gear 244 is advancing the gear 154 and is causing the shaft 110 to advance from one time increment to the next. Consequently, if a ticket T is fortuitously inserted into the ticket chamber 313 at the very instant that time is changing in the ticket-punching module D, the rearward pushing actuation of the bar 354 and actuator blade 356 of micro-switch 357 will not immediately initiate a ticket-punching cycle. Of course, this time-change interval is of the order of a few seconds and is hardly noticed by the user. The ticket, therefore, will

*Table V*

| Cam Disk | Cam Follower | Punch | Aperture | Binary Number Represented by Hole Formed in Ticket | Cam-Patterns (Minutes—i.e. twenty-four section cam disks) |
|---|---|---|---|---|---|
| 141 | $mf^1$ | $mp^1$ | $ma^1$ | One | O X O X O X O X O X O X O X O X O X O X O X O X |
| 142 | $mf^2$ | $mp^2$ | $ma^2$ | Two | O O X X O O X X O O X X O O X X O O X X O O X X |
| 143 | $mf^3$ | $mp^3$ | $ma^3$ | Four | X X X X O O O O X X X X O O O O X X X X O O O O |
| 144 | $mf^4$ | $mp^4$ | $ma^4$ | Eight | O O O O X X X X X X X X O O O O O O O O X X X X |
| 145 | $mf^5$ | $mp^5$ | $ma^5$ | Sixteen | O O O O O O O O O O O O X X X X X X X X X X X X |

| | | | | | Cam-Patterns (Hours—i.e. twenty-four section cam disks) |
|---|---|---|---|---|---|
| 171 | $hf^1$ | $hp^1$ | $ha^1$ | One | O X O X O X O X O X O X O X O X O X O X O X O X |
| 172 | $hf^2$ | $hp^2$ | $ha^2$ | Two | O O X X O O X X O O X X O O X X O O X X O O X X |
| 173 | $hf^3$ | $hp^3$ | $ha^3$ | Four | X X X X O O O O X X X X O O O O X X X X O O O O |
| 174 | $hf^4$ | $hp^4$ | $ha^4$ | Eight | O O O O X X X X X X X X O O O O O O O O X X X X |
| 175 | $hf^5$ | $hp^5$ | $ha^5$ | Sixteen | O O O O O O O O O O O O X X X X X X X X X X X X |

| | | | | | Cam-Patterns (Days—i.e. twenty-one section cam disk) |
|---|---|---|---|---|---|
| 201 | $df^1$ | $dp^1$ | $da^1$ | One | O X O X O X O X O X O X O X O X O X O X O |
| 202 | $df^2$ | $dp^2$ | $da^2$ | Two | O O X X O O X X O O X X O O X X O O X X O |
| 203 | $df^3$ | $dp^3$ | $da^3$ | Four | O O O O X X X X O O O O X X X X O O O O X |

| | | | | | Cam-Patterns (Weeks—i.e. twenty-four section cam disks) |
|---|---|---|---|---|---|
| 204 | $wf^1$ | $wp^1$ | $wa^1$ | One | O X O X O X O X O X O X O X O X O X O X O X O X |
| 205 | $wf^2$ | $wp^2$ | $wa^2$ | Two | O O X X O O X X O O X X O O X X O O X X O O X X |

Thus, as the shafts 110, 111, 112 and 113 are continuously rotated by the synchronous motor 242, the various cam-disks 141, 142, 143, 144, 145, 171, 172, 173, 174, 175, 201, 202, 203, 204, 205 will constantly rotate and, depending upon the positions of the lobes at any given interval of chronological (actual) time, some of the valve chambers 330 will be open and some of the valve chambers 330 will be closed in a pattern corresponding to the binary code. As shown in FIGS. 37 to 42, inclusive, the cam-disks 141, 142, 143, 144, 145, 171, 172, 173, 174, 175, 201, 202, 203, 204, 205 are all at "zero" time merely rest in the ticket-chamber 313 for a few seconds longer than usual and as soon as the cam-wheel 245 has moved along, the notch 246 will pass beyond the cam-follower 249 which then rides up again on the periphery of the cam-wheel 245 and the circuit to the solenoid valve 104 will be completed.

The solenoid valve 104, in its closed position, is vented to atmosphere so that each punching cycle, as the solenoid valve returns to initial or closed position, the pressure in the various cylinders 323, 323' will be relieved and the punches which have been driven down will return to initial position under influence of the springs 327, 327'.

The ticket-punching module D also includes a time-imprinting mechanism shown in FIGS. 43 to 54, inclusive, and comprising a vertically disposed main plate 400 which is integrally provided along its vertical margins with laterally bent flanges 401, 402, which are, in turn, bent outwardly at their upper ends in the provision of horizontal ears 403, 404, secured, by means of bolts 405, 406, to the underside of the base-plate 100 in straddle-wise relationship to the bifurcation or slot 316.

Bolted or otherwise rigidly secured upon one face of the main plate 400 adjacent the bottom margin thereof is a synchronous electric timing motor 407 having a drive shaft 408 which projects horizontally through a U-shaped clearance opening 409 formed in the main plate 400. Rigidly secured upon the end of the shaft 408 is a circular unidirectional clutch plate 410 conventionally provided with a plurality of angularly projecting spring tongues 411.

Adjacent their lower margins the flanges 401, 402 are provided with coaxial apertures 412, 413 for slip-fitting engagement with mounting pins 414, 415, respectively, which are rigidly mounted in and project rearwardly from laterally bent ears 416, 417 formed integrally on the opposite end of a mounting bar 418 which is riveted or otherwise rigidly secured across the lower face portion of a first vertical chassis-plate 419. Mounted rigidly upon the first chassis-plate 419 in laterally spaced parallel relation thereto, by means of a solid spacer-rivet 420 and three tubular spacer rivets 421, 422, and 423, is a second chassis-plate 424. The pin 415 is preferably provided with a conventional annular groove for receiving a snapping-ring 425, which serves to lock the pin 415 in place, and thereby hold the first chassis-plate 419 and all of the structure supported thereby removably upon the ears 401, 402.

Journaled in and extending through the chassis-plates 419 and 424, is a shaft 426 provided along its length with suitable spacer-sleeves 427, 428, 429. Staked or otherwise rigidly secured to the shaft 426 between the spacer sleeves 428, 429, is a quick-return plate cam 430 pivotally provided at its outer or tip end with a quick-trip auxiliary tip 431 having an angular slot 432 which rides along a headed rivet 433 mounted in and carried by the plate cam 430 which limits the rocking movement of the auxiliary tip 431 with reference to the plate cam 430. On its proximal end, that is to say, the end which is located between the main-plate 400 and the first chassis-plate 419, the shaft 426 is rigidly provided with a driven disk 434 which is set closely parallel to, but spaced slightly from, the unidirectional clutch plate 410 and is suitably apertured for engagement with the spring fingers 411 thereof so that, as the synchronous motor 407 is energized and the shaft 408 thereof is rotated, the disk 434 and shaft 426 will also be rotated.

Mounted at its ends in and extending horizontally between the chassis-plates 419 and 424 adjacent to the central portion of their upper margins is a secondary shaft 435 provided with spacing collars 436, 437, 438, and mounted for free rotation thereon between the spacing collars 436, 437, are five axially spaced printing wheels 439, 440, 441, 442, and 443. The printing wheels 439, 440, and 441 are provided on their peripheral surfaces with type faces respectively designating weeks, days, and hours. Similarly, the printing wheels 442 and 443 are provided on their peripheral surfaces with type faces respectively designating the "tens" and "digits" numbers corresponding to the sixty minutes in a single hour. Also mounted for free rotation on the secondary shaft 435, and respectively pinned to the printing wheels 439, 440, 441, are peripherally toothed ratchet wheels 444, 445, 446. Similarly, pinned to the printing wheels 442, 443, are peripherally toothed ratchet wheels 447, 448. The ratchet wheels 444, 445, 446, 447 and 448 are somewhat smaller in diametral size than the printing wheel so as to avoid interference with the printing action thereof. As will be seen by reference to FIG. 51–A, the ratchet wheels 445, 446, 447 are disposed between the printing wheels 439, 440, 441 and 442, holding them in axially spaced relation. Similarly, the ratchet wheel 444 is interposed between the printing wheel 439 and the spacing collar 437 and the ratchet wheel 448 is interposed between the printing wheel 443 and the spacing collar 436.

The periphery of the ratchet wheel 448 is provided with twenty teeth separated into two consecutive sets of ten teeth each by diametrally opposed clearance slot 449. Each of the teeth is opposite and corresponds to one digit and, of course, the digits in each set range from "0" to "9," thus, it will be evident that there are two complete sets of "digits" numbers. The ratchet wheel 447 is provided around its periphery with twenty-four teeth subdivided into four sets of six each by four radial clearance slots 450. The printing wheel 442 is correspondingly provided with four successive duplicate sets of printing numbers ranging from "0" to "6," and one such printing number is located adjacent to each tooth on the ratchet wheel 447. The ratchet wheel 446 is provided with twenty-four teeth and only one radial clearance slot 451. The ratchet wheel 447 is provided with twenty-one teeth arranged in three successive sets of seven which are separated by three radial clearance slots 452. The printing wheel 440 associated with the ratchet wheel 445 is correspondingly provided with three sets of seven successive type symbols respectively representing Sunday, Monday, Tuesday, Wednesday, Thursday, Friday, and Saturday, each of such symbols being opposite one of the teeth of the ratchet wheel 445. Finally, the ratchet wheel 444 is provided with twenty-six teeth and has no clearance slot whatever. The printing wheel 439 associated with the ratchet wheel 444 is provided with a single set of printing symbols running from "W/0" to "W/25" respectively representing a period of twenty-six successive weeks, each such symbol being located adjacent to a tooth on the ratchet wheel 444.

Mounted upon the rivet 420 are six spacer-sleeves 453, 454, 455, 456, 457, and 458, and five identically shaped pawl-plates 459, 460, 461, 462, 463, all secured together for rotation as a unit by means of an axial pin 64. The pawl-plate 460 is integrally provided with a downwardly projecting L-shaped rock arm 465 which is hooked into the lower end of a tension spring 466, the latter being, in turn, hooked at its upper end over a stationary rod 467 secured at its ends in and extending horizontally between the chassis-plates 419 and 424. As a result of the tension of the spring 466, the pawl-plates 459, 460, 461, 462, 463 are respectively urged into rotation preventing engagement with teeth on the several ratchet wheels 444, 445, 446, 447, 448, and the lower end of the rock arm 465 projects laterally beyond the adjacent edge of the chassis-plate 419 to permit manual tripping or disengagement of the pawl-plates 459, 460, 461, 462, and 463.

Rockably mounted upon the secondary shaft 435 adjacent to the chassis-plates 419, 424 are two frame-plates 468, 468', which extend radially downwardly and project beyond the peripheries of the printing wheels 439, 440, 441, 442, and 443. In this lower or downwardly projecting area, the plates 468, 468' are integrally connected by a transversely extending bight 469, which is provided on its laterally presented face with an ear 470 and a bar-shaped shim pad 471. Rigidly mounted at its ends in and extending horizontally between the frame-plates 468, 468', adjacent the lower extremities thereof, is a stationary roller-shaft 472 which operatively supports a cam-following roller 473 adapted for engagement with the periphery of the plate cam 430, being urged downwardly into resilient contact therewith by means of a tension spring 474 which is hooked at one end through a suitable aperture formed in the bight 469 and at its other end around a stationary rod 475 secured at its ends in and extending horizontally between the chassis-plates 419, 424.

Also rigidly secured at its ends in and extending horizontally between the frame-plates 468, 468' is a shaft 476 and rockably mounted thereon are five suitably spaced pawls 477, 478, 479, 480, 481, respectively positioned for alignment with and engagement with the ratchet wheels 448, 447, 446, 445, and 444, respectively. The pawls 477, 478, 479, 480, and 481 are secured together by means of a pin 482 so as to rock as a single unit and are biased upwardly toward the ratchet wheels 448, 447, 446, 445, and 444, by means of a coiled spring 483. As will be seen by reference to FIGS. 50-A, 50-B, 51-A, 51-B, 51-C, 51-D, and 51-E, the pawls 477, 478, 479, 480 and 481, are staggered in respect to each other in terms of relative distances from the secondary shaft 435. In other words, when the pawl 477 is engaged between two successive teeth of the ratchet wheel 448, all of the other pawls 478, 479, 480, 481, will be displaced outwardly and away from engagement with the respective ratchet wheels 447, 446, 445, and 444. However, when the pawl 477 drops into the clearance slot 449, the pawl 478 is allowed to drop into engagement between two successive teeth of the ratchet wheel 447, the other pawls 479, 480, 481, still being held outwardly away from engagement with the respective ratchet wheels 446, 445, and 444, as shown in FIG. 51-B. Subsequently, when the clearance slots 449 and 450 are aligned so that the pawls 477 and 478 respectively drop thereinto, the pawl 479 will thus be allowed to drop into engagement between two successive teeth of the ratchet wheel 446 as shown in FIG. 51-C, but the pawls 480 and 481 will still be out of engagement with the ratchet wheels 445 and 444. Subsequently, when the clearance slots 449, 450, and 451, are aligned, so that the pawls 477, 478, and 479 drop thereinto, as shown in FIG. 51-D, the pawl 480 will drop into engagement between two successive teeth of the ratchet wheel 445. Finally, when the clearance slots 449, 450, 451, and 452 come into alignment so that the pawls 477, 478, 479, 480 drop thereinto as shown in FIG. 51-E, the pawl 481 will drop into engagement between two successive teeth of the ratchet wheel 444. Of course, the dropping of the pawls 477, 478, 479, 480 into the respective clearance slots 449, 450, 451, 452 takes place only during a single increment of advancing movement so that digital transfer to higher orders will take place at the correct intervals.

Also rigidly mounted at its end in and extending horizontally between the frame-plates 468, 468' in upwardly spaced relation to the shaft 476 is an abutment rod 484 located directly below the pawl-plates 459, 460, 461, 462, and 463, when the frame-plates 468, 468' are in downwardly swung position as shown in FIG. 50-A. When, however, the cam 430 rotates and thereby swings the frame-plates 468, 468', upwardly to the position shown in FIG. 50-B, the bar 484 will also swing upwardly and lock the pawl-plates 459, 460, 461, 462, and 463, upwardly and out of engagement with the ratchet wheels 444, 445, 446, 447 and 448, releasing them so that they can be advanced by the pawls 477, 478, 479, 480 and 481, when the frame-plates 468, 468' swing back down to initial position under the influence of the spring 474.

The several printing wheels 439, 440, 441, 442, and 443 extend upwardly above the secondary shaft 435 into the bifurcation or slot 316 and the pawl-plates 459, 460, 461, 462, 463 are of such size and shape so as to hold the printing wheels 439, 440, 441, 442 and 443 with a single printing symbol presented upwardly in printing position through the slot 316 in close proximity to the underside of the ticket T when the latter is placed within the ticket chamber 313, all as best seen in FIGS. 43 and 50-A. Assuming that the printing wheels 439, 440, 441, 442, 443, are manually oriented or set in a so-called "zero" position, that is to say, with the "0" printing symbol of the printing wheels 443, 442, 441, the printing symbol "SU" (for Sunday), and the printing symbol "W/0" for the first week, presented upwardly in printing position, then it will be apparent from FIGS. 51-A, 51-B, 51-C, 51-D, and 51-E, that for the first ten revolutions of plate-cam 430, the pawl 477 will advance the printing wheel 443 ten steps, thereby successively presenting the printing symbols "1" to "9" toward printing position, and, finally, bringing up the second "0" symbol into printing position. As the second "0" comes into printing position, one of the clearance slots 449 will come into position opposite the pawl 477 so that it will drop thereinto and the pawl 478 will thereupon advance the printing wheel 447 one step so that the printing symbol "1" will be brought around into printing position. Thereafter, for the next ten revolutions of the plate-cam 430, the numbers "11" through "19" will be presented toward printing position, as a second series of ten numbers on the printing wheel 443 are successively brought into printing position, whereupon the second clearance slot 449 will be brought around opposite the pawl 477 and the latter will drop therein so that the pawl 478 will again advance the printing wheel 442 one more step bringing the printing symbol "2" into printing position. During the next ten revolutions of the plate-cam 430, the numbers "21" to "30" will be brought up into printing position. It will thus be evident that after sixty revolutions of the plate-cam 430, the two printing wheels 443, 442, will have successively been in a position to print the numbers ranging from "00" to "59" and again return to "00." On the sixty-first revolution of the plate-cam 430, the first clearance slot 449 of the ratchet wheel 448 and the first clearance slot 450 of the ratchet wheel 447 will be brought into alignment as shown in FIG. 51-C, so that the pawls 477, 478 will respectively drop thereinto and the pawl 479 will drop into engagement with the ratchet wheel 446, thereby advancing the printing wheel 447 one step, and bringing the printing symbol "1" up into printing position. It will, of course, be evident that the plate-cam 430 makes one revolution for each minute of actual time and, thus, sixty revolutions thereof will represent one hour. Accordingly, the printing symbol "1," on the printing wheel 441, will represent "1 A.M." It will also, of course, be apparent that after a period of twenty-four hours, the printing wheel 441 will have been advanced twenty-four successive times to complete one revolution. During this same twenty-four hour period, the printing wheel 442, having four clearance slots 450 and four sets of "tens" numbers, will have made six revolutions and, correspondingly, the "digits" printing wheel 443 will have made seventy-two complete revolutions. At this point in time (i.e., the elapse of one full day) the first clearance apertures 449 and 450 and the clearance aperture 451 will be aligned as shown in FIG. 51-D so that the pawls 477, 478, and 479 will respectively drop thereinto and allow the pawl 480 to advance the printing wheel 440 one step bringing the printing symbol "M" (for "Monday") up into printing position. This printing wheel 440 will, of course, advance one successive step for each complete revolution of the printing wheel 441 until it has advanced five more steps, successively bringing printing symbols "TU," "W," "TH," "FR," and "SA," up into printing position. Thereupon, clearance slots 449, 450, 451 and 452 will be brought into alignment as shown in FIGS. 51-E so that the pawls 477, 478, 479, 480 will respectively drop thereinto allowing the pawl 481 to drop into engagement with the ratchet wheel 444 and advance the printing wheel 439 one step. Obviously, the printing wheel 439 is advanced one step for each seven steps on the printing wheel 440, so that the printing wheel 439 will advance one step for each week. As the day-printing wheel 440 moves from the "SA" symbol to the "SU" symbol of the next week, the hours printing wheel 441 and the numbers printing wheel 442, 443 move to "0" and "00" respectively.

In order to insure that the several printing wheels 439, 440, 441, 442, and 443 will advance only a single step at a time, five interlock pawls 482, 483, 484, 485, and 486 are provided and are rockably mounted upon a stationary shaft 87 which is rigidly secured at its end in and extends horizontally between the chassis-plates 419, 424. The interlock pawls 482, 483, 484, 485, and 486 are held in suitably spaced relation upon the stationary shaft 487 by means of spacer-collars 488, 489, 490, 491, 492, and 493. The interlock pawls 482, 483, 484, 485, and 486 are all of substantially identical shape and respectively engage the ratchet wheels 444, 445, 446, 447, and 448 at approximately the opposite sides thereof with respect to the pawl-plates 459, 460, 461, 462, and 463. Moreover, each of the interlock pawls 482, 483, 484, 485, and 486 are respectively provided with laterally projecting fingers 494, 495, 496, 497, and 498, which are, in turn, biased upwardly by means of springs 499, 500, 501, 502, and 503 the latter all being hooked at their upper ends over a stationary rod 504. Rockably mounted upon the stationary rod 476 is a U-shaped interlock bracket 505 having a transversely extending bight-plate 506 the upper edge of which directly underlies the fingers 494, 495, 496, 497, and 498, thereby holding the interlock pawls 482, 483, 484, 485, and 486 in locking position against the several ratchet wheels 444, 445, 446, 447, and 448.

The bight-plate 506 is provided with a slot 507, and a transverse support pin 508, the latter being slidably engaged along the bottom edge of a trigger-link 509 which is pivotally secured at its inner end upon the ear 470 and, at its other end, extends slidably through the slot 507, being provided at such outer end with a depending abutment or tooth 510 so positioned as to drop down into engagement with the lower margin of the slot 507 as the frame-plates 468, 468', swing from the position shown in FIG. 50–A to the position shown in FIG. 50–B. The trigger-link 509 is biased downwardly by means of a short tension spring 511 and thus will momentarily engage the bight-plate 506 upon return movement thereby swinging the latter outwardly into the position shown in dotted lines in FIG. 50–B and then will slip upwardly out of engagement with the bight-plate 506 in order to allow the interlock bracket 505 to rock back under its own weight to the position shown in full lines in FIG. 50–B. During this interval in which the interlock bracket 505 is swung outwardly the interlock pawls 482, 483, 484, 485, and 486, will be momentarily released so that the several bracket wheels 444, 445, 446, 447 and 448, can be advanced in the manner previously described.

It may be noted by reference to FIG. 50–A, that the interlock bracket 505, upon returning to locked position, will come into abutment with a stop collar 512 mounted upon the face of the chassis-plate 419. This stop collar 512 is also threadedly provided with a laterally projecting adjustment screw 513 which is disposed in endwise abutment against the shim pad 471 and affords the means by which pawl-stroke can be precisely adjusted for effecting single-step advancements of the several ratchet wheels 444, 445, 446, 447, and 448.

Rigidly secured upon and projecting laterally on opposite sides of chassis-plate 419 are two auxiliary support plates 514, 515, which operatively support spool-shafts 516, 517, respectively, having spline-ends 518, 519, for non-rotative engagement through the cores of conventional ribbon spools 520, 521, thereby supporting the ribbon spools 520, 521, in lateral alignment on opposite sides of the slot 316, so that the ribbon 522 will extend between the spools 520, 521, and will be trained across the top of the printing wheels 439, 440, 441, 442, 443, directly beneath the slot 316, the ribbon 522 being supported in such position by a bifurcated wire ribbon support 523.

The spool shafts 516, 517 project through the auxiliary plates 514, 515, and are rigidly provided on their projecting ends with star-toothed feed-wheels 524, 525, respectively adapted for alternative engagement with matching star-toothed feed-wheels 526, 527, which are rigidly mounted on the opposite ends of a drive-shaft 528 operatively mounted, for both rotative and longitudinally shifting movement within laterally projecting ears 529, 529', respectively bent outwardly from the inner margins of the auxiliary plates 514, 515, the feed-wheel 527 having a hub 630 which is adjustably secured to shaft 528 by a conventional set screw.

Also rigidly secured upon the shaft 528 by means of a conventional set screw in axially spaced relation to the hub 530 is a set-collar 531, and operatively engaged between the hub 530 and set-collar 531, is an actuating finger 532 which is operatively mounted in the lower end of a rocking-link 533 pivotally mounted upon a horizontal pin 534 which is, in turn, rigidly secured at its ends in and projects laterally from the auxiliary support plate 515. In its upper end the rock-link 533 is provided with a relatively large circular aperture 535 which loosely encircles and engages the laterally projecting end 536 of a shift-bar 537 which extends slidably through the flanges 401, 402, and is rigidly provided with two laterally projecting ribbon-contact clevises 538, 539. The ribbon 522 is threaded through these ribbon-contact clevises 538, 539, and around a series of suitably located idler-rollers 540, 541, 542, 543, substantially as shown in FIG. 49. Moreover, the ribbon 522 is provided adjacent its opposite terminal ends with conventional eyelets 544 which will respectively engage one or the other of the ribbon-contact clevises 538, 539, as the ribbon 522 reaches one of its ends. Rockably mounted on and depending from the lower end of the rocking-link 533 is an over-center link 545 operatively engaged at its lower end with the lower end of a tension spring 546 which extends upwardly beyond the center-line of the pivot pin 534 and at its upper end is attached to the rocking-link 533 directly beneath the aperture 535. The spring 546 serves to hold the rocking-link 533 in either the position shown in FIG. 45 or in the position shown in FIG. 49 and the rocking-link 533 is shifted from the position shown in FIG. 45 to the position shown in FIG. 49 by engagement between the eyelet 544 and the ribbon-contact clevis 539 as the ribbon is wound almost completely from the spool 521, thereby shifting the rod 537 in the direction of the arrow as shown in FIG. 49. As the rocking-link 533 rocks to the position shown in FIG. 49 the shaft 528 will shift in the opposite direction disengaging the gears 524, 526, and bringing the gears 525, 527, into engagement so as to reverse the direction of travel of the ribbon 522 and spool it back again from the spool 520 to the spool 521. As the ribbon 522 is almost completely transferred to spool 521 the other eyelet 544 located adjacent the other terminal end of the ribbon 522 will come into engagement with the ribbon-contact clevis 538 and shift the rod 537 in the opposite direction swinging the rocking-link 533 back to the position shown in FIG. 45 and again reversing the direction of travel of the ribbon 522.

Rigidly mounted on and projecting laterally from the auxiliary plate 515 is a solenoid 545 having a vertically reciprocating pull-bar 546 which is operatively provided at its upper end with a pawl-carrier 547, the latter being, in turn, provided on its upper face with a stabilizing rod 548 slidably disposed in and extending vertically through the bracket arm 549 rigidly mounted on and projecting laterally from the auxiliary plate 515. Disposed encirclingly around the upwardly projecting end of the stabilizing rod 548 is a compression spring 550 which abuts at its upper end against the washer 551 secured upon the stabilizing rod 548 by means of a pair of lock-nuts 552, 553, thereby biasing the stabilizing rod 548 and its associated elements upwardly to the position shown in FIG. 47. Rockably mounted upon the pawl-carrier 547 and extending horizontally therethrough is a gravity-biased pawl 554 which projects outwardly on one side from the pawl-carrier 547 for engagement with a star-toothed feed-wheel 555 which is, in turn, pinned or otherwise rigidly mounted upon the shaft 528. As will be seen by reference to FIG. 49, the pawl 554 is relatively wide so that it will maintain operative engagement with the feed-wheel 555 in either shifted position of the shaft 528. The solenoid 545 is electrically connected in parallel with the circuit to the solenoid valve 104, so that whenever the circuit is closed to the solenoid valve 104 to initiate a ticket-punching cycle, the pawl-carrier 547 will be pulled quickly downwardly rotating the shaft 528 and, correspondingly advancing the ribbon in one direction or the other, depending upon the shifted position of the shaft 528. This ribbon-advancing movement takes place very quickly at the beginning of the ticket-punching cycle.

Rigidly mounted upon the forward face of the cylinder-block 300 in overlying relationship to the slot 316, as shown in FIG. 25 and FIG. 26, is a small pneumatic cylinder 556 operatively provided with a piston 557 and piston-rod 558 normally biased into upward position by means of a compression spring 559. The cylinder-space above the piston 557 is connected through a supply tube 560 to a bored duct 561 extending through the cylinder-block 300 and communicating with the air-pressure manifold 332. The piston 558 projects downwardly from the cylinder 556 and on its lower end is rigidly provided with a pad-block 562, the underface of which carries a somewhat resilient rubber pad 563. The pad-block 562 is also provided with an upwardly projecting pin 564 which is slidably engaged in the wall of the cylinder 556, so as to prevent axial rotation of the piston 557.

When the solenoid valve 104 opens and admits air under pressure to the manifold 332, air under pressure will similarly be admitted to the cylinder 556 and will drive the piston 557 downwardly thereby impelling the pad 563 downwardly upon a ticket T which has been inserted into the ticket chamber 313. The ticket T is thereby pressed against the ribbon 552 and the printing symbols which, at the moment, are presented upwardly in printing position on the printing wheels 439, 440, 441, 442, and 443. By this means, the actual time at which the punching cycle occurs will be legibly imprinted upon the underface of the ticket T.

At the conclusion of a punching cycle, the ticket T may be manually removed and retained by the customer for whatever period of time the automobile remains on the parking lot. Preferably, the ticket T is provided with a perforated stub *s* which can be placed on the vehicle being parked. Conventionally the ticket T and stub *s* carry matching serial numbers so that the two can be identified with each other.

Rigidly supported in outwardly spaced parallel relation upon the forwardly presented face of the chassis-plate 424, are two spaced parallel clock plates 565, 566. As will be seen by reference to FIG. 53, the shaft 426 projects through the chassis-plate 424 and terminates in the space between the chassis-plate 424 and the clock plate 565, being rigidly provided on such terminal end with a small clock pinion 567 which meshes with a primary clock gear 568 journaled upon an idler shaft 569 which is rigidly mounted at its end and projects laterally from the clock plate 565. The primary clock gear 568 is spaced outwardly from the clock plate 565 and in the intermediate space the shaft 569 is provided with a free rotating ratchet wheel 570 which is rigidly secured to an intermediate pinion 571. The ratchet wheel 570 is connected for unidirectional driving movement to the primary clock gear 568 by means of a pawl-spring 572. Journaled in and extending through the clock-plates 565, 566, in coaxial alignment with the shaft 426 is a minutes shaft 573 provided on its inner end with a minutes gear 574 which meshes with the pinion 571. Journaled upon the minutes shaft 573 and also concentrically journaled in the clock-plate 566 is an hours quill 575 which is integrally provided on its interior end with a large transfer gear 576 which meshes with an idler pinion 577 journaled upon an idler shaft 578 which is, in turn, operatively mounted at its opposite ends in and extends horizontally between the clock-plates 565, 566. Also journaled upon the idler shaft 578 and rigidly connected to the idler pinion 577 is an idler gear 579 which meshes with a pinion 580 fixed upon the minutes shaft 573. As is conventional in clock mechanisms, the ratio of the gearing between the minutes shaft 573, and the hours quill 575 is such that the hours quill 575 will make one complete revolution for each sixty revolutions of the minutes shaft 573. And, similarly, the gear ratios between the pinion 567 and the minutes shaft 573 are such that the minutes shaft 573 will be driven through one complete revolution for each minute of actual time. The forwardly presented surface of the clock-plate 566 is suitably imprinted with clock numerals for cooperation with a minutes hand 581 and an hours hand 581', respectively secured upon the minutes shaft 573 and the hours quill 575.

Mounted in and projecting horizontally from the clock-plate 565 in the direction of the chassis-plate 424 is an idler shaft 582 and journaled thereon is a setting gear 583 which meshes with the minutes gear 574 and is provided with a diametrally enlarged peripherally knurled setting wheel 584 which projects beyond the margins of the clock-plates 565, 566, so as to be accessible for manual rotation. Since the pinion 571 is connected for unidirectional movement to the primary gear 568 by means of the pawl-spring 572 it is possible to rotate the minutes gear 574 in a clockwise direction independently of the primary gear 568 and thereby set the hands 581, 581', to correct time. As will be seen by reference to FIGS. 14 and 23, the forwardly presented or indicia bearing face of the clock-plate 566 is presented forwardly so that it can be viewed when the door 11 is opened. It should also be noted in this connection that the printing wheels 439, 440, 441, 442, and 443, can be manually set to correct time by simultaneously swinging the pawl-plates 459, 460, 461, 462, 463, and the interlock bracket 505 outwardly into disengaged position. As will be obvious by reference to FIGS. 50–A and 50–B, this disengagement can be accomplished manually when desired.

INTERMITTENT GEARING

As above set forth, the shafts 110, 111, 112, and 113 are interconnected by an intermittent gear-train consisting of the three twenty-four tooth gear-wheels 154, 185, 239, the twenty-one tooth gear-wheel 216, the single tooth transfer gear-wheels 155, 186, the three tooth gear-wheel 217, and the single tooth gear-wheel 247 which is driven by the synchronous motor 242. It has also been pointed out above that the motor-driven gear-wheel 244 rotates once every two and one-half minutes, thereby causing the twenty-four tooth gear-wheel 154 to rotate once every hour. The single tooth transfer gear-wheel 155, consequently, rotates once every hour, thereby causing the twenty-four tooth gear-wheel 185 to rotate once every twenty-four hours or, in other words, once a day. The single tooth transfer gear-wheel 186 correspondingly rotates once every day thereby rotating the twenty-one tooth gear-wheel 216 once every twenty-one days or, in other words, once every three weeks. The three tooth transfer gear-wheel 217 will, of course, advance the twenty-four tooth gear-wheel 239 one tooth, or one-twenty-fourth of a revolution each week.

This intermittent gear-train can, of course, be mechanically implemented by the use of conventional Geneva gears or, for that matter, various other types of well-known and standard intermittent gearing systems. However, at the present time, there does not seem to be any standard Geneva gears or other gear components used in recognized intermittent gearing systems which have the tooth-ratios necessary for use in the computer device A. In addition to this, such Geneva gears and other intermittent gearing components that are available as standard parts are relatively large in size and much too costly for adaptation to the requirements of computer devices generally. Therefore, in connection with the present invention, a rather novel system of intermittent gearing has been developed, as a result of which it has been possible to provide the necessary intermittent motion and gear ratios within extremely compact size limitations and at relatively modest cost.

This has been accomplished by using the design of standard involute spur gears having the desired dimensions and structural capability for carrying the loads and stresses which must be transmitted in the gear-train. In selecting the standard gears, all of the gears must be of the same diametral pitch so that they have the same tooth-form and tooth-dimension, thereby being capable of meshing with each other. The gears which are to be developed as the driven gears in the gear-train should be selected so that in the standard gear form or design they would ordinarily have a number of teeth several times greater than the actual number of teeth required.

For example, the twenty-four tooth gear-wheels 154, 185, and 239, are orginally laid out as seventy-two tooth standard involute gears and then reduced to the form of twenty-four equally spaced teeth by eliminating the second and third tooth in each successive group of three teeth around the periphery of the gear so that, in effect, each one of the twenty-four teeth are spaced by a gap equivalent to two normal tooth spaces. The twenty-one tooth gear-wheel 216 is originally laid out as a standard sixty-three tooth involute gear and intermediate pairs of teeth eliminated so that each one of the twenty-one teeth finally remaining in the finished gear-design will, in effect, be spaced by a distance equal to two tooth-spaces.

Similarly, the driving gear-wheels, namely, the single tooth gear-wheels 155, 186, 244, and the three tooth gear-wheel 217 will be selected so that they have a pitch diameter of the driven gear-wheels with which such driving gear-wheels are intended to mesh.

The single tooth gear-wheels 155, 186, and 244 are laid out as standard involute gears. In the case of the gear-wheels 155, 186, all of the teeth but one are eliminated in the design. In the case of the three tooth gear-wheel 217, all but three of the teeth are eliminated in the design and the three teeth which are left are arranged at 120° intervals around the periphery thereof.

It has also been found necessary to set up a meshing pair of gears (e.g., the transfer gear-wheel 155 and the twenty-four tooth gear-wheel 185 which it drives), on centers of rotation which are slightly further apart than the normal center-line distance which would be utilized for the standard full-tooth involute gears from which the gear-wheels 155 and 186 are derived. The increase in center-line distance is of the order of .75% to 1.25%. Thus, the center-line distance, between the three tooth gear-wheel 217 and the twenty-four tooth gear-wheel 239 which it drives, is 1.0083 times the normal or standard center-line distance which would be employed if such gear-wheels were full-toothed and meshed continuously instead of intermittently. Similarly, the center-line distance between the single tooth transfer gear-wheel 155 and the twenty-four tooth gear-wheel 186 which it drives 1.0118 times the normal or standard center-line distance which would be employed if such gear-wheels were full-toothed and meshed continuously instead of intermittently.

TICKET READING MODULE

The ticket reading module E, in general, consists of a mechanism having fifteen normally open micro-switches will conform to the punch-hole pattern in the ticket T. In addition, there are three interlock micro-switches respectively located for alignment with the three rows of punched holes. Also, a normally open initiating micro-switch is provided and is located in such position that it will be closed as the ticket T is inserted into proper position for reading. Two of the interlock micro-switches are located in such poistion that they will be cleared by the notches $n^1$, $n^2$, if such notches are in the ticket and are in the proper position. These interlock micro-switches can either be normally closed so as to complete the necessary circuits if the validation notch $n^1$ and the lot identification notch $n^2$ are in proper position. In such case, either one or both will be opened if the notches $n^1$, $n^2$ are not in proper position or not present in the ticket T and the necessary circuits will be broken. Obviously, a converse arrangement can be utilized if desired, in which case the interlock micro-switches will be normally open and, when closed, as a result of presentation of an improper ticket, will complete a circuit to an interlocking relay or some similar device, which will render the mechanism inoperative.

Some suitable mechanism set into operation when the appropriate micro-switches are closed will drive the banks of reading switches down toward the ticket and suitable means are provided so that certain of the reading switches will be actuated responsive to the presence of punched holes in the ticket. Obviously, this also can be arranged in several ways. The reading switches can be normally open and arranged so that only the switches above punched holes will remain open during the reading cycle and all of the other reading switches, namely, those corresponding to spaces on the ticket where no holes have been punched will be shifted to closed position. In such case, the fifteen switches will be wired into a sensing-circuit consistent with this type of operation. On the other hand, the reading switches can be of the normally closed type so that the particular reading switches, which are located over punched holes, will remain closed and the rest of the reading switches opened during the reading cycle. In such case, the fifteen reading switches will be connected to a sensing-circuit consistent with this arrangement.

Thus, when a ticket T is inserted into the ticket reading module E, a computing cycle will be initiated and the configuration of the sensing-circuit established by the several reading switches will be changed to correspond with the punched hole pattern in the ticket T, and this change in circuit configuration will, in effect, introduce into the computer device A a record or indication of the exact time at which the ticket T was issued.

The ticket reading module E preferably comprises a flat base-plate 600, the lateral margins of which are releasably secured, as above stated, to the inclined supporting rails 82, 86, in such position that the forward transverse margin is proximate to the inwardly presented face of the door 11 and the rear transverse margin is spaced forwardly from the rear wall 2. Provided for disposition upon the upper face of the base-plate 600 is an upstanding bracket-plate 601 integrally provided along its vertical margins with forwardly bent triangular flanges 602, 603, which are, in turn, bent inwardly along their bottom margins in the provision of identical horizontal mounting flanges 604, 604', which, in turn, rest upon the upper face of the base-plate 600 and are secured thereto by means of bolts 605, 605'. The flanges 602, 603, moreover, support the plate 601 so that its lower horizontal margin is substantially above the upper face of the base-plate 600 to provide a clearance slot 606.

Figure 1:
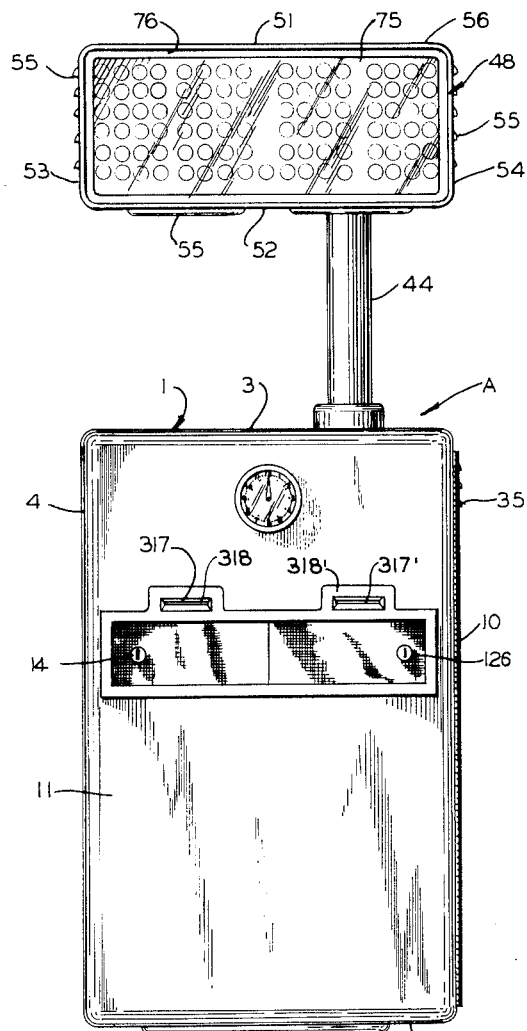
FIG. 1 is a front elevational view of a computer construction in accordance with and embodying the present invention.

The upper face of the base-plate 600 is milled out between the flanges 602, 603, to provide a channel 607 which is of relatively shallow vertical height sufficient to accommodate the thickness of the ticket T. The channel is defined by two rearwardly extending vertical shoulder faces 608, 609, which are flared outwardly at the forward ends in the formation of forwardly diverging guide-faces 610, 611, as best seen in FIG. 63. Rigidly mounted upon the upper face of the base-plate 600 and extending across the channel 607 is a guide block 612, thereby forming a long flat open-ended ticket chamber 613 which substantially corresponds in size and shape to the ticket chamber 313 of the ticket punching module D. As will be apparent from FIG. 1, this chamber 613 opens forwardly toward the inside face of the door 11 adjacent to a second ticket-slot 317' formed therein and defined by a rectilinear extension 318' of the frame-member 124.

In the area of the chamber 613, the base-plate 600 is provided with three uniformly spaced rearwardly extending rows of five apertures 614, 615, 616, 617, 618, 619, 620, 622, 623, 624, 625, 626, 627, 628 having the same positional arrangement or pattern as the apertures $ma^1$, $ma^2$, $ma^3$, $ma^4$, $ma^5$, $ha^1$, $ha^2$, $ha^3$, $ha^4$, $ha^5$, $da^1$, $da^2$, $da^3$, $wa^1$, and $wa^2$ of the ticket-punching module D. Similarly, the guide-block 612 is bored with fifteen vertical drill-holes 629, 630, 631, 632, 633, 634, 635, 636, 637, 638, 639, 640, 641, 642, 643 respectively overlying and aligned with the apertures 614, 615, 616, 617, 618, 619, 620, 621, 622, 623, 624, 625, 626, 627, 628.

The guide-block 612 is held in place upon the base-plate 600 by means of four studs 644, 645, 646, 647, which are rigidly bolted into the base-plate 600 and project vertically upwardly therefrom through the guide-block 612 adjacent its four corners, each of the studs being provided with an annularly enlarged collar 648 which is drawn into abutment against the top face of the guide-block 612 and is, in turn, provided upon its upwardly presented face with a rubber cushioning washer 649.

Slidably mounted upon the upper ends of the studs 644, 645, 646, and 647 is a flat rectilinear frame-plate 650 which extends laterally equidistantly on opposite sides of the guide-block 612 and is slightly wider from front to rear than the front-to-rear dimension of the aperture pattern. The frame-plate 650 rests upon and is biased upwardly by four identical coiled springs 651 which are seated in recesses 652 and are located adjacent to the four studs 644, 645, 646, 647, as best seen in FIGS. 60 and 62. At their upper ends, the studs 644, 645, 646, 647 are respectively provided with snap-rings 653, 654, 655, 656, which serve as upper stops for the frame-plate 650. Shiftably mounted in the frame-plate 650 and extending vertically therethrough are fifteen rod-like feelers 657, 658, 659, 660, 661, 662, 663, 664, 665, 666, 667, 668, 669, 670, and 671, respectively, positioned in coaxial coaxial alignment with, and extending slidably into, the drill-holes 629, 630, 631, 632, 633, 634, 635, 636, 637, 638, 639, 640, 641, 642, and 643. All of the feelers 657–671, inclusive, are similar and are prevented from dropping out of the frame-plate 650 by means of snap-rings 672.

Rigidly mounted in upwardly spaced parallel relation upon the frame-plate 650 by means of stud bolts 673 and spacer sleeves 674, 675 are switch carrier-plates 676, 677. Mounted upon the upper face of the switch carrier-plate 676 is a row of five conventional single-pole, double-throw micro-switches 678, 679, 680, 681, 682 having downwardly extending vertically reciprocating actuating plungers 683, 684, 685, 686, 687, which are respectively in coaxial alignment with, and in endwise abutting contact with the upper ends of, the feelers 657, 658, 659, 660, 661, in the space between the frame-plate 650 and the switch carrier-plate 676, as best seen in FIGS. 55 and 59. Similarly mounted upon the upper face of the switch carrier-plate 677 are five conventional single-pole, double-throw micro-switches, 688, 689, 690, 691, 692, which are identical with the previously described micro-switches 678–687, inclusive, and have downwardly presented actuating plungers 693, 694, 695, 696, 697, which are in endwise abutment with the upper ends of the feelers 662, 663, 664, 665, 666, respectively, in the space between the switch carrier-plates 676, 677, and approximately along the centerline thereof. Also mounted upon the upper face of the carrier-plate 676 is a row of five conventional single-pole, double-throw micro-switches 698, 699, 700, 701, 702, which are also identical with the previously described micro-switches 678–687, inclusive, and have downwardly presented actuating plungers 703, 704, 705, 706, 707, which are in endwise abutment with the upper ends of the feelers 667, 668, 669, 670, 671, in the space between the frame-plate 650 and the switch carrier-plate 676, as best seen in FIGS. 55 and 59. As will be seen by reference to FIGS. 57 and 64, the central row of feelers 662, 663, 664, 665, and 666 are substantially longer than the other feelers 657, 658, 659, 660, 661, 667, 668, 669, 670, 671, and project slidably through the switch carrier-plate 676 for endwise abutment against the switch-actuating plungers 703, 704, 705, 706, 707, respectively.

Rigidly bolted upon the upper face of the switch carrier-plate 677 is a U-shaped saddle 708 which straddles the line of micro-switches 698–702, inclusive, and is provided with a horizontal bight portion 709. Similarly bolted to the forwardly presented face of the bracket-plate 601 adjacent the upper edge thereof is a forwardly extending shelf-plate 710 which is disposed in upwardly spaced parallel relation to the bight portion 709 of the saddle 708. Rigidly mounted upon the upper face of the shelf-plate 710 are two conventional solenoids 711, 712, respectively, having internal plunger-type armatures 713, 714. Abuttingly mounted against the lower end of the armature 714 and extending slidably through the shelf-plate 710 is a push rod 715 which is bolted securely into the center of the bight portion 709 of the saddle 708, so that, whenever the solenoid 712 is energized, the saddle 708, together with the frame-plate 650 and the switch carrier-plates 676, 677, are pushed downwardly upon the upper ends of the studs 644, 645, 646, 647, compressing the springs 651 and respectively dropping the various feelers 657–671, inclusive, into the apertures 614–628, inclusive, of the base-plate 600.

Assuming that a ticket T has been inserted into the ticket chamber 613 and has only two punched holes which coincide with the apertures 616 and 624 with all other punch-hole areas of the ticket T unpunched (i.e., the ticket T as punched in FIG. 43), it will be evident that the feelers 657, 658, 660, 661, 662, 663, 665, 666, 667, 668, 669, and 671 will contact unpunched areas on the ticket T and will be thus prevented from dropping into the particular apertures 614, 615, 617, 618, 619, 620, 622, 623, 624, 625, 626, 627, and 628. On the other hand, the two feelers 659 and 664 will drop through the two punched holes in the ticket T and enter into the corresponding aperture 616 and 621. The feelers 657, 658, 660, 661, 662, 663, 665, 666, 667, 668, 669, 670, and 671, which are held upwardly as a result of the absence of holes in the ticket T, will shift the switch-actuating plungers 688, 689, 691, 692, 693, 694, 695, 696, 697, 703, 704, 706, 707, with which they are respectively associated, and the corresponding micro-switches 678, 679, 681, 682, 683, 684, 685, 686, 687, 698, 699, 701, 702 will be shifted to closed position. Meanwhile, the micro-switches 680 and 700, associated with the plungers 690 and 705 which have dropped through the two punched holes in the ticket T, will remain open. This configuration is schematically illustrated in FIG. 64, although, for clarity of illustration, the ticket T is not shown in position within the ticket chamber 613.

Rigidly mounted upon the base-plate 600 and projecting upwardly therefrom directly to the rear of the slot 606 is a pair of transversely spaced support blocks 716, 716′, which engage the opposite ends of horizontal bars 717, 717′, held in upwardly spaced parallel relation above the upper surface of the base-plate 600. Mounted on and supported by the bars 717, 717′ are four double-pole, single-throw micro-switches 718, 719, 720, 721, respectively, having forwardly biased depending actuator blades 722, 723, 724, 725, which bear against the rear ends of horizontally shiftable slide bars 726, 727, 728, 729, the latter being operatively mounted in slots 730, 731, 732, 733, respectively formed in the upper face of the base-plate 600. As will be noted by reference to FIG. 60 the micro-switch 718 and its associated slide bar 726 are in line with the first row of apertures 614, 615, 616, 617, and 618. Similarly, the micro-switch 720 and its associated slide bar 728 are aligned with the middle row of apertures 619, 620, 621, 622, and 623. The micro-switch 721 and its associated slide bar 729 are aligned with the last row of apertures 624, 625, 626, 627, 628. The micro-switch 719 and its actuator bar 727 are located approximately midway between the switches 718 and 721 and the slide bar 727 extends across an extra aperture 734 formed in the base-plate 600 rearwardly with respect to the rearmost apertures 618, 623, 628.

Mounted for vertical shifting movement in the rear portion of the guide-block 612 in co-axial alignment with the aperture 734 is an elongated punch 735 provided in upwardly spaced relation to the guide-block 612 with a snap-collar 736. Disposed encirclingly around the punch 735 in endwise abutting relationship to the guide-block 612 and the inner face of the snap-ring 736 is a compression spring 737 which normally biases the punch 735 upwardly. The lower or cutting end of the punch 735 is cusp-shaped similar to the cutting end of the lot identification punch $hp^x$ for clearing the forward end of the slide bar 727 and also for cutting a semi-circular notch in the rear edge of the ticket T, thereby preventing re-use of the ticket T after it has been read in the ticket-reading module D. The punch 735 projects upwardly for a substantial distance and is rigidly joined at its upper end to an upwardly projecting co-axial actuating rod 738 which, in turn, extends slidably through the shelf-plate 710 and is rigidly mounted in the lower end of the solenoid armature 713, all as best seen in FIG. 57.

Thus, when the ticket T is inserted into the ticket chamber 613, the rear edge thereof will come up against the slide bars 727, 729, shifting it rearwardly and closing the micro-switches 719, 721, which immediately completes an electrical circuit to the solenoids 711, 712, thereby initiating a computing cycle, provided that the ticket T has a notch $n^1$ in the correct position along its rearward edge. In such case, the notch $n^1$ will clear the slide bars 728 and leave the micro-switch 720 unactuated. The micro-switches 719 and 721 are of the normally open type and are in series with the normally closed contact of the micro-switch 720. Consequently, when the micro-switches 719 and 721 are actuated by the rear edge of the ticket T, the circuit through them will be closed and the non-actuation of the micro-switch 720, as a result of the clearance notch $n^1$ will, as above stated, complete the circuit to the solenoids 711, 712. Parenthetically, it should be noted at this point that the normally closed contact or pole of the micro-switch 718 is in series with another circuit and is utilized for a purpose which will be presently more fully discussed, it being sufficient at this juncture to state that the actuation of the micro-switch 718 will break the circuit through this normally closed contact at the same time that the circuit is being completed through the normally open contact to the solenoids 711, 712.

On the other hand, if notch $n^1$ is absent from the rear edge of the ticket T or is in the incorrect position, it will not clear the actuating bar 727, and the rear edge of the ticket T will shift such actuating bar 727 rearwardly, opening the circuit through the micro-switch 720, thereby preventing the initiation of a ticket reading cycle.

COMPUTING IN GENERAL

The computation of parking charges for elapsed time, generally speaking, involves the use of a clock-controlled mechanism which constantly keeps actual time in terms of the binary coding system above discussed. This mechanism preferably includes a so-called "binary clock" which controls a group of circuits having an overall configuration that changes every two-and-one-half minutes, so that such circuit configuration will constantly reflect actual time or "time now," as it may be called. The binary clock is electro-mechanically implemented by the use of four stepping switches, which when energized, will continue to operate step-by-step until the energizing circuit is broken. These four stepping switches, in effect, "count" minutes, hours, days, and weeks and are electrically connected through appropriate leads to the binary clock and to the ticket reading module E in such a manner that when a ticket T is inserted into the ticket reading module E and a computing cycle thereby initiated, the four stepping switches will be energized and brought into coincidence with the circuit configuration established by the binary clock. The stepping switches have a series of cams which are the counterpart of the cams in the ticket punching module D and have a cam-pattern in which time is binarily coded. Thus, when the stepping switches respectively find coincidence with the circuit configuration established by the binary clock, the cams of these switches will be in a mechanical configuration representing "time now," that is to say, the actual time at which the computing cycle is initiated. Thus, it can be said that the stepping switches are reset to "time now," keeping in mind that these stepping switches will, at the beginning of any computing cycle, have been left in the mechanical configuration of the final stage in the previous computation. While the stepping switches are being reset, all other computing components and circuitry are also being reset or cleared with respect to the previous computing cycle so as to be in condition for the computing cycle which is initiated by insertion of the ticket T into the ticket reading module E.

When the stepping switches have been reset to "time now," they are in condition for carrying out subsequent computing functions. This is done by connecting them to the sensing-circuit configuration established by the ticket reading module E, which conforms to the binarily coded time at which the ticket T was punched, or, in other words, reflects "time then." The stepping switches are energized through the sensing-circuit established by the ticket reading module E in such manner as to "count back" until they arrive at coincidence with the sensing-circuit configuration. Since these stepping switches function through cams and count back from "time now" to "time then," they may be referred to as "count-back steppers."

Also incorporated in the computing circuitry are six stepping switches which are mechanically quite different from the count-back steppers, but nevertheless are similar thereto in the sense that, once energized, they continue to operate step-by-step until de-energized. Two of these stepping switches are used in tandem to count decimally and can be referred to as "decade steppers." They are, in turn, connected by appropriate circutry to four more of these stepping switches which accumulate charges in monetary amounts, i.e., cents, dimes, dollars, and ten-dollars and ultimately transfer such accumulated charges to the various light-bulbs 62 in the display-box 48. Therefore, these latter four stepping switches can be referred to as charge-output steppers. The decade steppers and the charge-output steppers are controlled by the count-back steppers in the sense that each time one of the count-back steppers counts back one interval, the decade steppers count through a number of successive steps corresponding to the monetary unit charge to be made for such interval of time according to the particular rate-structure in force on the parking lot being monitored. For example, if the rate-structure includes an hourly charge of fifty cents per hour, then each time the hours count-back stepper counts back one interval (i.e., an hour), the decade steppers will count off a number of successive steps corresponding to fifty cents and transfer such amount into the charge-output steppers.

The operation of the decade steppers is also controlled through a rate-set circuit which is embodied in a rate module G which can be placed in a configuration that reflects various charging rates comprising the parking lot rate-structure and will cause the decade steppers to count off the correct number of steps for each count-back interval on the count-back steppers consistent with such rate-structure. The rate-set circuit is provided with means for changing the rate setting, so that a parking lot proprietor can adapt the computer device A to his own particular rate-structure. As will be presently seen, the rate-set circuit is extremely flexible and can accommodate a wide range of parking lot rate-structures.

Also incorporated in the computer device A, as an adjunct to the rate-set circuit, is means for allowing the rate-structure to include a maximum daily charge, a maximum weekly charge, changes in rate after either an initial half-hourly charge or an initial hourly charge, and also a "grace period" so as to meet the legal requirement in some localities which have statutes or ordinances requiring the parking lot proprietor to grant a "grace period" of some prescribed length.

It has been found preferable, in connection with the present invention, to charge hours, days, and weeks in the manner generally outlined above. However, minutes-charging, in the embodiment herein being described, involves a somewhat different problem. For practical purposes, the minimum unitary charge which will be made is a half-hourly charge, since most parking lots charge some rate for the first half hour of fraction thereof. In other words, the customer is charged for an entire half hour even though he parks only for a few minutes. Although there may be exceptions to this practice, it is generally true and, therefore, any exceptions ordinarily can be disregarded. In the interest of simplicity, economy, and computing-speed, therefore, the problem of minutes-charging is treated differently through the use of a stepping switch which is substantially similar in mechanical construction to the minutes count-back stepper and operates in tandem therewith. This particular stepping switch may be referred to as the minutes-output stepper and stores the total of the minutes intervals counted back by the minutes count-back stepper even though the latter passes through zero-minutes in its count-back operation. This latter condition will prevail whenever the minutes of "time then" are greater than the minutes in "time now," e.g., where "time now" is 5:20 p.m. and "time then" is 3:30 p.m. Since the count-back begins at twenty minutes after the hour, it will reach zero-minutes and continue counting back through fifty-nine minutes, fifty-eight minutes, fifty-seven minutes, and so on until coincidence at thirty minutes is reached, whereupon the minutes count-back stepper will come to rest. The minutes-output stepper, having initially been reset to zero-position when all resetting took place, will simultaneously move from such zero-position through twenty successive steps (each step representing an interval of two-and-one-half minutes) and stop in its twentieth position (representing a total of fifty minutes), thereby serving as a memory for minutes-information and storing such minutes-information while hours are being charged. As the next step in the charging operations, the information stored in the minutes-output stepper is charged as either one or two half-hourly units depending upon whether the stored minutes are less than or greater than thirty. Thereupon, days and weeks are charged in successive order in the same type of charging operation as is used for hours-charging.

When all the charging operations have been completed, the monetary charge accumulated in four so-called "charge-output" stepping switches are transferred to the four sets of bulb-sockets 61 in the display-box 48 and the various bulbs 62 light up to provide a visual monetary amount representing the total charge for the period of elapsed time. By an appropriate holding circuit, the light bulbs 62 remain lighted for a selected period of time (preferably one minute) and then automatically go off. This holding circuit is also indirectly responsive to the micro-switch 721 in the ticket reading module E, so that if, by any chance, another ticket is inserted into the ticket chamber 613 before a full minute has elapsed after completion of a prior computing cycle, then the holding circuit is prematurely interrupted, turning off the light bulbs 62.

Preferably, though not necessarily, the monetary amount is also transferred to suitable totalizers which record a running total of charges and transactions computed by the computing device A. Thus, the parking lot proprietor can read the monetary total and transaction total each morning and each evening. By subtracting these figures, it is possible to maintain accurate accounting surveillance over the parking lot employees and also keep essential accounting records for tax purposes and the like.

Obviously, these various computing and charging operations must be carried out sequentially and, therefore, a so-called "mode" switch is employed. This is also a stepping switch substantially similar to the decade steppers and, in effect, programs the computing and charging operations (for convenience referred to herein as "modes") in a desired sequence through one complete computing cycle. When the computing cycle has been completed, the computer components and circuitry comes to rest in the final mode and consequently the first mode of the next computing cycle, when it is initiated by insertion of a proper ticket T into the ticket chamber 613 of the ticket reading module E, is to reset the count-back steppers to "time now," reset the charge-output steppers to zero, and reset the minutes-output stepper to zero.

For reasons of manufacturing convenience, the circuitry and electromechanical components, broadly and generally outlined above, are assembled as a time-comparator module F, a rate-setting module G, and a charge-display module H, each upon a separate chassis and removably mounted in the lower part of the housing 1, as shown in FIG. 14.

COUNT-BACK STEPPERS

Provided for use in the circuitry of the present invention is a count-back stepper 800ª shown in FIGS. 65 to 70, inclusive, and comprises a base-plate 801 which is formed of heavy gauge metal adapted for mechanically supporting various moving parts. The base-plate 801 is integrally provided along its right-hand margin (reference being made to FIGS. 65 and 66) with a forwardly projecting flange 802. Welded or otherwise rigidly secured upon the base-plate 801 is a bracket plate 803 integrally provided with a bracket arm 804. Although the count-back stepper 800ª does not necessarily have to be mounted in any particular position, nevertheless, if it be assumed, for purposes of the present description, that the base-plate 801 is vertical (i.e., the position shown in FIGS. 66, 68 and 69) then the flange 802 will be vertical and perpendicular to the base-plate 801. Similarly, the bracket-arm 804 will be horizontal and perpendicular to the base-plate 801.

Rigidly secured upon the underface of the bracket arm 804 and extending laterally therefrom in spaced parallel relation to the forward face of the base-plate 801 is an auxiliary arm 805 which is operatively connected, by means of a threaded pin 806 to the outer end of a rotating shaft assembly 807 operatively mounted on a stud 808 staked into and projecting perpendicularly from the central portion of the base-plate 801. The shaft assembly 807 rotates freely upon the stud 808 and is provided with a toothed ratchet-gear 809 which is keyed or pinned thereto. Also mounted upon the shaft assembly 807 in axially spaced relation therealong is an auxiliary cam-disk 810 and five substantially circular binary cam-disks 811, 812, 813, 814, 815, all secured together and to the ratchet-gear 809 by means of axial bolts 816. As will be seen by reference to FIG. 71, the cam-disks 811, 812, 813, 814, 815, are provided with high lobes and intermediate valleys which are binarily coded, according to Table V, as will be presently more fully explained. Incidentally, as a matter of manufacturing convenience, the ratchet-gear 809 which is employed in the present invention has thirty-two teeth and, accordingly, the cam-disks 810, 811, 812, 813, 814, 815, are subdivided into thirty-two increments. Since the binary code only requires twenty-four increments, it is necessary to blank out, or otherwise render inoperative, the eight extra increments on the cam-disks 810, 811, 812, 813, 814, 815, as will presently be more fully described.

The base-plate 801 is also integrally provided, along its upper and lower margins, respectively, with forwardly projecting flanges 817, 818, which are parallel to the bracket-arm 804, and rigidly secured to the forward face of the base-plate 801, by means of bolts 819, is an auxiliary support-plate 820 which projects longitudinally beyond the left margin of the base-plate 801 (reference being made to FIGS. 65 and 66). Adjacent to its outer end, the support-plate 820 is integrally provided along its upper margin with a forwardly projecting flange 821, the latter also being parallel to the bracket-arm 804.

Rigidly secured to the flange 802 by means of a mounting screw 822 and extending horizontally beneath the bracket-arm 804, is an electro-magnetic coil 823 having a laterally presented magnetic pole-piece 824 located in a plane parallel to and substantially to the right of the shaft assembly 807. Rigidly secured upon the underface of the flange 818 by means of bolts 825, 826, is a pivot-support plate 827 which projects laterally beyond the transverse margin of the flange 804 and is integrally provided with a pair of spaced parallel ears 828, 829, which support a pivot pin 830. Rockably mounted upon the pivot pin 830 and projecting upwardly therefrom is an armature-plate 831 located in juxtaposition to the pole-piece 824 of the electro-magnetic coil 823 so as to be attracted to and held against the pole-piece 824 when the electro-magnetic coil 823 is energized. The armature-plate 831 integrally includes an upwardly projecting pawl-lever 832 which is, in turn, integrally provided at its upper end with a projecting lock-tooth 833 adapted for engagement between any two adjacent teeth on the ratchet-gear 809. Rockably mounted on the upper end of the pawl-lever 832 is a pawl 834 adapted for engagement against any one of the teeth of the ratchet-gear 809 and being biased resiliently downwardly into such engagement by means of a small tension-spring 835. The upper end of the pawl-lever 832 is abuttingly seated against one end of a compression spring 836 which is, in turn, seated at its other end upon an adjustment screw 837 threadedly mounted in an ear 838 formed integrally on and projecting forwardly from the base-plate 801 and held in any selected position of adjustment by means of a locking nut 839, as best seen in FIG. 70. It will, of course, be apparent that by loosening the locking nut 839 and turning the screw 837, it is possible to adjust the force applied by the spring 836. It will also be apparent that as the electro-magnetic coil 823 is energized and the armature-plate 831 is drawn toward the pole-piece 824, the pawl-lever 832 will swing to the right (reference being made to FIG. 70) and the lock-tooth 833 will be withdrawn from the ratchet-gear 809. At the same time, the pawl 834 will be swung outwardly and pulled downwardly into engagement with the next successive tooth on the ratchet-gear 809, thereby being "cocked," so to speak. As soon as the electro-magnetic coil 823 is de-energized so as to release the armature-plate 831, the spring 836 will force the pawl-lever 832 to swing back to initial position, thereby advancing the ratchet-gear 809 by the arcuate distance of one tooth-space. During the so-called "cocking" movement, the ratchet-gear 809 is presented from retrogressive movement by means of a leaf-spring retention-blade 840 which bears against the back side of one of the teeth of the ratchet-gear 809, and is rigidly secured at its butt-end, by a clamping plate 841, upon the flange 817.

The armature-plate 831 integrally includes a laterally projecting interrupter-arm 842 which extends in the direction of the lower flange 818 and is integrally provided at its extremity with a flat actuating-finger 843 located directly above a multi-blade interrupter switch 844 which comprises three relatively heavy stationary blades 845, 846, 847, and two moving blades 848, 849, of the spring-leaf type, all held in spaced parallel relation by means of rectilinear insulating wafers 850, 851, 852, 853, 854, 855, all being conventionally held securely in assembled relation, upon the flange 818, by means of screws 856, 857, and a relatively heavy bottom or clamping plate 858. The moving blades 848, 849, are also provided with upstanding dielectric plugs 859, 860, which serve to transmit motion from the actuating-finger 843 to the moving blades 848, 849. Thus, when the electromagnetic coil 823 is energized and draws the armature-plate 831 into engagement against the pole-piece 824, the interrupter-arm 842 will swing downwardly and this motion will be transmitted through the finger 843 and dielectric plugs 859, 860, to the moving plates 848, 849, causing them to shift downwardly out of normal position. As will be seen by reference to FIG. 66, the moving blade 848 is normally in contact with the stationary blade 845 and is so positioned that it will flex downwardly into contact with the stationary blade 846, thereby constituting a single-pole double-throw switch. The moving blade 849, on the other hand, is normally in contact with the stationary blade 847 and will move downwardly out of contact therewith, thus constituting a single-pole single-throw switch. As will be presently more fully apparent from the discussion of the wiring diagrams, the electromagnetic coil 823 is in series with the interrupter switch 844 in such a manner that each time the electromagnetic coil 823 is energized and the interrupter-arm 842 rocked downwardly, the circuit to the electromagnetic coil 823 will be interrupted and the armature-plate 831 will be released. Therefore, as long as the interrupter switch 844 is in series with a circuit that is elsewhere completed, the electromagnetic coil 823 will continue to be energized and de-energized in rapid succession, thereby causing the armature-plate 831, interrupter arm 844, and the pawl-lever 832 to rock back and forth, advancing the ratchet-gear 809 tooth by tooth. This movement will continue as long as the circuit, with which the interrupter switch 844 is in series, remains closed. Similarly, when the circuit to the interrupter switch 844 is placed in series with a circuit that is already open, the step-by-step movement will stop.

The count-back stepper 800$^a$ is provided with six identical leaf-switches $sw^1$, $sw^2$, $sw^3$, $sw^4$, $sw^5$, and $sw^6$. For mechanical convenience and compactness the switches $sw^1$, $sw^3$, $sw^5$, are rigidly mounted on the flange 821 and the switches $sw^2$, $sw^4$, $sw^6$, are rigidly mounted on the flange 804. The switch $sw^1$ comprises four stationary blades 861, 862, 863, 864, and two resilient or moving contactors 865, 866, which are of the spring-leaf type and are respectively located between the stationary blades 861, 862, and 863, 864. These various blades are held in spaced stacked relation by a series of dielectric wafers 867 and the entire switch $sw^1$ is held in assembled relation upon the flange 821 by a clamping plate 868 and bolts 869, 870.

The contactor 866 is provided at its outer end with a dielectric plug 871 which bears against the outer or projecting end of the contactor 865, and the latter is, in turn, integrally provided at its outer end with an obliquely bent cam-following finger 872$^a$ which bears against the peripheral surface of the auxiliary cam-disk 810.

The switches $sw^2$, $sw^3$, $sw^4$, $sw^5$, and $sw^6$ are all identical to the switch $sw^1$ in construction and general operation except that the contactors 866 in each of the switches $sw^2$, $sw^3$, $sw^4$, $sw^5$, and $sw^6$, respectively, have cam-following fingers 872$^b$, 872$^c$, 872$^d$, 872$^e$ and 872$^f$, which bear against the peripheral surfaces of the cam-disks 811, 812, 813, 814, 815, and the auxiliary cam-disk 810. When the cam-following fingers 872$^a$, 872$^b$, 872$^c$, 872$^d$, 872$^e$, 872$^f$ are on the low portions of respective cam-disks 810, 811, 812, 813, 814, 815, the corresponding switches $sw^1$, $sw^2$, $sw^3$, $sw^4$, $sw^5$, $sw^6$ are in non-operated or "normal position" and when the cam-following fingers 872$^a$, 872$^b$, 872$^c$, 872$^d$, 872$^e$, 872$^f$ are on high portion of the respective cam-disks 810, 811, 812, 813, 814, 815, the switches $sw^1$, $sw^2$, $sw^3$, $sw^4$, $sw^5$, and $sw^6$ are in operated or "off-normal position." In this connection, it should be noted that the switch $sw^1$ and the auxiliary cam-disk 810 constitute an electrical "step-through" arrangement in effect causing the count-back stepper 800ᵃ to step automatically through the last eight steps or teeth on the ratchet-gear 809 so as to move directly around to first or initial position from its twenty-fourth position inasmuch as the present binary code involves only twenty-four increments. It should also be noted that the cam-disks 811, 812, 813, 814, and 815 correspond binarily to the five binary orders exemplified in Table I and represented by cam-disks 141, 142, 143, 144, and 145 of the ticket-punching module D. The count-back stepper 800ᵃ may thus be referred to as the "minutes count-back stepper." For convenience of illustration in FIG. 71 the cam-disks 810, 811, 812, 813, 814, and 815 are all shown with their corresponding cam-following fingers 872ᵃ, 872ᵇ, 872ᶜ, 872ᵈ, 872ᵉ, 872ᶠ, at initial position; that is to say, the positions corresponding to the first column of minutes cam-patterns in Table V. As shown, the valleys on the cam-disks 811, 812, 813, 814, 815 correspond to the large "O," the high lobes correspond to the large "X," and the arcuate arrows indicate direction of rotation. Finally, the cam-disks 810, 811, 812, 813, 814, and 815, as shown in FIG. 71, are divided by light dotted lines into octants and the two octants which are shaded by light horizontal lines are the octants which are "stepped through" as a result of the action of the auxiliary cam-disk 810.

It will be apparent from Table V, that the binary coding is identical for minutes and hours. Consequently, the circuitry of the present invention employs a second count-back stepper 800ᵇ which is identical in all respects with the previously described minutes count-back stepper 800ᵃ and comprises an electromagnetic coil 823ᵇ, an interrupter switch 844ᵇ, which are identical with the coil 823 and interrupter switch 844. The count-back stepper 800ᵇ also comprises six switches $sw^7$, $sw^8$, $sw^9$, $sw^{10}$, $sw^{11}$, and $sw^{12}$, having cam-following fingers 879ᵃ, 879ᵇ, 879ᶜ, 879ᵈ, 879ᵉ, 879ᶠ, respectively, adapted for cooperation with an auxiliary cam-disk 880 and switching cam-disks 881, 882, 883, 884, 885, to shift the switches $sw^7$, $sw^8$, $sw^9$, $sw^{10}$, $sw^{11}$, and $sw^{12}$, into either "normal" or "off-normal" position in the same manner as above described in connection with the minutes count-back stepper 800ᵃ. As will be seen by reference to FIG. 72, the cam-disks 880, 881, 882, 883, 884, and 885, are identical with cam-disks 810, 811, 812, 813, 814, and 815. Moreover, the cam-disks 881, 882, 883, 884, and 885 correspond binarily to the binary orders exemplified in Table II and represented by cam-disks 171, 172, 173, 174, and 175. The count-back stepper 800ᵇ, thus, may be referred to as the "hours count-back stepper." The schematic arrangement of illustration in FIG. 72 is the same as that used in FIG. 71.

Also provided for use in the circuitry of the present invention is a count-back stepper 800ᶜ as shown in FIGS. 73 to 79, which is substantially similar to the count-back stepper 800ᵃ and comprises an electromagnetic coil 823ᶜ and interrupter switch 844ᶜ which are identical with the previously described electromagnetic coil 823 and interrupter switch 844. The count-back stepper 800ᶜ also comprises four switches $sw^{13}$, $sw^{14}$, $sw^{15}$, $sw^{16}$, having cam-following fingers 889ᵃ, 889ᵇ, 889ᶜ, 889ᵈ, for cooperation respectively with an auxiliary cam-disk 890 and three binary cam-disks 891, 892, 893, to shift the switches $sw^{13}$, $sw^{14}$, $sw^{15}$, $sw^{16}$, into either "normal" or "off-normal" position. The auxiliary cam-disk 890 and its associated switch $sw^{13}$ cause the count-back stepper automatically to step through the eighth step in each quadrant so that each group of seven steps will correspond to the binary coding for successive days in the week as exemplified in Table III and represented by the cam-disks 201, 202, 203, of the ticket-punching module D. The count-back stepper 800ᶜ thus may be referred to as the "days count-back stepper." The relation of the cam-disks 890, 891, 892, 893, and the cam-following fingers 889ᵃ, 889ᵇ, 889ᶜ, 889ᵈ, at initial position is shown schematically in FIG. 79, the same conventions of illustration being used therein as previously used in FIGS. 71 and 72.

Also provided for use in the circuitry of the present invention is a count-back stepper 800ᵈ, as shown in FIGS. 80 to 84, inclusive, which is substantially similar to the previously described count-back stepper 800ᵃ and comprises an electromagnetic coil 823ᵈ and interrupter switch 844ᵈ, which are identical to the electromagnetic coil 823 and interrupter switch 844 respectively. However, the count-back stepper 800ᵈ does not have the auxiliary support-plate 820 or any counterpart thereof since it comprises only two cam-disks 894, 895, and two switches $sw^{17}$, $sw^{18}$, the latter having cam-following fingers 896ᵃ, 896ᵇ, for respectively bearing against the binary cam-disks 894, 895 to shift the switches $sw^{17}$, $sw^{18}$, into either "normal" or "off-normal" position. Since only four binary orders are required to code four weeks (see Table IV) and the number four is evenly divisible into thirty-two, it is not necessary, in the weeks count-back stepper 800ᵈ, to employ an auxiliary cam-disk such as the auxiliary cam-disk 810.

The cam-disks 894, 895, correspond binarily to the two binary orders exemplified in Table IV and represented by cam-disks 204, 205. The count-back stepper 800ᵈ thus may be referred to as the "weeks count-back stepper." The relation of the cam-disks 894, 895, and the cam-following fingers 896ᵃ, 896ᵇ, at initial position is shown schematically in FIG. 85.

Also provided for use in the circuitry of the present invention is another count-back stepper 800ᵉ which is substantially similar to the previously described count-back stepper 800ᵈ including an electromagnetic coil 823ᵉ and interrupter switch 844ᵉ. The count-back stepper 800ᵉ, however, has an auxiliary cam-disk 897 and a minutes-counting cam-disk 898, and two switches $sw^{19}$, $sw^{20}$, which operate from the cam-disks 897, 898, respectively, to shift the switches $sw^{19}$, $sw^{20}$, into either "normal" or "off-normal" position. The cam-disk 897 has a single high lobe covering one step or increment and the cam-disk 898 has a continuous low segment for twelve steps or increments and a continuous high lobe or segment for twenty steps or increments, all as best seen in FIG. 86. This count-back stepper 800ᵉ serves a memory device to supplement the counting function or output of the minutes count-back stepper 800ᵃ for purposes presently more fully appearing and thus may be referred to as the "minutes output stepper."

DIGITAL STEPPERS

The circuitry of the present invention also employs a number of digital or so-called "decade" steppers which function, in various modes of operation, to count directly in numerical succession or to accumulate a numerical count. These digital steppers vary in terms of circuit-handling capacity but are otherwise substantially alike.

For example, a typical digital stepper 900ᵃ, as shown in FIGS. 90–94 inclusive, comprises a base-plate 901 integrally provided along one lateral margin with a forwardly projecting flange 902 and along its upper margin with an upwardly extending ear 903 having forwardly extending flanges 904, 905. Similarly, along its lower margins the base-plate 901 is provided with a forwardly projecting integral flange 906. Welded or otherwise rigidly secured upon the forward face of the base-plate 901 is a bracket-plate 907 having a forwardly projecting flange 908. Although the digital stepper 900ᵃ can be mounted in any position, nevertheless, if it be assumed for purposes of illustration that the digital stepper 900ᵃ, as shown in FIG. 91, is in vertical position, then the flanges 902, 905, will both be vertical and will also be perpendicular to the base-plate 901. Similarly, the flanges 904, 905, 908, will be horizontal and will also be perpendicular to the base-plate 901.

Staked or otherwise rigidly secured in and projecting outwardly from the forward face of the base-plate 901 is a stationary stud 909 which is bored and tapped at its outer end to provide an internally threaded recess 910. Rotatably mounted on the stud 909 is a tubular quill-shaft 911 which is externally threaded for a short distance rearwardly from its forward end and keyed or otherwise rigidly secured to the rear end of the quill-shaft 911 is a toothed ratchet-gear 912. Fitted snugly upon the quill-shaft 911 is a cylindrical dielectric sleeve 913 which extends between the ratchet-gear 912 and the threaded end portion of the quill-shaft 911. Mounted on and carried by the sleeve 913 are six pairs of matching Phosphor-bronze switch-disks 914–915, 916–917, 918–919, 920–921, 922–923, 924–925, integrally provided with peripherally projecting arcuate bifurcated contact arms 926–927, 928–929, 930–931, 932–933, 934–935, 936–937, respectively, which are paired and bent inwardly at their outer ends so that the outer ends of each pair will be disposed in lightly touching resilient engagement as best seen in FIG. 87, and for purposes presently more fully appearing. The pairs of switch-disks 914–915, 916–917, 918–919, 920–921, 922–923, 924–925 are each spot-welded to intermediate metal washers 938, 939, 940, 941, 942, 943, so that each pair forms a single unit and is spaced from other pairs and from the ratchet-gear 912 by dielectric washers 938′, 939′, 940′, 941′, 942′, 943′, the latter being held rigidly in assembled relation by a suitable adhesive so that the switch-disks 916–917, 918–919, 920–921, 922–923, 924–925, the metal washers 938, 939, 940, the dielectric washers 941, 942, 943, the dielectric sleeve 913 and the ratchet-gear 912 are interconnected for rotation as a unitary shaft-assembly 944. Moreover, successive pairs of contact arms 926–927, 928–929, 930–931, 932–933, 934–935, and 936–937 are located at 120° intervals in relation to each other for reasons of mechanical symmetry.

Mounted on the outer threaded end of the quill-shaft 911 is a dielectric cam-disk 945 held in place by a metal washer 946 and nut 947. On its peripheral surface, the cam-disk 945 is integrally provided with three radially projecting lobes 948, 949, 950, disposed at 120° intervals with respect to each other. The shaft-assembly 944 is held rotatably upon the stud 909 by means of a large-headed machine-screw 951 which is threaded into the recess 910.

Rigidly mounted on the inwardly presented lateral face of the flange 902, by means of a threaded stud 952 is an electromagnetic coil 953 having a pole-piece 954 which is located in upwardly spaced relation to the inwardly presented or left-hand lateral margin of the flange 906 (reference being made to FIG. 91). Bolted or otherwise rigidly secured upon and projecting horizontally from the last-named margin of the flange 906 is a pivot-support 955 which is integrally provided with two axially spaced hinge-knuckles 956, 957, which support a horizontal hinge-pin 958. Rockably mounted upon the hinge-pin 958 and projecting upwardly therefrom is an armature-plate 959, located in juxtaposition to the pole-piece 954 of the electromagnetic coil 953 so as to be attracted to, and held against, the pole-piece 954 when the electromagnetic coil 953 is energized. The armature-plate 959 integrally includes an upwardly projecting pawl-lever 960 which is, in turn, integrally provided at its upper end with a projecting lock-tooth 961 adapted for engagement between any two teeth of the ratchet-gear 912. Rockably mounted on the upper end of the pawl-lever 960 is a pawl 962 adapted for engagement with any one of the teeth of the ratchet-gear 912 and being biased resiliently downwardly into such engagement by means of a small tension-spring 963. The upper end of the pawl-lever 960 is abuttingly seated against one end of a compression spring 964 which is, in turn, seated at its other end upon an adjustment screw 965 threadedly mounted in the flange 905 and held in any selected position of adjustment by means of a locking nut 966 as best seen in FIG. 90.

As the electromagnetic coil 953 is energized and the armature-plate 959 is drawn toward the pole-piece 954, the pawl-lever 960 will swing to the right (reference being made to FIG. 91) and the lock-tooth 961 will be withdrawn from the ratchet-gear 912. At the same time, the pawl 962 will be swung outwardly and pulled downwardly into engagement with the next successive tooth on the ratchet-gear 912, thereby being "cocked," so to speak. As soon as the electromagnetic coil 953 is de-energized so as to release the armature-plate 959, the spring 964 will force the pawl-lever 960 to swing back to initial position, thereby advancing the ratchet-gear 912 by the arcuate distance of one tooth-space. During the so-called "cocking" movement, the ratchet-gear 912 is prevented from retrogressive movement by means of a leaf-spring retention-blade 967 which bears against the back side of one of the teeth of the ratchet-gear 912 and is rigidly secured at its butt-end by a clamping plate 968 and bolts 969, 970, upon the flange 904.

The armature-plate 959 integrally includes a laterally projecting interrupter-arm 971 which extends in the direction of the lower flange 906 and is integrally provided at its extremity with a flat actuating-finger 972 located directly above a multi-blade interrupter switch 973 which comprises three relatively heavy stationary blades 974, 975, 976, and two moving blades 977, 978, of the spring-leaf type, all held in spaced parallel relation by means of rectilinear insulating wafers 979, 980, 981, 982, 983, 984, all being conventionally held securely in assembled relation, upon the flange 906, by means of screws 985, 986, and a relatively heavy bottom or clamping plate 987. The moving blades 977, 978, are also provided with upstanding dielectric plugs 988, 989, which serve to transmit motion from the actuating-finger 972 to the moving blades 977, 978. Thus, when the electromagnetic coil 953 is energized and draws the armature-plate 959 into engagement against the pole-piece 952, the interrupter-arm 971 will swing downwardly and this motion will be transmitted through the finger 972 and dielectric plugs 988, 989, to the moving plates 977, 978, causing them to shift downwardly out of normal position. As will be seen by reference to FIG. 91, the moving blade 977 is normally in contact with the stationary blade 974 and is so positioned that it will flex downwardly into contact with the stationary blade 975, thereby constituting a single-pole, double-throw switch. The moving blade 978, on the other hand, is normally in contact with the stationary blade 976 and will move downwardly out of contact therewith, thus constituting a single-pole single-throw switch.

Rigidly secured to the forward face of the base-plate 901 by means of bolts 990 is an axial support plate 991 which projects laterally beyond the left margin of the base-plate 901 (reference being made to FIGS. 90 and 91). Secured to the forwardly presented face of the support plate 991 by a series of bolts 992 and an arcuate clamping plate 993 is a stack of arcuate dielectric segments 994, 995, 996, 997, 998, 999, and 1000. The arcuate clamping plate 993 and the several dielectric segments 994–1000 are, in effect, segments of a circular arc centered upon the center line of the stud 909 and having a radius substantially greater than the radius of the contact arms 926–937, inclusive, so that, as mounted on the axial support plate 991, the arcuate clamping plate 993 and the dielectric segments 994–1000, inclusive, will be concentric with the stud 909 and entirely clear of the rotative path of movement of the contact arms 926–937, inclusive. Rigidly clamped and securely held between the dielectric segments 994–995, are eleven uniformly spaced radial contact-fingers 1001 which extend radially on opposite sides of the dielectric segments 994–995, and on their interior ends project into the path of, and between, the contact arms 926–927 so that the inwardly bent outer ends thereof will wipe across and make successive contact with each of the contact-fingers 1001 as the shaft-assembly 944 is rotated step-by-step responsive to energization and de-energization of the electromagnetic coil 953. In order to insure against unauthorized slippage of the contact-fingers 1001 they are not only held in place by the friction resulting from the clamping pressure between the dielectric segments 994–995, but are also held by a thin coat of a suitable adhesive. Similarly clamped and adhesively secured between the dielectric segments 994–995 adjacent one end thereof is a series of Phosphor bronze wiper arms 1002, 1003, which extend radially inwardly between the switch-disks 914, 915, and are bent outwardly into wiping contact with the juxtaposed faces thereof thereby serving as a means for establishing an electric circuit through the contact arms 926–927. Thus, whenever the contact arms 926–927 are in contactive engagement with one of the contact-fingers 1001, an electric circuit will be completed through the wipers 1002, 1003, the switch-disks 914, 915, and the contact arms 926–927, to such contact-fingers 1001. It will also be noted, by reference to FIG. 91, that the series of contact-fingers 1001 are arranged around approximately 120° of the circular path of movement of the contact arms 926–927.

Rigidly clamped and securely held between the dielectric segments 995, 996, are eleven uniformly spaced radial contact-fingers 1004 which extend radially on opposite sides of the dielectric segments 995, 996, and on their interior ends project into the path of, and between the contact arms 928–929, so that the inwardly bent outer ends thereof will wipe across and make successive contact with each of the contact fingers 1004 as the shaft-assembly 944 is rotated step-by-step responsive to energization and de-energization of the electromagnetic coil 953. The contact-fingers 1004 are identical to, and in horizontal registration with, the contact-fingers 1001 and are similarly held between the dielectric segments 995, 996, by a thin coat of a suitable adhesive. Similarly clamped and adhesively secured between the dielectric segments 995, 996, adjacent one end thereof, is a pair of Phosphor bronze wiper arms 1005, 1006, which extend radially inwardly between the pair of switch-disks 916–917, and are bent outwardly into wiping contact with the juxtaposed faces thereof thereby serving as a means for establishing an electric circuit through the pair of contact arms 928–929. Thus, whenever the contact arms 928–929 are in contactive engagement with one of the contact-fingers 1004, an electric circuit will be completed through the wipers 1005, 1006, the switch-disks 916–917, and the contact arms 928–929, to such contact-fingers 1004. It will also be noted, by reference to FIG. 91, that the series of contact-fingers 1004 are arranged around approximately 120° of the circular path of movement of the contact arms 928–929.

Similarly, clamped between the dielectric segments 996, 997, are eleven uniformly spaced radial contact-fingers 1007 which extend radially on opposite sides of the dielectric segments 996, 997, and on their interior ends project into the path of, and between the contact arms 930–931, so that the inwardly bent outer ends thereof will wipe across and make successive contact with each of the contact-fingers 1007 as the shaft-assembly 944 is rotated step-by-step responsive to energization and de-energization of the electromagnetic coil 953. The contact-fingers 1007 are identical to, and in horizontal registration with, the contact-fingers 1001 and 1004 and are similarly held between the dielectric segments 996, 997, by a thin coat of a suitable adhesive. Similarly clamped and adhesively secured between the dielectric segments 996, 997, adjacent one end thereof, is a pair of Phosphor bronze wiper arms 1008, 1009, which extend radially inwardly between the pair of switch-disks 918–919, and are bent outwardly into wiping contact with the juxtaposed faces thereof thereby serving as a means for establishing an electric circuit through the pair of contact arms 930–931. Thus, whenever the contact arms 930–931, are in contactive engagement with one of the contact-fingers 1007, an electric circuit will be completed through the wipers 1008, 1009, the switch-disks 918–919, and the contact arms 930–931, to such contact-fingers 1007. It will also be noted, by reference to FIG. 91, that the series of contact-fingers 1007 are arranged around approximately 120° of the circular path of movement of the contact arms 930–931.

Securely clamped between the dielectric segments 997, 998, are eleven uniformly spaced radial contact-fingers 1010 which are identical with the contact-fingers 1001, 1004, and 1007 and are in horizontally aligned, or so-called "stacked," relation thereto. The contact-fingers 1010 extend radially on opposite sides of the dielectric segments 997, 998, and on their interior ends project into the path of, and between the contact arms 932–933, so that the inwardly bent outer ends thereof will wipe across and make successive contact with each of the contact-fingers 1010 as the shaft-assembly 944 is rotated step-by-step responsive to energization and de-energization of the electromagnetic coil 953. As in the case of the previously described contact-fingers 1001, 1004, and 1007, the contact-fingers 1010 are held by a thin coat of a suitable adhesive. Similarly clamped and adhesively secured between the dielectric segments 997, 998, adjacent one end thereof, is a pair of Phosphor bronze wiper arms 1011, 1012, which extend radially inwardly between the pair of switch-disks 920–921, and are bent outwardly into wiping contact with the juxtaposed faces thereof thereby serving as a means for establishing an electric circuit through the pair of contact arms 932–933 during approximately 120° of the circular movement thereof in the same manner as previously described in connection with the pairs of contact arms 926–927, 928–929, 930–931.

Rigidly clamped between the dielectric segments 998, 999, are eleven uniformly spaced radial contact-fingers 1013 which are identical with, and positioned in, stacked relation to the previously described contact-fingers 1001, 1004, 1007, 1010. The contact-fingers 1013 project radially inwardly into the path of, and between the pair of contact arms 934, 935, so that the inwardly bent outer ends thereof will wipe across and make successive contact with each of the contact-fingers 1013 as the shaft-assembly 944 is rotated step-by-step responsive to energization and de-energization of the electromagnetic coil 953. For the reasons previously indicated, the contact-fingers 1013 are also held by a thin coat of a suitable adhesive. Similarly secured between the dielectric segments 998, 999, adjacent one end thereof, is a pair of Phosphor bronze wiper arms 1014, 1015, which extend radially inwardly between the switch-disks 922–923, and are bent outwardly into wiping contact with the juxtaposed faces thereof thereby serving as a means for establishing an electric circuit through the pair of contact arms 935, 936, in the same manner as contact is established with the other banks of contact-fingers 1001, 1004, 1007, 1010.

Finally, there is a sixth bank of eleven uniformly spaced radial contact-fingers 1016 which are clamped and adhesively held between the dielectric segments 999, 1000, and project, on their interior ends, into the path of, and between the pair of contact arms 936, 937, so that the inwardly bent outer ends thereof will wipe across and make successive contact with each of the contact-fingers 1016 as the shaft-assembly 944 is rotated step-by-step responsive to energization and de-energization of the electromagnetic coil 953. Similarly clamped and adhesively secured between the dielectric segments 999, 1000, adjacent one end thereof, is a pair of Phosphor bronze wiper arms 1017, 1018, which extend radially inwardly between the switch-disks 924–925, and are bent outwardly into wiping contact with the juxtaposed faces thereof, thereby serving as a means for establishing an electric circuit through the pair of contact arms 936, 937, in the same manner as contact is established through the other banks of contact-fingers 1001, 1004, 1007, 1010, and 1013.

Secured by means of bolts 1019, 1020, to the flange 908, is an extension-plate 1021 and mounted upon the outer end thereof is an auxiliary or homing switch $sw^{21}$ comprising two pairs of spaced parallel stationary blades 1022$^a$, 1022$^b$, 1023$^a$, 1023$^b$, and two resilient or moving contactor blades 1024, 1025, which are of the spring-leaf type and are respectively located between the pairs of stationary blades 1022$^a$, 1022$^b$, 1023$^a$, 1023$^b$, as best seen in FIG. 91. These various blades are held in spaced stacked relation by a series of dielectric wafers 1027 and the entire switch $sw^{21}$ is held in assembled relation upon the extension-plate 1021 by a clamping plate 1028 and bolts 1029, 1030. At its outer or free end, the blade 1025 is provided with a cam-following finger 1026 which rides on the cam-disk 945. When the cam-follower finger 1026 is riding upon the low sections of the cam-disk 945 between the high lobes 948, 949, 950, the blades 1024, 1025, will be in contact with the blades 1022$^a$, 1023$^a$, and the switch $sw^{21}$ will be in non-operated or "normal position" and, when the cam-following finger 1026 rides up on any one of the high lobes 948, 949, 950, the blades 1024, 1025, will be flexed into contact with the blades 1022$^b$, 1023$^b$, and the switch $sw^{21}$ will be in operated or "off-normal position." The switch $sw^{21}$ is, therefore, a homing switch and causes the digital stepper 900$^a$ to home on the positions corresponding to the high lobes 948, 949, 950, on the cam-disk 945 in successive order as the cam-disk 945 and associated elements rotate through a complete revolution.

As will be presently more fully apparent from the discussion of the wiring diagrams, the electromagnetic coil 953, the switch $sw^{21}$, and the interrupter switch 973, are mutually in series and, assuming that the cam-disk 945 is in such position that the switch $sw^{21}$ is in normally closed position, then, if current is applied across the coil 953 and interrupter switch 973, the electromagnetic coil 953 will be energized, pulling in the armature-plate 959 and rocking the interrupter-arm 971 downwardly, whereupon, the circuit to the electromagnetic coil 953 will be interrupted and the armature-plate 959 will be released. Therefore, as long as the interrupter switch 973 and switch $sw^{21}$ are in series with a circuit that is elsewhere completed, the electromagnetic coil 953 will continue to be energized and de-energized in rapid succession, thereby causing the armature-plate 959, interrupter arm 971, and the pawl-lever 960 to rock back and forth, advancing the ratchet-gear 912 tooth by tooth. Assuming that the circuit with which the interrupter switch 973 and switch $sw^{21}$ are in series remains closed, this stepping movement will continue until the cam-following finger 1026 rides up on one of the high lobes 948, 949, 950, thereby shifting the switch $sw^{21}$ to normally open position and bringing the stepping movement to stop in so-called "zero position." Similarly, when the circuit to the interrupter switch 973 is opened or the interrupter switch 973 is placed in series with a circuit that is already open, the step-by-step movement will stop. Since each series of contact-fingers 1001 extend around 120°, the digital stepper 900$^a$ will, in effect, repeat itself three times for each complete revolution of the ratchet-gear 912 and this is merely a matter of convenience and economy of construction. The only important aspect of this function is that once the coil 753 is energized, the digital stepper will home on the zero position which happens to come around next in order.

The series of contact-fingers 1001 and the associated pair of wiper arms 1002, 1003, together with the pair of switch-disks 914–915 and associated contact arms 926–927 are electrically equivalent to an eleven-position rotary switch $sw^{22}$, in which the wiper arms 1002, 1003, are, in effect, brush-type connections to the moving contact-arms 926–927. The three pairs of contact arms 926–927 move counterclockwise (as shown in FIG. 91) and, therefore, each pair of contact arms 926–927 will ride over the wiper arms 1002, 1003, first and then proceed to make step-wise successive contact with the contact-fingers 1001. Therefore, the eleven contact-fingers successively correspond to the "first-position," "second-position," "third-position," "fourth-position," "fifth-position," "sixth-position," "seventh-position," "eighth-position," "ninth-position," "tenth-position," and "eleventh-position" on such switch $sw^{22}$ counting around from the wiper arms 1002, 1003. It will also be noted that, by reason of the 120° arrangement, one set of the three pairs of contact arms 926–927 will rest upon the eleven-position contact-fingers 1001 when the next succeeding pair of contact arms 926–927 will rest upon the wiper arms 1002, 1003, thereby the eleventh-position may be referred to as the "home-position." In the digital stepper 900$^a$, each of the other five banks of contact-fingers 1001 and the elements operatively associated therewith are electrically equivalent to eleven-position rotary switches $sw^{23}$, $sw^{24}$, $sw^{25}$, $sw^{26}$, $sw^{27}$, respectively, and function exactly in the manner above described in relation to the switch $sw^{20}$.

The circuitry of the present invention also employs three four-bank digital steppers 900$^{b1}$, 900$^{b2}$, 900$^{b3}$, as shown in FIG. 95, which are mechanically identical with the previously described digital stepper 900$^a$ and respectively comprise electromagnetic coils 953$^{b1}$, 953$^{b2}$, 953$^{b3}$, and interrupter switches 973$^{b1}$, 973$^{b2}$, 973$^{b3}$. Moreover, the digital stepper 900$^{b1}$ includes an auxiliary or homing switch $sw^{28}$ and four banks of contact-fingers 1031$^{b1}$, 1032$^{b1}$, 1033$^{b1}$, 1034$^{b1}$, which, together with associated elements, are electrically equivalent to switches $sw^{29}$, $sw^{30}$, $sw^{31}$, $sw^{32}$. The digital stepper 900$^{b2}$ includes an auxiliary or homing switch $sw^{33}$ and four banks of contact-fingers 1031$^{b2}$, 1032$^{b2}$, 1033$^{b2}$, 1034$^{b2}$, which, together with associated elements are electrically equivalent to switches $sw^{34}$, $sw^{35}$, $sw^{36}$, $sw^{37}$. The digital stepper 900$^{b3}$ includes an auxiliary or homing switch $sw^{38}$ and four banks of contact-fingers 1031$^{b3}$, 1032$^{b3}$, 1033$^{b3}$, 1034$^{b3}$, which, together with associated elements are electrically equivalent to switches $sw^{39}$, $sw^{40}$, $sw^{41}$, $sw^{42}$. Similarly, the circuitry of the present invention employs three ten-bank digital steppers 900$^{c1}$, 900$^{c2}$, 900$^{c3}$, as shown in FIG. 96, which are mechanically identical with the previously described digital stepper 900$^a$ and comprise electromagnetic coils 953$^{c1}$, 953$^{c2}$, 953$^{c3}$, and interrupter switches 973$^{c1}$, 973$^{c2}$, 973$^{c3}$. Moreover, the digital stepper 900$^{c1}$ includes an auxiliary or homing switch $sw^{43}$ and ten banks of contact-fingers 1035$^{c1}$, 1036$^{c1}$, 1037$^{c1}$, 1038$^{c1}$, 1039$^{c1}$, 1040$^{c1}$, 1041$^{c1}$, 1042$^{c1}$, 1043$^{c1}$, and 1044$^{c1}$, which, together with associated elements, are electrically equivalent to switches $sw^{44}$, $sw^{45}$, $sw^{46}$, $sw^{47}$, $sw^{48}$, $sw^{49}$, $sw^{50}$, $sw^{51}$, $sw^{52}$, $sw^{53}$. The digital stepper 900$^{c2}$ includes an auxiliary or homing switch $sw^{54}$ and ten banks of contact-fingers 1035$^{c2}$, 1036$^{c2}$, 1037$^{c2}$, 1038$^{c2}$, 1039$^{c2}$, 1040$^{c2}$, 1041$^{c2}$, 1042$^{c2}$, 1043$^{c2}$, 1044$^{c2}$, which, together with associated elements, are electrically equivalent to switches $sw^{55}$, $sw^{56}$, $sw^{57}$, $sw^{58}$, $sw^{59}$, $sw^{60}$, $sw^{61}$, $sw^{62}$, $sw^{63}$, $sw^{64}$. The digital stepper 900$^{3c}$ includes an auxiliary or homing switch $sw^{65}$ and ten banks of contact-fingers 1035$^{c3}$, 1036$^{c3}$, 1037$^{c3}$, 1038$^{c3}$, 1039$^{c3}$, 1040$^{c3}$, 1041$^{c3}$, 1042$^{c3}$, 1043$^{c3}$, and 1044$^{c3}$, which, together with associated elements, are electrically equivalent to switches $sw^{66}$, $sw^{67}$, $sw^{68}$, $sw^{69}$, $sw^{70}$, $sw^{71}$, $sw^{72}$, $sw^{73}$, $sw^{74}$, and $sw^{75}$.

Since the four-bank digital steppers 900$^{b1}$, 900$^{b2}$, 900$^{b3}$, and the ten-bank digital steppers 900$^{c1}$, 900$^{c2}$, and 900$^{c3}$, count consecutively from "one" through "nine" and "zero" (which is the eleventh or so-called zero-position), the tenth-position in all of the banks of all of such four-bank and ten-bank digital steppers are not used and are, therefore, wired in series, respectively, with the interrupter switches 973$^{b1}$, 973$^{b2}$, 973$^{b3}$, 973$^{c1}$, 973$^{c2}$, 973$^{c3}$, so that in each bank thereof the ten-position contact-fingers 1001 will be skipped automatically. These digital steppers 900^b1, 900^b2, 900^b3, 900^c1, 900^c2, and 900^c3, also home on the eleventh or so-called zero-position, exactly as previously described in connection with the digital stepper 900^a.

The digital steppers 900^b1, 900^b2, and 900^b3, are respectively referred to, for reasons which will presently become apparent, as the "units-counting stepper," "tens-counting stepper" and "nickels-charging stepper."

RATE-SET SWITCHES

The circuitry of the present invention also includes a number of multiple-position switches which are capable of being manually set. These switches are used in the setting of a selected rate-structure and may, therefore, be referred to as "rate-set switches." These multiple-position switches vary in terms of circuit-handling capacity, but are otherwise substantially alike.

For example, a typical four-bank rate-set switch 1045, as shown in FIGS. 107 to 114, inclusive, comprises a rectangular face-plate 1046, having two rectangular apertures 1047, 1048, and integrally joined at its opposite transverse margins with rectangular side-plates 1049, 1050. Although the switch 1045 can be mounted in any position, in FIG. 107 it is shown in horizontal position and, therefore, the face-plate 1046 and the side plates 1049, 1050, may be said to be vertical.

Secured in horizontal upwardly facing position between the side plates 1049, 1050, by means of short machine screws 1051 and spacer-sleeves 1052 is a U-shaped chassis-plate 1053 having small forwardly projecting prongs 1054 which are seated retentively in apertures 1055 formed in the face-plate 1046 outwardly of the opposite ends of the aperture 1047. The chassis-plate 1053 is provided with a large circular opening 1056 having an integral diametral web 1057, all as best seen in FIG. 112 and for purposes presently more fully appearing.

Staked or otherwise rigidly attached across the upper margins of the chassis-plate 1053 is a rectangular dielectric plate 1058 having a relatively large central aperture 1059 and being provided at its four corners with upstanding tubular spacer-posts 1060 which, in turn, support a rectangular dielectric plate 1061 held in place by means of machine screws 1062 extending through the spacer-posts 1060 and threadedly secured in the dielectric plate 1058. The dielectric plate 1061 is also provided with a relatively large central aperture 1063 of the same size as, and concentric with, the aperture 1059.

Journaled at its lower end in the central portion of the diametral web 1057 is a vertical shaft 1064 which extends concentrically through the circular apertures 1059, 1063. Rigidly secured to the shaft 1064, and located in the enclosed space between the chassis-plate 1053 is a dielectric thumb-wheel 1065 which is provided around its periphery with ten uniformly spaced flat faces 1066 separated by sets of closely spaced vertical ribs 1067. The faces 1066 are respectively imprinted with numbers representing a series of monetary increments, such as, for instance, $0.00, $0.10, $0.20, $0.30, $0.40, $0.50, $0.60, $0.70, $0.80, $0.90. Moreover, the thumb-wheel 1065 is of such size as to project partially through the rectangular opening 1047, so as to be both visible and accessible from the front. On its under face, the thumb wheel 1065 is provided with an annular recess 1068 having ten radial detent slots 1069 which are respectively aligned with the centerline of the flat faces 1066 and are spaced at approximately 36° intervals. Thus, it will be seen that each detent slot 1069 is diametrally paired with another detent slot 1069.

Non-rotatively secured upon the web 1057 by means of rivets 1070 is a circular disk-spring 1071 having diametrally opposed apertured cusps 1072 which are bent upwardly for resiliently urging ball-detents 1073 into position-locating engagement with diametrally paired detent slots 1069 and will releasably hold the thumb-wheel 1065 in any one of ten positions with one of the flat face indicia-bearing faces 1066 presented through the aperture 1047 in outwardly spaced parallel relation to the face plate 1046, as best seen in FIGS. 107 and 108. Secured by axial rivets 1073 to the central part of the thumb-wheel 1065 and extending concentrically through the circular aperture 1059 is a dielectric washer 1074 having a peripheral flange 1075 which projects over the upper face of the plate 1058 around the margin of the aperture 1059 in order to serve as an additional mechanical bearing for the shaft 1064. Secured upon the upper face of the washer 1074 by means of two of the rivets 1073 is a radially outwardly projecting contact arm 1075 which is integrally provided, adjacent to its outer end, with two resilient segmental contact arms 1076, 1077, which are spaced radially from each other and are concentric with the shaft 1064. The inner contact arm 1076 is located for wiping contact around a circular contact-ring 1078 which is adhesively secured upon the upper face of the dielectric plate 1058 in concentric relation to the shaft 1064. The outer contact arm 1077 is located for wiping contact with ten uniformly spaced short contact segments 1079 which are also adhesively secured upon the upper face of the dielectric plate 1058 in outwardly spaced concentric relation to the contact-ring 1078. These contact segments are electrically connected to ten corresponding flat terminal nibs 1080 which are rigidly secured to the dielectric plate 1058 and project rearwardly in a uniformly spaced row from the rear margin thereof, as best seen in FIG. 109.

Secured by axial rivets 1081 to the upper part of the shaft 1064 and extending concentrically through the circular aperture 1063 is a dielectric washer 1082 having a peripheral flange 1083 which projects over the upper face of the plate 1061 around the margin of the aperture 1063 in order to serve as an additional mechanical bearing for the shaft 1064. Secured upon the upper face of the washer 1082 by means of two of the rivets 1081 is a radially outwardly projecting contact arm 1084 which is integrally provided, adjacent to its outer end, with two resilient segmental contact arms 1085, 1086, which are spaced radially from each other and are concentric with the shaft 1064. The inner contact arm 1085 is located for wiping contact around a circular contact-ring 1087 which is adhesively secured upon the upper face of the dielectric plate 1063 in concentric relation to the shaft 1064. The outer contact arm 1086 is located for wiping contact with ten uniformly spaced short contact segments 1088 which are also adhesively secured upon the upper face of the dielectric plate 1061 in outwardly spaced concentric relation to the contact-ring 1087. These contact segments are electrically connected to ten corresponding flat terminal nibs 1089 which are rigidly secured to the dielectric plate 1061 and project rearwardly in a uniformly spaced row from the rear margin thereof, as best seen in FIG. 109.

Similarly secured in horizontal downwardly facing position between the side plates 1049, 1050, by means of short machine screws 1051' and spacer-sleeves 1052' is a U-shaped chassis-plate 1053' having small forwardly projecting prongs 1054' which are seated retentively in apertures 1055' formed in the face plate 1046 outwardly of the opposite ends of the aperture 1048. The chassis-plate 1053' is provided with a large circular opening 1056' having an integral diametral web 1057', all as best seen in FIG. 112, and for purposes presently more fully appearing.

Staked or otherwise rigidly attached across the upper margins of the chassis-plate 1053' is a rectangular dielectric plate 1058' having a relatively large central aperture 1059' and being provided at its four corners with upstanding tubular spacer-posts 1060' which, in turn, support a rectangular dielectric plate 1061' held in place by means of machine-screws 1062' extending through the spacer-posts 1060' and threadedly secured in the dielectric plate 1058'. The dielectric plate 1061' is also provided with a relatively large central aperture 1063' of the same size as, and concentric with, the aperture 1059'.

Journaled at its lower end in the central portion of the diametral web 1057' is a vertical shaft 1064' which extends concentrically through the circular apertures 1059', 1063'. Rigidly secured to the shaft 1064' and located in the enclosed space between the chassis-plate 1054' is a dielectric thumb-wheel 1065' which is provided around its periphery with ten uniformly spaced flat faces 1066' separated by sets of closely spaced vertical ribs 1067'. The faces 1066' are respectively imprinted with numbers representing a series of monetary increments of a different denomination. Moreover, the thumb-wheel 1065' is of such size as to project partially through the rectangular opening 1048 so as to be both visible and accessible from the front. On its under face, the thumb-wheel 1065' is provided with an annular recess 1068' having ten radial detent slots 1069' which are respectively aligned with the centerline of the flat faces 1066' and are spaced at approximately 36° intervals. Thus, it will be seen that each detent slot 1069' is diametrally paired with another detent slot 1069'.

Non-rotataively secured upon the web 1057' by means of rivets 1070' is a circular disk-spring 1071' having diametrally opposed apertured cusps 1072' which are bent upwardly for resiliently urging ball detents 1073' into position-locating engagement with diametrally paired detent slots 1069' and will releasably hold the thumb-wheel 1065' in any one of ten positions with one of the flat face indicia-bearing faces 1066' presented through the aperture 1047 in outwardly spaced parallel relation to the face plate 1046, as best seen in FIGURES 107 and 108. Secured by axial rivets 1073' to the central part of the thumb-wheel 1065' and extending concentrically through the circular aperture 1059' is a dielectric washer 1074' having a peripheral flange 1075', which projects over the under face of the plate 1058' around the margin of the aperture 1059' in order to serve as an additional mechanical bearing for the shaft 1064'. Secured upon the under face of the washer 1074' by means of two of the rivets 1073' is a radially outwardly projecting contact arm 1075' which is integrally provided, adjacent to its outer end with two resilient segmental contact arms 1076', 1077', which are spaced radially from each other and are concentric with the shaft 1064'. The inner contact arm 1076' is located for wiping contact around a circular contact-ring 1078' which is adhesively secured upon the under face of the dielectric plate 1058' in concentric relation to the shaft 1064'. The outer contact arm 1077' is located for wiping contact with ten uniformly spaced short contact segments 1079' which are also adhesively secured upon the under face of the dielectric plate 1058' in outwardly spaced concentric relation to the contact-ring 1078'. These contact segments are electrically connected to ten corresponding flat terminal nibs 1080' which are rigidly secured to the dielectric plate 1058' and project rearwardly in a uniformly spaced row from the rear margin thereof, as best seen in FIG. 109.

Secured by axial rivets 1081' to the central part of the shaft 1064' and extending concentrically through the circular aperture 1063' is a dielectric washer 1082' having a peripheral flange 1083' which projects over the under face of the plate 1063' around the margin of the aperture 1063' in order to serve as an additional mechanical bearing for the shaft 1064'. Secured upon the under face of the washer 1082' by means of two of the rivets 1081' is a radially outwardly projecting contact arm 1084' which is integrally provided, adjacent to its outer end with two resilient segmental contact arms 1085', 1086', which are spaced radially from each other and are concentric with the shaft 1064'. The inner contact arm 1085' is located for wiping contact around a circular contact-ring 1087', which is adhesively secured upon the under face of the dielectric plate 1063' in concentric relation to the shaft 1064'. The outer contact arm 1086' is located for wiping contact with ten uniformly spaced short contact segments 1088' which are also adhesively secured upon the upper face of the dielectric plate 1061' in outwardly spaced concentric relation to the contact-ring 1087'. These contact segments are electrically connected to ten corresponding flat terminal nibs 1089' which are rigidly secured to the dielectric plate 1061' and project rearwardly in a uniformly spaced row from the rear margin thereof, as best seen in FIG. 109.

Thus, the dielectric plates 1058, 1061, 1058', 1061', together with associated elements, form the four identical banks of the switch 1045 which, together with associated elements, are electrically equivalent to four ten-position rotary switches, which are respectively identified in the wiring diagrams FIGS. 118A, 118B, by the reference numerals $sw^{76}$, $sw^{77}$, $sw^{78}$, $sw^{79}$.

The circuitry of the present invention also employs a second four-bank rate-set switch 1045' which is in all respects identical to the previously described rate-set switch 1045 and its four banks are electrically equivalent to four ten-position rotary switches which are respectively identified in the wiring diagrams FIGS. 118A, 118B, by the reference numerals $sw^{80}$, $sw^{81}$, $sw^{82}$, $sw^{83}$.

The circuitry of the present invention also employs eight two-bank rate-set switches 1090, 1091, 1092, 1093, 1094, 1095, 1096, 1097, which are all identical to each other and are substantially similar to the rate-set switch 1045 except that the uppermost and lowermost dielectric plates 1061, 1061', thereof, together with associated elements, are omitted, as shown in FIG. 115. In the switch 1090, the two banks are electrically equivalent to two ten-position rotary switches which are respectively identified in the wiring diagrams FIGS. 118A, 118B, by the reference numerals $sw^{84}$, $sw^{85}$, and similarly in the other rate-set switches 1091, 1092, 1093, 1094, 1095, 1096, 1097, the banks are electrically equivalent to ten-position rotary switches which are respectively identified in the wiring diagrams FIGS. 118A, 118B, by the reference numerals $sw^{86}$, $sw^{87}$, $sw^{88}$, $sw^{89}$, $sw^{90}$, $sw^{91}$, $sw^{92}$, $sw^{93}$, $sw^{94}$, $sw^{95}$, $sw^{96}$, $sw^{97}$, $sw^{98}$, $sw^{99}$.

The circuitry of the present invention also includes one single-bank rate-set switch 1098 which is substantially similar to the previously described rate-set switch 1045 except that the dielectric plate 1061 and the entire chassis-plate 1053', together with the dielectric plates 1058', 1061', the shaft 1064' and associated elements are eliminated. In other words, the rate-set switch 1098 includes a single chassis-plate 1053, a single dielectric plate 1058, and a single shaft 1064, as shown in FIG. 116. Thus, such rate-set switch 1098 may be said to have a single-bank which is electrically equivalent to a ten-position rotary switch $sw^{100}$.

The several rate-set switches 1045, 1045', 1090, 1091, 1092, 1093, 1094, 1095, 1096, 1097, and 1098, are mounted in a suitably apertured panel 1099, so as to be manually accessible from the front of the computer device A when the front door 11 is open. The panel 1099 and the various switches mounted thereon form the rate module G.

BINARY CLOCK

The circuitry of the present invention also includes a binary clock 1100, as shown in FIGS. 97 to 106, inclusive, which comprises two similarly shaped flat rectangular plates 1101, 1102, held in spaced parallel relation by elongated bolts 1103, 1104, 1105, 1106, which are respectively located adjacent to and extend between the four corners of the plates 1101, 1102. At their opposite ends the bolts 1103, 1104, 1105, 1106, are provided with a pair of lock nuts 1107, 1108 and a tubular stud nut 1109. Between the plates 1101, 1102 the bolts 1103, 1105, are each provided with three tubular spacer sleeves 1110, 1111, 1112, of suitable length for firmly and rigidly supporting two somewhat narrower contact-mounting plates 1113, 1114, which are thereby held in suitably spaced parallel relation between the plates 1101, 1102. Similarly, the bolts 1104, 1106, are provided with tubular spacer sleeves 1115, 1116, 1117, 1118, 1119, which are of sufficient length for firmly and rigidly supporting two pairs of relatively narrow bracket plates 1120–1121, 1122–1123, all as best seen in FIGS. 97 and 100. Although the binary clock 1100 can be mounted in any position as a matter of choice, nevertheless, if, for purposes of illustration, it be assumed that the binary clock 1100 is in a vertical position, as shown in FIGS. 97, 98, and 100, then, of course, the several plates 1101, 1102, 1113, 1114, 1120–1121, 1122–1123, can be referred to as being horizontal and, moreover, the plate 1101 can be referred to as being the upper plate with respect to the plate 1102 which, in turn, can be referred to as the lower plate.

Rigidly mounted upon the upper face of the upper plate 1101 is a conventional synchronous motor 1124 which is geared down to drive a shaft 1125 at the rate of one revolution per minute during each five-minute interval. The synchronous motor 1124 and the gearing forming a part thereof are conventional and, therefore, are not shown or described herein in detail. The shaft 1125 extends freely and rotatably through the upper plate 1101 terminating in upwardly spaced relation to the contact-mounting plate 1113 and on its lower end being rigidly provided with a cam 1126 having a high lobe for 180° of its periphery and a low lobe for the other 180° of its periphery. Bearing operatively against the cam 1126 is a cam-following roller 1127 which is rotatably mounted in the end of a rockable actuating arm 1128 mounted externally upon a micro-switch 1139 and bearing against a switching actuating plunger 1130 which is shiftably mounted in the micro-switch and actuates a contact leaf or blade 1131 having opposed contacts 1132, 1133, for alternately engaging stationary contacts 1134, 1135. The blade 1131 and the actuating plunger 1130 are biased outwardly to the position shown in FIG. 99 by means of a compression spring 1136. It will thus be apparent that the micro-switch 1129 will shift from the contact position of FIG. 99 to its alternative contact position at the end of each two and one-half minute interval of time.

Rigidly mounted upon the underface of the lower plate 1102 is a second electric motor 1137 which also may be of the same type as the motor 1124 and is connected through conventional gearing to a shaft 1138 which is journaled in and extends upwardly through the lower plate 1102 and is also journaled at its upper end centrally along and adjacent to the rear margin of the uppermost contact-mounting plate 1113. Operatively mounted on, and frictionally secured to the shaft 1138, adjacent to its lower end and directly above the lower plate 1102, is a dielectric disk 1139 coaxially provided with a tubular hub 1140 which extends upwardly therefrom. Along its forward margin the disk 1139 projects beneath the contact mounting plate 1114 and is provided on its upper face with a vertically projecting pin 1141 adapted for pawl-like motion transmitting engagement with a star-wheel 1142 rigidly secured upon the lower end of a vertical shaft 1143 which is, in turn, journaled in and supported between the lower pair of plates 1122–1123. As may be apparent by reference to FIG. 102, the pin 1141 engages the star-wheel 1142 once during each revolution of the disk 1139 and thereby rotates the star-wheel 1142 an arcuate distance equivalent to that of one tooth during the period of such engagement. In other words, the star-wheel 1142 and its associated shaft 1143 rotate one increment for each full revolution of the disk 1139.

Operatively mounted upon the shaft 1143 between the plates 1122–1123, is a pinion 1144 which meshes with a relatively large thin spur-gear 1145, the latter being rigidly secured to and carried by a quill-hub 1146 which is, in turn, loosely journaled upon the shaft 1138. On its underface, the spur-gear 1145 bears rotatively axially against the upper flat end of the tubular hub 1140 which extends axially between the disk 1139 and the spur-gear 1145 thereby serving as a spacer element.

At its upper end the quill-hub 1146 is diametrally reduced and operatively provided with a second dielectric disk 1147 which is of the same peripheral size as the dielectric disk 1139 and projects marginally between contact mounting plates 1113, 1114. The disk 1147 is, likewise, provided on its upper face with a vertical pin 1148 adapted for engagement with the teeth of a star-wheel 1149, rigidly secured upon the lower end of a shaft 1150 which is suitably journaled in and supported by the upper pair of plates 1120–1121. The motion-transmitting relationship between the pin 1148 and the star-wheel 1149 is exactly the same as that previously described in connection with the pin 1141 and star-wheel 1142.

Rigidly mounted upon the shaft 1150 between the plates 1120–1121 is a pinion 1151 which meshes with a relatively large thin spur-gear 1152, the latter being rigidly secured to and carried by a quill-hub 1153 which is, in turn, loosely journaled upon the shaft 1138. On its underface, the quill-hub 1152 bears axially against the upper end of the quill-hub 1146 thereby causing spaced relationship between the disk 1147 and the spur-gear 1152. At its upper end the quill-hub 1153 is diametrally reduced and operatively provided with a third dielectric disk 1154 which is of the same peripheral size as the dielectric disks 1139, 1147, and projects marginally between the upper plate 1101 and the contact mounting plate 1113.

At its upper end the quill-hub 1146 is diametrally reduced and rigidly provided with a second dielectric disk 1147 which is of the same peripheral size as the dielectric disk 1139 and projects marginally between contact mounting plates 1113, 1114. The disk 1147 is likewise provided on its upper face with a vertical pin adapted for engagement with the teeth of a star-wheel 1149 rigidly secured upon the lower end of a shaft 1150, which is suitably journaled in and supported by the upper pair of plates 1120–1121. The motion-transmitting relationship between the pin 1148 and the star-wheel 1149 is exactly the same as that previously described in connection with the pin 1141 and star-wheel 1142.

Rigidly mounted upon the shaft 1150 between the plates 1120–1121 is a pinion 1151 which meshes with a relatively large thin spur-gear 1152, the latter being rigidly secured to and carried by a quill-hub 1153, which is, in turn, loosely journaled upon the shaft 1138. On its underface, the quill-hub 1153 bears axially against the upper end of the quill-hub 1146, thereby causing spaced relationship between the disk 1147 and the spur-gear 1152. At its upper end, the quill-hub 1153 is diametrally reduced and rigidly provided with a third dielectric disk 1154 which is of the same peripheral size as the dielectric disks 1139, 1147, and projects marginally between the upper plate 1101 and the contact-mounting plate 1113.

Adhesively or otherwise rigidly secured flatwise and concentrically upon the underface of the dielectric disk 1139 are six thin metallic contact-rings 1155, 1156, 1157, 1158, 1159, 1160, arranged in the pattern shown in FIG. 103. It will be noted that each of such contact-rings 1155–1160, inclusive, have uniformly spaced nonconductive segmental gaps cut out of their exterior and interior peripheries and that these gaps are in alternate positions. Thus, each of the contact-rings 1155–1160 may be said to consist of a series of electrically interconnected contact-segments which are located alternately inwardly and outwardly with respect to the center of the disk 1139. Moreover, the successive contact-segments of the rings 1155–1160 are divided into two identical half-circles about a so-called "zero-diameter" indicated by the dotted line $L^1$–$L^1$ in FIG. 118, whereas the outermost contact-ring 1155 has diametrally opposed contact-segments which straddle this line for reasons presently more fully appearing.

It will also be apparent by reference to FIG. 103 that the contact-ring 1155 is, in effect, subdivided into twenty-four alternate inner and outer contact-segments each having an arcuate length of fifteen degrees around the three hundred sixty degrees of the full circle. Similarly, the contact-ring 1156 has the same number of contact-segments except that the contact-ring 1156 is arcuately oriented so that radial lines of division between two successive contact-segments on opposite sides thereof will coincide with the zero-diameter $L^1$–$L^1$. Similarly, the contact-ring 1157 is subdivided into twelve alternate inner and outer contact-segments each having an arcuate length of thirty degrees and being oriented so that one such thirty-degree contact-segment is radially aligned with each pair of two successive contact-segments on the contact-ring 1156. Similarly, the contact-ring 1158 is subdivided into six alternate contact-segments each having an arcuate length of sixty degrees and being oriented so that one such contact-segment is radially aligned with each pair of two successive contact-segments on the contact-ring 1157 and four successive contact-segments on contact-ring 1156.

The contact-rings 1159 and 1160 are non-symmetrical, so to speak. In other words, the contact-ring 1159 is subdivided into four successive inner and outer contact-segments having an arcuate length of sixty degrees, one-hundred twenty degrees, one-hundred twenty degrees and sixty degrees around the full three-hundred sixty degrees of the circle, the first sixty-degree contact-segment commencing at the upper half of the zero-diameter (as depicted in FIG. 103), and extending counterclockwise therefrom with the two one-hundred twenty degree contact-segments and the final sixty-degree segment following in counterclockwise order. The innermost contact-ring 1160 is subdivided into inner and outer contact-segments having arcuate lengths of one-hundred eight degrees each respectively covering the two halves of the disk 1139.

Dielectrically mounted on the upper face of the lower plate 1102, in spaced relation along the front margin thereof and to the left of the shaft 1138 (reference being made to FIG. 100) are twelve spaced parallel contact-fingers $1155^a$, $1155^b$, $1156^a$, $1156^b$, $1157^a$, $1157^b$, $1158^a$, $1158^b$, $1159^a$, $1159^b$, $1160^a$ and $1160^b$, which extend angularly upwardly for wiping contactive engagement with the contact-rings 1155, 1156, 1157, 1158, 1159, 1160, respectively, as the dielectric disk 1139 rotates.

The contact-fingers $1155^a$, $1155^b$ are paired, so to speak, and respectively contact the inner and outer contact-segments of contact-ring 1155 in alternate succession along a radial line on one side of the disk 1139. Similarly, the contact-fingers $1156^a$, $1156^b$ are paired and respectively contact the inner and outer contact-segments of contact-ring 1156 in alternate position along the same radial line on one side of the disk 1139. Similarly, the contact-fingers $1157^a$–$1157^b$ are paired and respectively contact the inner and outer contact-segments of contact-ring 1157 in alternate succession along the same radial line on one side of the disk 1139. Similarly, the contact-fingers $1158^a$–$1158^b$ are paired and respectively contact the inner and outer contact-segments of contact-ring 1158 in alternate succession along the same radial line on one side of the disk 1139. Similarly, the contact-fingers $1159^a$–$1159^b$ are paired and respectively contact the inner and outer contact-segments of contact-ring 1159 in alternate succession along the same radial line on one side of the disk 1139. Finally, the contact-fingers $1160^a$–$1160^b$ are paired and respectively contact the inner and outer contact-segments of contact-ring 1160 in alternate succession along the same radial line on one side of the disk 1139.

Also dielectrically mounted upon the upper face of the lower plate 1102 along the front margins thereof and on the right side of the shaft 1138 (reference again being made to FIG. 100) are twelve matching contact-fingers $1155^c$, $1155^d$, $1156^c$, $1156^d$, $1157^c$, $1157^d$, $1158^c$, $1158^d$, $1159^c$, $1159^d$, $1160^c$, and $1160^d$, which match and correspond to the contact-fingers $1155^a$–$1160^b$, inclusive, and are also located for wiping contactive engagement with the contact-rings 1155, 1156, 1157, 1158, 1159, and 1160, respectively, as the disk 1139 rotates.

The contact-fingers $1155^c$–$1155^d$ are paired, so to speak, and respectively contact the inner and outer contact-segments of contact-ring 1155 in alternate succession along a radial line on the diametrally opposite side of the disk 1139. Similarly, the contact-fingers $1156^c$–$1156^d$ are paired and respectively contact the inner and outer contact-segments of contact-ring 1156 in alternate position along this second radial line on the diametrally opposite side of the disk 1139. Similarly, the contact-fingers $1157^c$–$1157^d$ are paired and respectively contact the inner and outer contact-segments of contact-ring 1157 in alternate position along this second radial line on the diametrally opposite side of the disk 1139. Similarly, the contact-fingers $1158^c$–$1158^d$ are paired and respectively contact the inner and outer contact-segments of contact-ring 1158 in alternate succession along this second radial line on the diametrally opposite side of the disk 1139. Similarly, the contact-fingers $1159^c$–$1159^d$ are paired and respectively contact the inner and outer contact-segments of contact-ring 1159 in alternate succession along this second radial line on the diametrally opposite side of the disk 1139. Finally, the contact-fingers $1160^c$–$1160^d$ are paired and respectively contact the inner and outer contact-segments of contact-ring 1160 in alternate succession along this second radial line on one side of the disk 1139.

Thus, when the disk 1139 is at rest in such position that the contact-finger $1155^a$ is in contactive engagement with one of the contact-segments of the contact-ring 1155, the contact-finger $1155^c$ will be in contactive engagement with a contact-segment of the contact-ring 1155 on the diametrally opposite side of the disk 1139 and the contact-fingers $1155^b$, $1155^d$ will be in nonconducting engagement with the dielectric disk 1139 in one of the dielectric gaps formed in the peripheries of the contact-ring 1155. Similarly, when the disk 1139 moves to its next position, as will be presently more fully explained, the contact-fingers $1155^a$, $1155^c$ will rest on the dielectric gaps between contact-segments of the contact-ring 1155 and, in turn, the contact-fingers $1155^b$, $1155^d$ will be in contactive engagement with paired contact-segments of the contact-ring 1155. For wiring convenience and the electrical functions of the circuitry, the paired contact-fingers $1155^a$–$1155^b$ are electrically connected to each other and connected in common to one pole of the motor 1137 as shown in FIG. 106 and FIG. 115–B. Similarly, the contact-fingers $1155^c$–$1155^d$ are respectively connected to the two stationary contacts 1134, 1135, of the single-pole double-throw micro-switch 1129. Therefore, the contact-fingers $1155^a$–$1155^b$ are electrically equivalent to a moving contact or blade of a switch and the contact-fingers $1155^c$–$1155^d$ are electrically equivalent to the stationary contact points of a switch so that the combination of the contact-ring 1155 and the contact-fingers $1155^a$–$1155^b$, $1155^c$–$1155^d$, are electrically equivalent to a single-pole double-throw switch that alternately changes its circuit configuration as the disk 1139 rotates which is shown in FIG. 106 by the conventional symbol for a single-pole double-throw switch and is designated by the reference numeral $sw^{101}$.

When the disk 1139 is in such position that the contact-finger $1156^a$ is in contactive engagement with one of the contact-segments of the contact-ring 1156, the contact-finger $1156^c$ will be in contactive engagement with a contact-segment of the contact-ring 1156 on the diametrally opposite side of the disk 1139 and the contact-fingers $1156^b$, $1156^d$ will be in nonconducting engagement with the dielectric disk 1139 in one of the dielectric gaps formed in the peripheries of the contact-ring 1156. Similarly, when the disk 1139 moves to its next position, as will be presently more fully explained, the contact-fingers $1156^a$, $1156^c$ will rest on the dielectric gaps between contact-segments of the contact-ring 1156 and, in turn, the contact-fingers $1156^b$, $1156^d$ will be in contactive engagement with paired contact-segments of the contact-ring 1156.

For wiring convenience and the electrical functions of the circuitry, the paired contact-fingers $1156^a$–$1156^b$ are electrically connected to each other and connected in common to ground as shown in FIGS. 115–B, 115–C. Similarly, the contact-fingers $1156^c$–$1156^d$ are separately wired into the circuitry as separate contact-elements. Therefore, the connected contact-fingers $1156^a$–$1156^b$ are electrically equivalent to a moving contact or blade of a switch and the contact-fingers $1156^c$–$1156^d$ are electrically equivelent to two stationary contact points of a switch so that the combination of the contact-ring 1156 and the pairs of contact-fingers $1156^a$–$1156^b$, $1156^c$–$1156^d$, are electrically equivalent of a single-pole double-throw switch, which alternately changes its circuit configuration as the disk 1139 rotates, and which, for clarity, is shown in the wiring diagrams by a conventional symbol for a switch of this type and is identified by the reference numeral $sw^{102}$.

When the disk 1139 is in such position that the contact-finger $1157^a$ is in contactive engagement with one of the contact-segments of the contact-ring 1157, the contact-finger $1157^c$ will be in contactive engagement with a contact-segment of the contact-ring 1157 on the diametrally opposite side of the disk 1139 and the contact-fingers $1157^a$, $1157^c$ will be in nonconducting engagement with the dielectric disk 1139 in one of the dielectric gaps formed in the peripheries of the contact-ring 1157. Similarly, when the disk 1139 moves to its next position, as will be presently more fully explained, the contact-fingers $1157^a$, $1157^c$ will rest on the dielectric gaps between contact-segments of the contact-ring 1157, and, in turn, the contact-fingers $1157^b$, $1157^d$ will be in contactive engagement with paired contact-segments of the contact-ring 1157. For wiring convenience and the electrical functions of the circuitry, the paired contact-fingers $1157^a$–$1157^b$ are electrically connected to each other and connected in common to ground as shown in FIGS. 115–B, 115–C. Similarly, the contact-fingers $1157^c$–$1157^d$ are separately wired into the circuitry as separate contact-elements. Therefore, the connected contact-fingers $1157^a$–$1157^b$ are electrically equivalent to a moving contact or blade of a switch and the contact-fingers $1157^c$–$1157^d$ are electrically equivalent to two stationary contact points of a switch so that the combination of the contact-ring 1157 and the pairs of contact-fingers $1157^a$–$1157^b$, $1157^c$–$1157^d$, is electrically equivalent of a single-pole double-throw switch, which alternately changes its circuit configuration as the disk 1139 rotates, and which, for clarity, is shown in the wiring diagrams by a conventional symbol for a switch of this type and is identified by the reference numeral $sw^{103}$.

When the disk 1139 is in such position that the contact-finger $1158^a$ is in contactive engagement with one of the contact-segments of the contact-ring 1158, the contact-finger $1158^c$ will be in contactive engagement with a contact-segment of the contact-ring 1158 on the diametrally opposite side of the disk 1139 and the contact-fingers $1158^a$, $1158^c$, will be in nonconducting engagement with the dielectric disk 1139 in one of the dielectric gaps formed in the peripheries of the contact-ring. Similarly, when the disk 1139 moves to its next position, as will be presently more fully explained, the contact-fingers $1158^a$, $1158^c$ will rest on the dielectric gaps between contact-segments of the contact-ring 1158 and, in turn, the contact-fingers $1158^b$, $1158^d$ will be in contactive engagement with paired contact-segments of the contact-ring 1158. For wiring convenience and the electrical functions of the circuitry, the paired contact-fingers $1158^a$–$1158^b$ are electrically connected to each other and connected in common to ground as shown in FIGS. 115–B, 115–C. Similarly, the contact-fingers $1158^c$–$1158^d$ are separately wired into the circuitry as separate contact-elements. Therefore, the connected contact-fingers $1158^a$–$1158^b$ are electrically equivalent to a moving contact or blade of a switch and the contact-fingers $1158^c$–$1158^d$ are electrically equivalent to two stationary contact points of a switch so that the combination of the contact-ring 1158 and the pairs of contact-fingers $1158^a$–$1158^b$, $1158^c$–$1158^d$, is electrically equivalent of a single-pole double-throw switch, which alternately changes its circuit configuration as the disk 1139 rotates, and which, for clarity, is shown in the wiring diagrams by a conventional symbol for a switch of this type and is identified by the reference numeral $sw^{104}$.

When the disk 1139 is in such position that the contact-fingers $1159^a$ is in contactive engagement with one of the contact-segments of the contact-ring 1159, the contact-fingers $1159^c$ will be in contactive engagement with a contact-segment of the contact-ring 1159 on the diametrally opposite side of the disk 1139, and the contact-fingers $1159^b$, $1159^d$ will be nonconducting engagement with the dielectric disk 1139 in one of the dielectric gaps formed in the peripheries of the contact-ring 1159. Similarly, when the disk 1139 moves to its next position, as will be presently more fully explained, the contact-fingers $1159^a$, $1159^c$ will rest on the dielectric gaps between contact-segments of the contact-ring 1159 and, in turn, the contact-fingers $1159^b$, $1159^d$ will be in contactive engagement with paired contact-segments of the contact-ring 1159. For wiring convenience and the electrical functions of the circuitry, the paired contact-fingers $1159^a$–$1159^b$ are electrically connected to each other and connected in common to ground as shown in FIGS. 115–B, 115–C. Similarly, the contact-fingers $1159^c$–$1159^d$ are separately wired into the circuitry as separate contact-elements. Therefore, the connected contact-fingers $1159^a$–$1159^b$ are electrically equivalent to a moving contact or blade of a switch and the contact-fingers $1159^c$–$1159^d$ are electrically equivalent to two stationary contact points of a switch so that the combination of the contact-ring 1159 and the pairs of contact-fingers $1159^a$–$1159^b$, $1159^c$–$1159^d$ is electrically equivalent to a single-pole double-throw switch, which alternately changes its circuit configuration as the disk 1139 rotates, and which, for clarity, is shown in the wiring diagrams by a conventional symbol for a switch of this type and is identified by the reference numeral $sw^{105}$.

When the disk 1139 is in such position that the contact-finger $1160^a$ is in contactive engagement with one of the contact-segments of the contact-ring 1160, the contact-finger $1160^c$ will be in contactive engagement with a contact-segment of the contact-ring 1160 on the diametrally opposite side of the disk 1139 and the contact-fingers $1160^a$, $1160^c$, will be in nonconducting engagement with the dielectric disk 1139 in one of the dielectric gaps formed in the peripheries of the contact-ring 1160. Similarly, when the disk 1139 moves to its next position, as will be presently more fully explained, the contact-fingers $1160^a$, $1160^c$ will rest on the dielectric gaps between contact-segments of the contact-ring 1160 and, in turn, the contact-fingers $1160^b$, $1160^d$ will be in contactive engagement with paired contact-segments of the contact-ring 1160. For wiring convenience and the electrical functions of the circuitry, the paired contact-fingers $1160^a$–$1160^b$ are electrically connected to each other and connected in common to ground as shown in FIGS. 115–B, 115–C. Similarly, the contact-fingers $1160^c$–$1160^d$ are separately wired into the circuitry as separate contact-elements. Therefore, the connected contact-fingers $1160^a$–$1160^b$ are electrically equivalent to a moving contact or blade of a switch and the contact-fingers $1160^c$–$1160^d$ are electrically equivalent to two stationary contact points of a switch so that the combination of the contact-ring 1160 and the pairs of contact-fingers $1160^a$–$1160^b$, $1160^c$–$1160^d$ is electrically equivalent of a single-pole double-throw switch, which alternately changes its configuration as the disk 1139 rotates, and which, for clarity, is shown in the wiring diagrams by a conventional symbol for a switch of this type and is identified by the reference numeral $sw^{106}$.

Rigidly mounted upon the under face of the lower plate 1102 and centrally of the forward margins thereof by means of a pair of screws 1161, 1162 is an outwardly projecting arm 1163 which is bent upwardly and backwardly at its forward end in the provision of a vertical leg 1164 which is, in turn, bent inwardly over and around the peripheral edge of the disk 1139 in the provision of an indexing pointer 1165 which can be used as a reference point for manually setting the disk 1139 to correct time.

Adhesively or otherwise rigidly secured flatwise and concentrically upon the underface of the dielectric disk 1147 are five thin metallic contact-rings 1166, 1167, 1168, 1169, 1170 arranged in the pattern shown in FIG. 104. It will be noted that each of such contact-rings 1166–1170, inclusive, are identical with the previously described contact-rings 1156, 1157, 1158, 1159, and 1160 and have uniformly spaced nonconductive segmental gaps cut out of their exterior and interior peripheries in alternate positions. Thus, each of the contact-rings 1166–1170 may be said to consist of a series of electrically interconnected contact-segments which are located alternately inwardly and outwardly with respect to the center of the disk 1147. Moreover, the successive contact-segments of the rings 1166–1170 are divided into two identical half-circles about a so-called "zero-diameter" indicated by the dotted line $L^2$–$L^2$ in FIG. 104.

It will also be apparent by reference to FIG. 104 that the contact-ring 1166 is, in effect, subdivided into twenty-four alternate inner and outer contact-segments each having an arcuate length of fifteen degrees around the three-hundred sixty degrees of the full circle and is arcuately oriented so that radial lines of division between two successive contact-segments on opposite sides thereof will coincide with the zero-diameter $L^2$–$L^2$. Similarly, the contact-ring 1167 is subdivided into twelve alternate inner and outer contact-segments each having an arcuate length of thirty degrees and being oriented so that one such thirty-degree contact-segment is radially aligned with each pair of two successive contact-segments on the contact-ring 1166. Similarly, the contact-ring 1168 is subdivided into six alternate contact-segments each having an arcuate length of sixty degrees and being oriented so that one such contact-segment is radially aligned with each pair of two successive contact-segments on the contact-ring 1167 and four successive contact-segments on contact-ring 1166.

The contact-rings 1169 and 1170 are non-symmetrical, so to speak. In other words, the contact-ring 1169 is subdivided into four successive inner and outer contact-segments having an arcuate length of sixty degrees, one-hundred twenty degrees, one-hundred twenty degrees and sixty degrees around the full three-hundred sixty degrees of the circle, the first sixty-degree contact-segment commencing at the upper half of the zero-diameter (as depicted in FIG. 104) and extending counterclockwise therefrom with the two successive one-hundred twenty degree contact-segments and the final sixty-degree segment following in counterclockwise order. The innermost contact-ring 1170 is subdivided into inner and outer contact-segments having arcuate lengths of one-hundred eight degrees each respectively covering the two halves of the disk 1147.

Dielectrically mounted on the upper face of the contact mounting plate 1114 in spaced relation along the front margin thereof and to the left of the shaft 1138 (reference being made to FIG. 100) are ten spaced parallel contact-fingers $1166^a$–$1166^b$, $1167^a$–$1167^b$, $1168^a$–$1168^b$, $1169^a$–$1169^b$, and $1170^a$–$1170^b$, which extend angularly upwardly for wiping contactive engagement with the contact-rings 1166, 1167, 1168, 1169, 1170, respectively, as the dielectric disk 1147 rotates.

The contact-fingers $1166^a$–$1166^b$ are paired, so to speak, and respectively contact the inner and outer segments of contact-ring 1166 in alternate succession along a radial line on one side of the disk 1147. Similarly, the contact-fingers $1167^a$–$1167^b$ are paired and respectively contact the inner and outer contact-segments of contact-ring 1167 in alternate position along the same radial line on one side of the disk 1147. Similarly, the contact-fingers $1168^a$–$1168^b$ are paired and respectively contact the inner and outer contact-segments of contact-ring 1168 in alternate succession along the same radial line on one side of the disk 1147. Similarly, the contact-fingers $1169^a$–$1169^b$ are paired and respectively contact the inner and outer contact-segments of contact-ring 1169 in alternate succession along the same radial line on one side of the disk 1139. Finally, the contact-fingers $1170^a$–$1170^b$ are paired and respectively contact the inner and outer contact-segments of contact-ring 1170 in alternate succession along the same radial line on one side of the disk 1147.

Also dielectrically mounted upon the upper face of the lower plate 1102 along the front margins thereof and on the right side of the shaft 1138 (reference again being made to FIG. 100) are twelve matching contact-fingers $1166^c$–$1166^d$, $1167^c$–$1167^d$, $1168^c$–$1168^d$, $1169^c$–$1169^d$, $1170^c$–$1170^d$, which match and correspond to the contact-fingers $1166^a$–$1170^b$, inclusive, and are also located for wiping contactive engagement with the contact-rings 1166, 1167, 1168, 1169, and 1170, respectively, as the disk 1147 rotates.

The contact fingers $1166^c$–$1166^d$ are paired and respectively contact the inner and outer contact-segments of contact-ring 1166 in alternate position along a radial line on the diametrally opposite side of the disk 1147. Similarly, the contact-fingers $1167^c$–$1167^d$ are paired and respectively contact the inner and outer contact-segments of contact-ring 1167 in alternate position along this second radial line on the diametrally opposite side of the disk 1147. Similarly, the contact-fingers $1168^c$–$1168^d$ are paired and respectively contact the inner and outer contact-segments of contact-ring 1168 in alternate succession along the second radial line on the diametrally opposite side of the disk 1147. Similarly, the contact-fingers $1169^c$–$1169^d$ are paired and respectively contact the inner and outer contact-segments of contact-ring 1169 in alternate succession along this second radial line on the diametrally opposite side of the disk 1147. Finally, the contact-fingers $1170^c$–$1170^d$ are paired and respectively contact the inner and outer contact-segments of contact-ring 1170 in alternate succession along this second radial line on one side of the disk 1147.

Thus, when the disk 1147 is at rest, in such position that the contact-finger $1166^a$ is in contactive engagement with one of the contact-segments of the contact-ring 1166, the contact-finger $1166^c$ will be in contactive engagement with a contact-segment of the contact-ring 1166 on the diametrally opposite side of the disk 1147 and the contact-fingers $1166^b$, $1166^d$, will be in nonconducting engagement with the dielectric disk 1147 in one of the dielectric gaps formed in the peripheries of the contact-ring 1166. Similarly, when the disk 1147 moves to its next position, as will be presently more fully explained, the contact-fingers $1166^a$, $1166^c$ will rest on the dielectric gaps between contact-segments of the contact-ring 1166 and, in turn, the contact-fingers $1166^b$, $1166^d$ will be in contactive engagement with paired contact-segments of the contact-ring 1176. For writing convenience and the electrical functions of the circuitry the paired contact-fingers $1166^a$–$1166^b$ are electrically connected to each other and connected in common to ground as shown in FIGS. 115–B, 115–C. Similarly, the contact-fingers $1166^c$–$1166^d$ are separately wired into the circuitry as separate contact-elements. Therefore, the connected contact-fingers 1166a–1166b are electrically equivalent to a moving contact or blade of a switch and the contact-fingers 1166c–1166d are electrically equivalent to two stationary contact points of a switch so that the combination of the contact-ring 1166 and the pairs of contact-fingers 1166a–1166b, 1166c–1166d, is electrically equivalent of a single-pole double-throw switch, which alternately changes its circuit configuration as the disk 1147 rotates, and which, for clarity, is shown in the wiring diagrams by a conventional symbol for a switch of this type and is identified by the reference numeral $sw^{108}$.

Similarly, when the disk 1147 is in such position that the contact-finger 1167a is in contactive engagement with one of the contact-segments of the contact-ring 1167, the contact-finger 1167c will be in contactive engagement with a contact-segment of the contact-ring 1167 on the diametrally opposite side of the disk 1147 and the contact-fingers 1167a, 1167c will be in nonconducting engagement with the dielectric disk 1147 in one of the dielectric gaps formed in the peripheries of the contact-ring 1167. When the disk 1147 moves to its next position, as will be presently more fully explained, the contact-fingers 1167a, 1167c will rest on the dielectric gaps between contact-segments of the contact-ring 1167 and, in turn, the contact-fingers 1167b, 1167d will be in contactive engagement with paired contact-segments of the contact-ring 1167. For wiring convenience and the electrical functions of the circuitry, the paired contact-fingers 1167a–1167b are electrically connected to each other and connected in common to ground as shown in FIGS. 115–B, 115–C. Similarly, the contact-fingers 1167c–1167d, are separately wired into the circuitry as separate contact-elements. Therefore, the connected contact-fingers 1167a–1167b are electrically equivalent to a moving contact or blade of a switch and the contact-fingers 1167c–1167d are electrically equivalent to two stationary contact points of a switch so that the combination of the contact-ring 1167 and the pairs of contact-fingers 1167a–1167b, 1167c–1167d is electrically equivalent of a single-pole double-throw switch, which alternately changes its circuit configuration as the disk 1147 rotates, and which, for clarity, is shown in the wiring diagrams by a conventional symbol for a switch of this type and is identified by the reference numeral $sw^{109}$.

Similarly, when the disk 1147 is in such position that the contact-finger 1167 is in contactive engagement with one of the contact-segments of the contact-ring 1168, the contact-finger 1168c will be in contactive engagement with a contact-segment of the contact-ring 1168 on the diametrally opposite side of the disk 1147 and the contact-fingers 1168a–1168c, will be in nonconducting engagement with the dielectric disk 1147 in one of the dielectric gaps formed in the peripheries of the contact-ring 1168. Similarly, when the disk 1147 moves to its next position, as will be presently more fully explained, the contact-fingers 1168a, 1168c will rest on the dielectric gaps between contact-segments of the contact-fingers 1168b, 1168d, will be in contactive engagement with paired contact-segments of the contact-ring 1168. For wiring convenience and the electrical functions of the circuitry, the paired contact-fingers 1168a–1168b are electrically connected to each other and connected in common to ground as shown in FIGS. 115–B, 115–C. Similarly, the contact-fingers 1168c–1168d are separately wired into the circuitry as separate contact-elements. Therefore, the connected contact-fingers 1168a–1168b are electrically equivalent to a moving contact or blade of a switch and the contact-fingers 1168c–1168d are electrically equivalent to two stationary contact points of a switch so that the combination of the contact-ring 1168 and the pairs of contact-fingers 1168a–1168b, 1168c–1168d, is electrically equivalent of a single-pole double-throw switch, which alternately changes its circuit configuration as the disk 1147 rotates, and which, for clarity, is shown in the wiring diagrams by a conventional symbol for a switch of this type and is identified by the reference numeral $sw^{110}$.

Similarly, when the disk 1147 is in such position that the contact-finger 1169a is in contactive engagement with one of the contact-segments of the contact-ring 1169, the contact-finger 1169c will be in contactive engagement with a contact-segment of the contact-ring 1169 on the diametrally opposite side of the disk 1147, and the contact-fingers 1169b, 1169d will be in nonconducting engagement with the dielectric disk 1147 in one of the dielectric gaps formed in the peripheries of the contact-ring 1169. When the disk 1147 moves to its next position, as will be presently more fully explained, the contact-fingers 1169a, 1169c will rest on the dielectric gaps between contact segments of the contact-ring 1169 and, in turn, the contact-fingers 1169b, 1169d will be contactive engagement with paired contact-segments of the contact-ring 1169. For wiring convenience and the electrical functions of the circuitry, the paired contact-fingers 1169a–1169b are electrically connected to each other and connected in common to ground as shown in FIGS. 115–B, 115–C. Similarly, the contact-fingers 1169c–1169d are separately wired into the circuitry as separate contact-elements. Therefore, the connected contact-fingers 1169a–1169b are electrically equivalent to a moving contact or blade of a switch and the contact-fingers 1169c–1169d are electrically equivalent to two stationary contact points of a switch so that the combination of the contact-ring 1169 and the pairs of contact-fingers 1169a–1169b, 1169c–1169d, is electrically equivalent of a single-pole double-throw switch, which alternately changes its circuit configuration as the disk 1147 rotates, and which, for clarity, is shown in the wiring diagrams by a conventional symbol for a switch of this type and is identified by the reference numeral $sw^{111}$.

Similarly, when the disk 1147 is in such position that the contact-finger 1170a is in contactive engagement with one of the contact-segments of the contact-ring 1170, the contact-finger 1170c will be in contactive engagement with a contact-segment of the contact-ring 1170 on the diametrally opposite side of the disk 1147 and the contact-fingers 1169b, 1169d, will be in nonconducting engagement with the dielectric disk 1147 in one of the dielectric gaps formed in the peripheries of the contact-ring 1170. When the disk 1147 moves to its next position, as will be presently more fully explained, the contact-fingers 1170a, 1170c will rest on the dielectric gaps between contact-segments of the contact-ring 1170 and, in turn, the contact-fingers 1170b, 1170d will be in contactive engagement with paired contact-segments of the contact-ring 1170. For wiring convenience and the electrical functions of the circuitry, the paired contact-fingers 1170a–1170b are electrically connected to each other and connected in common to ground as shown in FIGS. 115–B, 115–C. Similarly, the contact-fingers 1170c–1170d are separately wired into the circuitry as separate contact-elements. Therefore, the connected contact-fingers 1170a–1170b are electrically equivalent to a moving contact or blade of a switch and the contact-fingers 1170c–1170d are electrically equivalent to two stationary contact points of a switch so that the combination of the contact-ring 1170 and the pairs of contact-fingers 1170a–1170b, 1170c–1170d, is electrically equivalent of a single-pole double-throw switch, which alternately changes its circuit configuration as the disk 1147 rotates, and which, for clarity, is shown in the wiring diagrams by a conventional symbol for a switch of this type and is identified by the reference numeral $sw^{112}$.

Rigidly mounted upon the under face of the contact mounting plate 1114 and centrally of the forward margin thereof by means of a pair of screws 1161', 1162', is an outwardly projecting arm 1163 'which is bent upwardly and backwardly at its forward end in the provision of a vertical leg 1164' which is, in turn, bent inwardly over and around the peripheral edge of the disk 1147 in the provision of an indexing pointer 1165' which can be used as a reference point for manually setting the disk 1147 to correct time.

Adhesively or otherwise rigidly secured flatwise upon the upper face of the dielectric disk 1154 are five concentric rings of thin metallic contact-rings 1171, 1172, 1173, 1174, 1175, having uniformly spaced nonconductive segmental gaps cut out of their exterior and interior peripheries and are in alternate positions, as shown in FIG. 105, so as to consist of a series of electrically interconnected contact-segments which are located alternately inwardly and outwardly with respect to the center of the disk 1154. Moreover, the successive contact-segments of the rings 1171, 1172, 1173, 1174, 1175, are divided into four identical quadrants about two so-called "zero-diameters" which are perpendicular to each other indicated by the dotted line $L^3$–$L^3$, $L^4$–$L^4$, in FIG. 105.

It will also be apparent by reference to FIG. 105 that the contact-ring 1171 is, in effect subdivided into twenty-eight alternate inner and outer contact-segments. There are four contact-segments along the inner periphery, each having an arcuate length of twenty-five degrees and symmetrically straddling the outer ends of the zero diameters $L^3$, $L^4$. In addition to this, each quadrant has five segments each having an arcuate length of thirteen degrees and alternately arranged along the outer and inner peripheries of the contact-ring 1171 between the twenty-five degree segments. The contact-ring 1172, similarly, is arranged in four identical quadrants, each of which consists of one segment having an arcuate length of twenty-five and one-half degrees, two successive alternately positioned segments having an arcuate length of twenty-six degrees, and one segment having an arcuate length of twelve and one-half degrees. Similarly, each quadrant of the contact-ring 1173 is subdivided into two alternate inner and outer contact-segments having arcuate lengths of fifty-one and one-half degrees and thirty-eight and one-half degrees respectively.

The contact-ring 1174 is subdivided into four successive inner and outer contact-segments each having an arcuate length of ninety degrees, around the full three-hundred sixty degrees of the circle, respectively corresponding to the four quadrants of the contact-rings 1171, 1172, 173, as depicted in FIG. 105. The innermost contact-ring 1175 is subdivided into inner and outer contact-segments having arcuate lengths of one-hundred eighty degrees each respectively covering the two halves of the disk 1154 on opposite sides of the zero-diameter $L^3$.

Dielectrically mounted on the under face of the contact mounting plate 1113 in spaced relation along the front margin thereof and to the left of the shaft 1138 (reference being made to FIG. 100) are ten spaced parallel contact-fingers 1171$^a$–1171$^b$, 1172$^a$–1172$^b$, 1173$^a$–1173$^b$, 1174$^a$–1174$^b$, 1175$^a$–1175$^b$, which extend angularly upward for wiping contactive engagement with the contact-rings 1171, 1172, 1173, 1174, 1175, respectively, as the dielectric disk 1154 rotates.

The contact-fingers 1171$^a$–1171$^b$ are paired, so to speak, and respectively contact the inner and outer contact-segments of contact-ring 1171 in alternate succession along a radial line on one side of the disk 1154. Similarly, the contact-fingers 1172$^a$–1172$^b$ are paired and respectively contact the inner and outer contact-segments of contact-ring 1172 in alternate position along the same radial line on one side of the disk 1154. Similarly, the contact-fingers 1173$^a$–1173$^b$ are paired and respectively contact the inner and outer contact-segments of contact-ring 1173 in alternate succession along the same radial line on one side of the disk 1154. Similarly, the contact-fingers 1174$^a$–1174$^b$ are paired and respectively contact the inner and outer contact-segments of contact-ring 1174 in alternate succession along the same radial line on one side of the disk 1154. Finally, the contact-fingers 1175$^a$–1175$^b$ are paired and respectively contact the inner and outer contact-segments of contact-ring 1175 in alternate succession along the same radial line on one side of the disk 1154.

Also dielectrically mounted upon the under face of the contact mounting plate 1113 along the front margins thereof and on the right side of the shaft 1138 (reference again being made to FIG. 100) are twelve matching contact-fingers 1171$^c$–1171$^d$, 1172$^c$–1172$^d$, 1173$^c$–1173$^d$, 1174$^c$–1174$^d$, 1175$^c$–1175$^d$, which match and correspond to the contact-fingers 1176$^a$–1176$^b$, inclusive, and are also located for wiping contactive engagement with the contact-rings 1171, 1172, 1173, 1174, 1175, respectively, as the disk 1154 rotates.

The contact-fingers 1171$^c$–1171$^d$ are paired, so to speak, and respectively contact the inner and outer contact-segments of contact-ring 1171 in alternate succession along a radial line on the diametrally opposite side of the disk 1154. Similarly, the contact-fingers 1172$^c$–1172$^d$ are paired and respectively contact the inner and outer contact-segments of contact-ring 1172 in alternate position along this second radial line on the diametrally opposite side of the disk 1154. Similarly, the contact-fingers 1173$^c$–1173$^d$ are paired and respectively contact the inner and outer contact-segments of contact-ring 1173 in alternate position along this second radial line on the diametrally opposite side of the disk 1154. Similarly, the contact-fingers 1174$^c$–1174$^d$ are paired and respectively contact the inner and outer contact-segments of contact-ring 1174 in alternate succession along this second radial line on the diametrally opposite side of the disk 1154. Finally, the contact-fingers 1175$^c$–1175$^d$ are paired and respectively contact the inner and outer contact-segments of contact-ring 1175 in alternate succession along this second radial line on the diametrally opposite side of the disk 1154.

Thus, when the disk 1154 is at rest, in such position that the contact-finger 1171$^a$ is in contactive engagement with one of the contact-segments of the contact-ring 1171, the contact-finger 1171$^c$ will be in contactive engagement with a contact-segment of the contact-ring 1171 on the diametrally opposite side of the disk 1154 and the contact-fingers 1171$^b$, 1171$^d$ will be in nonconducting engagement with the dielectric disk 1154 in one of the dielectric gaps formed in the peripheries of the contact-ring 1171. Similarly, when the disk 1154 moves to its next position, as will be presently more fully explained, the contact-fingers 1171$^a$, 1171$^c$ will rest on the dielectric gaps between contact-segments of the contact-ring 1171 and, in turn, the contact-fingers 1171$^b$, 1171$^d$ will be in contactive engagement with paired contact-segments of the contact-ring 1171. For wiring convenience, and the electrical functions of the circuitry, the paired contact-fingers 1171$^a$–1171$^b$ are electrically connected in common to ground as shown in FIGS. 115–B, 115–C. Similarly, the contact-fingers 1171$^c$–1171$^d$ are separately wired into the circuitry as separate contact-elements. Therefore, the connected contact-fingers 1171$^a$–1171$^b$ are electrically equivalent to a moving contact or blade of a switch and the contact-fingers 1171$^c$–1171$^d$ are electrically equivalent to two stationary contact points of a switch so that the combination of the contact-ring 1171 and the pairs of contact-fingers 1171$^a$–1171$^b$, 1171$^c$–1171$^d$ is electrically equivalent of a single-pole double-throw switch, which alternately changes its circuit configuration as the disk 1154 rotates, and which, for clarity, is shown in the wiring diagrams by a conventional symbol for a switch of this type and is identified by the reference numeral $sw^{114}$.

Similarly, when the disk 1154 is in such position that the contact-finger 1172$^a$ is in contactive engagement with one of the contact-segments of the contact-ring 1172, the contact-finger 1172$^c$ will be in contactive engagement with a contact-segment of the contact-ring 1172 on the diametrally opposite side of the disk 1154 and the contact-fingers 1172$^b$, 1172$^d$, will be in nonconducting engagement with the dielectric disk 1154 in one of the dielectric gaps formed in the peripheries of the contact-ring 1172. Similarly, when the disk 1154 moves to its next position, as will be presently more fully explained, the contact-fingers 1172$^a$–1172$^c$, will rest on the dielectric gaps between contact-segments of the contact-ring 1172, and, in turn, the contact-fingers 1172$^a$–1172$^b$, will be in contactive engagement with paired contact-segments of the contact-ring 1172. For wiring convenience and the electrical functions of the circuitry, the paired contact-fingers 1172$^a$–1172$^b$ are electrically connected to each other and connected in common to ground as shown in FIGS. 115–B, 115–C. Similarly, the contact-fingers 1172$^c$–1172$^d$, are separately wired into the circuitry as separate contact-elements. Therefore, the connected contact-fingers 1172$^a$–1172$^b$ are electrically equivalent to a moving contact or blade of a switch and the contact-fingers 1172$^c$–1172$^d$ are electrically equivalent to two stationary contact points of a switch so that the combination of the contact-ring 1172 and the pairs of contact-fingers 1172$^a$–1172$^b$, 1172$^c$–1172$^d$, is electrically equivalent of a single-pole double-throw switch, which alternately changes its circuit configuration as the disk 1154 rotates, and which, for clarity, is shown in the wiring diagrams by a conventional symbol for a switch of this type and is identified by the reference numeral $sw^{115}$.

Similarly, when the disk 1154 is in such position that that contact-finger 1173$^a$ is in contactive engagement with one of the contact-segments of the contact-ring 1173, the contact-finger 1173$^c$ will be in contactive engagement with a contact-segment of the contact-ring 1173 on the diametrally opposite side of the disk 1154 and the contact-fingers 1173$^a$, 1173$^c$ will be in nonconducting engagement with the dielectric disk 1154 in one of the dielectric gaps formed in the peripheries of the contact-ring 1173. Similarly, when the disk 1154 moves to its next position, as will be presently more fully explained, the contact-fingers 1173$^a$, 1173$^c$ will rest on the dielectric gaps between contact-segments of the contact-ring 1173 and, in turn, the contact-fingers 1173$^b$, 1173$^d$ will be in contactive engagement with paired contact-segments of the contact-ring 1173. For wiring convenience and the electrical functions of the circuitry, the paired contact-fingers 1173$^a$–1173$^b$ are electrically connected to each other and connected in common to ground as shown in FIGS. 115–B, 115–C. Similarly, the contact-fingers 1173$^c$–1173$^d$ are separately wired into the circuitry as separate contact-elements. Therefore, the connected contact-fingers 1173$^a$–1173$^b$ are electrically equivalent to a moving contact or blade of a switch and the contact-fingers 1173$^c$–1173$^d$ are electrically equivalent to two stationary contact points of a switch so that the combination of the contact-ring 1173 and the pairs of contact-fingers 1173$^a$–1173$^b$, 1173$^c$–1173$^d$, is electrically equivalent of a single-pole double-throw switch, which alternately changes its circuit configuration as the disk 1154 rotates, and which, for clarity, is shown in the wiring diagrams by a conventional symbol for a switch of this type and is identified by the reference numeral $sw^{116}$.

Similarly, when the disk 1154 is in such position that the contact-finger 1174$^a$ is in contactive engagement with one of the contact-segments of the contact-ring 1174, the contact-finger 1174$^c$ will be in contactive engagement with a contact-segment of the contact-ring 1174 on the diametrally opposite side of the disk 1154, and the contact-fingers 1174$^b$, 1174$^d$ will be in nonconducting engagement with the dielectric disk 1154 in one of the dielectric gaps formed in the peripheries of the contact-ring 1174. Similarly, when the disk 1154 moves to its next position, as will be presently more fully explained, the contact-fingers 1174$^a$, 1174$^c$ will rest on the dielectric gaps between contact-segments of the contact-ring 1174 and, in turn, the contact-fingers 1174$^b$, 1174$^d$ will be in contactive engagement with paired contact-segments of the contact-ring 1174. For wiring convenience and the electrical functions of the circuitry, the paired contact-fingers 1174$^a$–1174$^b$ are electrically connected to each other and connected in common to ground as shown in FIGS. 115–B, 115–C. Similarly, the contact-fingers 1174$^c$–1174$^d$, are separately wired into the circuitry as separate contact-elements. Therefore, the connected contact-fingers 1174$^a$–1174$^b$ are electrically equivalent to a moving contact or blade of a switch and the contact-fingers 1174$^c$–1174$^d$ are electrically equivalent to two stationary contact points of a switch so that the combination of the contact-ring 1174 and the pairs of contact-fingers 1174$^a$–1174$^b$, 1174$^c$–1174$^d$, is electrically equivalent of a single-pole double-throw switch, which alternately changes its circuit configuration as the disk 1154 rotates, and which, for clarity, is shown in the wiring diagrams by a conventional symbol for a switch of this type and is identified by the reference numeral $sw^{117}$.

Similarly, when the disk 1154 is at rest, in such position that the contact-finger 1175$^a$ is in contactive engagement with one of the contact-segments of the contact-ring 1175, the contact-finger 1175$^c$ will be in contactive engagement with a contact-segment of the contact-ring 1174 on the diametrally opposite side of the disk 1154 and the contact-fingers 1175$^b$, 1175$^d$ will be in nonconducting engagement with the dielectric disk 1154 in one of the dielectric gaps formed in the peripheries of the contact-ring 1175. Similarly, when the disk 1154 moves to its next position, as will be presently more fully explained, the contact-fingers 1175$^a$, 1175$^c$ will rest on the dielectric gaps between contact-segments of the contact-ring 1175 and, in turn, the contact-fingers 1175$^b$, 1175$^d$ will be in contactive engagement with paired contact-segments of the contact-ring 1175. For wiring convenience and the electrical functions of the circuitry, the paired contact-fingers 1175$^a$–1175$^b$ are electrically connected to each other and connected in common to ground as shown in FIGS. 115–B, 115–C. Similarly, the contact-fingers 1175$^c$–1175$^d$ are separately wired into the circuitry as separate contact-elements. Therefore, the connected contact-fingers 1175$^a$–1175$^b$ are electrically equivalent to a moving contact or blade of a switch and the contact-fingers 1175$^c$–1175$^d$ are electrically equivalent to two stationary contact points of a switch so that the combination of the contact-ring 1175 and the pairs of contact-fingers 175$^a$–1175$^b$, 1175$^c$–1175$^d$, is electrically equivalent of a single-pole double-throw switch, which alternately changes its circuit configuration as the disk 1154 rotates, and which, for clarity, is shown in the wiring diagrams by a conventional symbol for a switch of this type and is identified by the reference numeral $sw^{118}$.

Rigidly mounted on the under face of the contact mounting plate 1113 and centrally of the forward margins thereof is an outwardly projecting indexing pointer 1165″ which is bent downwardly and forwardly into contiguous relationship to the upper face of the disk 1154.

As will be seen by reference to FIG. 97, the three indexing pointers 1165, 1165′, and 1165″ are in vertical alignment and serve as points of reference for convenience in setting the binary clock 1100 to correct chronological time. In order to further facilitate the setting of the binary clock 1100 the disks 1139, 1147, and 1154 are imprinted upon their upper faces and adjacent to their perpiheral margins with a series of numbers which correspond to the various time-positions coded in the disks 1139, 1147, 1154, but these numbers are oriented ninety degrees away from the true position due to the fact that the true-time position is along the diametral lines of contact of the various contact-fingers 1155$^a$ to 1165$^b$, inclusive, 1166$^a$ to 1170$^b$, inclusive, and 1171$^a$ to 1175$^b$, inclusive, which lines of contact lie in a vertical plane extending through the axis of the shaft 1138 in inwardly spaced parallel relation to the forward face of the binary clock 1100. Obviously, in order to place the time-position indicating numbers in readable position at the front of the clock, the pointers 1165, 1165′, 1165″ are mounted in perpendicular relationship to the above-mentioned plane and the time-position indicating numbers are correspondingly oriented. Since the disk 1139 is frictionally secured to the shaft 1138 it may be manually rotated to any desired setting independently of the shaft 1138 and since the disks 1147, 1154, are journaled on the shaft 1138 they also can be manually rotated to any desired setting. It is, therefore, a relatively simple matter, when the computer device A is initially put into operation or is being started up again after a current-interruption, to set the binary clock 1100 to correct chronological time.

When the main power lines of the computer device A are energized, the motor 1124 will rotate and turn the cam 1126 at the rate of one revolution every five minutes. As will be seen by reference to FIG. 99, the cam 1126 is divided into two haves and will, therefore, shift the position of the micro-switch 1129 once every two and one-half minutes. If it be assumed that the circuitry of the binary clock motors 1124, 1137, is in the configuration shown in FIG. 106 at the instant in which the cam 1126 is in the position shown in FIG. 99, and if it also be assumed that the disks 1139, 1147, 1154, are in "zero-position" (that is to say, with zero diameters $L^1$–$L$, $L^2$–$L^2$, and $L^3$–$L^3$, all in the plane of the line of contact, then, two and one-half minutes later the cam 1126 will have rotated one-hundred eight degrees, thereby shifting the blade 1131 of the micro-switch away from contact with the contact point 1134 and into contact with contact point 1135. During this two and one-half minute initial interval, the contact-fingers $1155^b$, $1155^d$ (shown as elements of switch $sw^{101}$ in FIG. 106) are in circuit-completing engagement with the contact-ring 1155 and the motor 1137 will be energized. This motor 1137 will very rapidly advance the disk 1139 until the contact-segments of the contact-ring 1155 with which the contact-finger $1155^c$ is in contact has moved slightly more than thirteen degrees and, thus, the contact-finger $1155^b$ will move onto the directly following dielectric gap in the inner peripheral margin of the contact-ring 1155, thereby breaking the circuit to the motor 1137 and bringing the disk 1139 to an immediate stop. This, in effect, changes the circuit configuration of the switch $sw^{101}$ from the position shown in full lines to the position shown in dotted lines in FIG. 106. It will, of course, be evident that as soon as the switch blade 1131 is shifted back into contact with the contact point 1134 at the end of the next suceeding two and one-half minute interval, the circuit will again be completed to the motor 1137 and the disk 1139 will, accordingly, be advanced one more increment.

During the course of one hour, the disk 1139 will have advanced twenty-four increments and will thus have completed one full revolution. The pin 1141 is so located in relation to the coding on the disk 1139 that, as the disk 1139 passes through its twenty-fourth increment, and completes a single hourly revolution, the pin 1141 will engage the star-wheel 1142 and advance it one increment. This incremental motion will be transmitted through the gears 1144, 1145, and cause the disk 1147 to advance one increment. Obviously, twenty-four successive hourly revolutions of the minutes-disk 1139 will be transmitted as twenty-four incremental steps to the hours-disk 1147, thereby producing one full revolution of the hours-disk for each twenty-four hourly revolutions of the minutes-disk 1139. In other words, in the course of a day, the minutes-disk will make twenty-four hourly revolutions and the hours-disk will make one daily revolution. In the same manner, the pin 1148 will advance the star-wheel 1149 one increment every day and this daily increment of movement will be transmitted through the gears 1151, 1152, to the weeks-days disk 1154, so that the latter will advance once increment for each full revolution of the hours-disk 1147. However, the days-weeks disk 1154 is subdivided into twenty-eight increments and, therefore, will make one complete revolution for every twenty-eight revolutions of the hours-disk 1147. In other words, the weeks-days disk 1154 will make one complete revolution every twenty-eight days or four weeks.

The bracket-plate 1121 is provided, along its rearwardly margin, and between the bolts 1104, 1106, with an elongated indentation or recess 1176 and secured, by means of screws 1177, 1178, upon the under face of the bracket-plate 1121 is a dielectric plate 1179 which extends across and projects rearwardly beyond such indentation or recess 1176. Mounted in the dielectric plate 1179 and located in uniformly spaced relationship within the indentation or recess 1176 are eight terminals 1180, 1181, 1182, 1183, 1184, 1185, 1186, 1187, as best seen in FIG. 101.

Adhesively or otherwise rigidly secured upon the under face of the dielectric plate 1179 is a semicircular contact-segment $1180^a$ which is electrically connected by a contactor strip $1180^b$ to the terminal 1180 and is located in concentric relation to the shaft 1150. Also adhesively secured upon the under face of the dielectric plate 1179 in concentric relation with the segment $1180^a$ in effect completing, so to speak, are seven equal uniformly spaced separate arcuate segments $1181^a$, $1182^a$, $1183^a$, $1184^a$, $1185^a$, $1186^a$, $1187^a$, which are rigidly connected by connector strips $1181^b$, $1182^b$, $1183^b$, $1184^b$, $1185^b$, $1186^b$, $1187^b$, to the terminals 1181, 1182, 1183, 1184, 1185, 1186, and 1187.

Rigidly mounted upon the upper face of the star-wheel 1149 and extending diametrically thereacross in the space between the upper face of the star-wheel 1149 and the under face of the dielectric plate 1179 is a contactor 1188 which is of such transverse width as to contact only one of the contact-segments 1181–1187 at a time. Since the contactor 1188 is diametral, and since the segments $1180^a$ is semicircular, it will, of course, be obvious that the contactor 1188 will, at all times, make a circuit from the segment $1180a$ to one of the seven segments $1181^a$–$1187^a$, depending upon the position of the star-wheel 1149. Moreover, the star-wheel 1149 is provided with fourteen teeth so that it will make a half revolution during each week. Consequently, the seven terminals 1181, 1182, 1183, 1184, 1185, 1186, 1187, respectively correspond to the seven successive days of the week (Sunday through Saturday, Sunday being reckoned as the first day of the week) and, therefore, the dielectric plate 1179, together with the terminals 1181–1187, inclusive, and the contact-segments $1181^a$–$1187^a$, inclusive, as well as the terminal 1180, together with the contact-segment $1180^a$ and contactor 1188, are electrically equivalent to a seven-contact rotary switch which is shown in the various wiring diagrams by the conventional symbol for a rotary switch of this type and is designated as switch $sw^{119}$. This rotary switch $sw^{119}$ functions in connection with special daily rates, as will be presently more fully discussed.

As has been pointed out above, the contact-ring 1156 and the contact-fingers $1156^a$, $1156^b$, $1156^c$, $1156^d$ are electrically equivalent to a switch which has been shown in the various wiring diagrams as a single-pole double-throw switch and has been designated as switch $sw^{102}$. Since the contact-fingers $1156^a$, $1156^b$ are electrically connected by a common lead into the circuitry, they will always be in circuit-making contact with the contact-ring 1156 no matter what position the disk 1139 is in. On the other hand, since the contact-fingers $1156^c$, $1156^d$ are electrically separate and ride along the outer and inner annular portions of the contact-ring 1156, respectively, the contact-fingers $1156^c$, $1156^d$ will be alternately "on" and "off," so to speak, as the disk 1139 rotates and contact-segments of the contact-ring 1156 or dielectric gaps therein are, for the moment, engaged by the respective contact-fingers $1156^c$, $1156^d$. Accordingly, the contact-fingers $1156^c$, $1156^d$ are electrically connected into the circuitry in such a manner that whenever the contact-finger $1156^d$ is in contact with a contact-segment on the inner annular portion of the contact-ring 1156, and whenever the corresponding contact-finger $1156^c$ is in contact with the corresponding dielectric gap on the outer annular portion of the contact-ring 1156 i.e., the dielectric gap which is in radial registration with the aforesaid contact-segment, the switch $sw^{102}$ will be in a so-called O-position. Similarly, whenever contact-finger 1156$^d$ is on a dielectric gap of the contact-ring 1156, and contact-finger 1156$^c$ is on a corresponding contact-segment in the outer annular portion of the contact-ring 1156, the switch $sw^{102}$ will be in so-called X-position. Since the disk 1139 rotates in the direction of the arrow in FIG. 103, and the contact-fingers 1156$^a$–1156$^d$, inclusive, are stationary, the sequence of O-positions and X-positions can be counted around in the opposite direction and it will thus be apparent that this sequence corresponds to the sequence of the top line in the minutes cam-patterns table (Table V). By similar comparison, it will be seen that the sequencing of the switch $sw^{103}$ formed by the contact-ring 1157, the switch $sw^{104}$ formed by the contact-ring 1158, the switch $sw^{105}$ formed by the contact-ring 1159, and the switch $sw^{106}$ formed by the contact-ring 1160, will respectively correspond to the second, third, fourth, and fifth lines of the minutes cam-patterns table. The disk 1147 is coded exactly in the same manner to correspond to the hours cam-patterns table as may be seen by reference to FIG. 104.

The three outer contact-rings 1171, 1172, 1173, of disk 1154, which are, in effect, switches $sw^{114}$, $sw^{115}$, $sw^{116}$, similarly correspond to the sequences of the days cam-patterns table and the other two contact-rings 1174, 1175, of disk 1154 which are, in effect, switches $sw^{117}$, $sw^{118}$, similarly correspond to the sequences of the weeks cam-patterns table. However, in comparing the coding of the disk 1154 with Table V it must be borne in mind that the disk 1154 faces upwardly whereas the disks 1139, 1147, face downwardly. Therefore, the sequential arrangement of contact-segments and dielectric gaps on disk 1154, as shown in FIG. 105, appear to run in the opposite direction as compared with the sequential arrangement of contact-segments and dielectric gaps on the disks 1139 and 1147 as shown in FIGS. 103, 104.

TIME-COMPARATOR MODULE

The time-comparator module F comprises a panel 1176 which is removably mounted in the compartment C$^2$ and the binary clock 1100, together with the count back steppers 800$^a$, 800$^b$, 800$^c$, 800$^d$, 800$^e$, are secured thereto. The panel 1176 is provided with a sight-opening 1177 located in front of the binary clock 1100 so that the disks 1139, 1147, 1154, may be manually set to correct time whenever necessary. The sight-opening 1177 is covered by a flat cover-plate 1178 swingably mounted on the panel 1176.

RATE-SETTING MODULE

The rate-setting module G similarly comprises a panel 1179 removably mounted in the compartment C$^2$ and provided with eleven horizontally elongated rectangular apertures 1180. Secured upon the interior face of the panel 1179 in line with the apertures 1180 are the eleven rate switches 1045, 1045′, 1089, 1090, 1091, 1092, 1093, 1094, 1095, 1096, 1097, with their respective thumb-wheels 1065 projecting slightly through the apertures 1180 so as to be accessible for manual setting.

Also rigidly mounted on the interior face of the panel 1179 are the mode switch 900$^a$ and two four-bank digital steppers 900$^{b1}$, 900$^{b2}$.

CHARGE DISPLAY MODULE

The charge display module H similarly comprises a chassis-plate or panel 1181 which is removably mounted on the rear wall of the compartment C$^2$ and secured thereon are the three ten-bank digital steppers 900$^{c1}$, 900$^{c2}$, 900$^{c3}$, and the other four-bank digital stepper 900$^{b3}$.

POWER SUPPLY CHASSIS

Rigidly secured to the interior of the compartment C$^1$, preferably beneath the ticket-reading module E, is a conventional power-supply chassis 1182 having the usual transformers and related electrical components to receive the usual 115 v. A.C. line current from a conventional source and transform it into an 85 v. supply and a 48 v. supply for energizing the various circuits wherein such voltages are desirable. Since this power supply chassis is entirely conventional, it is not shown or described in detail herein.

WIRING DIAGRAMS AND CIRCUITRY

The electrical connections between the various components or so-called "wiring diagrams" of the computer device A are shown in three interrelated figures, namely, FIGS. 117–A, 117–B, and 117–C, two interrelated FIGS. 118–A, 118–B, and four interrelated FIGS. 119–A, 119–B, 119–C, and 119–D. The heavy dotted lines along the right and left margins of the drawings represent continuity of the leads or wires. In these wiring diagrams, the various switches and other circuit-components, which change electrical configuration during a computing cycle, are shown in the circuit-configuration which would exist before the circuitry is energized. As a matter of fact, this is substantially the circuit-configuration which will exist just after midnight on the first day of the first week in each monthly period before any tickets have been inserted.

As will be seen by reference to FIGS. 117–A, 118–A, and 118–B, the circuitry includes a manually operable reset switch which is a conventional single-throw, triple pole switch having two normally open contacts and one normally closed contact, which are shown by conventional electrical symbols and designated by the reference numeral $sw^R$. As will be presently more fully described, negative terminal of the coil 953$^a$ of the mode switch 900$^a$ is connected by a lead to various other operative components in the circuitry and the normally closed contact of the reset switch $sw^R$ is interposed in this lead so that, when the reset switch is manually pressed, this lead will, in effect, be broken. On the other hand, the two normally open contacts of the reset switch are connected in such manner as to establish separate and independent ground connections to the interrupter switch 973 of the mode switch 900$^a$ and the homing switches $sw^{28}$, $sw^{33}$, of the digital steppers 900$^{b1}$, 900$^{b2}$, respectively. Thus, when the reset switch $sw^R$ is manually operated, the two normally open contacts will close to establish such independent grounds for the interrupter 973 and the switches $sw^{28}$, $sw^{33}$, so that the digital steppers 900$^{b1}$ and 900$^{b2}$ will be reset to home position and the mode switch 900$^a$ will be reset to its eleventh position, which actually may also be referred to as the home position for said mode switch 900$^a$. The reset switch $sw^R$ is actually included in the circuitry of the present invention merely for the purpose of providing means by which such circuitry can be reset manually in the event that some unforeseen malfunction occurs during a computing cycle. For this reason, the reset switch $sw^R$ is shown in the wiring diagrams, FIGS. 117–A, 118–A, and 118–B, but the reset switch $sw^R$ is omitted from the mode diagrams, FIGS. 120 to 130, inclusive, since it does not contribute in any way to, or function normally within, any of the modes.

Finally, the electrical connections between the various components of the charge-display module H and the various groups of display lights 62 within the display box 48 are shown in four interrelated figures, namely, FIGS. 119–A, 119–B, 119–C, and 119–D, in which the heavy dotted lines represent the continuity of the leads of wires. For convenience, in connecting and disconnecting the various components for repair or replacement, these components are wired to connector blocks 1200, 1300, 1400 and 1500, which plug into matching connector blocks which are merely the terminal ends of harnesses. Since the use of harnesses, which, at their opposite ends are tied into connector blocks, is a conventional expedient and would unduly complicate the wiring diagrams, these matching connector blocks have not been shown and, in lieu thereof, the connector block 1200 is shown on the drawing as having connector-contacts 1201 to 1223, inclusive, and the connector block 1300 is shown on the drawings as having connector-contacts 1300 to 1327, inclusive. Similarly, the connector block 1400 is shown on the drawings as having connector-contacts 1401 to 1481, inclusive, and the connector block 1500 is shown on the drawings as having connector-contacts 1201 to 1223, inclusive. The interconnection between these various contacts can be traced in FIGS. 117–A, 117–B, 117–C, 118–A, 118–B, 119–A, 119–B, 119–C, and 119–D, according to the following table.

*Table VI*

CORRELATION TABLE FOR CONNECTOR BLOCKS

1200

| | |
|---|---|
| 1201–1405 | 1213–1532 |
| 1202–1552 | 1214–1546 |
| 1203–1402 | 1215–1414 |
| 1204–1550 | 1216–1418 |
| 1205–1411 | 1217–1419 |
| 1206–1401–1553 | 1218–   –1402 |
| 1207–1415 | 1219–1406 |
| 1208–1539 | 1220–1434 |
| 1209–1542 | 1221–1417–1547 |
| 1210–1537–1422 | 1222–1544–1435 |
| 1211–1413 | 1223–1426 |
| 1212–1533 | |

1300

| | |
|---|---|
| 1308–1481 | 1322–1448 |
| 1309–   –1435 | 1323–1449 |
| 1310–1436 | 1324–1408 |
| 1311–1437 | 1325–1409 |
| 1312–1438 | 1326–1410 |
| 1313–1439 | 1327–1429 |
| 1314–1440 | 1301–1553–1401 |
| 1315–1441 | 1302–1430–1543 |
| 1316–1442 | 1303–1431 |
| 1317–1443 | 1304–1432 |
| 1318–1444 | 1305–1433 |
| 1319–1445 | 1306–1416 |
| 1320–1446 | 1307–1480 |
| 1321–1447 | |

1400

| | |
|---|---|
| 1401–1206–1553 | 1425–1540 |
| 1402–1203–1218 | 1426–1223 |
| 1403–1554 | 1427–1551 |
| 1404–1534 | 1428–1536 |
| 1405–1201 | 1429–1327 |
| 1406–1219 | 1430–1302–1543 |
| 1407–1531 | 1431–1303 |
| 1408–1324 | 1432–1304 |
| 1409–1325 | 1433–1305 |
| 1410–1326 | 1434–1220 |
| 1411–1205 | 1435–1309–1544 |
| 1412–1549 | 1436–1310–1555 |
| 1413–1211 | 1437–1311 |
| 1414–1215 | 1438–1312 |
| 1415–1207 | 1439–1313 |
| 1416–1306–1545 | 1440–1314 |
| 1417–1221–1547 | 1441–1315 |
| 1418–1216 | 1442–1316 |
| 1419–1217 | 1443–1317 |
| 1420–1535 | 1444–1318 |
| 1421–1548 | 1445–1319 |
| 1422–1210–1537 | 1446–1320 |
| 1423–1538 | 1447–1321 |
| 1424–1541 | 1448–1322 |

| | |
|---|---|
| 1449–1323 | 1466–1514 |
| 1450–1530 | 1467–1513 |
| 1451–1529 | 1468–1512 |
| 1452–1528 | 1469–1511 |
| 1453–1527 | 1470–1510 |
| 1454–1526 | 1471–1509 |
| 1455–1525 | 1472–1508 |
| 1456–1524 | 1473–1507 |
| 1457–1523 | 1474–1506 |
| 1458–1522 | 1475–1505 |
| 1459–1521 | 1476–1504 |
| 1460–1520 | 1477–1503 |
| 1461–1519 | 1478–1502 |
| 1462–1518 | 1479–1501 |
| 1463–1517 | 1480–1307 |
| 1464–1516 | 1481–1308 |
| 1465–1515 | |

1500

| | |
|---|---|
| 1501–1479 | 1529–1451 |
| 1502–1478 | 1530–1450 |
| 1503–1477 | 1531–1407 |
| 1504–1476 | 1532–1213 |
| 1505–1475 | 1533–1212 |
| 1506–1474 | 1534–1404 |
| 1507–1473 | 1535–1420 |
| 1508–1472 | 1536–1428 |
| 1509–1471 | 1537–1210–1422 |
| 1510–1470 | 1538–1423 |
| 1511–1469 | 1539–1208 |
| 1512–1468 | 1540–1425 |
| 1513–1467 | 1541–1427 |
| 1514–1466 | 1542–1209 |
| 1515–1465 | 1543–1302–1430 |
| 1516–1464 | 1544–1222–1435 |
| 1517–1463 | 1545–1306–1416 |
| 1518–1462 | 1546–1214 |
| 1519–1461 | 1547–1221–1417 |
| 1520–1460 | 1548–1421 |
| 1521–1459 | 1549–1412 |
| 1522–1458 | 1550–1204 |
| 1523–1457 | 1551–1427 |
| 1524–1456 | 1552–1202 |
| 1525–1455 | 1553–1301–1401 |
| 1526–1454 | 1554–1403 |
| 1527–1453 | 1555–1310–1436 |
| 1528–1452 | |

By way of illustration of the operation of the above correlation table, the connector contact 1201 of connector block 1200 is connected by a conductor within the harness to the connector contact 1405 of connector block 1400. Similarly, connector contact 1202 of connector block 1200 is connected through a conductor within the harness to the connector contact 1552 of the connector block 1500. Picking certain connector contacts at random for purposes of illustration, connector contact 1501 of connector block 1500 is connected through a conductor in the harness to connector contact 1479 of connector block 1400. In the above tabulator key it will also be noted that some of the connector contacts are associated with two other connector contacts, rather than merely one. For instance, the connector contact 1301 of connector block 1300 is connected through one conductor in the harness to the connector contact 1553 of connector block 1500, and through another conductor in the harness to the connector contact 1401 of connector block 1400. In a few instances, a connector contact is associated with another connector contact in the third column of the above tabulator key and there is a blank space in the second column. This is not an anomalous connection or error, but merely indicates that the particular connector contact is connected through a single conductor in the harness to another connector contact which is, in turn, connected through two conductors to another connector contact. For example, connector contact 1218 of connector block 1200 is connected through a single conductor in the harness to connector contact 1402 in connector block 1400, and this latter connector contact 1402 is also connected through a second conductor in the harness to connector contact 1203 in connector block 1200. Undoubtedly, this same series of connections could be achieved by the use of a jumper between connector contacts 1203 and 1218 within the connector block 1200, but the former method has been found to be more convenient and practical in terms of designing the harness, and is, therefore, a matter of choice.

Most of the components which are diagrammatically shown in the various wiring diagrams, namely, FIGS. 117–A, 117–B, 117–C, 118–A, 118–B, 119–A, 119–B, 119–C, and 119–D, are related by appropriate reference numerals to components which have been described above in detail. In addition to this, the circuitry includes a large number of diodes which are indicated at various points in the wiring diagrams by the conventional electrical symbol and have not been identified by specific reference numerals for the reason that they are conventionally used for the purpose of establishing unidirectional flow through the conductor in which they have been inserted. In other words, the diodes will block any reverse flowing currents through the particular conductors as the connections within the circuit charge during the course of the various computing modes. Also shown in the wiring diagram by a conventional symbol are twelve varistors $v^1$, $v^2$, $v^3$, $v^4$, $v^5$, $v^6$, $v^7$, $v^8$, $v^9$, $v^{10}$, $v^{11}$, $v^{12}$, which are conventional in design.

As has been above stated in the various wiring diagrams, namely, FIGS. 117–A, 117–B, 117–C, 118–A, 118–B, 119–A, 119–B, 119–C, and 119–D, that the circuitry of the present invention includes five count-back steppers, namely, a minutes count-back stepper 800$^a$, an hours count-back stepper 800$^b$, a days count-back stepper 800$^c$, a weeks count-back stepper 800$^d$, and a minutes output stepper 800$^e$. In addition to this, the circuitry includes one six-bank digital stepper 900$^a$, three four-bank digital steppers 900$^b$, which, for convenience, in the aforesaid wiring diagrams, have been respectively designated 900$^{b1}$, 900$^{b2}$, and 900$^{b3}$, and, finally, three ten-bank digital steppers 900$^c$, which, for convenience in the aforesaid wiring diagrams, have been respectively designated 900$^{c1}$, 900$^{c2}$, and 900$^{c3}$. In the aforesaid wiring diagrams, the electromagnetic driving coils of the several count-back steppers 800$^a$, 800$^b$, 800$^c$, 800$^d$, and 800$^e$, are identified respectively by the reference numerals 823$^a$, 823$^b$, 823$^c$, 823$^d$, and 823$^e$. In the aforesaid wiring diagrams, the electromagnetic driving coil associated with the one six-bank digital stepper is designated by the reference numeral 953 which is the same reference numeral as has been used above. The electromagnetic driving coils 953$^b$ associated with the four-bank digital steppers 900$^b$ are, for convenience, respectively designated 953$^{b1}$, 953$^{b2}$, 953$^{b3}$, and, finally, the electromagnetic coils 953$^c$ associated with the ten-bank digital steppers 900$^c$ are, for convenience, respectively designated as 953$^{c1}$, 953$^{c2}$, 953$^{c3}$. The varistors $v^1$, $v^2$, $v^3$, $v^4$, $v^5$, $v^6$, $v^7$, $v^8$, $v^9$, $v^{10}$, $v^{11}$, $v^{12}$ are respectively connected in parallel across the electromagnetic driving coils 823$^a$, 283$^b$, 823$^c$, 823$^d$, 823$^e$, 953, 953$^{b1}$, 953$^{b2}$, 953$^{b3}$, 953$^{c1}$, 953$^{c2}$, 953$^{c3}$, and function in the conventional manner as arc-suppression devices to limit the inductive voltage peaks generated by the electromagnetic coils and reduce them to a level which is safe for the other components in the circuit. The circuitry of the present invention also includes eleven relays $k^1$, $k^2$, $k^3$, $k^4$, $k^5$, $k^6$, $k^7$, $k^8$, $k^9$, $k^{10}$, $k^{11}$, all of which are substantially conventional in mechanical construction and electrical operation and, therefore, need not be described in structural detail. It is sufficient for present purposes merely to designate the type of each relay and identify the electrical component thereof to which connections must be made as shown in the several wiring diagrams 117–A, 117–B, 117–C, 118–A, 118–B, 119–A, 119–B, 119–C, and 119–D.

The relay $k^1$ has a conventional electromagnetic coil or solenoid 1600 which, when energized, pulls in a conventional armature which, in turn, flexes moving contact blades 1601, 1602, 1603, 1604, 1605, located operatively between, and adapted for closing various circuits through, stationary contact-point 1606, 1607, 1608, 1609, 1610, 1611. This relay controls the functions of the ticket-reading module E, and, among other things, completes a circuit to the solenoids 711, 712, which are in parallel, causing the ticket-reading mechanism to shift downwardly into ticket-reading position, and causing the punch 735 to cut a re-read prevention notice in the inserted marginal edge of the ticket T. Consequently, the relay $k^1$, may, for convenience, be referred to as the reader relay.

The relay $k^2$ is another conventional relay which includes an electromagnetic coil or solenoid 1700 which, when energized, pulls in a conventional armature which, in turn, operates nine single-pole, single-throw switches $sw^{120}$, $sw^{121}$, $sw^{122}$, $sw^{123}$, $sw^{124}$, $sw^{125}$, $sw^{126}$, $sw^{127}$, $sw^{128}$, and two single-pole, double-throw switches $sw^{129}$, $sw^{130}$. The switches $sw^{120}$–$sw^{127}$, inclusive, are respectively associated with the rate-set switches 1090–1097, inclusive. The switch $sw^{128}$ is a lock-in contact for the coil 1700. The switches $sw^{129}$ and $sw^{130}$ are connected to a so-called "truth circuit" consisting in part of four double-pole double-throw switches $sw^{131}$, $sw^{132}$, $sw^{133}$, and $sw^{134}$, of the toggle-type mounted on the rear face of the panel 1099 of the rate module G and respectively including pairs of mechanically connected moving contactors 1701–1702, 1703–1704, 1705–1706, 1707–1708, having manually operable toggle-handles 1709, 1710, 1711, 1712, which project through and are accessible from the front face of the panel 1099. The contactors 1701, 1702, 1703, 1704, 1705, 1706, 1707, 1708, respectively operate between pairs of stationary contacts 1713–1714, 1715–1716, 1717–1718, 1719–1720, 1721–1722, 1723–1724, 1725–1726, 1727–1728. The relay $k^2$ and switches $sw^{131}$, $sw^{132}$, $sw^{133}$, and $sw^{134}$ are associated with the rate module G and, through various contacts, distinguishes between various regular and special rates and selects the rate which is applicable to a particular transaction. Consequently, the relay $k^2$ may, for convenience, be referred to as the rate-selection relay.

The relay $k^3$ is also a conventional relay having an electromagnetic coil or solenoid 1800 which, when energized, pulls in a conventional armature which, in turn, flexes moving contact blades 1801, 1802, 1803, 1804, 1805, 1806, 1807, 1808, 1809, located operatively between, and adapted for closing various circuits through stationary contact-points 1810, 1811, 1812, 1813, 1814, 1815, 1816, 1817, and 1818. The relay $k^3$ is associated with the charge-computing circuitry and successively cooperates, in the various modes presently to be described, with the hours count-back stepper 800$^b$, the days count-back stepper 800$^c$, and the weeks count-back stepper 800$^d$, so as to cause them, in turn, to count back one step at a time and stop momentarily between such steps while certain selected digital steppers will count up a charge corresponding to that increment of time. As soon as such increment has been counted, the relay $k^3$ will close momentarily and cause one of the count-back steppers 800$^b$, 800$^c$, 800$^d$ (depending upon which particular mode is then functioning) to shift to the next lower position, thereby subtracting or removing the next increment of time from the system so that the computing system will progressively move through "elapsed time" from "time now" to "time then." In this connection, it will be recalled that the expressions "time now" and "time then" respectively relate to the time to which the ticket is read and the time to which the ticket was punched and, of course, "elapsed time" refers to the chronological interval therebetween. It will be evident from the foregoing that the relay $k^3$ may, for convenience, be referred to as the charge-progressive relay.

The relay $k^4$ is also a conventional relay having an electromagnetic coil or solenoid 1900 which, when energized, pulls in a conventional armature which, in turn, operates one single-pole, single-throw switch $sw^{135}$ and two single-pole, double-throw switches $sw^{136}$, $sw^{137}$. The switch $sw^{135}$ is a lock-in contact for the coil 1900 and the switches $sw^{136}$, $sw^{137}$, are connected as part of the truth circuit. The relay $k^4$ is associated electrically with the hours count-back stepper 800$^b$ and the charge-progression relay $k^3$ and pulls in after the first time that the charge-progression relay $k^3$ has closed a circuit to the hours count-back stepper 800$^b$, thereby serving as a memory during various successive stages in the computing cycle of the fact that a previous hourly charge has been made during such computing cycle. It will be noted that since the relay $k^4$ only pulls in after the relay $k^3$ causes the hours count-back stepper 800$^b$ to move through its initial count-back, the relay $k^4$ will, in effect, remember the fact that such single count-back hourly charge has previously been made but will not discriminate between succeeding hourly charges. Accordingly, the relay $k^4$ may, for convenience, be referred to as the initial hours charge-sensing relay.

The relay $k^5$ is also a conventional relay and includes an electromagnetic coil or solenoid 2000 which, when energized, pulls in a conventional armature and the latter, in turn, flexes moving contact blades 2001, 2002, 2003, 2004, 2005, 2006, 2007, 2008, located operatively between, and adapted for closing various circuits through, stationary contact-points 2009, 2010, 2011, 2012, 2013, 2014, 2015, 2016, 2017, 2018, and 2019. The relay $k^5$ is also associated with the charge-computing circuitry and pulls in whenever a maximum charge is reached during the hours-charging and days-charging modes. As previously pointed out, for usage on parking lots and in garages, it is desirable and, indeed, almost essential that the hourly charges do not accumulate to an amount exceeding the weekly charge. The relay $k^5$, therefore, will, during the hours-charging mode, sense the fact that the hourly charges have reached an amount equal to the daily charge, if, as, and when, such fact occurs during a computing cycle and, likewise, will, during the days-charging mode, sense the fact that the daily charges have reached an amount equal to the weekly charge. When the maximum has been reached during the hours-charging mode, the relay $k^5$ will cause the remaining hours which might be counted during such mode to be counted out of or subtracted from the system without marking any further charges therefor. Similarly, when the maximum is reached during the days-charging mode, the relay $k^5$ will cause the remaining day-increments which might be counted, during such mode to be counted out of or subtracted from the system without making any further charges therefor. Accordingly, the relay $k^5$ may, for convenience, be referred to as the maximum charge relay.

The relay $k^6$ is also a conventional relay having an electromagnetic coil or solenoid 2100 which, when energized, pulls in a conventional armature and the latter, in turn, flexes moving contact blades 2101, 2102, located operatively between, and adapted for closing various circuits through, stationary contact-points 2103, 2104, and 2105. Inasmuch as the circuitry of the present invention charges in minimum monetary units of five cents, it is necessary at various times during the performance of computations to carry and odd five-cent amount so that if a maximum weekly charge is reached, this odd nickel can be either charged or disregarded. Consequently, the relay $k^6$ may, for convenience, be referred to as the totalizer relay.

The relay $k^7$ is also a conventional electromagnetic coil or solenoid 2200 which, when energized, pulls in a conventional armature and the latter, in turn, flexes moving contact blades 2201, 2202, 2203, 2204, located operatively between, and adapted for closing various circuits through, stationary contact points 2205, 2206, 2207, 2208, and 2209. The relay $k^7$ is electrically associated with the set of bulbs 62 in the display-box 48 which light up and display a number corresponding to "dimes." However, this relay $k^7$ does not light all of the lights but merely lights certain selected ones, namely, figures 62$^b$, 62$^q$, 62$^v$, and 62$^w$. As will be seen by reference to FIG. 117–C, the relay $k^7$, when it is pulled out, so to speak, will complete a circuit to the bulb 62$^k$. It will thus be apparent that the relay $k^7$ supplements other components in the circuitry relating to the visible display of the monetary amount to be charged and may thus be referred to, for convenience, as a "dimes" charge-display relay. In this connection, it should also be noted that the electromagnetic solenoid 2200 operates on 85 volts A.C., and, therefore, should be of the shading pole type to prevent chattering.

The relay $k^8$ is also a conventional relay and includes an electromagnetic coil or solenoid 2300 which, when energized, pulls in a conventional armature and the latter, in turn, flexes moving contact blades 2301, 2302, 2303, 2304, located operatively between, and adapted for closing various circuits through, stationary contact-points 2305, 2306, 2307, 2308, and 2309. The relay $k^8$ is electrically associated with the set of bulbs 62 in the display box 48 which light up and display a number corresponding to "dollars." However, this relay $k^8$ does not light all of the lights but merely lights certain selected ones, namely, figures 62$^b$, 62$^q$, 62$^v$, and 62$^w$. As will be seen by reference to FIG. 117–C, the relay $k^8$, when it is pulled out, so to speak, will complete a circuit to the bulb 62$^k$. It will thus be apparent that the relay $k^8$ supplements other components in the circuitry relating to the visible display of the monetary amount to be charged and may thus be referred to, for convenience, as a "dollar" charge-display relay. In this connection, it should also be noted that the electromagnetic solenoid 2300 operates on 85 volts A.C., and, therefore, should be of the shading pole type to prevent chattering.

The relay $k^9$ is also a conventional relay and includes an electromagnetic coil or solenoid 2400 which, when energized, pulls in a conventional armature and the latter, in turn, flexes moving contact blades 2401, 2402, 2403, 2404, located operatively between, and adapted for closing various circuits through, stationary contact-points 2405, 2406, 2407, 2408, and 2409. The relay $k^9$ is electrically associated with the set of bulbs 62 in the display box 48 which light up and display a number corresponding to "ten-dollar increments." However, this relay $k^9$ does not light all of the lights but merely lights certain selected ones, namely, figures 62$^b$, 62$^q$, 62$^v$, and 62$^w$. As will be seen by reference to FIG. 117–C, the relay $k^9$, when it is pulled out, so to speak, will complete a circuit to the bulb 62$^k$. It will thus be apparent that the relay $k^9$ supplements other components in the circuitry relating to the visible display of the monetary amount to be charged and may thus be referred to, for convenience, as a "ten-dollar increment" charge-display relay. In this connection, it should also be noted that the electromagnetic solenoid 2400 operates on 85 volts A.C., and, therefore, should be of the shading pole type to prevent chattering.

The relay $k^{10}$, which is the principal component of a pulse generator PG, is a conventional mercury-type relay which includes an electromagnetic coil 2500 and a movable contact element 2501 which is mechanically shiftable at a very high rate and without bounce-effect between two puddles of mercury which serve as contact-points 2502, 2503. The pulse generator PG additionally includes a so-called resistor-switch comprising a conventional capacitor 2504 connected across the positive and negative terminals of the coil 2500 and a conventional resistor 2505 which is interposed between the positive terminal of the coil 2500 and the positive side of the 48 volt direct current supply circuit. The common point of connection between the positive terminal of the coil 2500, the capacitor 2504 and the resistor 2505 is alternatively connected by a lead 2506 through various normally open switching elements in the circuitry to ground, as will presently be more fully discussed, so that, whenever one or more of such switching elements is closed, the coil 2500 will be de-energized and the pulse generator PG will be shut off. Interposed between the movable contact element 2501 and the contact-point 2502 is a series-connected resistor-capacitor arc-suppression network and, similarly, interposed between the moving contact element 2501 and the contact-point 2503 is a series-connected resistor-capacitor arc-suppression network. The pulse generator PG is employed for the purpose of generating a series of uniformly spaced distinctly separate and discrete pulses which will be connected circuit-wise to the minutes count-back stepper $800^a$ and the minutes output stepper $800^e$, and also to two four-bank digital steppers $900^{b1}$, $900^{b2}$, and to all three of the ten-bank digital steppers $900^{c1}$, $900^{c2}$, and $900^{c3}$, so that these various components will move in successive discrete steps without aberrations which might result from the usual mechanical shortcomings of magnetic interrupter circuits. Accordingly, the relay $k^{10}$ may, for convenience, be referred to as a pulse generator relay.

The relay $k^{11}$ is a conventional motor-driven time-delay relay having a small driving motor 2600 which, when energized, drives a cam mechanism 2601 which, at the end of a time-delay interval, shifts a contactor 2602 out of circuit-making engagement with a contact 2603. The motor 2600 is energized through a hold-in switch 2604, a contactor 2605, and contact 2606, which are held in by a coil 2607. Incidentally, time-delay relay $k^{11}$ is conventional and, therefore, not specifically shown herein, but it is sufficient to note that the cam mechanism 2601 thereof is driven by a solenoid actuated clutch 2608 and is spring-biased so as to reset itself when the solenoid actuated clutch is disengaged responsive to dropping out of the coil 2607. The relay $k^{11}$ is electrically associated with the main power circuit to all of the light bulbs 62, and will hold such circuit closed for a predetermined interval of time unless the lights are sooner shut off by the insertion of another ticket T, the insertion of which will initiate a subsequent computing cycle even though the light-holding interval has not yet expired.

As will be seen by reference to FIG. 118-B, the six-bank digital stepper $900^a$ is shown with only five of its banks connected into the circuitry. The sixth bank (i.e. the switch $sw^{27}$) which is not used in connection with the present invention, has been reserved for use in connection with other possible adaptations of the present device. The digital stepper $900^a$ actually programs the computer device A through eleven successive modes of operation and automatically moves from one mode to the next as soon as each mode has concluded its particular function and, therefore, all eleven of its positions are used. Accordingly, the digital stepper $900^a$ may be referred to as the mode switch.

The circuitry also includes a single-pole, double-throw toggle "Day-Night" switch $sw^{138}$ and seven single-pole, single-throw "Day" switches $sw^{139}$, $sw^{140}$, $sw^{141}$, $sw^{142}$, $sw^{143}$, $sw^{144}$, $sw^{145}$, all having manually operable handles or knobs that are accessible from the front face of the rate module panel 1179, as best seen in FIG. 14. Imprinted on the face of the panel opposite the two alternative positions of the switch $sw^{138}$ are the notations "Day," "Night," and opposite the respective Day switches $sw^{139}$, $sw^{145}$, inclusive, are the abbreviations "Sun.," "Mon.," "Tues.," "Wed.," "Thurs.," "Fri.," "Sat." Mounted on the face of the time-comparator module panel 1176 is a simple "on-and-off" toggle switch $sw^{146}$ in series with the power line to the binary clock motor 1124 so that the latter may be shut off whenever it is necessary to set the binary clock 1100.

MODES OF OPERATION WITHIN A COMPUTING CYCLE

Figure 130:
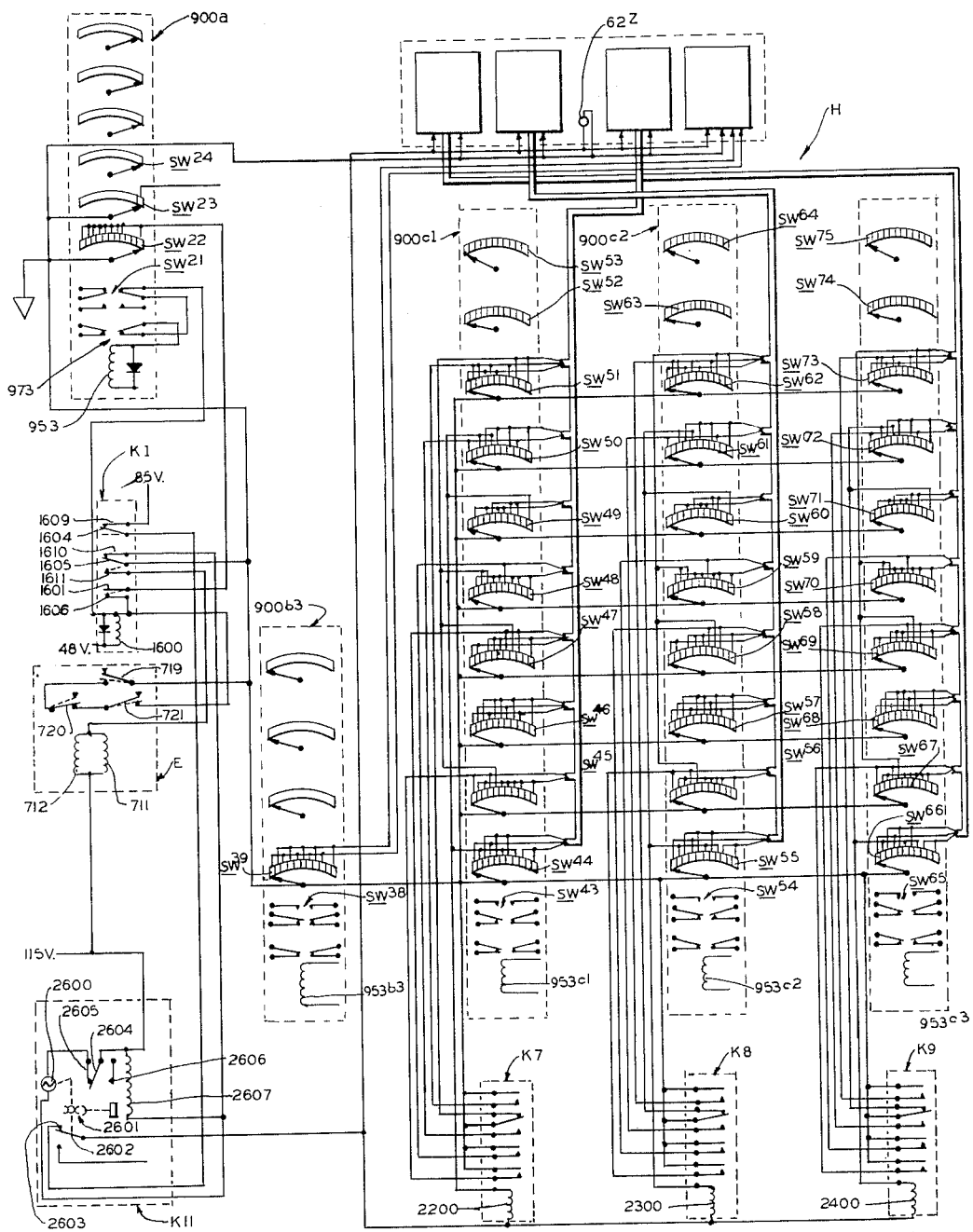

The digital stepper or mode switch $900^a$, as above noted, automatically causes the computer system to operate through eleven separate and successive operational sequences which are shown in FIGS. 120–130, inclusive, and may be designated as follows:

Mode 1. Reset (FIG. 120)
Mode 2. Grace Period (FIG. 121)
Mode 3. Minutes Counting (FIG. 122)
Mode 4. Preliminary Hours Charging (FIG. 123)
Mode 5. Final Hours Charging (FIG. 124)
Mode 6. Circuit Normalizing Interval (FIG. 125)
Mode 7. Days Charging (FIG. 126)
Mode 8. Weeks Charging (FIG. 127)
Mode 9. Preliminary Totalizer Correction (FIG. 128)
Mode 10. Final Totalizer Correction (FIG. 129)
Mode 11. Display (FIG. 130)

The circuitry has been redrawn to show only those circuit components which are operative in the particular mode. However, many of the components operate in several modes, and therefore, in many of the mode drawings, there will be elements which appear unconnected. This merely serves to indicate that such apparently unconnected elements are not used in the particular mode.

In the mode drawings (FIGS. 120 to 130, inclusive), the various coils will be referred to as having positive and negative terminals and the double-throw switches as having "normally open" and "normally closed" contacts. Moreover, all of the relays $k^1$ to $k^{11}$ are shown in de-energized position with each moving contactor deflected away from the relay-coil since this is the conventional method of illustration. However, the interrupter switches associated with the count-back steppers and the digital steppers are shown in de-energized position with each moving contactor deflected toward the coil which actuates it, since this is diagrammatically consistent with mechanical illustrations of such interrupters in FIGS. 66, 74, 81 and 91. The relays and interrupter switches are shown in such de-energized positions for the further reason that, with but few exceptions, the coils associated therewith actually are de-energized at the beginning of each mode and it is convenient to describe the changes in circuit-configuration from such initial condition. For the same reason, all homing switches (such as the switch $sw^{21}$, for example), are shown in the "normal position." On the other hand, the various cam-operated switches in the count-back steppers (such as the switch $sw^1$, for example), are shown in the position which they will assume at the end of the mode being illustrated, since this is a convenient way of indicating ultimate circuit-configuration toward which the operations in the mode are progressing.

For convenience is following the various sequences of operation within the various modes, the transliteral relation between various reference numerals and the switches or relays designed thereby is shown in the following indices:

*Table VII*

| | SWITCH INDEX | |
|---|---|---|
| Component | Nomenclature | Reference Numerals |
| 800a | Minutes countback stepper | $sw^1$ and $sw^2$ to $sw^6$, Incl. |
| 800b | Hours countback stepper | $sw^7$ and $sw^8$ to $sw^{12}$, Incl. |
| 800c | Days countback stepper | $sw^{13}$ and $sw^{14}$ to $sw^{16}$, Incl. |
| 800d | Weeks countback stepper | $sw^{17}$ and $sw^{18}$. |
| 800e | Minutes output | $sw^{19}$ and $sw^{20}$. |
| 900a | Mode switch (6 bank) | $sw^{21}$ and $sw^{22}$ to $sw^{27}$, Incl. |
| 900b1 | Units-counting stepper (4 bank) | $sw^{28}$ and $sw^{29}$ to $sw^{32}$, Incl. |
| 900b2 | Tens-counting stepper (4 bank) | $sw^{33}$ and $sw^{34}$ to $sw^{37}$, Incl. |
| 900b3 | Nickels-charging stepper (4 bank) | $sw^{38}$ and $sw^{39}$ to $sw^{42}$, Incl. |
| 900c1 | Dimes-charging stepper (10 bank) | $sw^{43}$ and $sw^{44}$ to $sw^{53}$, Incl. |
| 900c2 | Dollars-charging stepper (10 bank) | $sw^{54}$ and $sw^{55}$ to $sw^{64}$, Incl. |
| 900c3 | Ten-Dollars-Charging stepper (10 bank) | $sw^{65}$ and $sw^{66}$ to $sw^{75}$, Incl. |
| 1045 | Rate-Set Switch (4 bank) | $sw^{76}$ to $sw^{79}$, Incl. |
| 1045′ | do | $sw^{80}$ to $sw^{83}$, Incl. |
| 1090 | Rate-Set Switch (2 bank) | $sw^{84}$ and $sw^{85}$. |
| 1091 | do | $sw^{86}$ and $sw^{87}$. |
| 1092 | do | $sw^{88}$ and $sw^{89}$. |
| 1093 | do | $sw^{90}$ and $sw^{91}$. |
| 1094 | do | $sw^{92}$ and $sw^{93}$. |
| 1095 | do | $sw^{94}$ and $sw^{95}$. |
| 1096 | do | $sw^{96}$ and $sw^{97}$. |
| 1097 | do | $sw^{98}$ and $sw^{99}$. |
| 1098 | Rate-Set Switch (1 bank) | $sw^{100}$. |
| 1139 | Binary Clock Disk: Contact-Ring 1155 Contact-Fingers 155a, 1155b, 1155c, 1155d, | $sw^{101}$. |
| | Contact-Ring 1156 Contact-Fingers 1156a, 1156b, 1156c, 1156d, | $sw^{102}$. |
| | Contact-Ring 1157 Contact-Fingers 1157a, 1157b, 1157c, 1157d, | $sw^{103}$. |
| | Contact-Ring 1158 Contact-Fingers 1158a, 1158b, 1158c, 1158d, | $sw^{104}$. |
| | Contact-Ring 1159 Contact-Fingers 1159a, 1159b, 1159c, 1159d, | $sw^{105}$. |
| | Contact-Ring 1160 Contact-Fingers 1160a, 1160b, 1160c, 1160d, | $sw^{106}$. |
| 1147 | Contact-Ring 1166 Contact-Fingers 1166a, 1166b, 1166c, 1166d, | $sw^{108}$. |
| | Contact-Ring 1167 Contact-Fingers 1167a, 1167b, 1167c, 1167d, | $sw^{109}$. |
| | Contact-Ring 1168 Contact-Fingers 1168a, 1168b, 1168c, 1168d, | $sw^{110}$. |
| | Contact-Ring 1169 Contact-Fingers 1169a, 1169b, 1169c, 1169d, | $sw^{111}$. |
| | Contact-Ring 1170 Contact-Fingers 1170a, 1170b, 1170c, 1170d, | $sw^{112}$. |
| 1154 | Contact-Ring 1171 Contact-Fingers 1171a, 1171b, 1171c, 1171d, | $sw^{114}$. |
| | Contact-Ring 1172, Contact-Fingers 1172a, 1172b, 1172c, 1172d, | $sw^{115}$. |
| | Contact-Ring 1173 Contact-Fingers 1173a, 1173b, 1173c, 1173d, | $sw^{116}$. |
| | Contact-Ring 1174 Contact-Fingers 1174a, 1774b, 1174c, 1174d, | $sw^{117}$. |
| | Contact-Ring 1175 Contact-Fingers 1175a, 1175b, 1175c, 1175d, | $sw^{118}$. |
| 1149 | Special day-rate, 1180a–1187a, inclusive. | $sw^{119}$. |
| | Reset Switch | $sw^R$. |
| $k^2$ | Rate Selection Relay | $sw^{120}$–$sw^{130}$, Incl. |

Truth Circuit Switches

| Switch | Moving Contactors | Toggle Handle | Stanionary Contact |
|---|---|---|---|
| $sw^{131}$ | 1701 1702 | 1709 | 1713, 1714 1715, 1716 |
| $sw^{132}$ | 1703 1704 | 1710 | 1717, 1718 1719, 1720 |
| $sw^{133}$ | 1705 1706 | 1711 | 1721, 1722 1723, 1724 |
| $sw^{134}$ | 1707 1708 | 1712 | 1725, 1726 1727, 1728 |
| $k^4$ | Initial hours charge-sensing relay. | | $sw^{135}, sw^{136}, sw^{237}$. |

*Table VII*—Continued

Reader Micro-Switches

| Binary Orders | Minutes | Hours | Days | Weeks |
|---|---|---|---|---|
| 1 | 678 | 683 | 698 | 701 |
| 2 | 679 | 684 | 699 | 702 |
| 4 | 680 | 685 | 700 | |
| 8 | 681 | 686 | | |
| 16 | 682 | 687 | | |

Relay Index

| Nomenclature | Reference Numerals |
|---|---|
| Reader Relay | $k^1$ |
| Rate-Differentiating Relay | $k^2$ |
| Charge-Progressive Relay | $k^3$ |
| Initial Hours Charge Sensing Relay | $k^4$ |
| Maximum Charge Relay | $k^5$ |
| Random-Minimum Unit Relay | $k^6$ |
| Charge-Display Relay (Dimes) | $k^7$ |
| Charge-Display Relay (Dollars) | $k^8$ |
| Charge-Display Relay (Ten Dollars) | $k^9$ |
| Pulse Generator Relay | $k^{10}$ |
| Time Delay Relay | $k^{11}$ |

MODE 1—RESET MODE

Figure 120:
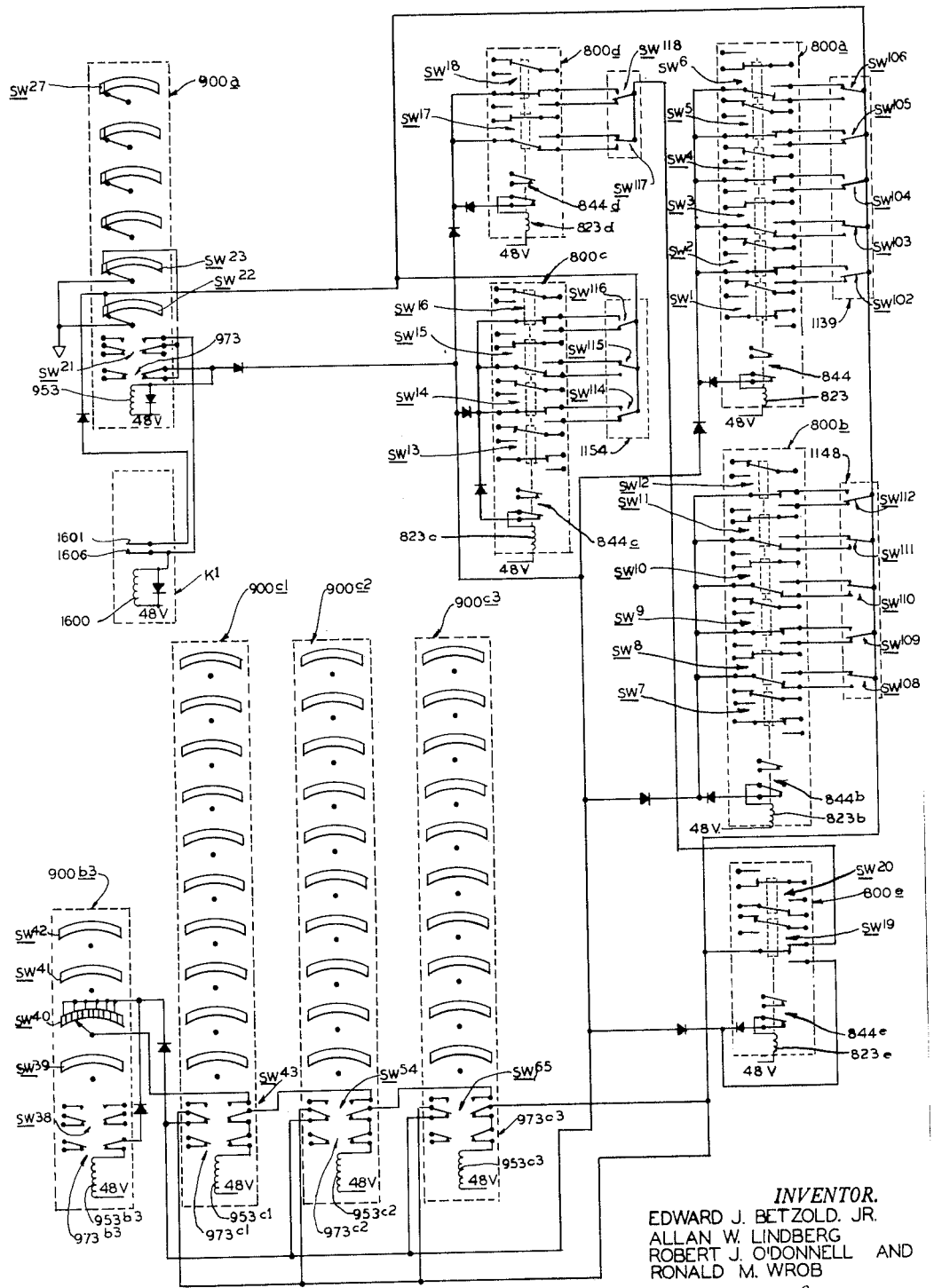

This mode, as diagrammatically shown in FIG. 120, is the first stage of operation of the circuitry in each computing cycle and is initiated by insertion of the ticket T into the ticket-receiving slot 317′. As it is inserted into the ticket chamber 613, the inner transverse margin of the ticket T will contact the slide 627 and, by pushing it rearwardly, close the micro-switch 719. Assuming that the ticket T has previously been punched in the ticket-reading module D and issued to a customer, such ticket T will contain a semi-circular notch or so-called lot idenification notch $n^2$ along its inwardly inserted transverse margin in a unique position so as to clear the so-called lot identification slide 728 and leave the lot identification micro-switch 720 unactuated. As will be seen by reference to FIG. 43, it may be assumed that the particular ticket T under discussion does not have a second lot identification notch and, therefore, the unnotched portion of its inwardly inserted transverse edge will abut against and shift the slide bar 729 rearwardly to actuate the micro-switch 721. For this particular configuration, the micro-switch 720 is wired in normally closed position and the micro-switch 721 is wired in normally open position, so that the insertion of the proper ticket T (that is to say, a ticket issued by the ticket punching module D associated with this particular ticket-reading module E into which the ticket T has now been inserted) will cause circuits to be simultaneously closed in series through the two micro-switches 720, 721. If the ticket T which happens to be inserted does not have a lot identification notch $n^1$ in the proper position, this circuit will not be closed and the entire device will remain inoperative. By this means, the ticket-reading module E is capable of discriminating between tickets properly issued by the ticket-punching module D with which it is associated, so that if, by accident or for and other reason, a customer returns a ticket to the wrong parking-lot, this ticket will immediately be identified. It will, of course, be obvious that by changing the wiring of the micro-switches 720, 721, and shifting the punches so that the lot identification notch $n^2$ will be in the position shown in dotted lines in FIG. 43, it is possible to uniquely identify the parking-lot computer device A with another and different parking-lot. Similarly, by modifying the wiring configuration of the micro-switches 720, 721, and either punching two such notches or omitting them entirely, it is possible to achieve two other unique combinations which can be asigned to two other parking-lots. These four combinations (if needed) can be assigned to four parking-lots which are located in proximity to each other within an urban area to prevent accidental interchange of parking tickets between near-by parking-lots. In general practice, it has been found that only three such combinations are needed to cover most geographical situations which ordinarily are encounered, namely, with a lot identification notch $n^2$ located in one or the other of its alternative positions and with the use of two lot identification notches $n^2$. It will, of course, be evident, in this connection, that if several parking-lot computer devices are installed on parking-lots in extremely congested areas, so that more than three or four parking-lots are thus equipped, it is possible to render a larger number of parking-lot computer devices A unique with respect to each other by varying the dimensional positions of the lot identification notches, so that they will not affect any coded positions along the inserted transverse margin of the ticket T. It is also possible to build the ticket-reading module E with a larger number of micro-switches and slide bars, such as the micro-switches 720, 721, and slide bars 728, 729. If, for instance, three lot identification micro-switches are used, eight unique combinations can be achieved, and, similarly, with four lot identification micro-switches, sixteen unique combinations can be achieved.

The insertion of a proper ticket T into the ticket chamber 613 will also actuate the micro-switch 719, which, in turn, closes the reader relay $k^1$, which, upon closure, completes a circuit to the solenoids 711, 712, causing the frame plate 650 and its associated structure to shift downwardly into ticket-reading position, and the ticket will be "read" in the manner previously described. In other words, the configuration of the fifteen rod-like feelers 657–671, inclusive, and the micro-switches associated therewith 678–687, inclusive, and 698–702, inclusive, will be changed to reflect "time then," as represented by the binarily coded punch-holes which happen to be in the ticket T. Similarly, the time-delay relay $k^{11}$ is pulled open and reset. If this occurs quite some time after the preceding computing cycle has been concluded, the various light bulbs 62, which had been lighted at the conclusion of such preceding computing cycle, will have been turned off as a function of the normal lapse of time. However, when the time-delay relay $k^{11}$ turns off the light bulbs 62, as a result of its conventional time-delay function, it will remain in cocked position and its driving motor 2600 will remain energized. Incidentally, such motor-driven time-delay relays are conventionally provided with some kind of clutching arrangement so that the motor is de-clutched at the end of the time interval for which the relay is designed. This mechanical arrangement, being entirely conventional, is not shown or described herein. However, it probably should be noted, at this point, that manufacturers of conventional motor-driven time-delay relays recommend that the motors be allowed to run continuously except for short intervals during which other circuitry-functions are being carried out for the reason that such devices seem to function better when allowed to operate in this manner. Consequently, one of the functions of the reader relay $k^1$ is to pull out the time-delay relay $k^{11}$ so as to momentarily shut off its motor and otherwise reset all of its mechanical parts to initial position.

The above-described functions of the reader relay $k^1$, namely, the energizing of the solenoids 711, 712, and resetting of the time-delay relay $k^{11}$ are merely preliminary or preparatory functions which do not actually enter into Mode 1, but rather are antecedent thereto. Therefore, the circuitry between the reader relay $k^1$ and the solenoids 711, 712, and between the reader relay $k^1$ and the time-delay relay $k^{11}$ are not shown in FIG. 118, but are merely indicated by verbal legends.

Upon closing, the reader relay $k^1$ also closes the circuit to the coil 953 of the mode-switch 900$^a$, advancing it into the first contact position on all six banks of contacts therein. As will be seen by reference to FIG. 120, two contacts 1001, namely, those in the first and second banks, of mode-switch 900$^a$ are operative in Mode 1. When the circuits are closed through these two contacts 1001, the ten-bank digital stepper 900$^{c3}$ (which may be referred to as the "ten-dollars charging stepper") is reset to zero position and immediately thereafter, in successive order, the digital stepper 900$^{c2}$ (which may be referred to as the "dollars charging stepper") and the digital stepper 900$^{c1}$ (which may be referred to as the "dimes charging stepper") are reset to zero positions.

Finally, the four-bank digital stepper 900$^{b3}$ (which was designated as the "nickels charging stepper") is stepped to the nearest even position. As may be seen by reference to FIG. 118, this latter function occurs by reason of the fact that in the bank of contact-fingers 1032 (which is operative in Mode 1) only the odd contact-fingers are wired to ground and the even contact-fingers are left without any connection. Hence, the even contact-fingers act as homing contacts.

While the several digital steppers 900$^a$, 900$^{b3}$, 900$^{c1}$, 900$^{c2}$, and 900$^{c3}$ are being reset to zero as above described, the minutes count-back steppers 800$^a$, the hours count-back stepper 800$^b$, and the days count-back stepper 800$^c$ are simultaneously being reset, from the positions at which they respectively stopped upon conclusion of the previous computation cycle, to "time now" as established through the binary clock 1100 by finding coincidence with the circuit configuration which happens to be established at that particular interval of chronological time by the binary clock 1100. It will be recalled that the binary clock 1100 has printed circuitry on its three disks 1139, 1147, and 1154, which, in effect, constitute fifteen single-pole double-throw switches which, for convenience, have been identified in FIGS. 120–130, inclusive as $sw^{102}$, $sw^{103}$, $sw^{104}$, $sw^{105}$, $sw^{106}$, $sw^{107}$, $sw^{108}$, $sw^{109}$, $sw^{110}$, $sw^{111}$, $sw^{112}$, $sw^{114}$, $sw^{115}$, $sw^{116}$, $sw^{117}$, $sw^{118}$. Five of those switches, namely, switches $sw^{102}$ to $sw^{106}$, inclusive, in different configurations, represent binarily coded minutes-intervals, each having a duration equivalent to two and one-half chronological minutes. Five of these switches, namely, switches $sw^{108}$ to $sw^{112}$, inclusive, represent binarily coded hours-intervals, each having a duration equal to one chrolongical hour. Three of these switches, namely, switches $sw^{114}$, $sw^{115}$, and $sw^{116}$, represent binarily coded days-intervals, each having a duration equal to one chrolongical day, and, finally, two of these switches, namely, switches $sw^{117}$ and $sw^{118}$ represent binarily coded weeks-intervals each having a duration of one chronological week.

For purposes of describing the operation of these various "coincidence-finding" circuits, it may be assumed that the ticket T, which is inserted into the ticket-reading module E to initiate the particular computation cycle here under discussion, is that particular ticket T which is shown in FIG. 43, namely, a ticket which was punched out during the first two-and-one-half minutes-interval of the first day of the first week in the month, namely, at 12:01 a.m. on Sunday of such first week. It may also be assumed that this ticket T has been returned to the parking-lot and has been inserted in the ticket-reading module E during the fifteenth two-and-one-half minutes-interval of the tenth hour on the third day of the second week in the month, namely, at 9:36 a.m. on Tuesday morning of such second week (see Tables I, II, III, and IV). Accordingly, the binary clock circuits are shown in FIG. 120 in the particular configuration corresponding to this assumed "time now." It will, of course, be recalled that the computer device A, in order to simplify explanation, has been assumed to operate on a four-weekly basis without regard to calendar months. If, for example, the month of March happens to commence on a Wednesday, then, of course, the first Sunday in March would be March 5th and the calendar week extending from March 5th to March 11th would be treated in the computer device A as the first week, the first four days in March being treated as the last four days of the fourth week in February. It is possible to set up the computer device A in such a manner that it will operate on a strict calendar-month basis, but this is ordinarily not necessary for practical purposes. On most parking-lots, the most common type of transaction is one which covers a period of a few hours on a single day. A certain percentage of the transactions may involve a parking period which extends over several days, and a very limited number of transactions will involve periods extending over several weeks. However, surveys made of parking-lot operations indicate, as previously stated that a parking-lot transaction extending over a period which exceeds four weeks is so rare that is unnecessary to provide circuitry covering such extremely infrequent transactions.

As previously pointed out, the minutes count-back stepper 800$^a$, once it has been energized, will continue to step itself around through successive positions in which its micro-switches $sw^2$, $sw^3$, $sw^4$, $sw^5$, and $sw^6$, will open and close in various sequences conforming to the binary coding system. When the switches $sw^2$, $sw^3$, $sw^4$, $sw^5$, and $sw^6$, are in off-normal position (i.e., whenever the respective cam-following fingers 872$^b$, 872$^c$, 872$^d$, 872$^e$, and 872$^f$ are in contact with high points on the respective cam-disks 811, 812, 813, 814, and 815), they may be said to be in so-called "O-position" and, on the other hand, when the switches $sw^2$, $sw^3$, $sw^4$, $sw^5$, $sw^6$ are in normal position (i.e. whenever the cam-following fingers 872$^b$, 872$^c$, 872$^d$, 872$^e$, and 872$^f$ are on low points of the respective cam disks 811, 812, 813, 814, and 815), they may be said to be in so-called "X-position." It should be parenthetically noted, in this connection, that, since the switches $sw^2$, $sw^3$, $sw^4$, $sw^5$, $sw^6$ are all, in electrical effect, double-pole, double-throw switches, some of the circuits through each of the switches $sw^2$, $sw^3$, $sw^4$, $sw^5$, and $sw^6$, will be open in the "O-position" while other circuits will be closed in the "O-position," and, contrariwise, when these switches $sw^2$, $sw^3$, $sw^4$, $sw^5$, and $sw^6$, are in the "X-position," the circuits, which were closed in the "O-position," will be open and the circuits, which were open in the "O-position," will be closed. In other words, the terms "O-position" and "X-position" are not intended to identify either open or closed positions of various contacts and contactors within the switches $sw^2$, $sw^3$, $sw^4$, $sw^5$, and $sw^6$, but, rather, to correlate with Tables I, II, III, IV, and V.

Whenever a circuit is closed, through the first contact position on the mode switch $900^a$, to the interrupter switch 844 of the minutes count-back stepper $800^a$, the coil 823 thereof will become energized and will pull back the armature-plate 831, thereupon momentarily opening the circuit through the interrupter switch 844. When this occurs, the coil 823 will release the armature-plate 831, allowing the pawl-lever 832 and cocked pawl 834 to swing back, causing the minutes count-back stepper $800^a$ to advance one step. If current continues to be applied across the interrupter switch 844, then, of course, the minutes count-back stepper $800^a$ will continue to step itself incrementally. Since the minutes count-back stepper $800^a$ counts back, so to speak, as its name implies, the cam-disks 811–815, inclusive, will, during rotation, move through the various positions in descending order. In other words, the cam-disks 811–815, inclusive, will move into position fifteen, for instance, from position sixteen, will next move from such position fifteen to the position fourteen and so on down progressively toward the position one. If the circuit to the interrupter switch 844 still remains closed as the cam-disks 811–815, inclusive, pass through the position one, then the cam-disk 810 which moves with the other cam-disks 811–815, inclusive, will actuate the switch $sw^1$ and cause the minutes count-back stepper $800^a$ to step automatically through the next eight steps (i.e. positions thirty-two to twenty-five, inclusive) and go directly to position twenty-four.

By reference to FIG. 120, it will be seen that the interrupter switch 844 is connected to a lead which is common to one of the moving blades in each of the switches $sw^2$, $sw^3$, $sw^4$, $sw^5$, and $sw^6$, which blades respectively operate between pairs of contact-points that are, in turn, paralleled with the pairs of stationary contact-points of the switches $sw^{102}$, $sw^{103}$, $sw^{104}$, $sw^{105}$, $sw^{106}$. The switches $sw^{102}$, $sw^{104}$, $sw^{105}$, are in the O-position and the switches $sw^{103}$, $sw^{106}$, are in the X-position, which follows the O–X–O–O–X configuration associated with the fifteenth column in the minutes cam patterns table (Table V). This column corresponds to the fifteenth interval, which, of course, is the minutes interval in which the thirty-fourth minute of the hour occurs (this being the minutes components of "time-now," i.e. 9:36 a.m.). It will also be noted that the blade-forming elements of the switches $sw^{102}$, $sw^{103}$, $sw^{104}$, $sw^{105}$, $sw^{106}$ are connected in common to ground through the mode-switch $900^a$ in Mode 1. Consequently, the interrupter switch 844 of the minutes count-back stepper $800^a$ will, during Mode 1, be connected to ground through one or more of the blades of the switches $sw^2$, $sw^3$, $sw^4$, $sw^5$, and $sw^6$, and the coil 823 will accordingly be energized in continuously succeeding discrete increments so that the stepping action thereof will be continuous until the cam-disks 811, 812, 813, 814, and 815 have simultaneously rotated around to the position fifteen. In position fifteen, and only position fifteen, the switches $sw^2$, $sw^4$, $sw^5$ will be in the O-position at the same time that the switches $sw^3$, $sw^6$, are in the X-position, thereby reaching a circuit-configuration identical with the "time now" circuit-configuration of the switches $sw^{102}$, $sw^{103}$, $sw^{104}$, $sw^{105}$, $sw^{106}$. In other words, at position fifteen, the minutes count-back stepper $800^a$ may be said to have found coincidence with the minutes coding circuits on the binary clock 1100, and, as may be seen by reference to FIG. 120, in this position all five circuits through the binary clock 1100 to ground will be open. Consequently, the minutes count-back stepper $800^a$ will come to a stop at position fifteen.

At the same time that the minutes count-back stepper $800^a$ is finding coincidence with the minutes circuitry of the binary clock 1100, the hours count-back stepper $800^b$ will find coincidence with the hours circuitry of the binary clock 1100 in precisely the same manner. By reference to FIG. 120, it will be seen that the interrupter switch $844^b$ is connected to a lead which is common to one of the moving blades in each of the swtiches $sw^8$, $sw^9$, $sw^{10}$, $sw^{11}$ and $sw^{12}$, which blades respectively operate between pairs of contact-points that are, in turn, paralleled with the pairs of stationary contact-points of the switches $sw^{108}$, $sw^{109}$, $sw^{110}$, $sw^{111}$, $sw^{112}$. The switches $sw^{109}$, $sw^{111}$, are in the O-position and the switches $sw^{108}$, $sw^{110}$, $sw^{112}$ are in the X-position, which follows the X–O–X–X–O configuration associated with the tenth column in the hours cam patterns table (Table V). This column corresponds to the tenth interval, which, of course, is the hours interval in which the tenth hour of the day occurs (this being the hours component of "time-now," i.e. 9:36 a.m.). It will also be noted that the blade-forming elements of the switches $sw^{108}$, $sw^{109}$, $sw^{110}$, $sw^{111}$, $sw^{112}$ are connected in common to ground through the mode-switch $900^a$ in Mode 1. Consequently, the interrupter switch $844^b$ of the minutes count-back stepper $800^b$ will, during Mode 1, be connected to ground through one or more of the blades of the switches $sw^8$, $sw^9$, $sw^{10}$, $sw^{11}$, and $sw^{12}$, and the coil $823^b$ will accordingly be energized in continuously succeeding discrete increments so that the stepping action thereof will be continuous until the cam-disks 881, 882, 883, 884, 885, have simultaneously rotated around to the position ten. The hours count-back stepper $800^b$ counts back in the same manner as previously described in connection with the minutes count-back stepper $800^a$. Therefore, in position ten, and only in this position ten, the switches $sw^9$, $sw^{11}$ will be in the O-position at the same time that the switches $sw^8$, $sw^{10}$, $sw^{12}$ are in the X-position, thereby reaching a circuit configuration identical with the "time-now" circuit-configuration of the switches $sw^{108}$, $sw^{109}$, $sw^{110}$, $sw^{111}$, $sw^{112}$. In other words, at position ten, the minutes count-back stepper $800^b$ may be said to have found coincidence with the minutes coding circuits on the binary clock 1100, and, as may be seen by reference to FIG. 120, in this position all five circuits through the binary clock 1100 to ground will be open. Consequently, the minutes count-backer stepper $800^b$ will come to a stop at position ten.

At the same time that the minutes count-back stepper $800^a$ and hours count-back stepper $800^b$ are finding coincidence with the minutes and hours circuitry of the binary clock 1100, the days count-back stepper $800^c$ will find coincidence with the days circuitry of the binary clock 1100 in precisely the same manner. By reference to FIG. 120, it will be apparent that the interrupter switch $844^c$ is connected to a lead which is common to one of the moving blades in each of the switches $sw^{14}$, $sw^{15}$, $sw^{16}$, which blades respectively operate between pairs of contact-points that are, in turn, parallel with the pairs of stationary contact-points of the switches $sw^{114}$, $sw^{115}$, $sw^{116}$. The switches $sw^{114}$, $sw^{116}$ are in the O-position and the switch $sw^{115}$ is in the X-position which follows the O–X–O configuration associated with the third column in the days cam patterns table (Table V). This column corresponds to the third interval, which, of course, is the days-interval corresponding to the third day of the week (this being the days component of "time-now," i.e. Tuesday).

The blade-forming components of the switches $sw^{114}$, $sw^{115}$, $sw^{116}$ are connected in a common to ground through the mode switch $900^a$ in Mode 1. Consequently, the interrupter switch $844^c$ of the days count-back stepper will, during Mode 1, be connected to ground through one or more of the blades of the switch $sw^{14}$, $sw^{15}$, $sw^{16}$, and the coil $823^c$ will be energized in continuously succeeding discrete increments so that the stepping action thereof will be continuous until the cam-disks 891, 892, 893 have simultaneously rotated around to position three. The days count-back stepper $800^c$ counts back in the same manner as previously described in connection with the minutes count-back stepper $800^a$ and hours count-back stepper $800^b$. Therefore, in position three, and only in position three, the switches $sw^{14}$, $sw^{16}$ will be in the O-position at the same time that the switch $sw^{15}$ is in X-position, thereby reaching a circuit-configuration identical with the "time-now" circuit configuration of the switches $sw^{114}$, $sw^{115}$, $sw^{116}$. In other words, at position three the days count-back stepper $800^c$ may be said to have found coincidence with the days coding circuits on the binary clock 1100 and, as may be seen by reference to FIG. 120, in such position all three circuits through the binary clock 1100 to ground will be open. Consequently, the days count-back stepper $800^c$ will come to a stop at position three.

At the start of Mode 1, the switches $sw^{19}$, $sw^{20}$ of the minutes output stepper may possibly be in the position shown in dotted lines in FIG. 120. In such instance, the interrupter switch $844^e$ and coil $823^e$ will be connected to ground through switch $sw^{20}$ and the minutes output stepper will step itself around until its switches $sw^{19}$, $sw^{20}$ shift into the configuration shown in full lines in FIG. 120, whereupon the connection through the coil $823^e$ and interrupter switch $844^e$ will be broken and the minutes output stepper will come to a stop. If, on the other hand, at the start of Mode 1, the minutes output stepper is already in the position shown in full lines in FIG. 120, then the coil $823^e$ and interrupter switch $844^e$ will not be connected to ground and the minutes output stepper will not move.

It will be noted, however, that, in Mode 1, the interrupter switch $844^d$ of the weeks count-back stepper $800^d$ is connected to a lead which is common to one of the moving blades in each of the switches $sw^{17}$, $sw^{18}$, which blades respectively operate between pairs of contact-points that are, in turn, paralleled with the pairs of stationary contact-points of the switches $sw^{117}$, $sw^{118}$. The switch $sw^{117}$ is in the X-position and the switch $sw^{118}$ is in the O-position which follows the X-O configuration associated with the second column in the weeks cam patterns table (Table V). This column corresponds to the second interval, which, of course, is the weeks interval corresponding to the second week of the month (this being the weeks component of "time-now").

The blade-forming components of the switches $sw^{117}$, $sw^{118}$ are connected in common to ground through the minutes output stepper $800^e$ and the mode switch $900^d$ when the switch $sw^{20}$ is in the position shown in full lines in FIG. 120. Therefore, when the minutes output stepper $800^e$ reaches the configuration shown in full lines in FIG. 120 (or if it is already in such configuration), the interrupter switch $844^d$ of the days count-back stepper will, during Mode 1, be connected to ground through either or both of the blades of the switches $sw^{17}$, $sw^{18}$, and the coil $823^d$ will be energized in continuously succeding discrete increments so that the stepping action thereof will be continuous until the cam-disks 894, 895, have simultaneously rotated around to position two. As will be noted by reference to the weeks cam patterns table (Table V), only four positions are needed to binarily code the four weeks forming the months accounting period of the computer device A. Hence, in the thirty-two steps of cam-disks 894, 895, this four-step pattern simply repeats itself eight times.

The weeks count-back stepper $800^d$ counts back in the same manner as previously described in connection with the minutes count-back stepper $800^a$ and hours count-back stepper $800^b$. Therefore, in position two, and only in position two, the switch $sw^{17}$ will be in the X-position at the same time that the switch $sw^{18}$ is in O-position, thereby reaching a circuit-configuration identical with the "time-now" circuit configuration of the switches $sw^{117}$, $sw^{118}$. In other words, at position two, the weeks count-back stepper $800^d$ may be said to have found coincidence with the weeks coding circuits on the binary clock 1100 and, as may be seen by reference to FIG. 120, in such position both circuits through the binary clock 1100 to ground will be open. Consequently, the days count-back stepper $800^d$ will come to a stop at position two.

Figure 121:
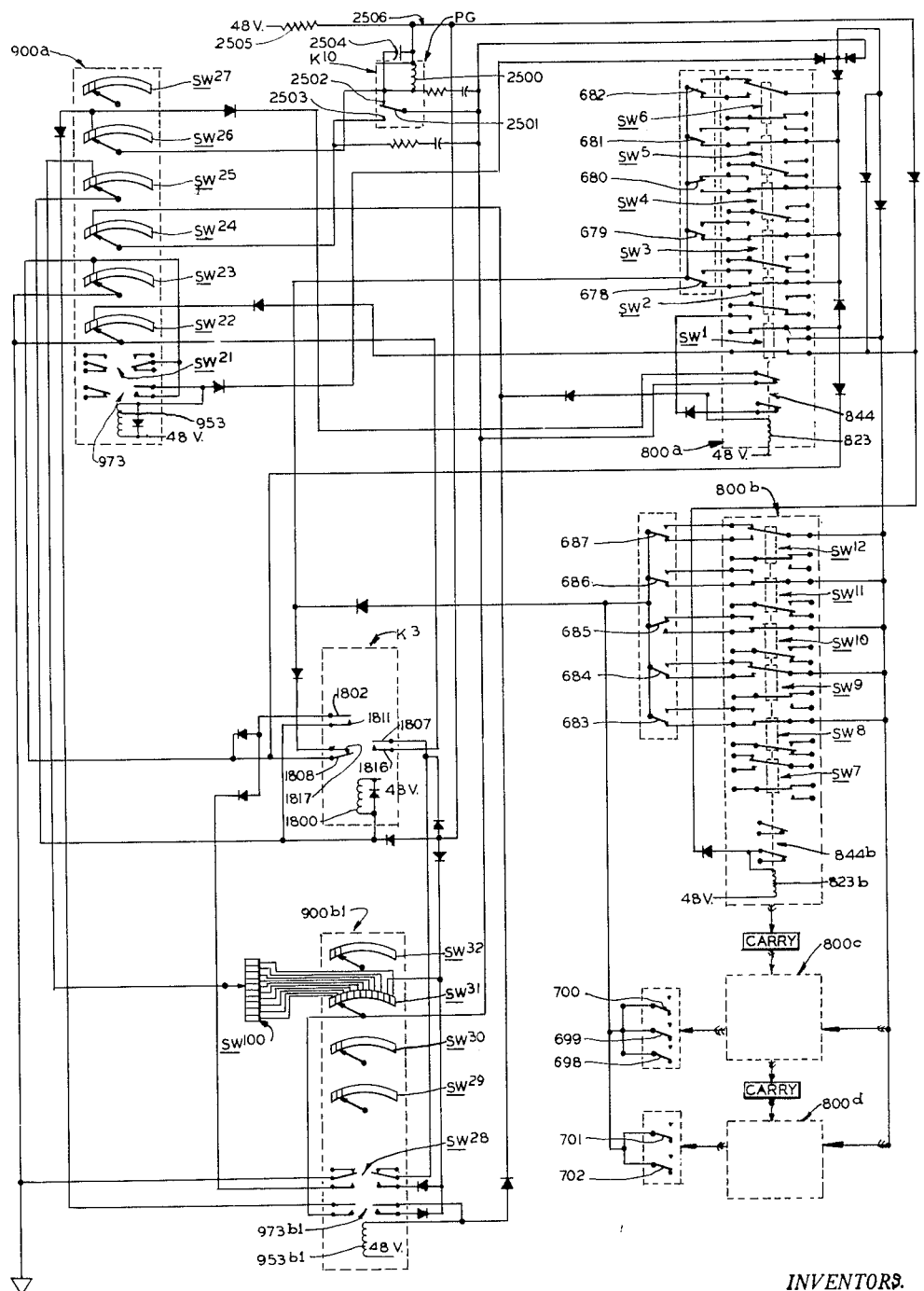
Figure 122:
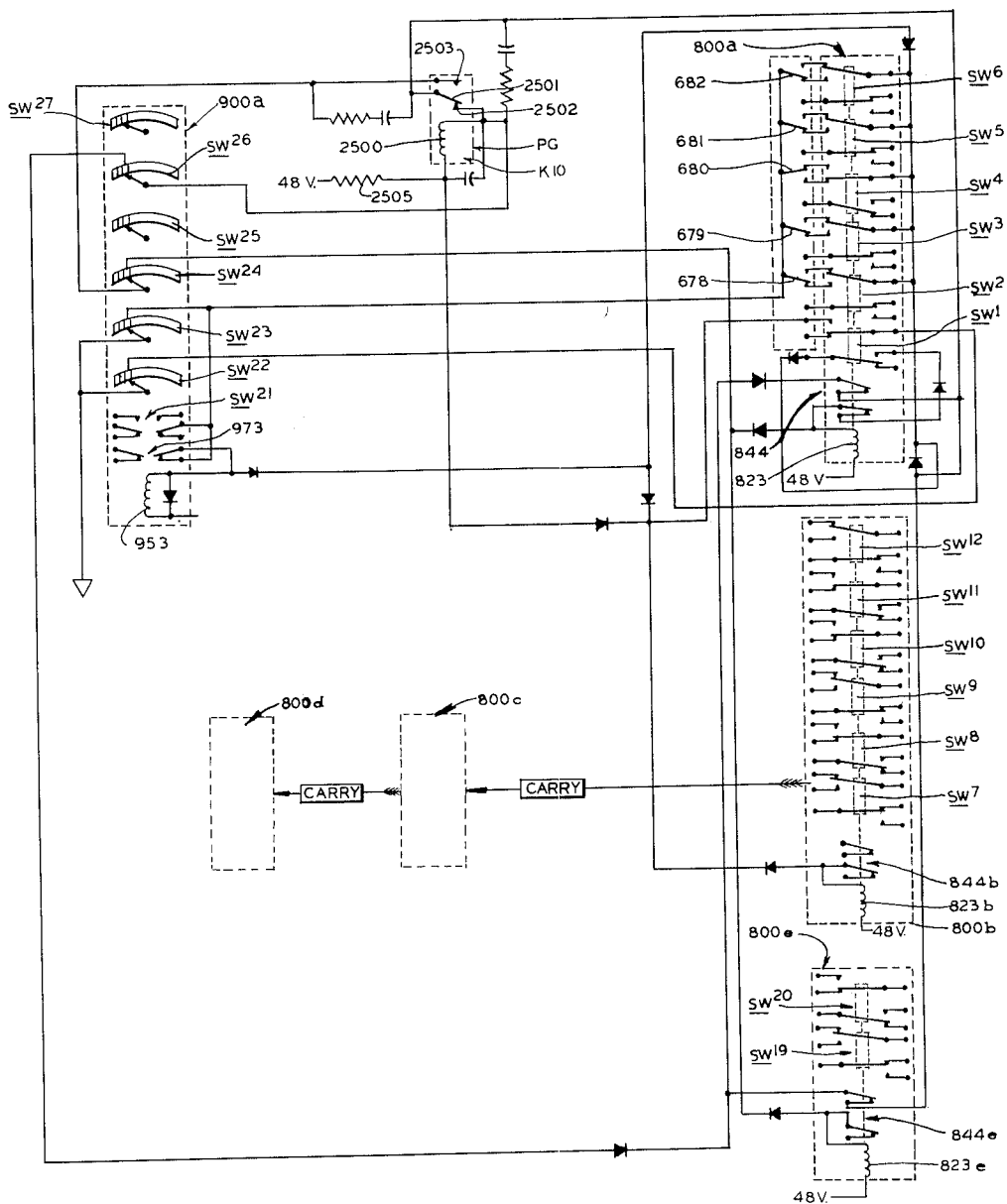

During Mode 1, the coil $953^a$ of the mode switch $900^a$ is connected to ground by a number of parallel leads through all of the steppers $800^a$, $800^b$, $800^c$, $800^d$, $800^e$, $900^{b3}$, $900^{c1}$, $900^{c2}$, $900^{c3}$. Therefore, as long as any one of the steppers $800^a$, $800^b$, $800^c$, $800^d$, $800^e$ is still connected to ground, the mode switch $900^a$ will hold in at position one. However, as soon as all the steppers $800^a$, $800^b$, $800^c$, $800^d$, $800^e$ reach ground and stop, all connections between the mode switch $900^a$ and ground will be open and the coil will drop out, allowing the mode switch $900^a$ to move into position two, thereby changing the circuit-configuration to Mode 2, as shown in FIG. 121.

As will be seen by reference to FIG. 120, in Mode 1, the interrupter switch $973^a$ of the mode switch $900^a$ is open. Prior to Mode 1 (see Mode 11, FIG. 130), this interrupter switch $973^a$ is closed. Hence, if, by any chance, all of the steppers $800^a$, $800^b$, $800^c$, $800^d$, $800^e$, happen to be at coincidence when the mode switch $900^a$ goes into Mode 1, the circuits to ground through the interrupter $973^a$ will cause the coil $953^a$ to pull in momentarily and move the mode switch $900^a$ directly through Mode 1 and into Mode 2.

MODE 2—GRACE PERIOD MODE

The application of the computer system of the present invention to parking lot transactions involves two problems which are partially or entirely resolved in Mode 2. The principal problem, and one which is entirely resolved in Mode 2, is the allowance of a grace period. It should be understood, of course, that many parking lots will not be confronted with the need for including a grace period in the rate structure inasmuch as the legal requirement pertaining to grace period is not in existence everywhere. However, a very large percentage of parking lot operators include a grace period in the rate structure as a matter of good public relations, even though not required by law to do so. Consequently, it is highly desirable that the computer device A have the capability of handling a rate structure including a grace period.

Since the allowance of a grace period requires the automatic deduction of a pre-selected increment of time so that such increment will not be included in the computation of monetary charges, it is also possible in Mode 2 to deduct automatically an additional constant increment of time and thereby establish a condition which, in a subsequent mode, will materially simplify the charging-logic of the computer device A in computing half-hourly charges to whatever extent the selected rate structure requires such computations. Inasmuch as the computer device A operates in terms of 2½ minute increments, both the grace period and the constant increment deducted for simplification of charging-logic must be either 2½ minutes or a multiple thereof. For purposes of explanation herein it may, therefore, be assumed that the grace period is ten minutes and the constant increment is 2½ minutes.

As will be seen by reference to FIG. 121, the one-bank rate-set switch 1098 is wired so that, in Mode 2, its ten positions are connected in parallel to the ten positions of the switch $sw^{31}$ of the units count-back stepper $900^{b1}$. Moreover, the first or so-called "zero" position is connected to the first position of the switch $sw^{31}$, so that even in the absence of a grace period at least one increment of time will be automatically deducted from the minutes count-back stepper $800^a$ in Mode 2. However, in the example which has been selected for explanatory purposes herein, the grace period is ten minutes and, consequently the rate switch $sw^{100}$ will be manually rotated into its fifth position in which the literal designation "10 minutes" will be visible from the front of the channel 1179 when the door 11 is open.

In the initial circuit configuration of Mode 2, the moving contactor 2501 of the pulse generator PG is in engagement with the contact 2502 and the various switching elements connected to the alternative lead 2506 are open so the positive terminal of the coil 2500 will be at positive potential. This contactor 2501 is connected in parallel to the minutes count-back stepper 800ª, hours count-back stepper 800ᵇ, days count-back stepper 800ᶜ, and weeks count-back stepper 800ᵈ, which are, in turn, connected in series with the switches 678–702, inclusive, of the ticket-reading module E, and these switches are connected in common, through the charge-progression relay $k^3$, to ground. Since the presumed "time now" is chronologically later than the presumed "time then," none of the count-back steppers 800ª, 800ᵇ, 800ᶜ, 800ᵈ are at coincidence with the reader switches 678–702, inclusive, the negative terminal coil 2500 of the pulse generator PG will find a ground connection through a number of these switches 678–702, inclusive, and the coil 2500 will become energized. The contact 2502 is connected in common with the terminal of the coil 2500 through the switch $sw^{26}$ to the interrupter switch 973ᵇ¹ of the unit-counting stepper 900ᵇ¹ and to the interrupter switch 844 of the minutes count-back stepper 800ª. However, these interrupter switches 971ᵇ¹ and 844 are, at this moment, closed, thereby forming a continuing connection to ground so that pulse generator PG will not operate on a self-interrupted basis.

When the coil 2500 of the pulse generator PG becomes energized, the contactor 2501 will immediately be shifted into engagement with the contact 2503, as indicated in dotted lines in FIG. 121. This contactor 2501 is connected through the switch $sw^{24}$ to the coil 823 of the minutes count-back stepper 800ª which is thus energized and causes mechanical elements of the count-back stepper 800ª to cock preparatory to moving the count-back stepper 800ª back one increment. The contactor 2501 is also connected to the coil 953ᵇ of the units-counting stepper 900ᵇ¹, which will similarly become energized and the mechanical elements thereof will be cocked preparatory to moving the units-counting stepper 900ᵇ¹ from its initial or so-called "home" position to the first of its ten successive contact-positions. As soon as the coils 823 and 953ᵇ are energized and pull in, the interrupter switches 844 and 873ᵇ will open and the connections between the contact 2502 and ground will be broken so that the coil 2500 will become de-energized, causing the contactor 2501 to move away from the contact 2503 and return to engagement with the contact 2502. As soon as the contactor 2501 moves away from the contact 2503, the circuit to the coils 823 and 953ᵇ will be broken, releasing the cocked mechanical elements of the minutes count-back stepper 800ª and the units-counting stepper 900ᵇ¹. The minutes count-back stepper 800ª will thereupon move back one increment and the units-counting stepper 900ᵇ¹ will move to its first position (i.e., the position shown in full lines in FIG. 121). As soon as the contactor 2501 of the pulse generator PG returns to contactive engagement with the contact 2502, another coil-energizing circuit-condition will be established will be established so that the minutes count-back stepper 800ª will move back a second increment and the units-counting stepper 900ᵇ¹ will move to its second position. It will thus be evident that the pulse generator PG will cause the minutes count-back stepper 800ª and the units-counting stepper 900ᵇ¹ to move in a continuous series of discrete successive increments.

However, the pair of moving contact arms 926ᵇ¹, 927ᵇ¹ of the switch $sw^{31}$ are also connected to ground through the minutes count-back stepper 800ª and, therefore, will establish a circuit-completing ground connection between the coil 1800 of the charge progression relay $k^3$ upon reaching the fifth position, that is to say, the position which is connected to the fourth position of the rate-set switch $sw^{100}$. The circuit-condition is established by reason of the fact that the moving contactor of the rate-set switch $sw^{100}$ is connected through the switch $sw^{25}$ of the mode switch 900ª to the coil 1800 of the charge progression relay $k^3$. As soon as the coil 1800 of the charge progression relay $k^3$ is energized, the relay $k^3$ will pull in and its contacts will shift from the position shown in full lines to the position shown in dotted lines in FIG. 121, thereby establishing a ground connection to the alternative lead 2506 of the pulse generator PG, and, as soon as this ground connection is established, the positive terminal of the coil 2500 will drop to zero potential and the pulse generator PG will stop operating. Thereupon, the series of discrete successive movements of the minutes count-back stepper 800ª and the units counting stepper 900ᵇ¹ will also stop. Since the minutes count-back stepper 800ª has moved through five incremental or count-back steps and the units-counting stepper 900ᵇ¹ has moved through its home position and five successive positions to reach its grounded-out fifth position, it will be evident that five increments of time equivalent to twelve and one-half minutes will have been thus subtracted from the minutes count-back stepper 800ª.

In the presumed example (i.e., time-now being 9:36 a.m.), the net effect of the deduction of the above-mentioned five increments is merely to set back the minutes count-back stepper 800ª from its fifteenth position to its tenth position (see Table I) corresponding to the tenth minutes-interval (i.e., 22½–25 minutes). In other words, the customer will be charged for only twenty-five minutes rather than for thirty-seven and one-half minutes in the hour. If the rate-structure consists of a charge for each half hour or fraction thereof, then, of course, the customer will pay only for the half-hour rather than for the full hour.

In the presumed example, the grace-period allowance only affects the minutes count-back stepper 800ª, and this represents the average and most usual type of parking-lot transaction. However, it is also possible that a customer may return to the parking-lot at a time which is less than twelve and one-half minutes after the hour. In such instance, the deduction of the above-mentioned five increments will cause the minutes count-back stepper 800ª to count-back through its zero position. It will be noted that the coil 823ᵇ of the hours count-back stepper 800ᵇ is connected in series with the switch $sw^1$ of the minutes count-back stepper 800ª, but this switch $sw^1$ is normally open during the twenty-four count-back increments of movement of the minutes count-back stepper 800ª. However, whenever the minutes count-back stepper 800ª reaches its twenty-fifth increment of movement (i.e., counts back from "one" to "zero"), the cam 819, which has a continuous high lobe for the eight steps between position thirty-two and position twenty-four (see FIG. 71), will close the switch $sw^1$. One set of contacts in the switch $sw^1$ is in series with the interrupter switch 844 and, therefore, the switch $sw^1$ will automatically step through the next eight increments and come to position "twenty-four." During this step-through operation, the other set of contacts in the switch $sw^1$, which are in series with the coil 823ᵇ, will remain closed and the coil 823ᵇ will pull in and stay in until the minutes count-back stepper 800ª has come to position "twenty-four," whereupon the switch $sw^1$ will open again and the coil 823ᵇ will drop out allowing the hours count-back stepper 800ᵇ to count-back one increment (i.e., one hour). In other words, whenever the minutes count-back stepper 800ª steps through its zero position, the switch $sw^1$ will effect a "carry" into the hours count-back stepper 800ᵇ, which, of course, is the next higher order of count-back steppers. Similarly, the coil 823ᶜ of the days count-back stepper 800ᶜ is connected in series with the switch $sw^7$ of the hours count-back stepper 800ᵇ and the coil 823ᵈ of the weeks count-back stepper 800ᵈ is connected in series with the switch $sw^{13}$ of the days count-back stepper 800ᶜ. Thus, the hours count-back stepper 800ᵇ will carry into the days count-back stepper 800ᶜ and the days count-back stepper 800ᶜ will carry into the weeks count-back stepper 800ᵈ. Of course, the counter-back steppers 800ª, 800ᵇ, 800ᶜ, 800ᵈ, as this terminology implies, count back from a higher number to a lower number and, therefore, may be said to operate subtractively. Consequently, the carry is a subtractive carry, rather than the additive carry commonly employed in conventional totalizers, but it is, nevertheless, a form of arithmetic carry.

These carry-circuits, therefore, are connected in Mode 2 to take care of the possibility that one or more of the count-back steppers 800$^a$, 800$^b$, 800$^c$, 800$^d$, will step through its zero position while counting out of the five increments constituting the above-mentioned grace period. For example, if "time-now" happened to be 12:06 a.m., of the Sunday in the second week of the month, then in Mode 1 the minutes count-back stepper 800$^a$ would have been set to its third position, the hours count-back stepper 800$^b$, and the days count-back stepper 800$^c$, would have been left in their first positions and the weeks count-back stepper 800$^d$ would be in its second position (i.e., the reading would, in effect, be five minutes, zero hours, zero days, and one week). Hence, as the five increments constituting grace-period are counted out or subtracted, the minutes count-back stepper 800$^a$ will move through its zero-position and stop at its twenty-third position (see Table I) corresponding to the twenty-third minutes-interval (i.e., 55–57½ minutes). By virtue of the carry, this movement through zero-position will subtract one hour from the hours count-back stepper 800$^b$, thereby setting it back from its first position through its zero-position to its twenty-fourth position (see Table II) corresponding to the twenty-fourth hours-interval (i.e., 11:00 p.m.). In turn, as the hours count-back stepper goes through its zero-position it will effect a carry into the days count-back stepper 800$^c$ and the latter will move from its first position through its zero-position to its seventh position (see Table III) corresponding to the seventh days-interval (i.e., Saturday). Finally, as the days count-back stepper 800$^c$ moves through its zero-position, it will effect a carry into the weeks count-back stepper 800$^d$ and the latter will move from its second position to its first position (see Table IV) corresponding to the first weeks-interval (i.e., the first weeks of the month). Thus, in deducting five minute-increments from 12:06 a.m. of Sunday in the second weeks, the computer device A has, in effect, set itself back to 11:55 p.m., of Saturday night in the first week. For substantially the same reason, the carry-circuits are connected in the above-described manner in subsequent modes when the count-back steppers 800$^a$, 800$^b$, 800$^c$, 800$^d$ are counting back for other purposes than the deduction of grace-period, as will presently be more fully discussed. It is also appropriate to note that in FIG. 121, the days count-back stepper 800$^c$ and weeks count-back stepper 800$^d$ are merely shown in block-diagram form since the only purpose is to indicate schematically the inter-relationship of the carry-circuits. It should also be noted that in the presumed example (i.e., time-then of ticket T being midnight Sunday of the first week and time-now being 9:36 a.m. Tuesday morning of the second week), the carry-circuits are not actually involved, but, of course, the capability of the carry-circuits must, nevertheless, be present.

There is also one further circuit-condition which must be taken into account in Mode 2. It is always possible that a customer, after having parked his automobile, will return almost immediately to pick up his car and this may happen before the grace-period has expired. Under such circumstances, the count-back steppers 800$^a$, 800$^b$, 800$^c$, 800$^d$ would reach total coincidence with the switches 678–702, inclusive, of the ticket-reading module E before the units-counting stepper 900$^{b1}$ reaches its grounded-out switch position. For this reason, the pulse generator circuitry is wired in series with the count-back steppers 800$^a$, 800$^b$, 800$^c$, 800$^d$, and reader switches 678–702, inclusive. Thus, if, by any chance, the count-back steppers 800$^a$, 800$^b$, 800$^c$, 800$^d$, and the reader switches 678 to 702, inclusive, should reach total coincidence during the grace-period, the grace-period operations would stop, even though the total amount of grace-period had not been deducted.

As above pointed out, when the charge-progression relay $k^3$ pulls in and breaks the connections from the pulse generator PG through the count-back steppers 800$^a$, 800$^b$, 800$^c$, 800$^d$, to ground the pulse generator PG will stop operating. At the same time, the coil 953 of the mode switch 900$^a$ will become de-energized allowing the mechanical components associated therewith to return to initial position, thereby stepping the mode switch 900$^a$ to its third or so-called Mode 3 position. At this time also, the coil 953$^{b1}$ of the units-charging stepper 900$^{b1}$ will be conducted to ground through one of the sets of closed contacts on the charge-progression relay $k^3$ and will reset itself to a home position.

MODE 3—MINUTES COUNTING MODE

In Mode 3, the coil 953 of the mode switch 900$^a$ is connected to ground through its interrupter switch 973 which is initially closed and through the various switches of the minutes count-back stepper 800$^a$ which are, in turn, connected in series through the micro-switches 678–682, inclusive, of the ticket-reading module E and the latter are connected in common to ground through the switch $sw^{23}$ of the mode switch 900$^a$. As has been above pointed out, the reader switches 678–682, inclusive, are at "time-then" and the switches of the minutes count-back stepper 800$^a$ are at "time-now" less the amount of the grace-period. Therefore, the switches of the minutes count-back stepper 800$^a$ and the reader switches 678–682, inclusive, are not at coincidence and one or more ground connections will be established therethrough so the coil 953 of the mode switch 900$^a$ will pull in and remain energized, even though, in pulling in, the interrupter switch 973 is open, thereby interrupting the duplicate ground connection through the switch $sw^{23}$.

At the beginning of Mode 3, the charge-progression relay $k^3$ will have dropped out and, therefore, the circuit-connections to the alternative lead 2506 of the pulse generator PG will be open so that the positive terminal of the coil 2500 will again be at positive potential. The negative terminal of the coil 2500 of the pulse generator PG is connected through the switch $sw^{26}$ to the interrupter switches 844 and 844$^e$ which are, in turn, connected to ground through the various switches of the minutes count-back stepper 800$^a$ and the reader micro-switches 678–682. The contactor 2501 of the pulse generator PG is also connected to ground through the same circuits of the minutes count-back stepper 800$^a$ and the reader micro-switches 678–682, inclusive. Since, at the beginning of Mode 3, the contactor 2501 of the pulse generator PG is in engagement with the contact 2502, which is also connected to the coil 2500, the contactor 2501 will initially do nothing more than duplicate the ground connection for the contactor 2501. However, as soon as the coil 2500 is energized and pulls in, the contactor 2501 will move away from contact with the contact 2502 and come into contactive engagement with the contact 2503, which is connected through the switch $sw^{24}$ in parallel with the coils 823 and 823$^e$ of the minutes count-back stepper 800$^a$ and the minutes output stepper 800$^e$, respectively, leaving the coil 2500 of the pulse generator PG connected to ground through the interrupter switches 844 and 844$^e$. As soon as the coils 823 and 823$^e$ become energized, they pull in, opening the interrupter switches 844, 844$^e$, and breaking the ground connection to the coil 2500 which then becomes de-energized and drops out, causing the contactor 2501 to move back to initial position. When the contactor 2501 moves back to initial position, the ground connection to the coils 823, 823$^e$, will be broken and these coils will drop out, allowing the interrupter switches 844, 844$^e$, associated therewith, to return to initial position and moving the minutes count-back stepper 800$^a$ and the minutes output stepper 800$^e$ back one increment. It will thus be evident that the pulse generator PG will cause the minutes count-back stepper 800$^a$ and the minutes output stepper 800$^e$ to move in a continuous series of discrete successive increments until coincidence is established between the switches of the minutes count-back stepper $800^a$ and the reader micro-switches 678 to 682, inclusive (i.e., time-then). In the presumed example, time-then is midnight on Sunday of the first or initial week. Therefore, the switches $sw^2$–$sw^6$, inclusive, of the minutes count-back stepper $800^a$ will move into the first position (see Table I) corresponding to the first minutes-interval (i.e., 0–2½ minutes) and such switch-positions are shown in full lines in FIG. 122.

The coil $823^b$ of the hours count-back stepper $800^b$ is connected in series with the switch $sw^1$ of the minutes count-back stepper $800^a$ to establish a carry-circuit, so that each time the minutes count-back stepper $800^a$ passes through its zero-position in counting back to time-then, an hours-increment will be subtracted from the hours count-back stepper $800^b$. Similarly, carry-circuits are established for the days count-back stepper $800^c$ and the weeks count-back stepper $800^d$ in the same manner as previously described in Mode 2.

It will be noted that in Mode 3, the minutes count-back stepper $800^a$ and the minutes output stepper $800^e$ are in parallel, so to speak. Therefore, the minutes output stepper $800^e$ will, in effect, follow the minutes count-back stepper $800^a$ step-by-step until the latter reaches coincidence and stops. Consequently, if the minutes count-back stepper $800^a$ moves through less than twelve increments or steps in reaching coincidence, the circuit-condition of the switches $sw^{19}$, $sw^{20}$, of the minutes output stepper $800^e$ will not change, thereby indicating that less than a half-hour has been counted out by the minutes count-back stepper $800^a$. On the other hand, if the minutes count-back stepper $800^a$ moves through twelve or more increments or steps in reaching coincidence, the cam-following finger of the switch $sw^{19}$ will ride up on the high lobe of the cam with which it is associated, and the switch $sw^{19}$ will close, thereby indicating that more than a half-hour has been counted out by the minutes count-back stepper $800^a$.

Whenever the minutes count-back stepper $800^a$ reaches coincidence, the initial-position ground connection established through the minutes count-back stepper $800^a$ and the reader switches 678 to 682, inclusive, will all be broken and, of course, the coil-holding ground connection for the coil 953 of the mode switch $900^a$ will also be broken. Consequently, the pulse generator PG will come to a stop and the coil 953 of the mode switch $900^a$ will drop out, thereby causing the mode switch to move into its fourth or so-called "Mode 4" position.

MODE 4—PRELIMINARY HOURS CHARGING MODE

In Mode 4, the coil 953 of the mode-switch $900^a$ is connected directly, through a common lead, to the moving contactors of the switches $sw^8$–$sw^{12}$, inclusive, of the hours count-back stepper $800^b$. Inasmuch as one or more of the switches $sw^8$–$sw^{12}$, inclusive, will be connected to ground through the reader micro-switches 683–687, inclusive, as long as there is lack of coincidence between the switches $sw^8$–$sw^{12}$ and the reader switches 683–687, the coil 953 will become energized or pulled in, so to speak, and remain in this condition until coincidence is reached. It will also be noted that the interrupter switch 973 of the mode switch $900^a$ is initially closed and is connected to ground through the switch $sw^{23}$, thereby momentarily establishing a duplicate ground connection which is broken as soon as the coil 953 is energized and shifts the interrupter switch 973 to open position. Also in Mode 4, the coil 2500 of the pulse generator PG is again connected to ground through the switch $sw^{26}$ to the interrupter switch $973^{b1}$ of the units-counting stepper $900^{b1}$ and the interrupter switch $973^{b3}$ of the nickels charging stepper $900^{b3}$. These interrupter switches $973^{b1}$ and $973^{b3}$ are connected in parallel to a lead, which is, in turn, connected in common to the moving contactors of the switches $sw^8$, $sw^9$ of the hours count-back stepper $800^b$. As will be seen in FIG. 123, sets of stationary contacts in these switches $sw^8$–$sw^{12}$, inclusive, are, in Mode 4, connected in series through the reader micro-switches 683–687, inclusive. The moving contactors in the reader micro-switches 683–687, inclusive, are connected in common to a lead, which is, in turn, connected to ground through the switch $sw^{22}$ of the mode-switch $900^a$. It will be noted, by reference to FIG. 123, that the moving contactor 2501 of the pulse generator PG is initially in contactive engagement with the contact 2502 which is also connected to the coil 2500. This moving contactor 2501 is also connected to the common lead which runs from the interrupter switches $973^{b1}$, $973^{b3}$, to the moving contactors of the switches $sw^3$–$sw^{12}$, inclusive, in the hours count-back stepper $800^b$. Therefore, in such initial position, the moving contactor 2501 of the pulse generator PG merely establishes a duplicate ground connection for the coil 2500. However, when the coil 2500 is energized, the pulse generator PG pulls in and the moving contactor 2501 shifts into contactive engagement with the contact 2503. The contact 2503 is connected through the switch $sw^{24}$ to a lead which runs in parallel to the coil $953^{b1}$ of the units-counting stepper $900^{b1}$ and the coil $953^{b3}$ of the nickels charging stepper $900^{b3}$. As soon as the contactor 2501 comes into contactive engagement with the contact 2503, the coils $953^{b1}$ and $953^{b3}$ will be connected to ground and thereby energized, so that the units-counting stepper $900^{b1}$ and the nickels charging stepper $900^{b3}$ will pull in, shifting the interrupter switches $973^{b1}$ and $973^{b3}$ to open position. When this occurs, the previously established ground connection for the coil 2500 of the pulse generator PG will be broken, so that the pulse generator PG will drop out and the moving contactor 2501 will return to initial position. It will thus be evident that the pulse generator PG will cause the units-counting stepper $900^{b1}$ and nickels-charging stepper $900^{b3}$ to move in a continuous series of successive discrete steps from their respective zero or "home" positions as long as the above-described circuit-conditions between the pulse generator PG and the two steppers $900^{b1}$, $900^{b3}$, continues to exist.

Figure 123:
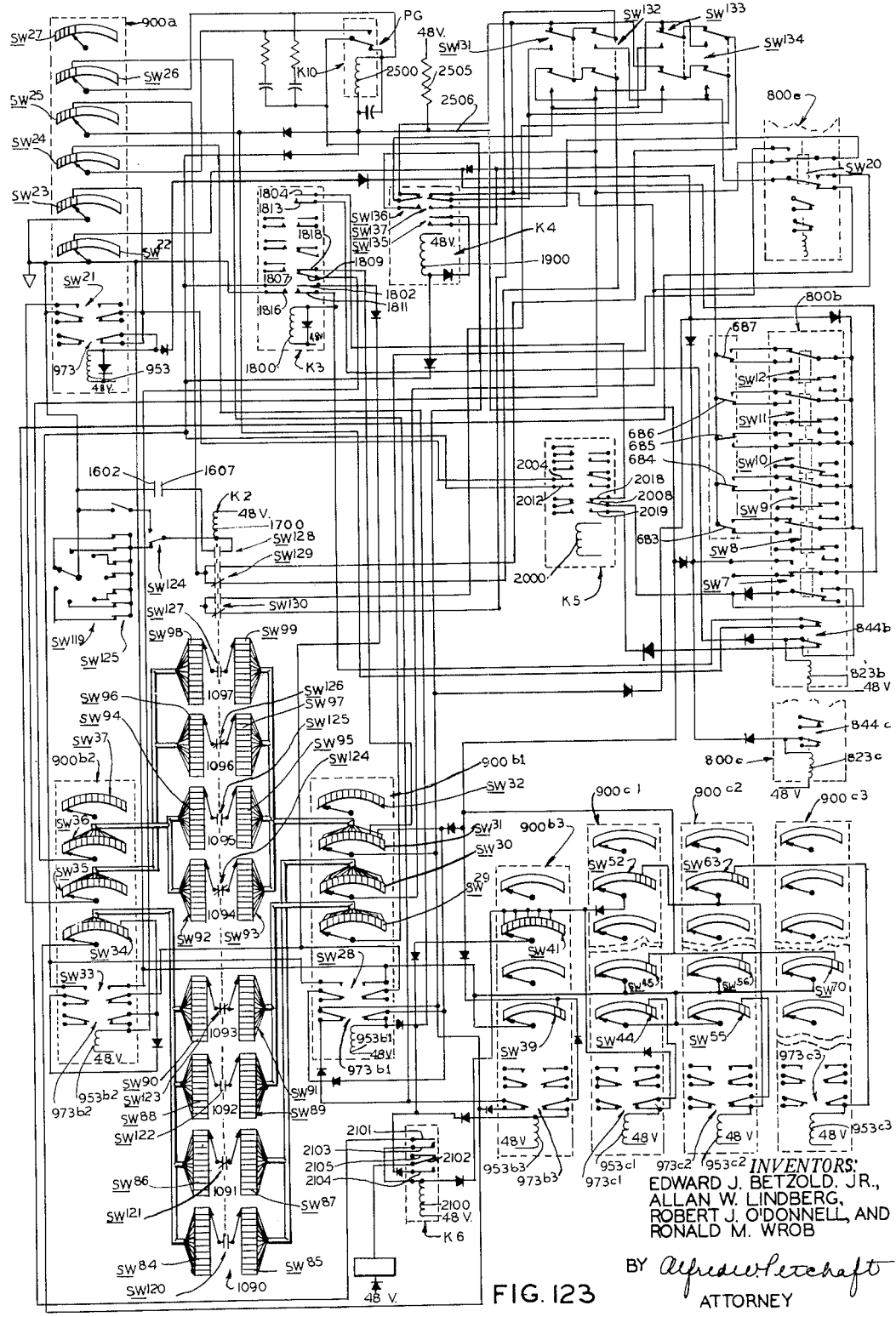

As will be seen by reference to FIG. 123, the switch $sw^{29}$ of the units-counting stepper $900^{b1}$ is connected by a ten-wire harness to the switches $sw^{89}$ and $sw^{91}$ of the rate-set switches 1092, 1093, such connections being so arranged that the first-position contact of the switch $sw^{29}$ is connected to the first-position contacts of the switches $sw^{89}$ and $sw^{91}$ and each successive contact in the switch $sw^{29}$ is connected in common to the two corresponding successive contacts of the switches $sw^{89}$, $sw^{91}$. Similarly, the switch $sw^{30}$ of the units counting stepper $900^{b1}$ is connected by a ten-wire harness to the switches $sw^{85}$, $sw^{87}$, of the rate-set switches 1090, 1091, respectively, such connections being so arranged that the first-position contact of the switch $sw^{30}$ is connected to the first-position contacts of the switches $sw^{85}$, $sw^{87}$, and each successive contact in the switch $sw^{30}$ is connected in common to the two corresponding successive contacts of the switches $sw^{85}$, $sw^{87}$. Similarly, the switch $sw^{31}$ of the units-counting stepper $900^{b1}$ is connected by a ten-wire harness to the switches $sw^{93}$, $sw^{95}$, $sw^{97}$, $sw^{99}$ of the rate-set switches 1094, 1095, 1096, 1097, respectively, such connections being so arranged that the first-position contact of the switch $sw^{31}$ is connected in common to the first-position contacts in each of the switches $sw^{93}$, $sw^{95}$, $sw^{97}$, $sw^{99}$, and each successive contact in the switch $sw^{31}$ is connected in common to the corresponding successive contacts in each of the four switches $sw^{93}$, $sw^{95}$, $sw^{97}$, $sw^{99}$.

It will be apparent that circuit-continuity between the moving contactor of the switch $sw^{29}$ and the moving contactor of the companion switch $sw^{89}$ will exist only when the two moving contactors are respectively in contactive engagement with matching contact positions, that is to say, contact positions which are directly interconnected through the ten-wire harness. Similarly, circuit-continuity between the moving contactor of the switch $sw^{29}$ and the moving contactor of the switch $sw^{91}$ will exist only when such moving contactors are in contactive engagement with matching contact positions. The same thing is true as to continuity between the moving contactor of the switch $sw^{30}$ and the moving contactors of the companion switches $sw^{85}$, $sw^{87}$. Similarly, the same thing is true as to circuit-continuity between the contactor of the switch $sw^{31}$ and the moving contactors of the companion switches $sw^{93}$, $sw^{95}$, $sw^{97}$, and $sw^{99}$.

Similarly, the switch $sw^{34}$ of the tens-counting stepper $900^{b2}$ is connected by a ten-wire harness to the switches $sw^{84}$, $sw^{86}$, $sw^{88}$, and $sw^{90}$ of the rate-set switches 1090, 1091, 1092, and 1093, respectively, such connections being so arranged that the first-position contact of the switch $sw^{34}$ is connected to the first-position contacts in each of the switches $sw^{84}$, $sw^{86}$, $sw^{88}$, and $sw^{90}$, and each successive contact in the switch $sw^{34}$ is connected in common to the corresponding successive contacts in each of the four switches $sw^{84}$, $sw^{86}$, $sw^{88}$, and $sw^{90}$. The switch $sw^{35}$ of the tens-counting stepper $900^{b2}$ is connected by a ten-wire harness to the switches $sw^{96}$ and $sw^{98}$ of the rate-set switches 1096 and 1097, respectively, such connections being so arranged that the first-position contact of the switch $sw^{35}$ is connected to the first-position contacts of the switches $sw^{96}$ and $sw^{98}$ and each successive contact in the switch $sw^{35}$ is connected in common to the two corresponding successive contacts of the switches $sw^{96}$ and $sw^{98}$. Finally, the switch $sw^{36}$ of the tens-counting stepper $900^{b2}$ is connected by a ten-wire harness to the switches $sw^{92}$ and $sw^{94}$ of the rate-set switches 1094, 1095, respectively, such connection being so arranged that the first position contact of the switch $sw^{36}$ is connected to the first-position contact of the switches $sw^{92}$ and $sw^{94}$, and each successive contact on the switch $sw^{36}$ is connected in common to the two corresponding successive contacts of the switches $sw^{92}$ and $sw^{94}$.

Circuit-continuity between the moving contactor of the switch $sw^{36}$ and the moving contactor of the switch $sw^{92}$ will exist only when such moving contactors are simultaneously in contactive engagement with matching contacts, that is to say, contacts which are directly connected with each other through the ten-wire harness. Similarly, circuit-continuity between the moving contactor of the switch $sw^{36}$ and the moving contactor of the switch $sw^{94}$ will exist only when such contactors are simultaneously in contactive engagement with matching or directly interconnected contacts. The same thing is true as to circuit-continuity with the moving contactor of the switch $sw^{35}$ and the moving contactors of the switches $sw^{96}$, $sw^{98}$. Similarly, the same thing is true as the circuit-continuity between the moving contactor of the switch $sw^{34}$ and the moving contactors of the switches $sw^{84}$, $sw^{86}$, $sw^{88}$, and $sw^{90}$.

It will also be noted by reference to FIG. 123 that the pair of moving contactors within the rate-set switch 1090, that is to say, the moving contactors of the switches $sw^{84}$ and $sw^{85}$ will be connected to each other through the switch $sw^{120}$ of the rate-selection relay $k^2$. Similarly, the pairs of moving contactors within the rate set switches 1091, 1092, 1093, 1094, 1095, 1096, and 1097, are respectively interconnected by the switches $sw^{121}$, $sw^{122}$, $sw^{123}$, $sw^{124}$, $sw^{125}$, $sw^{126}$, and $sw^{127}$ of the rate-selection relay $k^2$ all for purposes presently more fully appearing.

The various rate-set switches 1090 to 1097, inclusive, must be manually set by the parking-lot operator to reflect the particular rate structure which is in force on the parking-lot monitored by the computer device A. As has been previously pointed out, there is a wide diversity in the rate structures which are used on various parking-lots in different geographical localities, depending upon various economic conditions. If, for instance, a parking-lot is located in a downtown area where parking space is at a premium, so that ground rentals and other overhead costs are high, the rate structure will be arranged so as to impose comparatively high charges. Ordinarily, this would be accomplished by making a relatively high charge for the first half-hour or fraction thereof (usually referred to as the "initial half-hourly rate") and making either the same or a different charge for each succeeding half-hour or fraction thereof (usually referred to as the "constant half-hourly rate"). In some extremely congested locations, the charge for succeeding half-hours will increase in order to encourage quick turn-over parking and discourage long-duration parking. In other localities, where parking is not at such a premium or a price-competition situation may exist with other nearby parking-lots, the rate structure may include a more modest initial half-hourly rate for the first half-hour or fraction thereof and a substantially lower constant half-hourly rate for each succeeding half-hour or fraction thereof. Quite often a rate structure will include a charge for the first hour (usually referred to as the "initial hourly rate") and the same or a different charge for each successive hour or fraction thereof (usually referred to as the "constant hourly rate"). In addition to this, on many parking lots, it is economically necessary to limit the accumulating hourly charges to some selected maximum figure which is less than twenty-four times the hourly rate. In such instance, the parking-lot proprietor must include such maximum charge within his rate structure and this is usually referred to as the "daily maximum" rate. Similarly, some parking-lots may have numerous cars which are parked for several days or even several weeks at a time and the parking lot proprietor, because of local competition, or for other reasons, may desire to limit the accumulating daily charges to some selected maximum figure which is substantially less than seven times the daily rate. In such instance, such maximum charge must be included within the rate structure and is usually referred to as the "weekly maximum" rate.

In addition to this, parking-lots very often will have one set of charges during daytime hours and a different set of charges during nighttime hours. If, for instance, the parking-lot is located in a downtown shopping area where stores and office building are open only during daytime hours, the nighttime rate structure will be much lower in terms of monetary charge than the daytime rate structure. On the other hand, if the parking-lot happens to be located in a theater district or entertainment area where traffic and patronage is heaviest in the nighttime hours, the nighttime rate structure may include higher rates than the daytime rate structure. A somewhat similar situation exists for Saturdays, Sundays, and holidays. Some parking-lots, such as those located in downtown office building areas, will have very little, if any, business on Saturdays, Sundays and holidays, whereas other parking-lots, such as those located near sports arenas, resort areas, and the like, will have a major amount of business on Saturdays, Sundays, and holidays. The rate structures will reflect these variations in geographical location and economic factors.

The foregoing variations in rate structure are substantially representative of the variations and make-up of rate structures for parking-lots throughout the United States. It will be evident, therefore, that practically all rate structures will consist of some selected initial rate and some selected constant rate and, moreover, these rates will relate either to half-hourly or hourly periods. In many instances, the rate structure will also include maximum daily rates, maximum weekly rates, and alternative rate structures for nighttime periods, Saturdays, Sundays, and holidays.

The various rate set switches 1090 to 1097, inclusive, are, therefore, employed so that the computer device A will have the capability of charging in accordance with rate structures including these variables, namely, an initial regular rate, an initial special rate, a constant regular half-hourly rate, a constant special half-hourly rate, a constant regular hourly rate, and a constant special hourly rate. Moreover, practically all parking-lots charge rates which are some multiple of five cents. Therefore, the charging circuitry of the computer device A is arranged so as to compute all charges in multiples of nickels.

A consideration of the various possible rate structures which may be established by various manual settings of the rate-set switches 1090 to 1097, inclusive, will indicate that provision must necessarily be made so that the computing circuitry will distinguish between an initial half-hourly rate and a constant half-hourly rate, since it is possible that these rates may be monetarily different. Similarly, the circuitry must distinguish between an initial hourly rate and a constant hourly rate since these rates may be monetarily different.

Moreover, it is arithmetically possible in many recurring computations to simplify and accelerate computing operations by utilizing a dual rate which is the sum of an initial rate and a constant rate. Within the charging logic of the computer device A, four such dual rates are possible, namely, the initial plus constant half-hourly regular rate, the initial plus constant half-hourly special rate, the initial half-hourly plus constant hourly regular rate, and the initial half-hourly plus constant hourly special rate. Consequently, the computer device A must have the capability of distinguishing these dual rates from each other, as well as from all other rates.

The function of distinguishing between various rates is accomplished by the so-called "truth circuit" consisting in part of four double-pole, double-throw switches $sw^{131}$, $sw^{132}$, $sw^{133}$, $sw^{134}$, which are connected as follows: Moving contactor 1701 is connected to contact 1717. Moving contactor 1702 is connected to contact 1719. Moving contactors 1703 and 1704 are, respectively, connected to the normally closed contacts of switch $sw^{130}$ and switch $sw^{129}$ in the rate selection relay $k^2$. Moving contactor 1705 is connected to contact 1725. Moving contactor 1706 is connected to contact 1727. Moving contactors 1707 and 1708 are, respectively, connected to a normally open contacts of switch $sw^{129}$ and switch $sw^{130}$ in the rate selection relay $k^2$. Contacts 1713 and 1723 are connected in common to the normally closed contact of switch $sw^{136}$ to the normally closed contact of switch $sw^{137}$ to the moving contactor of switch $sw^{30}$ in the units-counting stepper 900$^{b1}$ and, finally, to the second normally open contact of switch $sw^{20}$. The contacts 1714 and 1724 are connected in common to the moving contactor of the single-pole, double-throw switch $sw^{137}$. The contacts 1715, 1720, 1721, and 1726 are connected in common to the normally open contact of switch $sw^{136}$ to the moving contactor of the switch $sw^{36}$ in the tens-counting stepper 900$^{b2}$. The contacts 1716, 1722, are connected in common to the moving contactor of the switch $sw^{136}$. The contacts 1718 and 1728 are connected in common to the second moving contactor of switch $sw^{20}$ in the minutes output stepper 800$^e$.

It should be noted, parenthetically, that the switch $sw^{20}$ of the minutes output stepper 800$^e$ is a double-pole, double-throw switch and, for purposes of convenient reference, may be said to comprises first and second moving contactors which respectively operate between first and second pairs of stationary contacts, each of such pairs of stationary contacts having a normally closed contact and a normally open contact. Therefore, as shown in FIG. 123, the first moving contactor of the switch $sw^{20}$ is connected to the normally open contact of the switch $sw^{137}$ in the initial hours charge-sensing relay $k^4$. The first normally open contact of the switch $sw^{20}$ is connected to the moving contactor of the switch $sw^{29}$ in the units-charging stepper 900$^{b1}$. The first normally closed contact of the switch $sw^{20}$ is connected to the common connection between contacts 1715, 1720, 1721, and 1726. The second moving contactor of the switch $sw^{20}$ is connected to the contact 1728. The second normally open contact of the switch $sw^{20}$ is connected to the normally closed contact of the switch $sw^{137}$ and also to the moving contactor of the switch $sw^{30}$ in the units-counting stepper 900$^{b1}$. The second normally closed contact of the switch $sw^{20}$ in the minutes output stepper 800$^e$ is connected to the moving contactor of the switch $sw^{35}$ in the tens-counting stepper 900$^{b2}$.

Figure 124:
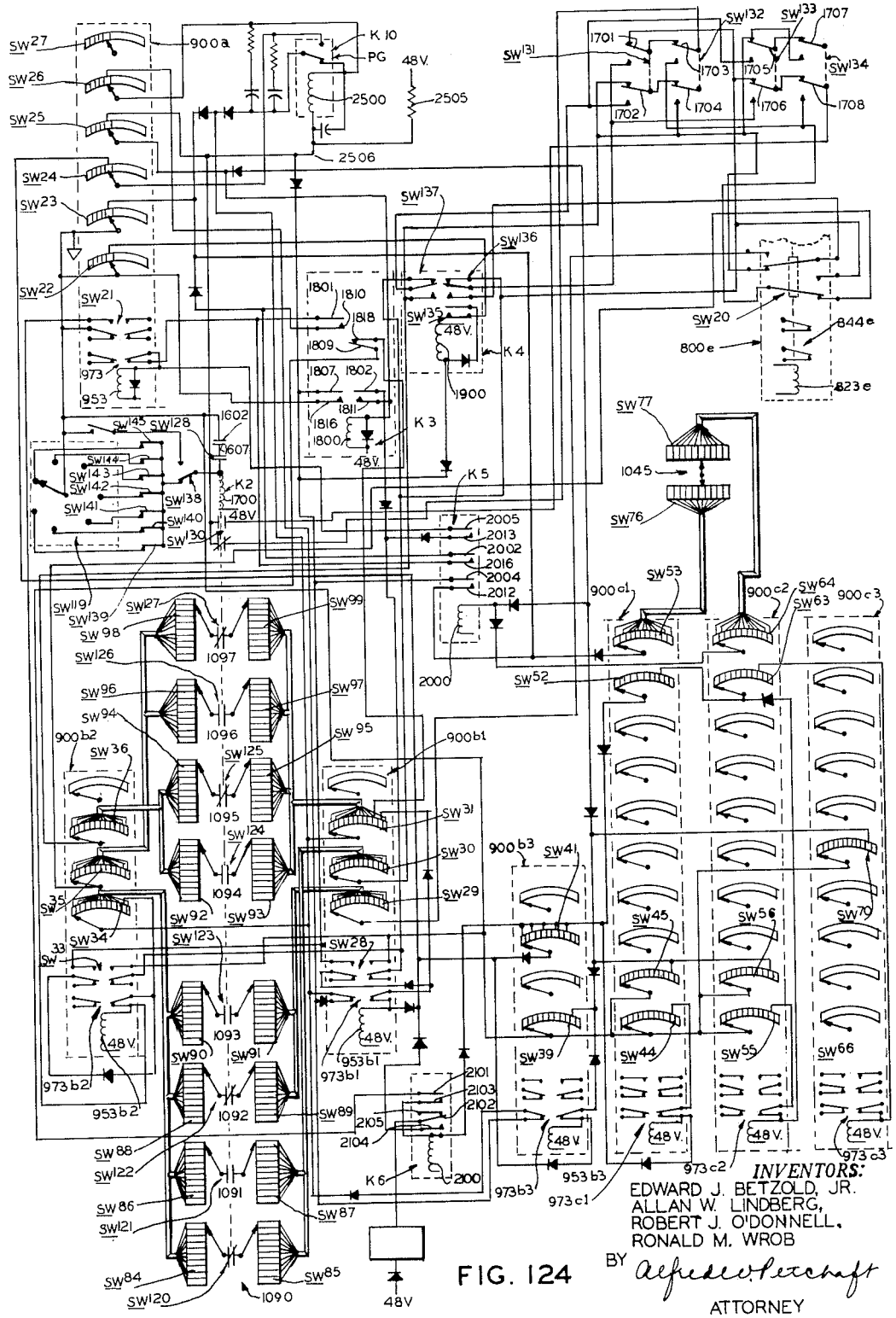

The moving contactor of switch $sw^{129}$ of the rate selection relay $k^2$ is connected to the fourth-position contact of the switch $sw^{25}$ in the mode switch 900$^a$. The moving contactor of the switch $sw^{130}$ is connected to the fifth-position contact of the switch $sw^{25}$ in the mode switch 900$^a$. This latter connection does not appear in FIG. 123 which relates only to Mode 4, but is shown in FIG. 124 which relates to Mode 5, presently to be discussed.

It will also be apparent from FIG. 123 that the switches $sw^{120}$, $sw^{122}$, $sw^{124}$, $sw^{126}$ of the rate selection relay $k^2$ are open when the coil thereof is deenergized and the switches $sw^{121}$, $sw^{123}$, $sw^{125}$, $sw^{127}$ are normally closed when the coil 1700 is de-energized. However, when the coil 1700 is energized and the rate selection relay $k^2$ pulls in, the opposite circuit condition is established, namely, the switches $sw^{120}$, $sw^{122}$, $sw^{124}$, $sw^{126}$ will close and the switches $sw^{121}$, $sw^{123}$, $sw^{125}$, $sw^{127}$ will open thereby making it possible to distinguish between regular and special rates.

As previously stated, the computer device A is capable of charging in accordance with rate structures including eight variables which, for convenience and brevity, can be referred to by literal designations as indicated in the following table:

*Table VIII*

| Regular Rates | | | Special Rates | | |
|---|---|---|---|---|---|
| Rate | Literal Designation | Rate-Set Switch | Rate | Literal Designation | Rate-Set Switch |
| Initial Rate (Regular) | IHR | 1090 | Initial Rate (Special) | IHS | 1091 |
| Initial Half-Hourly Rate (Regular) | IXR | 1099 | Initial Half-Hourly Rate (Special) | IXS | 1091 |
| Constant Half-Hourly Rate (Regular) | CXR | 1092 | Constant Half-Hourly Rate (Special) | CXS | 1093 |
| Constant Hourly Rate (Regular) | CHR | 1094 | Constant Hourly Rate (Special) | CHS | 1095 |

Also as previously stated, it has been found that the charging logic can be simplified by using four dual rates which, for convenience and brevity, can be referred to by literal designation as indicated in the following table.

It will be recalled from previous discussion that the ticket-punching module D can be manually set by the parking-lot attendant to punch the special notch $n^1$ in the ticket T. Ordinarily, this would be done if the rate structure included a day-rate and a night-rate. In such instance, the parking-lot attendant would make this manual setting of the ticket-punching module D at the time when the rate charge went into effect. For example, if the night-rate went into effect at 7:00 p.m., the parking-lot attendant would unlock and open the door 125, and shift the manually operable special setting knob 127 so that the ticket-punching module D would thereafter punch a special hole in the ticket T and this condition would continue until the special-setting knob is manually returned to its former position, which presumably would be done early

Table IX

| Regular Rates | | | Special Rates | | |
|---|---|---|---|---|---|
| Rate | Literal Designation | Rate-Set Switch | Rate | Literal Designation | Rate-Set Switch |
| Initial plus constant half-hourly (Regular). | IXCXR | 1096 | Initial plus constant half-hourly (Special). | IXCXS | 1097 |
| Initial half-hourly plus constant hourly (Regular). | IXCHR | 1096 | Initial half-hourly plus constant hourly (Special). | IXCHS | 1097 | the next morning so that the computer device A would then begin charging day-time rates.

Consequently, if ticket T is punched in the ticket-punching module D during the nighttime hours, it will contain the notch or indentation $n^1$. When the customer returns to the parking-lot later that night and such ticket is inserted into the ticket-reading module E, the notch $n^1$ will clear the slide bar 726 and the reader micro-switch 718 will not be actuated. Therefore, the relay $k^2$ will not pull in and, therefore, the rate-set switches 1090, 1092, 1094, 1096 remain open and the rate-set switches 1091, 1093, 1095, 1097 remain closed. Thus, only the four special rate switches 1091, 1093, 1095, 1097 are operative. This has the effect of immediately dividing the above tables, namely, Table VIII and Table IX, in half so that only the special rates will be available for rate selection. On the other hand, if a ticket T is punched out during the day-time hours, the ticket will not carry the notch or indentation $n^1$ and, therefore, when the customer returns to the parking-lot and such ticket T is inserted into the ticket-reading module E, the relay micro-switch 718 will be actuated and the relay $k^2$ will be pulled in. Consequently, the rate-set switches 1090, 1092, 1094, and 1096 will be closed and the rate-set switches 1091, 1093, 1095, 1097 will be open, so that the four regular rate-set switches 1090, 1092, 1094 and 1096 are operative so that only the regular rates shown in Tables VIII and IX will be available for rate selection. In other words, the position of the rate selection relay $k^2$ will determine whether regular or special rates will be utilized during any given computation.

A substantially identical problem exists in connection with special rates which will be charged for special days, such as Saturdays, Sundays, and holidays. Therefore, one terminal of each of the switches $sw^{139}$ to $sw^{145}$, inclusive, is connected in common to the day contact of the day-night switch $sw^{138}$ and the moving contactor of the day-night switch $sw^{138}$ is, in turn, connected to the coil 1700 of the rate selection relay $k^2$. The other terminals of the switches $sw^{139}$ to $sw^{145}$ are respectively connected to the corresponding seven terminals of the special day-rate switch 119 which is a part of the binary clock 1100. If, for instance, the rate structure includes special reduced rates for Saturdays and Sundays, the day switches $sw^{139}$ to $sw^{145}$ which correspond respectively to Sunday and Saturday will be manually set into open position. Consequently, when the special day-rate switch 119 in the binary clock reaches the contact corresponding to Saturday, no circuit can be completed to the rate selection relay $k^2$ and the rate selection relay $k^2$ will remain open so that only special rates will be available for selection and utilization during all computations made on that day. The same situation will prevail during Sunday. When, however, the special day-rate switch 119 reaches its Monday-position, the regular rate structure will again become operative. Of course, it must be remembered that the regular rate structure during the ordinary business days of the week may still utilize the special rates during the nighttime hours, if the parking-lot proprietor so desires, and this can be accomplished by the above-described manual setting of the ticket-punching module D.

The computing operations are carried out under the surveillance of the truth circuit in accordance with the following truth table:

Table X

| Rate-Combination | Rate used in Mode 4 | Rates used in Mode 5 | | | |
|---|---|---|---|---|---|
| | | When some previous charge has been made in Mode 4 | | When no previous charge was made in Mode 4 | |
| | | $sw^{20}$ on Low Lobe | $sw^{20}$ on High Lobe | $sw^{20}$ on Low Lobe | $sw^{20}$ on High Lobe |
| IHR-CHR | CHR | IHR | IHR | IHR | IHR |
| IHS-CHS | CHS | IHS | IHS | IHS | IHS |
| IXR-CXR | CHR | IXR | IXCXR | IXR | IXCXR |
| IXS-CXS | CHS | IXS | IXCXS | IXS | IXCXS |
| IXR-CHR | CHR | IXR | IXCHR | IXR | IXCHR |
| IXS-CHS | CHS | IXS | IXCHS | IXS | IXCHS |
| IHR-CXR | IHR first then CHR | CXR | CHR | IHR | IHR |
| IHS-CXS | IHS first then CHS. | CXS | CHS | IHS | IHS |

As indicated in Table X above, the computer device A has a capability of eight basic types of selected rate-combinations. For instance, the rate-combination exemplified by the first line in Table X consists of an initial hourly rate and a constant hourly rate. Of course, within the framework of this particular rate-combination, the monetary amounts can vary in five-cent increments from zero to four dollars and ninety-five cents. In other words, it is possible, theoretically at least, to charge the customer as little as nothing or as much as four dollars and ninety-five cents for the first hour, although, according to general parking-lot practice, this charge will ordinarily range from zero to fifty cents, the zero charge being quite common in connection with shopping center parking, where the stores desire to give the customers free parking for an initial period. The same thing is true of the constant hourly rate which can also vary from zero to four dollars and ninety-five cents. The monetary amounts of IHR and CHR are manually set into rate-switches 1090 and 1094, as indicated in Table VIII.

Similarly, the rate-combination exemplified in the second line of Table X consists of an initial special hourly rate and a constant special hourly rate, the monetary amounts of which can vary from zero to four dollars and ninety-five cents, and may be manually set into the rate-set switches 1091 and 1095, respectively, as indicated in Table VIII.

The other rate-combinations exemplified on the other six lines of Table X may also be interpreted by reference to Tables VIII and IX, and the monetary amounts of the various rates used in the selected rate-combinations can be manually set into the various rate-set switches designated in Tables VIII and IX. In this connection, it is appropriate to point out that the initial regular rate IHR is an hourly rate but, notwithstanding this, both the initial regular rate IHR and the initial half-hourly regular rate IXR are assigned to rate-set switches 1090, as indicated in Table VIII, for the reason that no rate structure will ever use both of these rates simultaneously. On the contrary, any rate structure which may be adopted by the parking-lot proprietor will use either an initial half-hourly rate or an initial hourly rate. Therefore, whichever initial rate the parking-lot proprietor intends to use can be monetarily set into rate-set switich 1090. This same consideration applies to the initial special hourly rate and the initial special half-hourly rate which are both assigned to rate-set switch 1091, also as indicated in Table VIII.

Substantially similar considerations apply to the dual rate, namely, the initial plus constant half-hourly regular rate (IXCXR) and the initial half-hourly plus constant hourly regular rate (IXCHR). Since any rate structure would use either an initial hourly rate or an initial half-hourly rate, it follows that any rate structure to which Table IX would be applicable could only include the initial plus constant half-hourly regular rate (IXCXR) or the initial half-hourly plus constant hourly regular rate (IXCHR), but not both. Therefore, these dual rates are assigned to the rate-set switch 1096. On the basis of the same reasoning, the initial plus constant half-hourly special rate (IXCXS) and the initial half-hourly plus constant hourly special rate (IXCHS) are both assigned to the rate-set switch 1097.

It will also be noted that the charging logic of computer device A embodies certain simplifications or shortcuts which accelerate some of the computations. For instance, the rate-combination IXR–CXR (i.e. the fourth line of Table X) is charged at the rate CHR in Mode 4. If the circuitry of the computer device A were arranged so as to make actual computations at a constant half-hourly rate, two charges would have to be made for each full hour counted out by the hours count-back stepper 800$^b$. However, in the circuitry of the present embodiment, elapsed hours are always counted out as full hours. Moreover, the charge for each full hour (after the first hour) is always twice the constant half-hourly rate. Hence, it is possible to double the constant half-hourly rate and set this amount into the rate-set switch 1094 as an auxiliary rate whenever the rate-combination IXR–CXR is used in the rate structure. This auxiliary rate then becomes the rate CHR used for preliminary hours-charging in Mode 4 and the half-hourly increments of elapsed time will be computed two at a time, thereby cutting the number of operations in half. Similar considerations apply to the rate-combination IXS–CXS, IHR–CXR, and IHS–CXS.

In setting up the rate-set module G, to reflect a selected rate structure, the truth circuit switches $sw^{131}$ and $sw^{132}$ are set up in accordance with one of the four special rate-combinations (IHS–CHS), (IXS–CXS), (IXS–CHS), or (IHS–CXS) shown in Table X. Similarly, the truth circuit switches $sw^{133}$ and $sw^{134}$ are set up in accordance with one of the four regular rate-combinations (IHR–CHR), (IXR–CXR, (IXR–CHR), or (IHR–CHR) shown in Table X. These various settings can be effected by various combinations of up and down positions by the truth circuit switches $sw^{131}$–$sw^{134}$, as shown in the following table:

*Table XI*

| Rate-Combination | Switch Positions | | | |
| --- | --- | --- | --- | --- |
| | $sw^{131}$ | $sw^{132}$ | $sw^{133}$ | $sw^{134}$ |
| IHR–CHR | | | Up | Up |
| IHS–CHS | Up | Up | | |
| IXR–CXR | | | Down | Down |
| IXS–CXS | Down | Down | | |
| IXR–CHR | | | Up | Down |
| IXS–CHS | Up | Down | | |
| IHR–CXR | | | Down | Up |
| IHS–CXS | Down | Up | | |

In the above Table XI, the blank spaces in the switch-position column indicate that the position to which such blank space applies is not pertinent to the charging logic in the particular selected rate-combination. Accordingly, the selected rate-combination exemplified by the positions of the switches $sw^{131}$, $sw^{132}$, $sw^{133}$, $sw^{134}$, as shown in FIG. 123, will reflect a rate structure including the two rate-combinations exemplified by the first two lines of the truth table, Table X. In this connection, it must be understood that a rate structure selected by a parking-lot proprietor can include one rate-combination which will apply continuously throughout the twenty-four hours of the day. On the other hand, if the parking-lot proprietor desires to charge special rates for nighttime parking and parking on Saturdays, Sundays, and holidays, the rate structure can consist of one of the four regular rate-combinations and one of the four special rate-combinations.

The rate structure which may be adopted or selected by a parking-lot proprietor also will odinarily include a daily rate and a weekly rate which incidentally will represent maxima. In other words, the daily rate will usually be less than twenty-four times the hourly rate and the weekly rate will usually be less than seven times the daily rate. Therefore, the rate set switch 1045 will be manually set up to reflect the monetary amount of the selected daily rate, and, similarly, the rate-set switch 1045′ will be set up to reflect the monetary amount of the selected weekly rate. Since the daily rate and weekly rate are uniformly recurrent throughout the computation, no problems of choice or rate distinguishment are involved during that portion of the computation involving daily rates or weekly rates. Consequently, the truth circuitry, as exemplified by the truth table (Table X), does not have to deal with daily rates or weekly rates. It should be pointed out that the computer device A is not limited entirely to rate structures in which the daily rate is substantially less than twenty-four times the hourly rate and in which the weekly rate is substantially less than seven times the daily rate. As a matter of fact, if a parking-lot proprietor wishes to charge at a uniform hourly rate straight through every day of the week and every week of the month, this can be accomplished by setting the rate-set switch 1045 to a daily rate which is equal to twenty-four times the hourly rate and setting the rate-set switch 1045′ to a weekly rate which is seven times such daily rate. There are, of course, certain monetary limits to which the selected embodiment of the present invention is subject, since such rate structure extremes will not ordinarily be encountered. Consequently, the day rate-set switch 1045 has, for reasons of economy, been limited to a capability of $9.90. Therefore, the largest hourly rate which could be selected for purposes of establishing a rate structure, which is constant hour-by-hour throughout the week, would be $0.40. As a matter of fact, this capability could be enlarged by very minor modifications in the components and circuitry used and, therefore, this is in no sense a limitation of the present invention, but merely a characteristic of the herein described embodiment which has been adopted for practical and economic reasons.

It will be evident, from the foregoing discussion, that the parking-lot proprietor has a substantially wide range of selection in setting up a rate structure, but, for purposes of simplifying explanation herein, it will be assumed that the computer device A has been set up for a selected rate structure consisting of an initial hourly charge of $0.25 for the first hour or fraction thereof, a constant hourly charge of $0.20 for each subsequent hour or fraction thereof, a daily charge of $3.00 per day, and a weekly charge of $15.00 per week. Also for purposes of explanation, it will be assumed that no special nighttime or holiday rates are employed in the selected rate structure so that relay $k^2$ will always pull in when a ticket T is inserted into the ticket reading module E. Accordingly, the rate-set switch 1090 is set to $0.25, the rate-set switch 1094 is set to $0.20, the rate-set switch 1045 is set to $3.00, and the rate-set switch 1045′ is set to $15.00.

This is an initial hourly regular rate and a constant hourly regular rate or, in other words, the IHR–CHR rate-combination. Therefore, the truth circuit switches $sw^{133}$ and $sw^{134}$ are set to "up" position, as shown in FIG. 123 (see Table XI). Also, as above noted, the truth circuit switches $sw^{131}$ and $sw^{132}$ are not pertinent since special rates are not included in this particular selected rate structure. Therefore, switches $sw^{131}$ and $sw^{132}$ will be inoperative as long as this selected rate structure is being used.

As has been above stated, when the circuitry is in the configuration of Mode 4, the pulse generator PG will cause the units-counting stepper $900^{b1}$ and the nickels-charging stepper $900^{b3}$ to move in unison through a continuous series of successive discrete steps as long as the pulse generator PG is pulsing. The negative terminal of the coil 2100 of the random minimum unit relay $k^6$ is connected to the first contact-position in the switch $sw^{41}$ of the nickels-charging stepper $900^{b3}$ and, therefore, when the first nickel is charged, the moving contactor of the switch $sw^{41}$ will move into contactive engagement with the first contact position of the switch $sw^{41}$. The contactor of the switch $sw^{41}$, however, is connected to contact 2503 in the pulse generator PG and, therefore, has no connection to ground after the first nickel is charged. When the pulse generator PG pulls in for the second time and the second nickel is charged, a ground-connection is established through the moving contactor of the switch $sw^{41}$, thereby energizing the coil 2100 from the pulse generator PG and causing the relay $k^6$ to pull in. As soon as the relay $k^6$ pulls in, the blade 2101 is moved into contactive engagement with the contact 2103 which is, in turn, connected through normally closed contacts in switch $sw^{21}$ of mode switch $900^a$ to ground. Therefore, as soon as the relay $k^6$ pulls in, it will stay in during all subsequent modes for the balance of the computing cycle and will transmit successive discrete pulses to the nickles-component $Q^n$ of a conventional solenoid-actuated mechanical totalizer which maintains a running total of charges being registered. This is a continuous total and has nothing to do with the charging logic of the computer device A, but makes it possible for the parking-lot proprietor to record the figures on the totalizer at the beginning and end of a period, such as a day, week, or month and, by subtractions, ascertain the total amount of business registered by the computer device A during such period.

Of course, if the hours count-back stepper $800^b$ happens to have been in coincidence at the beginning of Mode 4, no charging will take place, because the mode switch $900^a$ will not find any ground through the hours count-back stepper $800^b$. Instead, the mode switch $900^a$ will find an initial ground through its own interrupter switch 973 which will open as soon as the coil 953 pulls in and, accordingly, the mode switch $900^a$ will move into its fifth or "Mode 5" position. In such case, the relay $k^6$ will not pull in.

It will be noted that the coil 2100 is not energized on the first nickels-charging step of the nickles-charging stepper $900^{b3}$. Therefore, the nickles totalizer $Q^n$ will receive its first energizing pulse on the second nickles-charging step of the nickels-charging stepper $900^{b3}$. Consequently, the nickels totalizer $Q^n$ is always a nickel behind and is corrected in subsequent modes. Whether the relay $k^6$ is pulled in or not and the fact that the totalizer $Q^n$ is a nickel behind are conditions which are used in subsequent modes to simplify final charging circuitry as will presently be more fully explained.

Assuming, however, that the hours count-back stepper $800^{b2}$ is not at coincidence and that the pulse generator PG commences pulsing, the units-counting stepper $900^{b1}$ and the nickels-charging stepper $900^{b3}$ will continue the series of successive discrete steps under control of the pulse generator PG and the coil $823^b$ of the hours count-back stepper $800^b$ will remain de-energized until the switch $sw^{31}$ of the units-counting stepper $900^{b1}$ reaches its fourth position which is connected with the four-position contact of switch $sw^{93}$ (i.e. the units component of the rate-set switch 1094). Since the constant hourly rate is only $.20, the switch $sw^{92}$ (i.e. the tens-component of the rate-set switch 1094), will remain in its zero or "home" position. Since the tens-counting stepper $900^{b2}$ is also in the zero or "home" position to match the position of the switch $sw^{92}$ and since the relay $k^2$ has been pulled in closing switch $sw^{124}$, circuit continuity will be established through the switches $sw^{36}$, $sw^{92}$, $sw^{124}$, $sw^{93}$, and the fourth position of switches $sw^{31}$, to the moving contactor of the switch $sw^{31}$ which is connected to ground through various closed switches within the hours count-back stepper $800^{b2}$. The moving contactor of the switch $sw^{36}$ in the tens-counting stepper $900^{b2}$ is connected to contact 1721 of truth-circuit switch $sw^{133}$ which is in the up position, as above described. Therefore, the moving contactor 1705 is in contactive engagement with the contact 1721, thereby establishing a connection through the contact 1725 and contactor 1707 of truth-circuit switch $sw^{134}$ to the normally open contact of switch $sw^{129}$ in the rate-selection relay $k^2$. Since the rate-selection relay $k^2$ is pulled in, this normally open contact of the switch $sw^{129}$ will now be closed so that a connection will be established to the fourth position of switch $sw^{25}$ in the mode switch $900^a$. Inasmuch as the mode switch $900^a$ is in its fourth position or Mode 4 position, the moving contactor of switch $sw^{25}$ will be in contactive engagement with the fourth position contact of the switch $sw^{25}$ and, therefore, a connection will be established through a set of normally closed contacts in the interrupter switch $844^b$ to the coil 1800, causing the charge-progression relay $k^3$ to pull in. At the same time a connection will also be established between ground and the alternative lead 2506 of the coil 2500 of the pulse generator PG, de-energizing the coil 2500 causing the pulse generator PG to stop pulsing.

When the charge-progression relay $k^3$ pulls in, a ground connection is established to the coil $823^b$ of the hours count-back stepper $800^b$ which cocks the mechanical stepping mechanism thereof. A ground connection is also established to the coil 1900 of the charge-sensing relay $k^4$, causing it to pull in. Thereupon, the lock-in switch $sw^{135}$ closes and establishes an auxiliary ground through switch $sw^{22}$, thereby holding the relay $k^4$ in. Since the switch $sw^{22}$ is of the "make-before-break" type, this auxiliary ground will continue to be connected for the remainder of the computing cycle and will serve as a "memory" to indicate the fact that a charge has been made in Mode 4.

The relay $k^3$, when pulled in, will also establish a ground connection through the interrupter switch $973^{b1}$ and the homing contacts of the units-counting stepper $900^{b1}$. It will be recalled that the units-counting stepper $900^{b1}$ momentarily stopped when it reached its fourth contact position, by reason of the fact that the pulse generator PG stopped pulsing. However, when the charge-progression relay $k^3$ pulls in, and the last-mentioned ground connection is established to the coil $953^{b1}$, the units-counting stepper $900^{b1}$ will start stepping again until it returns to a home or zero position, at which latter position the homing contacts of the units-counting stepper $900^{b1}$ will open and the ground connection to the coil $953^{b1}$ will again be broken, causing the units-counting stepper $900^{b1}$ to stop in home position. At this moment the ground connection to the coil 1800 of the charge-progression relay $k^3$ will be broken and the charge-progression relay $k^3$ will fall out.

When the charge-progression relay $k^3$ falls out, two circuit-conditions will occur. The ground connection to the coil $823^b$ will be broken and the coil $823^b$ will become de-energized, releasing the cocked mechanical stepping mechanism which will return to initial position, thereby causing the hours count-back stepper $800^{b2}$ to move back one increment or step. At the same time, the ground connection to the alternative lead 2506 of the coil 2500 of the pulse generator PG is broken, thereby turning the pulse generator PG on again. The units-counting stepper 900$^{b1}$ will thereupon start a second series of four steps, whereby it will count out a second charge of $.20. Meanwhile, the nickels-charging stepper 900$^{b3}$ has stopped at its fourth position, which is merely an even position showing that the total charge thus far reached has a "zero" for its final digit. Actually, the function of monetary charge-totalization is effected by the dimes-charging stepper 900$^{c1}$, which receives a "carry" from the nickels-charging stepper 900$^{b3}$ each time the latter passes through an odd position and comes to an even position, as will be presently more fully explained. As soon as the pulse generator PG and the units-counting stepper 900$^{b1}$ resume operation, the nickels-charging stepper 900$^{b3}$ will become energized and start stepping in unison with the units-counting stepper 900$^{b1}$. Since it is already at its fourth position, it will move next in order to its fifth, sixth, seventh, and eighth positions while the units-counting stepper moves, for the second time, to its fourth position. It will thus be apparent that the nickles-charging stepper 900$^{b3}$ will have stepped through eight successive positions and arrived at an even-numbered position by the time the units-counting stepper 900$^{b1}$ reaches the fourth-position in this second series of steps. When the units-counting stepper 900$^{b1}$ reaches its fourth position, for the second time, the pulse generator PG will again be shut off, the charge-progression relay $k^3$ will again pull in, cocking the mechanical stepping mechanism of the hours count-back stepper 800$^{b2}$, causing the units-counting stepper 900$^{b1}$ to reset itself to a home position and then causing the charge-progression relay $k^3$ to fall out so that the hours count-back stepper 800$^{b2}$ will step back one more step and the pulse generator PG will again resume its operation for a third charging sequence through the units counting stepper 900$^{b1}$.

Inasmuch as the hours count-back stepper 800$^{b2}$ was in its ninth position at the beginning of Mode 3 (the time of the presumed example being 9:36 a.m.), the above-described sequence of charging operations will be repeated for a total of nine times. It will be noted that all odd-numbered contacts in the switch $sw^{41}$ of the nickel-charging stepper 900$^{b3}$ are connected in common to the coil 953$^{c1}$ of the dimes-charging stepper 900$^{c1}$. Thus, whenever the moving contactor of the switch $sw^{41}$ in the nickels-charging stepper 900$^{b3}$ reaches an odd-numbered contact-position, circuit-continuity will be established between such contactor and the coil 953$^{c1}$ of the dimes-charging stepper 900$^{c1}$ and, consequently, when the next pulse is received by the nickels-charging stepper 900$^{b3}$, causing it to move from the odd-numbered contact-position to the next succeeding even-numbered contact-position, this same pulse will also energize the coil 953$^{c1}$, causing the latter to advance one step. It will, therefore, be evident that the dimes-charging stepper 900$^{c1}$ will advance one step for each two nickels resgistered by the nickels-charging stepper 900$^{b3}$, thereby effecting a dimes-carry. Similarly, the ninth-contact position of switch $sw^{52}$ is connected to the coil 953$^{c2}$ of the dollars-charging stepper 900$^{c2}$ so that when the dimes-charging stepper 900$^{c1}$ receives its tenth pulse, the dollars-charging stepper 900$^{c2}$ will advance one step. Thus, it will be evident that the dollars-charging stepper 900$^{c2}$ will advance one step for each ten dimes registered by the dimes-charging stepper 900$^{c1}$, thereby effecting a dollars-carry. Finally, the ninth-contact of the switch $sw^{63}$ of the dollars-charging stepper 900$^{c2}$ is connected to the coil 953$^{c3}$ of the ten-dollar-charging stepper 900$^{c3}$ so that the latter will advance one step for each ten dollars registered by the dollars-charging stepper 900$^{c2}$, thereby effecting a ten-dollar carry.

In the ninth sequence, the hours count-back stepper 800$^{b2}$ will reach coincidence so that all ground connections through it will be broken, as shown in FIG. 123.

This will have the effect of stopping the pulse generator PG for the last or final time in Mode 4, and will break the ground connection to the coil 953$^{b1}$ by which the mode switch 900$^a$ has been held in. As soon as the coil 953$^{b1}$ of the mode switch 900$^a$ becomes de-energized, the cocked mechanism of mode switch 900$^a$ will move the mode switch 900$^a$ to its fifth or so-called "Mode 5" position, leaving the nickels-charging stepper 900$^{b3}$ in its sixth position, the dimes-charging stepper 900$^{c1}$ at $.80 and the dollars-charging stepper 900$^{c2}$ at $1.00 (i.e. nine times $.20). This monetary amount is less than the daily maximum charge of $3.00. Therefore, the above-described preliminary hours-charging sequences will be caried out to completion as described. If, however, the ticket T had been inserted into the ticket-reading module E. at 9:36 p.m., for instance, so that twenty-two elapsed hours had to be counted, the total would come to $4.45 and, therefore, exceed the daily maximum. Consequently, when the charges accumulated in the dollars-charging stepper 900$^{c2}$ reach $3.00 (which will occur in Mode 4), a ground circuit will be completed through the switches $sw^{76}$–$sw^{77}$ of the daily rate-set switch 1045 to the coil 2000 of the maximum charge relay $k^5$, causing it to pull in and complete alternative ground circuits to the coil 953 of the mode switch 900$^a$ and to the positive terminal of the pulse-generator coil 2500, causing the circuitry to shift directly into Mode 6, before any further charges in excess of $3.00 can be thrown into the charging steppers 900$^{b3}$, 900$^{c1}$, 900$^{c2}$, and 900$^{c3}$. In this connection, it should be noted that the monetary amount of the selected daily rate is manually set into both pairs of switches $sw^{76}$–$sw^{77}$ and $sw^{78}$–$sw^{79}$ of the daily rate-set switch 1045, so that the pair of switches $sw^{76}$–$sw^{77}$ will perform the maximum rate function and the switches $sw^{78}$–$sw^{79}$, as will be subsequently discussed in connection with Mode 7, will be used in conjunction with daily rate charging.

MODE 5—FINAL HOURS CHARGING MODE

At the beginning of Mode 5, the coil 953 of the mode switch 900$^a$ is not energized, since the hours count-back stepper 800$^b$ is now at coincidence and the interrupter switch 973 is connected to an open switch in the relay $k^3$. Therefore, the mode switch 900$^a$ will temporarily remain in its fifth or Mode 5 position, and the mechanical stepping mechanism thereof will not be initially cocked. However, as soon as the mode switch 900$^a$ reaches its Mode 5 position, the coil 2500 of the pulse generator PG will become energized, since the moving contactor 2501 is connected through the switch $sw^{23}$ to the ground. The negative terminal of the coil 2500, that is to say, the contact 2502 is connected through the switch $sw^{26}$ to the interrupter switches 973$^{b1}$ and 973$^{b3}$, respectively, of the units-counting stepper 900$^{b1}$ and the nickels-charging stepper 900$^{b3}$. Since the coils 953$^{b1}$ and 953$^{b3}$, respectively, of the units-counting stepper 900$^{b1}$ and nickels-charging stepper 900$^{b3}$ are not initially energized. The interrupter switches 973$^{b1}$ and 973$^{b3}$ will be closed and, as a result, the coil 2500 of the pulse generator PG will have an alternative connection to ground through the interrupter switches 973$^{b1}$ and 973$^{b3}$, so that the pulse generator PG will not operate on the self-interrupted basis. As soon as the coil 2500 is energized, the pulse generator PG will pull in and the contactor 2501 will move away from contact 2502 into contactive engagement with contact 2503 which is connected through switch $sw^{24}$ on the mode switch 900$^a$ to the negative terminals of the coils 953$^{b1}$ and 953$^{b3}$. The latter, thereupon, become energized causing the units-counting stepper 900$^{b1}$ and the nickels-charging stepper 900$^{b3}$ to move one step. Since the contactor 2501 of the pulse generator PG is no longer in contactive engagement with the contact 2502, the coil 2500 will only find circuit-continuity to ground through the switch $sw^{26}$ of the mode switch 900$^a$ and the interrupter switches 973$^{b1}$ and 973$^{b3}$, but, as soon as the coils $953^{b1}$ and $953^{b3}$ pull in the interrupter switches $973^{b1}$ and $973^{b3}$ will be opened, thereby breaking the circuit-continuity of the coil 2500. Consequently, the coil 2500 will immediately become de-energized and the pulse generator PG will drop out, causing the contactor 2501 to return to initial contactive engagement with the contact 2502. As soon as the contactor 2501 moves away from the contact 2503 the coils $953^{b1}$ and $953^{b3}$ will become de-energized again. This is exactly the same pulsing operation which has been heretofore described in connection with Mode 4, by which the units-counting stepper $900^{b1}$ and the nickels-charging stepper $900^{b3}$ are caused to move in unison through a successive series of discrete steps.

As pointed out above, in connection with the discussion of Mode 4 the switches $sw^{29}$, $sw^{30}$, and $sw^{31}$ of the units-counting stepper $900^{b1}$ are connected in tandem, respectively, with the switches $sw^{34}$, $sw^{35}$, and $sw^{36}$ of the tens-counting stepper $900^{b2}$ through the various rate-set switches 1090 to 1097, inclusive, and cooperative substantially in the manner heretofore described.. In other words, as the soon as the units-counting stepper $900^{b1}$ and the nickels-charging stepper $900^{b3}$ have stepped in unison through a number of steps equal (in terms of nickels) to the rate being charged in Mode 5, the coil 1800 of the charge-progression relay $k^3$ will be connected through the switcth $sw^{25}$ of the mode switch $900^a$ to the normally opened contact of switch $sw^{129}$ in the rate-selection relay $k^2$ is pulled in, as previously explained, this normally opened contact of switch $sw^{129}$ will now be closed so that circuit continuity will be established through the two circuit switches $sw^{133}$, $sw^{134}$, and the switch $sw^{20}$ of the minutes-output stepper $800^e$ to ground through the switch $sw^{34}$ of the tens-counting stepper $900^{b2}$, the switches $sw^{84}$ and $sw^{85}$ of rate-set switch 1090, and switch $sw^{30}$ of the units-counting stepper $900^{b1}$.

The rate structure of the presumed example consists of the rate-combination IHR-CHR and, therefore, it will be apparent from the truth table (Table X) that the rate which will be charged in Mode 5 is the rate IHR, regardless of whether a previous charge has been made in Mode 4 and regardless of whether the minutes-output stepper $800^e$, is on a high lobe or a low lobe. Thus, in the presumed example, the position of the minutes-output stepper $800^e$ is not relevant and it is, therefore, by-passed. In other words, the normally open contact of switch $sw^{129}$ in the rate-selection relay $k^2$ will be connected to contactor 1708 in truth switch $sw^{134}$ which is. in turn, connected through contact 1727 to contactor 1706 of truth switch $sw^{133}$. The contactor 1706 is connected through contact 1723 to the contactor of switch $sw^{30}$ in the units-counting stepper $900^{b1}$. The contacts of switch $sw^{30}$ are connected through rate-set switch 1090 and switch $sw^{34}$ of the tens-counting stepper $900^{b2}$ to ground through switch $sw^{23}$ of the mode switch $900^a$. The ordinal relationship between switches $sw^{29}$, $sw^{30}$, $sw^{31}$ of the units-counting stepper $900^{b1}$ and the switches $sw^{34}$, $sw^{35}$, $sw^{36}$ of the tens-counting stepper $900^{b2}$ is the same as above described in connection with Mode 4.

Since rate-set switch 1090 reflects the initial hourly rate IHR (see Table VIII) the units-counting stepper $900^{b1}$ and nickels-charging stepper $900^{b3}$ will step in unison until the proper monetary charge has been registered, which, under the presumed rate-structure, will be $.75. The nickels-charging stepper $900^{b3}$ will add this charge to the charges registered in Mode 4 and such charges will accumulate in the dimes, dollars, and ten-dollars stepper $900^{c1}$, $900^{c2}$, $900^{c3}$, as described above in connection with Mode 4, so that the monetary amount carried therein will now come to $2.05.

When this proper monetary charge has been registered, circuit continuity to ground will be established for the coil 1800 and the charge-progression relay $k^3$ will pull in. At this instant, two things will occur. The alternate lead 2506 to the positive side of the pulse-generator coil 2500 will go to ground, causing the pulse generator PG to stop pulsing, and the coil 953 of mode switch $900^a$ will be energized, thereby cocking the stepping mechanism associated therewith. However, this circuit which is established in Mode 5 from the coil 953 of the mode switch $900^a$ to ground when the charge-progression relay $k^3$ pulls in, passes through the interrupter switch 973. Hence, as soon as the coil 953 pulls in, the interrupter switch 973 will break this circuit to ground and the coil 953 will again become de-energized allowing the cocked stepping mechanism to return to initial position and thereby move the mode switch $900^a$ into the sixth or "Mode 6" position.

In the presumed example (i.e. time-now at 9:36 a. m. and time-then at midnight), only ten elapsed hours will be counted and the total charge will amount to $2.05, which is less than the daily maximum of $3.00. Therefore, the above-described final hours-charging sequence will be carried out to completion as described. If, however, the ticket T had been inserted into the ticket-reading module C at 2:25 p. m., for instance, fourteen hours would have been counted out and registered in Mode 4 amount to a monetary charge of $2.80, which is slightly under the daily maximum charge. However, when the final charge is computed in Mode 5 at the rate of $.25, the total would be $3.05, but this exceeds the daily maximum charge. Therefore, as soon as $3.00 is reached, the coil 2000 of the maximum charge relay will pull in, as above described, and the circuitry will immediately shift to Mode 6. As a matter of fact, the daily maximum charge can be reached in either Mode 4 or Mode 5, and the relay $k^5$ will pull in wherever the daily maximum charge is reached.

Before proceeding to describe Mode 6, it is necessary to deal with several types of charging problems which are not illustrated or explained by the foregoing discussion based on the presumed example. It will be remembered that the minutes-output stepper $800^e$ is on its low lobe if the minutes counted out during Mode 3 are less than thirty and is on its high lobe if the minutes counted out in Mode 3 are greater than thirty. If the rate-combination which happens to have been selected for rate structure includes an initial half-hourly charge, then it is essential to determine whether the minutes counted out in Mode 3 are greater or less than thirty. Obviously, if less than thirty minutes have been counted out in Mode 3, it will be necessary to charge for the initial half-hour of elapsed time at the initial half-hourly rate. On the other hand, if the minutes counted out in Mode 3 are greater than thirty, then, of course, it is necessary to make a charge for the initial half-hour and also to make a charge for the second half-hour, at whatever monetary rate may be required by the rate structure that has been adopted and set up within the various switches of the rate module G. If, for instance, the selected rate-combination consists of an initial half-hourly charge and a constant half-hourly charge (i.e. IXR–CXR or IXS–CXS) then the customer should pay for the first half-hour at the initial half-hourly rate and for the second half-hour at the constant half-hourly rate. This can be accomplished by making a single charge in Mode 5 at the dual rate consisting of the sum of the initial half-hourly rate plus the constant half-hourly rate (either IXCXR or IXCXS, depending on whether regular or special rates are applicable). This same charging logic will apply, in this instance, irrespective of whether a previous charge has been made in Mode 4, as will be apparent from from the truth table (Table X). If the rate structure includes an initial half-hourly charge and a constant hourly charge (i.e. IXR–CHR or IXS–CHS), a substantially similar situation exists.

If the rate structure includes an initial hourly charge and constant half-hourly charge (i.e. either IHR–CXR or IHS–CXS), a somewhat different situation exists. Suppose, for example, the elapsed time which must be counted and charged in Modes 4 and 5 is three hours and twenty minutes (assuming that the grace period has already been deducted in Mode 2). Suppose, further, that regular rates rather than special rates are applicable and that IHR–CXR are respectively set at $.20 and $.25. Obviously, in this amount of elapsed time, there will be one initial first hour and two subsequent hours, each consisting of two half-hourly periods. The final twenty minutes, being a fraction of a half-hour will count as a fifth half-hourly period. As has been previously stated, elapsed time is always counted out in terms of full hours, during Mode 4. Thus, in Mode 4, a first hourly charge will be made at the initial hourly rate (IHR) and, thereafter, the four succeeding half-hourly periods (which are ostensibly charged to the customer at a stated constant half-hourly rate) will actually be computed as two full hours at the auxiliary constant hourly rate (i.e. the CHR which is twice CXR and has been set into rate-set switch 1094), as indicated in the truth table (Table X). This is accomplished by reason of the fact that for the rate-combination the truth circuit switches $sw^{133}$ and $sw^{134}$ are set respectively in "down" and "up" positions, as shown in Table XI. Consequently, when the switch $sw^{30}$ of the units-counting stepper reaches its grounded-out contact-position for the first time in Mode 4 (i.e. the fourth contact-position since IHR equals $.20 as assumed above), the circuit will be completed to ground from the moving contactor of the switch $sw^{30}$, through rate-set switch 1090, the switch $sw^{34}$ of the tens-counting stepper $900^{b2}$ and the various closed switches $sw^3$–$sw^{12}$, inclusive, of the hours count-back stepper $800^b$ since the latter is not at coincidence. The moving contactor of the switch $sw^{30}$ is, in turn, connected through the normally closed contacts of switch $sw^{136}$ in relay $k^4$ and the truth circuit switches $sw^{133}$, $sw^{134}$ (i.e. contacts 1722, 1725 and contactors 1705, 1707) to the switch 129 and thence through the switch $sw^{25}$ and the interrupter switch $844^b$ to the coil 1800 of the charge-progression relay $k^3$ which then pulls in to terminate the first charging sequence and cause the hours count-back stepper $800^b$ to step back one step. When the relay $k^3$ pulls in, the charge sensing relay also pulls in and remains in, thereby shifting the switches $sw^{136}$, $sw^{137}$ into the position shown in dotted lines in FIG. 123. Thus, when the next charging sequence commences the coil 1800 of the charge-progression relay $k^3$ is connected through the truth circuitry and the normally open contacts of switch $sw^{136}$ (which are now closed) to the moving contactor of the switch $sw^{36}$ in the tens-counting stepper $900^{b2}$. The switch $sw^{36}$ is connected through rate-set switch 1094 (relay $k^2$ being pulled in and switch $sw^{124}$ thereof being closed) to the switch $sw^{31}$ of the units-counting stepper $900^{b1}$ and, thence, through the moving contactor of switch $sw^{31}$ and the coincidence circuitry of the hours count-back stepper $800^b$ to ground. Since this line of circuitry involves rate-set switch 1094, the second and all subsequent charging sequences in Mode 4 will be charged at the rate CHR which has been set into rate-set switch 1094 thereby fulfilling the Mode 4 requirement of the truth table. Since the suppositious elapsed time of three hours and twenty minutes only includes three full hours, such three hours will be charged out in three successive charging sequences, whereupon the hours count-back stepper $800^b$ will arrive at coincidence and Mode 4 will terminate.

Meanwhile, the twenty minutes which will have been stored, so to speak, in the minutes-output stepper $800^e$ during Mode 3 will remain to be charged in Mode 5. Since the customer is being charged at a stated constant rate for each half hour after the first full hour, it will be necessary to make a single additional charge at this half-hourly rate for the remaining twenty minutes in order to render a correct computation of the amount of money owed by the customer for elapsed time of three hours and twenty minutes. In other words, final charging in Mode 5 must be carried out at the constant half-hourly rate, CXR, as shown in the truth table (Table X). This is accomplished by reason of the fact that the circuitry will now have certain pre-conditions as it moves into Mode 5. The truth circuitry switches, of course, will have been set in "down" and "up" positions to reflect the adaptation of the rate-combination IHR-CXR; the charge sensing relay $k^4$ will remain pulled in, thereby indicating that there has been a previous charge in Mode 4; and the minutes output stepper will be in the normal position, that is to say, the positon shown in full lines in FIG. 124, thereby indicating that a minutes-increment of less than thirty minutes has been stored during Mode 3. Therefore, when the mode switch moves into its fifth position, the coil $953^{b1}$ of the units-counting stepper $900^{b1}$ will be connected to ground as previously described and the pulse generator PG will commence pulsing so that the units-counting stepper $900^{b1}$ and nickels-charging stepper will step in unison. In this circuit configuration, however, the switch $sw^{29}$ is the only one of the three switches $sw^{29}$, $sw^{20}$, $sw^{31}$, which is operatively connected. The moving contactor of this switch $sw^{29}$ is connected through the minutes output stepper $800^e$ and the truth circuitry to the switch $sw^{129}$ and thence to the coil 1800 of the charge-progression relay $k^3$. Therefore, when this switch $sw^{29}$ reaches its grounded-out position (i.e. the fifth contact-position since CXR equals $.25 as is assumed above), a ground connection will be established from the coil 1800 of the charge-progression relay $k^2$ through the rate-set switch 1092 (the relay $k^2$ being pulled in) and the switch $sw^{34}$. Consequently, a charge of $.25 is stepped out and registered thereby fulfilling the requirements of the truth table (Table X).

If the elapsed time of the previous example had been three hours and forty minutes instead of three hours and twenty minutes, the final forty minutes would have been stored in the minutes-output stepper $800^e$ during Mode 3. Since this final period of elapsed time is in excess of a half hour, the switch $sw^{20}$ of the minutes-output stepper $800^e$ would be in off-normal position. Under the last-mentioned suppositious rate-combination (i.e. IHR–CXR), the remaining forty-minute period would be treated as two succeeding half-hourly periods inasmuch as the final ten minutes thereof is a fraction of a half hour. Consequently, the customer would be required to pay for such remaining forty-minute period in terms of two half-hourly periods at the constant half-hourly rate. This charge is arithmetically equal to the auxiliary constant hourly-rate (i.e. the CHR which has been set into the rate-set switch 1094). As will be seen by reference to FIG. 124, when the minutes-output stepper $800^e$ is in off-normal position, the contactors of the switch $sw^{20}$ will be in the position shown in dotted lines, thereby establishing circuit continuity to the contactor of the switch $sw^{31}$ in the units-counting stepper $900^{b1}$ which, of course, is electrically associated with the rate-set switch 1094.

If the elapsed time of the previous example had been only forty-minutes instead of three hours and forty-minutes, there will, of course, be no hours-component to be charged. In other words, the hours count-back stepper $800^b$ will have been at coincidence at the beginning of Mode 4 and the circuit will immediately step through Mode 4 without making any charge. Hence, the charge sensing relay will not pull in. Therefore, when Mode 5 is reached, the switches $sw^{136}$, $sw^{137}$ will still be in the position shown in full lines in FIG. 124 and the switch $sw^{30}$ will again be the only one of the switches $sw^{29}$, $sw^{30}$, $sw^{31}$ that is operatively connected. Since this switch $sw^{30}$ is associated with the rate-set switch 1090, the rate which has been set into this rate-set switch 1090 will be charged (i.e. IHR which equals $.20 as assumed above) to fulfill the requirements of the truth table (Table X). Since, in the presume case (i.e. a rate-combination IHR–CXR), an initial charge is made for the first full hour or fraction thereof, it will make no difference whether the elapse time is more or less than thirty minutes and, therefore, the position of the minutes-output stepper $800^e$ is not relevant. As will be seen from FIG. 124, when the relay $k^4$ is not pulled in, the minutes-output stepper $800^e$ is, in effect, by-passed through the contactors 1705, 1707, of the truth circuit switches $sw^{133}$, $sw^{134}$. Again, when the charging operation has been completed, coil 1800 will be energized and the units-counting stepper 900$^{b1}$ will return to a home position. Thereupon, the mode switch 900$^a$ will move to the Mode 6 position.

There is one further problem of charging logic which may require explanatory comment. It will be remembered that, during Mode 2, a grace period of ten minutes was deducted from the minutes count-back stepper 800$^a$. Also an arbitrary additional deduction of two and one-half minutes was made for the purpose of simplifying the charging logic and truth circuitry. As a matter of fact, the size of this arbitrary additional deduction is not important. It is merely necessary to make an arbitrary additional deduction of some finite size for the following reasons. Suppose that a ticket T is inserted into the ticket reading module E at ten minutes after any hour (assuming that a grace period of ten minutes is used). In such case, if no arbitrary additional deduction is used, the minutes count-back stepper 800$^a$ would be stepped back to coincidence, leaving no minutes to be charged. For example, if the ticket T was inserted into the ticket reading module E at 4:10 o'clock, of either day time or night time on any day), then the allowance of the grace period will create a chargeable "time-now" of exactly 4:00 o'clock and there will be no fractional part of the fourth hour so the customer can only be charged for the three elapsed hours. However, the minutes-output stepper 800$^e$ will, nevertheless, be in normal position as though some minutes less than thirty had been recorded and, therefore, an erroneous charge would be made in Mode 5 for this phantom minutes-period. It is, of course, possible to avoid charging for such phantom minutes-period by including additional components in the truth circuitry which can make a three-way distinction between no-minutes, minutes-less-than-thirty, and minutes-more-than thirty in the minutes-output stepper 800$^e$. The need for such additional components and the attendant complications in charging logic, however, can be very simply and economically obviated merely by the use of an arbitrary additional deduction in Mode 2, because such deduction will have the effect of stepping back the minutes count-back stepper 800$^a$ to a "time-now" of 3:57½ o'clock. In so doing, a negative-carry of one hour will be deducted from the hours count-back stepper 800$^b$ and the minutes-output stepper 800$^e$ will move into off-normal position to represent the 57½ minutes. Consequently, three hours will be charged out in Mode 4 and the two half-hourly periods now "stored" in the minutes-output stepper 800$^e$ and will be charged out in Mode 5 under surveillance of the truth table (Table X) in the manner above described, depending upon which selected rate-combination is in effect.

On the other hand, if actual time-now had been 4:12½, then, assuming a deduction of both grace period and the 2½ minutes arbitary additional deduction, the minutes count-back stepper 800$^a$ would be stepped back to coincidence and the hours count-back stepper 800$^b$ would remain in its fourth position, thereby creating a chargeable "time-now" of exactly 4:00 o'clock. In this instance however, the position of the minutes output stepper 800$^e$ would again cause a charge to be made in Mode 5 for the first half-hour in the fourth hour, but this charge would not be in error, because the "time-now" which should be actually charged to the customer is 4:02½ (i.e. 4:12½ minus the ten minutes grace period). Since this is still a fractional portion of the next half-hour after 4:00 o'clock, the customer should properly be charged therefor.

MODE 6—CIRCUIT NORMALIZING INTERVAL

As has been indicated above, the units-counting stepper 900$^{b1}$ and also the tens-charging stepper 900$^{b2}$ (if it has been involved) are reset to home position at the end of Mode 5, but this resetting is partially mechanical and, therefore, consumes some amount of operational time. Even though this operational time is only a few microseconds, it is possible that the resetting may not be fully completed and the switch elements fully at rest by the time Mode 6 is reached. Since any computations made in Mode 7 would be in error if the units-counting stepper 900$^{b1}$ and tens-charging stepper 900$^{b2}$ are not at home position, this must be provided for in Mode 6.

Figure 125:
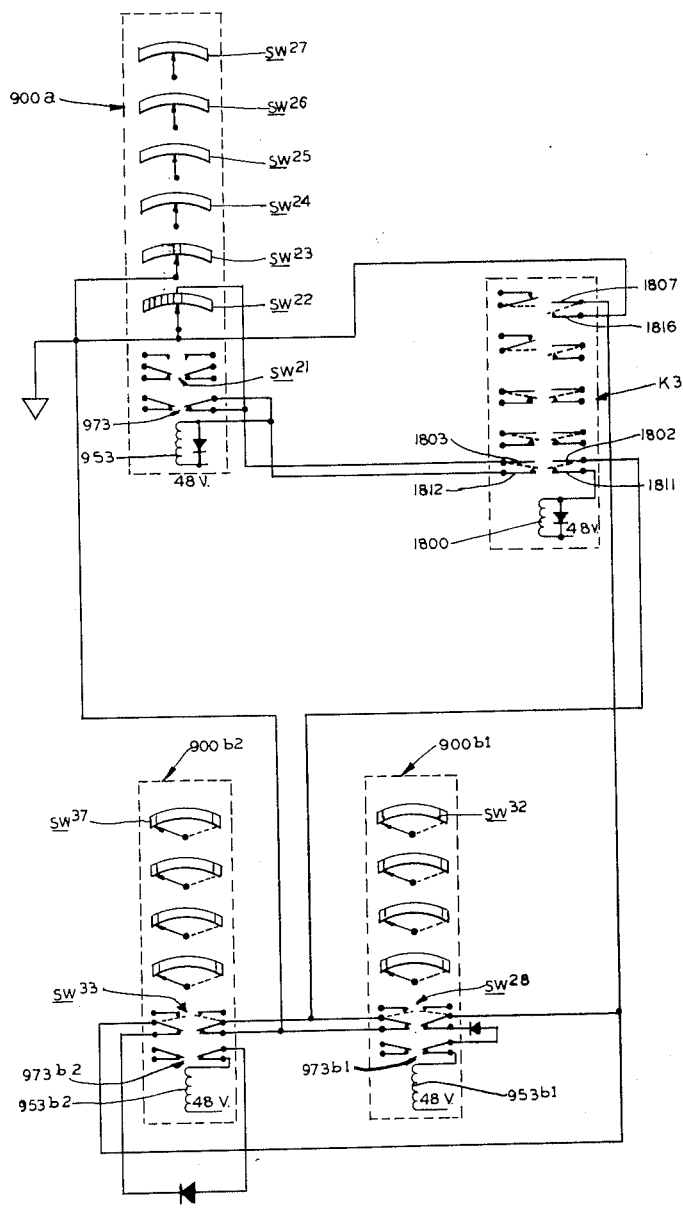

As will be seen by reference to FIG. 125, if the units-counting stepper 900$^{b1}$ and tens-charging stepper 900$^{b2}$ are at home position, the homing switches $sw^{28}$ and $sw^{33}$ will be in off-normal position (i.e. the position shown in dotted lines) and no circuit will exist to the coil 1800 of the charge-progression relay $k^3$. Hence, the charge-progression relay will be in the position shown in full lines in FIG. 125, and the coil 953 of the mode switch 900$^a$ will merely move through its own interrupter switch 973 to the Mode 7 position. If, however, either the units-counting stepper 900$^{b1}$, the tens-charging stepper 900$^{b2}$, or both, are not at home position, the homing switches will be in normal position (i.e. the position shown in full lines in FIG. 125). Moreover, the charge-progression relay $k^3$ will also remain pulled in since the circuit to the coil 1800 thereof will still be completed through one or both of the switches $sw^{28}$, $sw^{33}$, and the contactors thereof will be in the energized position (i.e. the position shown in dotted lines in FIG. 125). Consequently, an alternative ground circuit will be completed directly from the coil 953 of the mode switch 900$^a$ through the charge-progression relay $k^3$ and switch $sw^{22}$ to ground and the mode switch 900$^a$ will be held in the Mode 6 position until the units-counting stepper 900$^{b1}$ and tens-charging stepper 900$^{b2}$ are both at home position, whereupon the homing switches $sw^{28}$, $sw^{33}$ will return to off-normal position, causing the charge-progression relay $k^3$ to drop out, which, in turn, causes the mode switch 900$^a$ to move on to its seventh or Mode 7 position.

MODE 7—DAYS CHARGING MODE

In Mode 7, the coil 953 of the mode switch 900$^a$ is connected to the moving contactors of the switches $sw^{14}$, $sw^{15}$, $sw^{16}$ of the days count-back stepper 800$^c$. In the presumed example, "time-now" is 9:36 a.m. on Tuesday of the second week and, therefore, the hours count-back stepper 800$^b$ will be in its third position (see Table III). Since "time-then" is presumed to be midnight Sunday of the first week, there will be lack of coincidence between the switches $sw^{14}$, $sw^{15}$, $sw^{16}$ of the days count-back stepper 800$^c$ and the reader micro-switches 698, 699, 700. Therefore, the coil 953 of the mode switch 900$^a$ will be connected directly to ground through this coincidence circuitry. As long as there is lack of coincidence between the switches $sw^{14}$, $sw^{15}$, $sw^{16}$ and the reader micro-switches 698, 699, 700, the coil 953 will become energized and remain energized until coincidence is reached. It will also be noted that the interrupter switch 973 of the mode switch 900$^a$ is initially closed and is connected to ground through the switch $sw^{23}$, thereby momentarily establishing a duplicate ground connection which is broken as soon as the coil 953 pulls in and opens the interrupter switch 973.

The negative terminal of the pulse generator coil 2500 is connected through the sixth contact position of the switch $sw^{26}$ in the mode switch 900$^a$ to the interrupter switch 973$^{b1}$ of the units-counting stepper 900$^{b1}$ and to the interrupter switch 973$^{c1}$ of the dimes-charging stepper 900$^{c1}$ which are initially closed and, in such closed position, establish a connection to ground through the coincidence circuitry of the days count-back stepper 800$^c$. The positive terminal of the coil 2500 is connected directly to a source of positive potential and the alternate lead 2506 is also connected through the normally closed interrupter switch 844$^d$ of the weeks count-back stepper 800$^d$ and thence to the auxiliary switch $sw^{13}$ of the days count-back stepper $800^c$, which, when closed, is connected to ground through the coincidence circuitry of the switches $sw^{14}$, $sw^{15}$, $sw^{16}$. However, since the days count-back stepper $800^c$ is in its third position, the switch $sw^{13}$ will be in normal or open position and, therefore, there will be no ground connection established for the alternate lead 2506 and the coil 2500 of the pulse generator PG will become energized. The coils $953^{b1}$ and $953^{c1}$ of the units-counting stepper $900^{b1}$ and the dimes-charging stepper $900^{c1}$, respectively, are connected through the switch $sw^{24}$ of the mode switch $900^a$ to the contact 2503. The contactor 2501 is connected to ground through the coincidence circuitry of the switches $sw^{14}$, $sw^{15}$, $sw^{16}$, of the days count-back stepper $800^c$ and, therefore, when the coil 2500 is energized and shifts the contactor 2501 into contactive engagement with the contact 2503 the coils $953^{b1}$, $953^{c1}$, will become energized and pull in. When this occurs, the interrupter switches $973^{b1}$ and $973^{c1}$ will open, breaking the ground connection to the negative terminal of the coil 2500 and the pulse generator PG will drop out, causing the contactor 2501 to return to initial position. When this occurs, the circuit through the contact 2503 to the coils $953^{b1}$ and $953^{c1}$ will open and the coils $953^{b1}$ and $953^{c1}$ will become de-energized. Meanwhile, the coil 2500 of the pulse generator PG will again become energized. It will thus be evident that the pulse generator PG will cause the units-counting stepper $900^{b1}$ and the dimes-charging stepper $900^{c1}$ to move in a continuous series of successive discrete steps from their respective home positions as long as the above-described circuit-condition between the pulse generator PG and the two steppers $900^{b1}$, $900^{c1}$ continues to exist.

Figure 126:
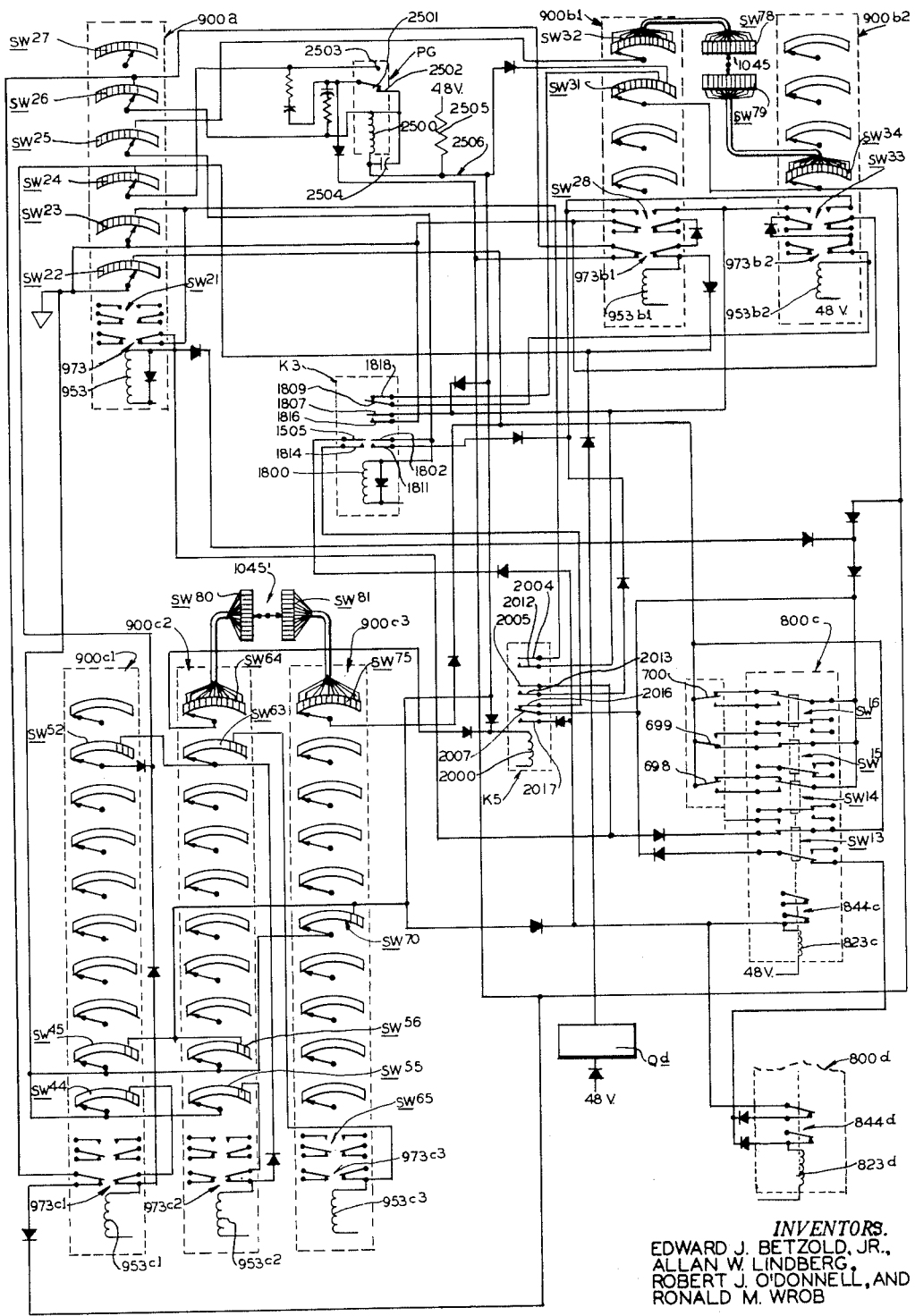
Figure 127:
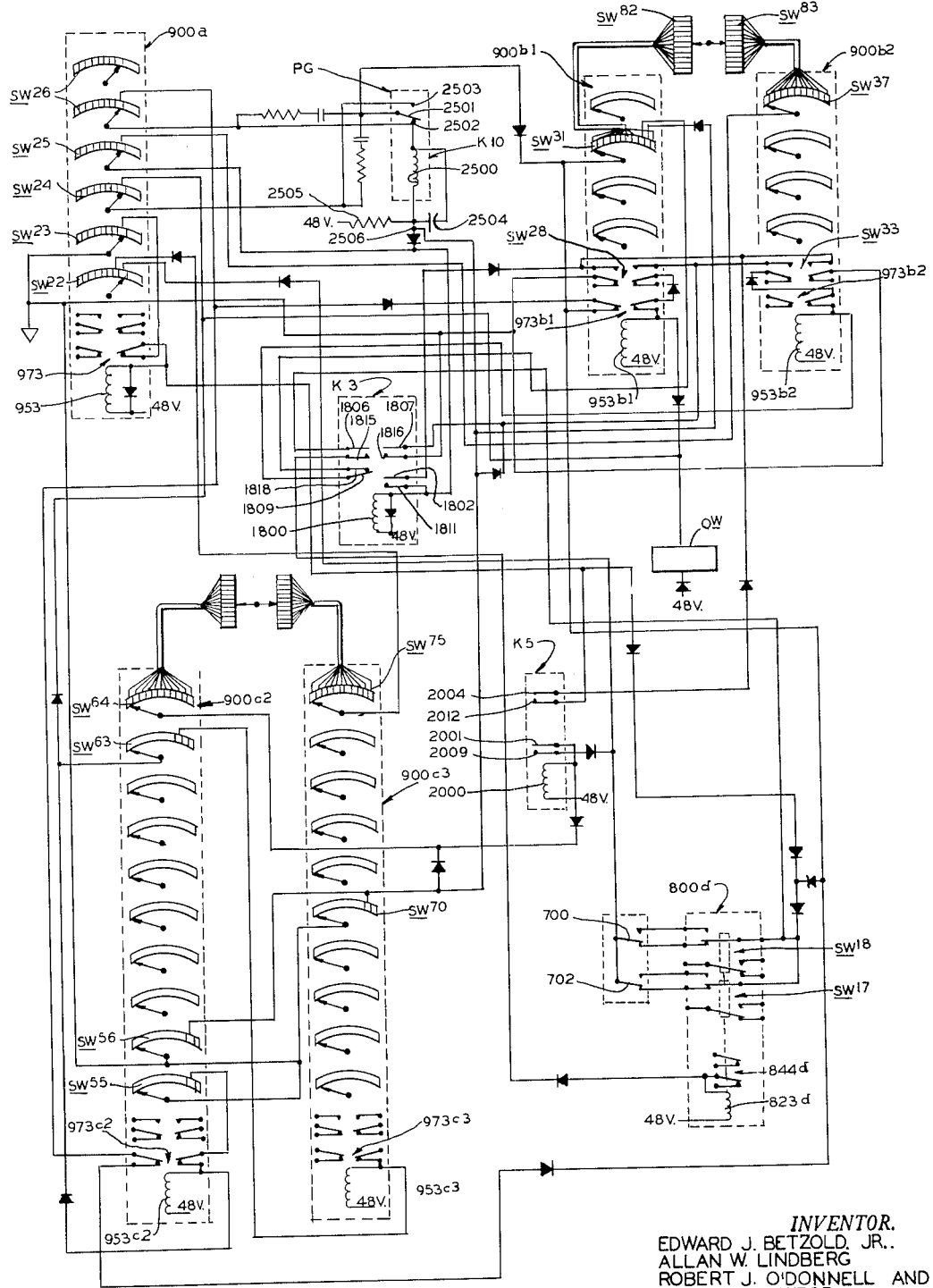
Figure 128:
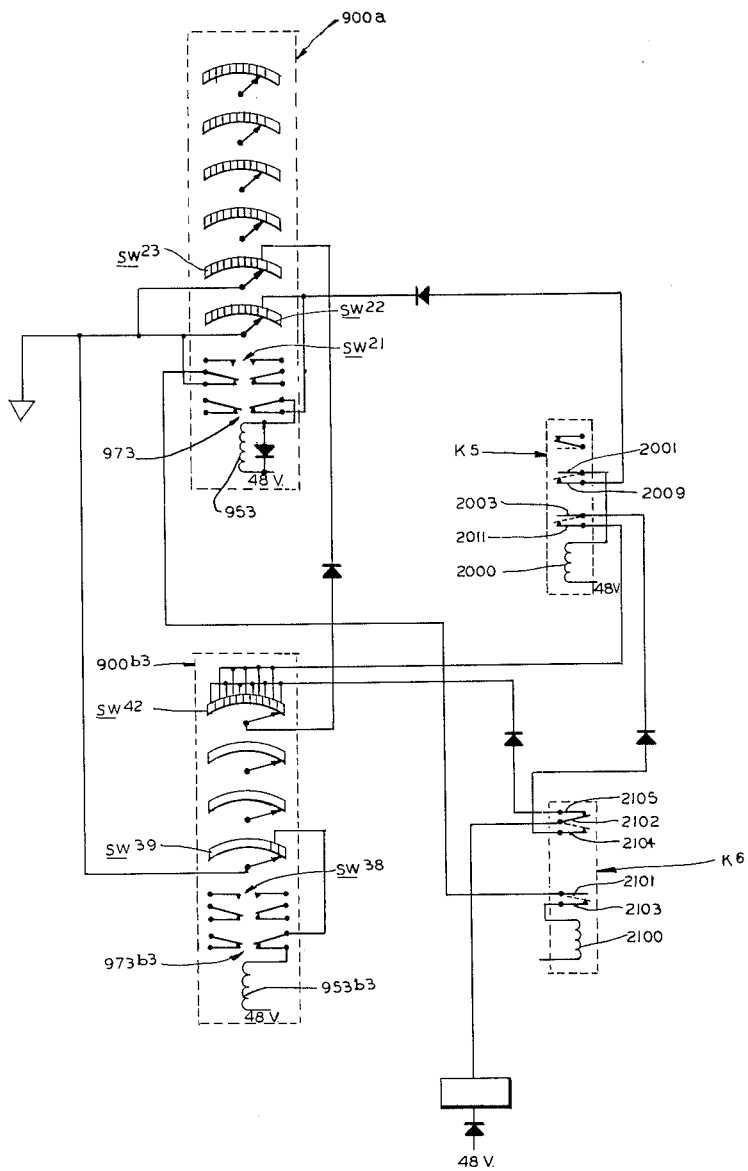
Figure 129:
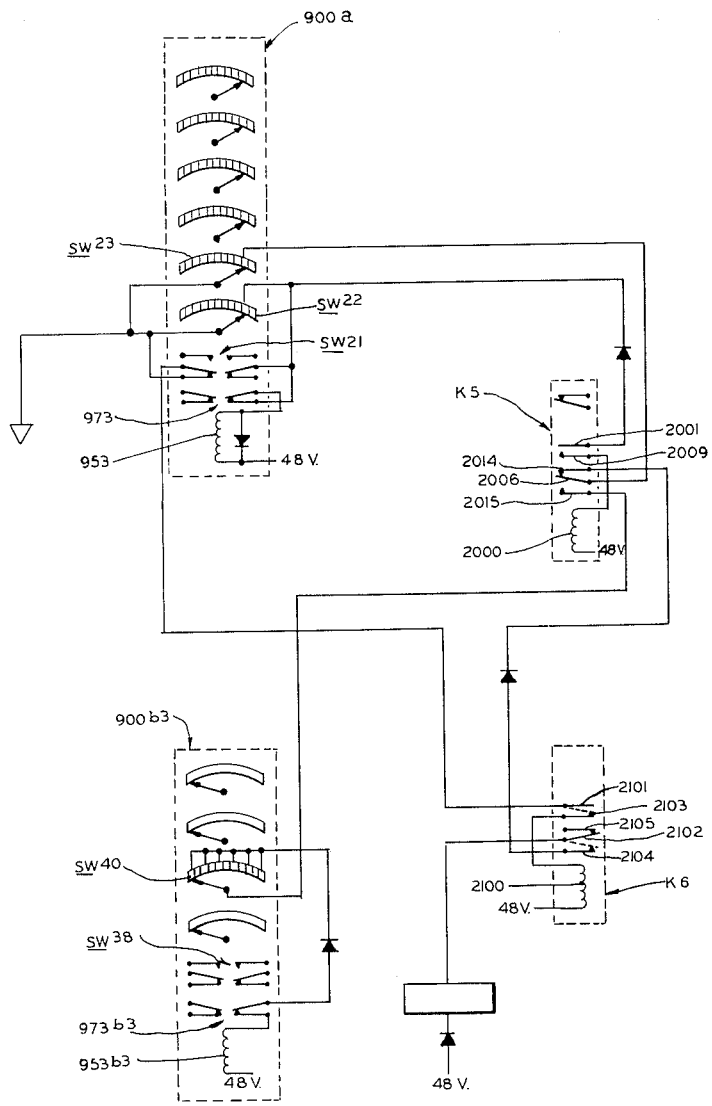

As will be seen by reference to FIG. 126, the two contact-positions of the switch $sw^{32}$ of the units-counting stepper $900^{b1}$ is connected by a ten-wire harness to the corresponding ten contact positions of the switch $sw^{78}$ which carries the units digit in the monetary amount of the selected daily rate, whatever that may be. The moving contactor of this switch $sw^{78}$ is directly connected to the moving contactor of the companion switch $sw^{79}$ which carries the tens digit in the monetary amount of the selected daily rate, and the ten contact positions of the switch $sw^{79}$ are, in turn, connected by a ten-wire harness to the ten contact positions of the switch $sw^{34}$ in the tens-counting stepper $900^{b2}$. The moving contactor of the switch $sw^{34}$ is, in turn, connected to ground through the coincidence circuitry of the days count-back stepper $800^c$ and this ground connection also extends to the moving contactor of the switch $sw^{31}$ in the units-counting stepper $900^{b1}$. As previously explained, the ninth position contact in this switch $sw^{31}$ is connected through a normally closed single-pole, single-throw switch in the charge-progression relay $k^3$ to the coil $953^{b2}$ of the tens-counting stepper $900^{b2}$. Consequently, whenever the units-counting stepper $900^{b1}$ reaches its ninth position, the coil $953^{b2}$ of the tens-counting stepper $900^{b2}$ will be energized, thereby cocking the stepping mechanism associated therewith. When the units-counting stepper $900^{b1}$ moves from its ninth position to its tenth position, thereby making its tenth count and passing to its zero position, the ground circuit to the coil $953^{b2}$ of the tens-counting stepper $900^{b2}$ will again be broken, so that the coil $953^{b2}$ will be de-energized and the cocked stepping mechanism will return to initial position, causing the tens-counting stepper $900^{b2}$ to advance to its first position, thereby effecting a so-called "tens-carry" from the units-counting stepper $900^{b1}$ to the tens-counting stepper $900^{b2}$. Since the day rate is $3.00, the units-counting stepper $900^{b1}$ will continue stepping under the control of the pulse generator PG for a series of thirty successive discrete steps and, in so doing, will effect a tens-carry into the tens-counting stepper $900^{b2}$ for each ten steps. Thus the tens-counting stepper $900^{b2}$ will be advanced to its third position when the units-counting stepper $900^{b1}$ reaches its tenth or zero position for the third time. Since the rate-set switch 1045 has been set at the monetary amount of $3.00, a circuit will be completed, for the first time during this particular charging sequence, from the coil 1800 of the charge-progression relay $k^3$ to ground through the switches $sw^{32}$, $sw^{34}$, and through the coincidence circuitry of the days count-back stepper $800^c$.

Meanwhile, the coil $953^{c1}$ has been energized and the dimes-charging stepper $900^{c1}$, with which it is associated, will have been stepping in unison with the units-charging stepper $900^{b1}$, so that the amount of $3.00 (in terms of thirty dimes) will have been registered by the dimes-charging stepper $900^{c1}$. As has been previously explained, the dimes-charging stepper $900^{c1}$ and the dollars-charging stepper $900^{c2}$ are electrically interconnected so that the dimes-charging stepper $900^{c1}$ will throw a dollars-carry into the dollars-charging stepper $900^{c2}$ for each ten dimes registered in the dimes-charging stepper $900^{c1}$. Similarly, the dollars-charging stepper $900^{c2}$ and the ten-dollars charging stepper $900^{c3}$ are electrically interconnected so that the dollars-charging stepper $900^{c2}$ will throw a ten-dollars-carry into the ten-dollars charging stepper $900^{c3}$ for each ten dollars registered in the dollars-charging stepper $900^{c2}$.

It will be noted that the negative terminal of the coil $953^{b1}$ of the units-counting stepper $900^{b1}$ is also connected directly to the dimes-order $Q^d$ of a conventional solenoid-actuated electro-mechanical totalizer which, as previously stated, maintains a running total of charges being registered. Of course, since the successive steps of the units-counting stepper $900^{b1}$ in Mode 7 represent dimes (rather than nickels as in Modes 4 and 5), the connection in Mode 7 must necessarily be to the dimes-order $Q^d$.

When the units-counting stepper $900^{b1}$ and the tens-counting stepper $900^{b2}$ mutually reach positions corresponding to the monetary amount of $3.00 and the coil 1800 of the charge-progression relay $k^3$ is energized, the first charging sequence will be terminated. When the charge-progression relay $k^3$ pulls in, a circuit will be completed to ground from the coil $823^c$ of the days count-back stepper $800^c$, causing the latter to pull in and cock the stepping mechanism thereof. Thereupon, the units-counting stepper $900^{b1}$ and the tens-counting stepper $900^{b2}$ are reset to home or zero position through the respective auxiliary switches $sw^{28}$ and $sw^{33}$. Obviously, as soon as the units-counting stepper $900^{b1}$ and tens-counting stepper $900^{b2}$ start this homing operation, circuit-continuity between the coil 1800 and ground through the switches $sw^{32}$, $sw^{34}$, will be broken, but when the charge-progression relay $k^3$ pulls in, an auxiliary ground circuit is established for the coil 1800 through a hold-in switch within the relay $k^3$ and the switches $sw^{28}$, $sw^{33}$, as long as the latter are in off-normal position. When the units-counting stepper $900^{b1}$ and the tens-counting stepper $900^{b2}$ reach home position, the switches $sw^{28}$, $sw^{33}$, will go into off-normal position, thereby breaking this auxiliary ground connection to the coil 1800 and the charge-progression relay $k^3$ will accordingly drop out. When this occurs, the coil $823^c$ of the days count-back stepper $800^c$ will drop out releasing the stepping mechanism associated therewith and the days count-back stepper $800^c$ will move back one step from its third position to its second position, thereby counting out one day.

As soon as the charge-progression relay $k^3$ has dropped out, the coil 2500 of the pulse generator PG will again be energized, thereby initiating a second days-charging sequence which will be carried through in exactly the same manner as above described. When the second days-charging sequence has been completed, the days count-back stepper $800^c$ will again move back one step from its second position to its first position and a third days-charging sequence will be initiated. At the end of the third days-charging sequence, the days count-back stepper $800^c$ will move one step back from its first position to its zero position, at which position coincidence will be established between the switches $sw^{14}$, $sw^{15}$, $sw^{16}$ of the days count-back stepper $800^c$ and the reader micro-switches 698, 699, 700, so that all ground-circuit continuity used in Mode 7 will be broken and the coil 953 becomes de-energized, whereupon, the cocked stepping mechanism associated therewith will be released, and the mode-switch $900^a$ will move into its eighth or Mode 8 position.

Since the monetary amount of $2.05 has been registered in the dimes-charging stepper $900^{c1}$ and the dollars-charging stepper $900^{c2}$ during Modes 4 and 5, the charging operations carried out in Mode 7 will add a further monetary amount of $9.00 (i.e. three times $3.00) to the previously accumulated amount. Thus, as the circuitry passes from Mode 7 to Mode 8, the dimes-charging stepper $900^{c1}$ and the dollars-charging stepper $900^{c2}$ will conjointly contain the monetary amount of $11.05. Inasmuch as this monetary amount is less than the weekly maximum charge of $15.00, the successive days-charging sequences will be carried out to completion as described. If, however, the ticket T had been inserted into the ticket-reading module E on Friday, rather than on Tuesday, as assumed, so that six elapsed days had to be counted, the total of six days at a daily rate of $3.00 would come to $18.00 and, therefore, exceed the weekly maximum. Consequently, when the charges accumulated in the dollars-charging stepper $900^{c2}$ and the ten-dollars charging stepper $900^{c3}$ reach $15.00, a ground circuit will be completed through the switches $sw^{80}$–$sw^{81}$ of the weeky rate-set switch 1045' to the coil 2000 of the relay $k^5$, causing it to pull in and complete the alternative ground circuits to the coil 953 of the micro-switch $900^a$ and to the positive terminal of the pulse generator coil 2500, causing the circuitry to shift directly into Mode 8 before any further charges in excess of $15.00 can be thrown into the charging steppers $900^{c1}$, $900^{c2}$, $900^{c3}$. In this connection, it should be noted that the monetary amount of the selected weekly rate is manually set into both pairs of switches $sw^{80}$–$sw^{81}$ and $sw^{82}$–$sw^{83}$ of the daily rate-set switch 1045', so that the pair of switches $sw^{80}$–$sw^{81}$ will perform the maximum rate function in Mode 7 and the switches $sw^{82}$–$sw^{83}$ may be used in Mode 8 in conjunction with weekly rate charging.

MODE 8—WEEKS CHARGING MODE

In Mode 8, the coil 953 of the mode-switch $900^a$ is connected to the moving contactors of the switches $sw^{17}$, $sw^{18}$ of the weeks count-back stepper $800^d$. In the presumed example, "time-now" is 9:36 a.m. on Tuesday of the second week, therefore, the weeks count-back stepper $800^d$ will have initially been reset to its second position (see Table IV). But, in counting back days in Mode 7 the days count-back stepper will have arrived at coincidence at zero time (time-then being midnight of Sunday of the first week) and, therefore, by virtue of a negative-carry the weeks count-back stepper $800^d$ will be set back to its first position. Consequently, there will be lack of coincidence between the switches $sw^{17}$, $sw^{18}$, of the weeks count-back stepper $800^d$ and the reader micro-switches 701, 702. Therefore, the coil 953 of the mode-switch $900^a$ will be connected directly to ground through this coincidence circuitry. As long as there is lack of coincidence between the switches $sw^{17}$, $sw^{18}$ and the reader micro-switches 701, 702, the coil 953 will become energized and remain energized until coincidence is reached. It will also be noted that the interrupter switch 973 of the mode switch $900^a$ is initially closed and is connected to ground through switch $sw^{23}$, thereby momentarily establishing a duplicate ground connection which is broken as soon as the coil 953 pulls in and opens the interrupter switch 973 so that the circuitry would have passed on to Mode 8 if (in a different transaction) the weeks count-back stepper $800^d$ had already been at coincidence.

The negative terminal of the pulse generator coil 2500 is connected through the sixth contact position of the switch $sw^{26}$ in the mode switch $900^a$ to the interrupter switch $973^{b1}$ of the units-counting stepper $900^{b1}$ and to the interrupter switch $973^{c1}$ of the dimes-charging stepper $900^{c1}$ which are initially closed and, in such closed position, establish a connection to ground through the coincidence circuitry of the weeks count-back stepper $800^d$. The positive terminal of the coil 2500 is connected directly to a source of positive potential and the alternate lead 2506 is also connected (in the manner of a resistor switch) to the switches $sw^{37}$ and $sw^{31}$, the latter being connected to ground through the coincidence circuitry of the switches $sw^{17}$, $sw^{18}$ of the weeks count-back stepper $800^d$. However, since the weeks count-back stepper $800^d$ is in its second position, the switches $sw^{17}$, $sw^{18}$, are not in coincidence with the reader micro-switches 701, 707. Therefore, there will be no ground connection established for the alternate lead 2506 so the coil 2500 of the pulse generator PG will become energized. The coils $953^{b1}$ and $953^{c2}$ of the units-counting stepper $900^{b1}$ and the dollars-charging stepper $900^{c1}$ respectively are connected through the switch $sw^{24}$ of the mode switch $900^a$ to the contact 2503. The contactor 2501 is connected to ground through the coincidence circuitry of the switches $sw^{17}$, $sw^{18}$ of the weeks count-back stepper $800^c$ and, therefore, when the coil 2500 pulls in and shifts the contactor 2501 into contactive engagement with the contact 2503, the coils $953^{b1}$, $953^{c2}$ will become energized and pull in. When this occurs, the interrupter switches $973^{b1}$ and $973^{c2}$ will open, breaking the ground connection to the negative terminal of the coil 2500 and the pulse generator PG will drop out, causing the contactor 2501 to return to initial position. When this occurs, the circuit through the contact 2503 to the coils $953^{b1}$ and $953^{c2}$ will open and the coils $953^{b1}$ and $953^{c2}$ will become de-energized. Meanwhile, the coil 2500 of the pulse generator PG will again become energized. It will thus be evident that the pulse generator PG will cause the units-counting stepper $900^{b1}$ and the dollars-charging stepper $900^{c2}$ to move in a continuous series of successive discrete steps from their respective home positions as long as the above-described circuit-condition between the pulse generator PG and the two steppers $900^{b1}$, $900^{c2}$ continues to exist.

As will be seen by reference to FIG. 126, the ten contact-positions of the switch $sw^{31}$ of the units-counting stepper $900^b$ is connected by a ten-wire harness to the corresponding ten contact positions of the switch $sw^{82}$ which carries the units digit in the monetary amount of the selected weekly rate, whatever that may be. The moving contactor of this switch $sw^{82}$ is directly connected to the moving contactor of the companion switch $sw^{83}$ which carries the tens digit in the monetary amount of the selected weekly rate, and the ten contact positions of the switch $sw^{83}$ are, in turn, connected by a ten-wire harness to the ten contact positions of the switch $sw^{37}$ in the tens-counting stepper $900^{b2}$. The moving contactor of the switch $sw^{31}$ is, in turn, connected to ground through the coincidence circuitry of the weeks count-back stepper $800^d$. The moving contactor of the switch $sw^{31}$ in the units-counting stepper $900^{b1}$ is connected through the switch $sw^{25}$ to the negative terminal of the coil 1800 in the charge-progression relay $k^3$. As previously explained, the ninth position contact in this switch $sw^{31}$ is connected through a normally closed single-pole, single-throw switch in the charge-progression relay $k^3$ to the coil $953^{b2}$ of the tens-counting stepper $900^{b2}$. Consequently, whenever the units-counting stepper $900^{b1}$ reaches its ninth position, the coil $953^{b2}$ of the tens-counting stepper $900^{b2}$ will be energized, thereby cocking the stepping mechanism associated therewith. When the units-counting stepper $900^{b1}$ moves from its ninth position to its tenth position, thereby making its tenth count and passing through its zero position, the ground circuit to the coil $953^{b2}$ of the tens-counting stepper $900^{b2}$ will again be broken, so that the coil $900^{b2}$ will be de-energized and the cocked stepping mechanism will return to initial position, causing the tens-counting stepper $900^{b2}$ to advance to its first position, thereby effecting a so-called "tens-carry" from the units-counting stepper $900^{b1}$ to the tens-counting stepper $900^{b2}$. Since the weekly rate is $15.00, the units-counting stepper $900^{b1}$ will continue stepping under the control of the pulse generator PG for a series of fifteen successive discrete steps and, in so doing, will effect a tens-carry into the tens-counting stepper $900^{b2}$ for each ten steps, so that the tens-counting stepper $900^{b2}$ will be advanced to its first position when the units-counting stepper $900^{b1}$ reaches its fifth position for the second time. Since the rate-set switch 1045 has been set at the monetary amount of $15.00, a circuit will be completed, for the first time during this particular charging sequence, from the coil 1800 of the charge-progression relay $k^3$ to ground through the switches $sw^{37}$, $sw^{31}$, and through the coincidence circuitry of the weeks count-back stepper $800^d$.

Meanwhile, the coil $953^{c2}$ has been energized and the dollars-charging stepper $900^{c2}$, with which it is associated, will have been stepping in unison with the units-charging stepper $900^{b1}$, so that the amount of $15.00 (in terms of fifteen single dollars) will have been registered by the dollars-charging stepper $900^{c2}$. As has been previously explained, the dollars-charging stepper $900^{c2}$ and the ten-dollars charging stepper $900^{c3}$ are electrically interconnected so that the dollars-charging stepper $900^{c2}$ will throw a ten-dollars carry into the ten-dollars charging stepper $900^{c3}$ for each ten-dollars registered in the dollars-charging stepper $900^{c2}$.

It will be noted that the negative terminal of the coil $953^{b1}$ of the units-charging stepper $900^{b1}$ is also connected directly to the dollars-order $Q^w$ of a conventional solenoid-actuated electro-mechanical totalizer which, as previously maintains a running total of charges being registered. Of course, since the successive steps of the units-counting stepper $900^{b1}$ in Mode 8 represent dollars (rather than dimes as in Mode 7), the connection in Mode 8 must necessarily be to the dollars-order $Q^w$.

When the units-counting stepper $900^{b1}$ and the tens-charging stepper $900^{b2}$ mutually reach positions corresponding to the monetary amount of $15.00 and the coil 1800 of the charge-progression relay $k^3$ is energized, the first charging sequence will be terminated. When the charge-progression relay $k^3$ pulls in, a circuit will be completed to ground from the coil $823^c$ of the days count-back stepper $800^c$, causing the latter to pull in and cock the stepping mechanism thereof. Thereupon, the units-counting stepper $900^{b1}$ and the tens-charging stepper $900^{b2}$ are reset to home or zero position through the respective auxiliary switches $sw^{28}$ and $sw^{33}$. Obviously, as soon as the units-counting stepper $900^{b1}$ and tens-counting stepper $900^{b2}$ start this homing operation, circuit-continuity between the coil 1800 and ground through the switches $sw^{32}$, $sw^{24}$ will be broken, but when the charge-progression relay $k^3$ pulls in, an auxiliary ground circuit is established for the coil 1800 through a hold-in switch within the relay $k^3$ and the switches $sw^{28}$, $sw^{33}$, as long as the latter are in off-normal position. When the units-counting stepper $900^{b1}$ and the tens-counting stepper $900^{b2}$ reach home position, the switches $sw^{28}$, $sw^{33}$ will go into off-normal position, thereby breaking this auxiliary ground connection to the coil 1800 and the charge-progression relay $k^3$ will accordingly drop out. When this occurs, the coil $823^c$ of the days count-back stepper $800^c$ will drop out, releasing the stepping mechanism associated therewith and the weeks count-back stepper $800^d$ will move back one step from its first position to its zero position, thereby counting out one week.

When the weeks count-back stepper $800^d$ moves one step back from its first postion to its zero position, coincidence will be established between the switches $sw^{17}$, $sw^{18}$ of the weeks-count-back stepper $800^d$ and the reader micro-switches 701, 702, so that all ground-circuit continuity used in Mode 8 will be broken and the coil 953 becomes de-energized. Thereupon, the cocked stepping mechanism associated with the coil 953 will be released, and the mode switch $900^a$ will move into its eighth or Mode 9 position.

Since the monetary amount of $11.05 has been registered in the dimes-charging stepper $900^{c1}$ and the dollars-charging stepper $900^{c2}$ during Mode 7, the charging operations carried out in Mode 8 will add a further monetary amount of $15.00 to the previously accumulated amount. Thus, as the circuitry passes from Mode 8 to Mode 9, the dimes-charging stepper $900^{c1}$ and the dollars-charging stepper $900^{c2}$ will conjointly contain the monetary amount of $26.05. There is, of course, no provision for a monthly maximum rate since such a rate is not ordinarily used by parking-lot proprietors in connection with ticket-recorded parking transactions. Whenever a parking-lot proprietor charges monthly rates it is the practice to collect a lump sum once a month from the customer and usually the customer has in-and-out privileges. In any case a ticket is not issued to such customers.

MODE 9—PRELIMINARY TOTALIZER CORRECTION MODE

In the discussion of Mode 4, it was pointed out that the nickels totalizer mechanism $Q^n$ receives its first totalizing impulse during the second charging step of the nickels-charging stepper $900^{b3}$ and is, therefore, one nickel behind, so to speak. In other words, the monetary amount transferred into the electro-mechanical totalizer mechanisms $Q^n$, $Q^d$, $Q^w$ will, during subsequent modes, namely, Modes 5, 6, 7, and 8 be five cents less than the actual amount being registered in the charging steppers $900^{b3}$, $900^{c1}$, $900^{c2}$, and $900^{c3}$. This five-cent deficiency is not an accidental aberration in the charging circuitry because it would be relatively simple, by minor rearrangement of circuit connections, to have the very first nickels-charging steps recorded in the electro-mechanical totalizer mechanism $Q^n$. However, there is a potential source of computing error which may be encountered from time to time if maximum rates are used in the rate structure. Such computing error can, of course, be prevented by the use of additional electrical components and special circuitry, but it has been found, in connection with the present invention, that the need for such additional electrical components and special circuitry can be obviated by the simple expedient of allowing the nickels totalizing mechanism $Q^n$ to run five cents behind during Modes 5, 6, 7, and 8 and then make the requisite corrections by changing the circuit configuration of existing components in Modes 9 and 10.

At the end of Mode 8 there are four possible circuit configurations which may exist. The maximum charge relay $k^5$ may be pulled in and the nickels-charging stepper $900^{b3}$ may stand on an even-numbered contact-position (i.e., a contact-position representing the terminal digit "0"). The maximum charge relay $k^5$ may also be pulled in and the nickels-charging stepper $900^{b3}$ may stand on an odd-numbered contact-position (i.e., a contact-position representing the terminal digit "5"). The maximum charge relay $k^5$ may not be pulled in and the nickels-charging stepper may stand on an even-numbered position. Finaly, the maximum charge relay $k^5$ may not be pulled in and the nickels-charging stepper $900^{b3}$ may stand on an odd-numbered position.

The first of these four circuit-configurations, if it exists, will be corrected in Mode 9 and can best be understood by reference to a specific example. If, for instance, the initial hourly charge (IHR) is $.30, the constant hourly charge (CHR) is $.15, the daily rate is $3.00, the weekly maximum rate is $15.00 and if the ticket T had been inserted into the ticket-reading module E at 8:25 a.m., on a Friday, then the charges accumulated in the charging steppers $900^{c1}$, $900^{c2}$, during Modes 4 and 5, will come to the amount of $1.50, and the nickels-charging stepper $900^{b3}$ will stand in an even-numbered position (i.e., a contact-position representing a terminal digit of "0"). Moreover, since the ticket T had been inserted into the ticket-reading module E on Friday, the days count-back stepper $800^c$ would be required to count back six steps in Mode 7. Therefore, the weekly maximum rate of $15.00 would be exceeded and the maximum charge relay $k^5$ would be pulled in. This would occur as soon as the sum of $15.00 had been additionally registered in the charging steppers $900^{b3}$, $900^{c1}$, $900^{c2}$, $900^{c3}$. Hence, the overall configuration of the charging steppers $900^{b3}$, $900^{c1}$, $900^{c2}$, $900^{c3}$ will be correct. However, the totalizer mechanisms $Q^n$, $Q^d$, $Q^w$, which are running five cents behind with respect to the charges accumulated in the charging steppers $900^{b3}$, $900^{c1}$, $900^{c2}$, $900^{c3}$, will be in error. Consequently, it merely becomes necessary to correct the nickels-order $Q^n$ thereof which can very easily be accomplished in Mode 9 in the following manner.

When the foregoing circuit-condition exists, the nickels-charging stepper $900^{b3}$ is on an even-numbered contact position and the maximum charge relay $k^5$ is pulled in. Therefore, when the mode-switch $900^a$ reaches its ninth or Mode 9 position, the moving contactor of the switch $sw^{42}$ in the nickels-charging stepper $900^{b3}$ will be connected to ground through the switch $sw^{23}$. It will also be noted that all of the odd-numbered contact-positions (i.e., the contact-positions representing the terminal digit "5") are conneced by a common lead to contact 2105 in the totalizer relay $k^6$, and, similarly, all of the even-numbered contact positions of the switch $sw^{42}$ are connected by a common lead to a contact 2011 in the maximum charge relay $k^5$. The contactor 2003 is, in turn, connected to the contactor 2104 in the totalizer relay $k^6$. Since the totalizer relay $k^6$ was pulled in during Mode 4 and remains pulled in, the contactor 2102 will be in contactive engagement with the contact 2104, as shown in dotted lines in FIG. 128. Since the maximum charge relay $k^5$ is pulled in (under the particular set of conditions presently being assumed), the contactor 2003 will be in contactive engagement with the contact 2011 in the position also shown in dotted lines in FIG. 128, and a circuit will be completed to the nickels totalizer mechanism $Q^n$.

The coil 953 of the mode-switch $900^a$ is connected to ground through the normally closed interrupter switch 973 and the switch $sw^{22}$. Since no provision is made, in Mode 9, for holding in the coil 953, the mode-switch $900^a$ will step on to Mode 10, but, in so doing, will allow one nickel-recording impulse to be transmitted to the nickels totalizer mechanism $Q^n$, bringing it up to the correct monetary amount which is being charged. If, however, the daily maximum charge has not been exceeded in Mode 7, the maximum charge relay $k^5$ will not be pulled in and the circuit, which provides this additional nickel-charging impulse, will not be completed through the contactor 2003 and contact 2011. Similarly, if the moving contactor of the switch $sw^{42}$ in the nickels-charging stepper $973^{b3}$ is at an odd position, there will be no circuit continuity between this moving contactor and the contact 2011 in the maximum charge relay $k^5$. As has been above pointed out, if the daily maximum charge has not been exceeded in Mode 7 or if the nickels-charging stepper $900^{b3}$ happens to have come to rest in an odd-numbered positions, circuit discontinuity will exist between the switch $sw^{23}$ and the totalizer relay $k^6$. Therefore, no nickel-charging impulse will be transmitted to the nickels-totalizing mechanism $Q^n$ and the mode-switch $900^a$ will simply pass on to its tenth or Mode 10 position.

MODE 10—FINAL TOTALIZER CORRECTION MODE

The other three circuit-configurations which possibly may exist at the end of Mode 8, remain to be corrected in Mode 10 and also can best be understood by reference to specific examples.

If, again, it be assumed that the initial hourly rate (IHR) is $.30, the constant hourly rate (CHR) is $.15, the daily rate is $3.00, the weekly maximum rate is $15.00 and that the ticket T has been punched out and in at such times as would result in an elapsed time of five days one hour and forty-five minutes, then the charges accumulated in the charging steppers $900^{c1}$, $900^{c2}$ will come to $.30 and the nickels-charging stepper will stand in an odd-numbered position representing the terminal digit "5" so that the overall configuration of the charging steppers $900^{b3}$, $900^{c1}$, will represent $.35 (i.e., the charge for one hour and forty-five minutes). According to the charging logic of the present computer device A, it is not possible, during Modes 4 and 5 to anticipate the amount of charges which will subsequently be made in Mode 7. In the specific example presently being considered, however, five days must be charged, during Mode 7, at a daily rate of $3.00 with a maximum of $15.00. The dimes-charging stepper $900^{c1}$ will, at the end of Mode 5, have thus far registered $.30 and, therefore the charging steppers $900^{c1}$ $900^{c2}$, during Mode 7, will exceed the $15.00 maximum before the fifth day is fully charged out. Hence, the charging steppers $900^{c1}$, $900^{c2}$, will stop at $15.00, but the $.35 charge from the computations made in Modes 4 and 5 will leave the nickels-charging stepper $900^{b3}$ standing on an odd-numbered position. Consequently, the overall configuration of the charging steppers $900^{b3}$, $900^{c1}$, $900^{c2}$, $900^{c3}$, will register $15.05, thus being in error by an excess of $.05. Of course, the totalizers $Q^n$, $Q^d$, $Q^w$, which are five cents behind, will also be in error by a deficiency of $.05. When this type of computing situation has been encountered, the second of the above-mentioned circuit-configurations will exist at the end of Mode 8, namely, the maximum charge relay $k^5$ will be pulled in the nickels-charging stepper $900^{b3}$ will stand on an odd-numbered contact-position.

If, under the same rate-structure of the preceding specific example, the elapsed time had been two days, one hour and forty-five minutes, then the charges accumulated in the charging steppers $900^{c1}$ during Modes 4 and 5 would still be $.30 and the nickels-charging stepper $900^{b3}$ would stand on an odd-numbered position so that the overall configuration of the charging steppers $900^{b3}$, $900^{c1}$ will represent $.35. Thereafter, in Mode 7 the charges for two days (i.e., $6.00) will be added so that the overall configuration of the charging steppers $900^{b3}$, $900^{c1}$, $900^{c2}$, $900^{c3}$ will come to $6.35, which is correct and, hence, the only correction needed will be the addition of $.05, to the nickels totalizer $Q^n$. When this type of computing situation has been encountered, the third of the above-mentioned circuit-configurations will exist at the end of Mode 8, namely, the maximum charge relay $k^5$ will not be pulled in and the nickels-charging stepper $900^{b3}$ will stand on an odd-numbered contact-position. Similarly, if, under the rate-structure of the preceding specific example, the elapsed time had been two days, four hours and forty-five minutes, then the charges accumulated in the charging stepper $900^{c1}$ would be $.90 and the nickels-charging stepper $900^{b3}$ would stand on an even-numbered contact-position so that the overall configuration of the charging steppers $900^{b3}$, $900^{c1}$ will represent $.90. Thereafter, in Mode 7 the charges for two days will be added so that the overall configuration of the charging steppers $900^{b3}$, $900^{c1}$, $900^{c2}$, $900^{c3}$ will come to $6.90 which is correct and, hence, the only correction needed will be the addition of $.05 to the nickels-totalizer $Q^n$. When this type of computing situation has been encountered the fourth of the above-mentioned circuit-configurations will exist at the end of Mode 8, namely, the maximum charge relay $k^5$ will not be pulled in and the nickels-charging stepper $900^{b3}$ will stand on an even-numbered position.

As a matter of fact, in the second, third, and fourth circuit-configurations a correction must be made in the totalizer $Q^n$. However, in both the third and fourth circuit-configurations, the charging-steppers $900^{b3}$, $900^{c1}$, 900$^{c2}$, 900$^{c3}$ are correct, whereas in the second circuit-configuration the charging-steppers 900$^{b3}$, 900$^{c1}$, 900$^{c2}$, 900$^{c3}$ are incorrect. The only difference in the types of errors present in these three circuit-configurations is that in the second circuit-configuration the charging steppers 900$^{b3}$, 900$^{c1}$, 900$^{c2}$, 900$^{c3}$ require correction but do not require correction in the third and fourth circuit-configurations. Hence, it is merely necessary, in Mode 10, to distinguish between the second circuit-configuration on the one hand and the third and fourth circuit-configurations on the other hand.

In Mode 10, the odd-numbered contact-positions of switch $sw^{40}$ will be connected in common to the interrupter switch 973$^b$ and the moving contactor of the switch $sw^{40}$ will be connected to the contact 2015 of the maximum charge relay $k^5$. Similarly, the contactor 2006 of the maximum charge relay $k^5$ will be connected to ground through the switch $sw^{23}$ of the mode switch 900$^a$. If the maximum charge relay $k^5$ has not been pulled in the contactor 2006 will be in contactive engagement with the contact 2014 which is, in turn, connected to the contact 2104 of the totalizer relay $k^6$. The totalizer relay $k^6$ was pulled in during Mode 4 and has remained pulled in, therefore, the contactor 2102 will be in contact with the contact 2104 and a circuit will be completed to the nickels totalizer mechanism Q$^n$.

As was true in Mode 9, the coil 953 of the mode switch 900$^a$ is connected to ground only through the interrupter switch 973 and, therefore, will step on through to Mode 11 so that only one charging impulse will be transmitted to the nickels totalizing mechanism Q$^n$ and the latter will thereupon be corrected regardless of whether the nickels-charging stepper 900$^{b3}$ was on an odd-numbered position or an even-numbered position, thereby making the correction required to correct the error in the third and fourth circuit-configurations if either of such circuit-configurations existed at the end of Mode 8.

If, however, the second circuit-configuration happens to exist at the end of Mode 8 (i.e., the maximum charge relay $k^5$ is pulled in and the nickels-charging stepper 900$^{b3}$ stands on an odd-numbered position, then in such case both the nickels totalizer Q$^n$ and the nickels-charging stepper 900$^{b3}$ must be corrected. Of course, the nickels totalizer Q$^n$ is corrected in the same manner as just above described. However, the only thing which is needed to bring the charging steppers 900$^{b3}$, 900$^{c1}$, 900$^{c2}$, 900$^{c3}$ into correct configuration is to move the nickels-charging stepper 900$^{b3}$ on to an even-numbered position without changing the respective positions of the other charging steppers 900$^{c1}$, 900$^{c2}$, 900$^{c3}$. For instance, if the monetary charge accumulated in the charging steppers 900$^{b3}$, 900$^{c1}$, 900$^{c2}$, 900$^{c3}$ is $15.05, as heretofore assumed, then by changing the terminal digit "5" to "0" while holding the other numbers unchanged, it is possible, obviously, to reduce the charge to $15.00 even though the nickels-charging stepper 900$^{b3}$ has accomplished this by moving on to the next even-numbered position.

As will be seen by reference to FIG. 19, the coil 953$^{b3}$ of the nickels-charging stepper 900$^{b3}$ is connected through its own interrupter switch 973$^{b3}$ to the common lead which interconnects the odd-numbered positions of the switch $sw^{40}$. The moving contactor of this switch is, in turn, connected to the normally open contact 2015 of the maximum charge relay $k^5$. Thus, if the latter is pulled in due to the fact that a maximum charge was reached in Mode 7, then a circuit will be completed to ground from the coil 953$^{b3}$ through the contactor 2096 of the maximum charge relay $k^5$ and the switch $sw^{23}$ of the mode switch 900$^a$ causing the nickels-charging stepper 900$^{b3}$ to advance one step to an even-numbered position. Both the correction of the nickels-totalizer Q$^n$ and the advancing of the nickels-charging stepper 900$^{b3}$ will take place during the single stepping interval of the mode switch 900$^a$ as it advances from Mode 9 through Mode 10 to its tenth or Mode 11 position, thereby making the correction required to correct the error in the second circuit-configuration if such circuit-configuration existed at the end of Mode 8.

MODE 11—DISPLAY MODE

In Mode 11, the negative terminal of the coil 953 of the mode switch 900$^a$ is connected only to its interrupter switch 973 and the homing cam switch $sw^{21}$, which are, in turn, connected in series to the lot-identification switch 721. Inasmuch as position eleven or the so-called Mode 11 position is the home position for the mode switch 900$^a$, the switch $sw^{21}$ will move into its off-normal or closed position as soon as the mode switch moves from its tenth position to its eleventh position. The interrupter switch 973 which is normally closed will momentarily remain closed as the mode switch 900$^a$ moves into its eleventh position and, thereafter, will open so that the mode switch 900$^a$ will come to rest in such eleventh position.

It will be recalled, from the discussion of Mode 1, that, when the ticket T is inserted into the ticket-reading module E, the lot-identification switch 720 which is normally closed will remain closed, whereas the lot-identification switch 721 which is normally open will be closed, as shown in dotted lines in FIG. 130. Similarly, the re-read prevention switch 719 will initially be closed, also as shown in dotted lines in FIG. 130. These switches 719, 720, 721 are in series with each other and the positions thereof will be determined by the edge of the ticket T, as previously described.

It will be evident from FIG. 130 that the contactor of the switch 719 is connected directly to ground and the normally open contact of the switch 721 is connected to the negative terminal of the coil 1600, which is also connected to the contact 1606 in the reader relay $k^1$. The moving contactor 1601 of the reader relay $k^1$ is connected to the first, second, third, fourth, fifth, sixth, seventh, eighth, and eleventh contact positions of the switch $sw^{22}$. It will also be noted that the contactor of the switch $sw^{22}$ is connected directly to ground. Therefore, a ground connection is established when the switch $sw^{22}$ is in its first, second, third, fourth, fifth, sixth, seventh, eighth and home positions. Only its ninth and tenth positions are blank. Since the switch $sw^{22}$ is a make-before-break switch, it follows that the coil 1600 of the reader relay $k^1$ will be pulled in and remain pulled in during Modes 1 to 8, inclusive, as shown in dotted lines in FIG. 130, but will drop out during Modes 9 and 10. Inasmuch as the terminals of the coil 1600 are paralleled by a diode, the coil 1600 will drop out rather slowly. On the other hand, the coil 953 of the mode switch 900$^a$ is operated on a self-interrupting basis in Modes 9 and 10 and, as a result, will move through Modes 9 and 10 rather rapidly. As a result, by the time the coil 1600 is fully dropped out and has resumed the positions shown in full lines in FIG. 130, the mode 900$^a$ will have commenced moving into its eleventh position.

It will be recalled from the discussion of Mode 1 that the negative terminals of the re-read prevention solenoid 711 and the reader solenoid 712 are connected to the normally open contact 1611 of the reader relay $k^1$. Consequently, when the coil 1600 of the reader relay $k^1$ is pulled in for the first time during Mode 1, the re-read prevention solenoid 711 will actuate the punch 735 which is associated therewith and cause the latter to cut a notch in the edge of the ticket T. As soon as this notch is cut, the material will fall away and the re-read prevention switch 719 will immediately move back into open position, breaking the circuit-continuity to ground through the series-connected switches 719, 720, 721. However, when the coil 1600 pulls in, it will shift the contactor 1601 into circuit making engagement with the contact 1606, as shown in dotted lines in FIG. 130, thereby establishing an alternative or holding circuit to ground for the coil 1600 through the switch $sw^{22}$ and, therefore, the opening of the switch 719 has no effect upon the condition of the coil 1600.

It will be recalled, from the discussion of Mode 1 above, that, at the end of the preceding computing cycle, the time-delay relay $k^{11}$ will have completed a time-delay operation at the end of which the contactor 2602 will have been moved out of contactive engagement with the contact 2603 by means of the cam mechanism 2601. However, the contactor 2605 of the hold-in switch 2604 will be held in circuit closing engagement with the contact 2606 by the coil 2607, so that the motor 2600 will continue to run. It will also be evident from FIG. 130 that the negative terminal of the coil 2607 is connected to ground through the normally closed contact 1610 and the contactor 1605 of the relay $k^1$. Therefore, as soon as the reader relay $k^1$ pulls in during Mode 1 of the computing cycle presently being described, the coil 2607 will become de-energized and remain de-energized as long as the reader relay $k^1$ remains pulled in. As soon as the coil 2607 becoms de-energized, the switch 2604 will open and the solenoid-clutched cam mechanism 2601 will reset itself. The motor 2600 of the time-delay relay $k^{11}$ will, thereafter, remain de-energized until the reader relay $k^1$ drops out during Modes 9 and 10. Once the reader relay $k^1$ drops out during Modes 9 and 10, the holding circuit through the contactor 1601 and contact 1606 will open and the reader relay $k^1$ will remain open during Mode 11, notwithstanding the fact that the eleventh contact position of the switch $sw^{22}$ in the mode switch 900$^a$ is connected to ground so as to be in position for the next succeeding computing cycle whenever it is subsequently initiated.

When the time-delay relay $k^{11}$ drops out and resets itself, the contactor 2602 is moved back to circuit-making engagement with the contact 2603 and this condition obtains when the motor 2600 resumes rotation as the mode switch reaches its eleventh position. The contact 2603 is connected through the contactor 1604 and the normally closed contact 1609 of the reader relay $k^1$ directly to the positive side of an 85 v. current supply. As is true of all other current supplies in the circuitry of the computer device A, the negative side of the 85 v. current supply is grounded so that all circuit-components operated from the 85 v. current supply can be energized by establishing a connection to ground. The contactor 2602 of the time-delay $k^{11}$ is connected to the positive terminals of the coils 2200, 2300, and 2400 in the relays $k^7$, $k^8$, and $k^9$ and also to the positive lead wires running to the positive or shell sides of all of the four sets of bulb sockets 61 in the display box 48.

The various negative contacts, which, for convenience, may be referred to as negative terminals of the bulb sockets 61 within the set of twenty-four comprising the ten-dollars display-light unit are connected through a twenty-wire harness to various contact positions in the switches $sw^{66}$ to $sw^{73}$, inclusive, of the ten-dollars charging stepper 900$^{c3}$. Similarly, the one-dollar display-light unit are connected through a twenty-wire harness to various contact positions in the switches $sw^{55}$ to $sw^{62}$, inclusive, of the dollars-charging stepper 900$^{c2}$. Finally, the dime display-light unit are connected through a twenty-wire harness to various contact positions in the switches $sw^{44}$ to $sw^{51}$, inclusive, of the dimes-charging stepper 900$^{c1}$.

The twenty-wire arrangements between the charging steppers 900$^{c1}$, 900$^{c2}$, 900$^{c3}$ and the display-light units respectively associated therewith are identical and, therefore, it will be sufficient merely to describe the circuit arrangement between the dimes-charging stepper 900$^{c1}$ and the dimes display-light unit. As has been above indicated, the various digits forming "0" to "9" are visually displayed by lighting up different groups of the twenty-four light bulbs 62 comprising the dimes display-light unit in the manner graphically represented above. This graphic representation can be recapitulated as follows:

*Table XII*

| Bulb | Digit Displayed | | | | | | | | | |
|------|---|---|---|---|---|---|---|---|---|---|
|      | 1 | 2 | 3 | 4 | 5 | 6 | 7 | 8 | 9 | 0 |
| 62$^a$ |   |   | * |   | * |   | * |   |   |   |
| 62$^b$ |   | * | * | * | * | * | * | * | * | * |
| 62$^c$ | * | * | * | * | * | * | * | * | * | * |
| 62$^d$ |   |   | * |   | * |   | * |   |   |   |
| 62$^e$ |   | * |   |   |   | * |   |   | * | * |
| 62$^f$ | * |   |   | * |   |   |   |   |   |   |
| 62$^g$ | * |   |   | * |   |   |   |   |   |   |
| 62$^h$ |   | * |   |   |   | * |   |   | * | * |
| 62$^i$ |   |   |   | * | * | * |   |   |   |   |
| 62$^j$ |   |   |   |   | * |   |   | * | * |   |
| 62$^k$ | * | * | * | * |   |   |   | * | * | * |
| 62$^l$ |   |   |   |   |   |   |   |   | * | * |
| 62$^m$ |   |   |   | * |   | * |   |   |   |   |
| 62$^n$ |   | * |   | * |   | * |   |   |   |   |
| 62$^o$ | * |   |   | * |   |   |   |   |   |   |
| 62$^p$ |   |   | * |   | * |   | * |   |   | * |
| 62$^q$ |   | * |   |   | * |   | * | * |   |   |
| 62$^r$ |   |   |   |   |   |   |   |   |   |   |
| 62$^s$ | * |   |   | * |   |   |   |   | * |   |
| 62$^t$ |   |   |   |   |   |   |   |   |   | * |
| 62$^u$ |   |   |   |   |   | * |   |   |   |   |
| 62$^v$ | * | * |   |   | * |   |   | * | * |   |
| 62$^w$ | * | * | * |   | * | * |   | * |   |   |
| 62$^x$ | * | * |   |   |   |   |   |   |   |   |

From the foregoing table, it will be noted that the bulbs 62$^a$, 62$^d$, are both lighted in forming the digits "3," "5," and "7." Therefore, these two bulbs can be connected by a comomn lead $l^a$ to three contact positions in the switch $sw^{44}$. Similarly, the bulbs 62$^f$, 62$^g$ are both lighted for the digits "1" and "4." Therefore, they may be connected by a common lead $l^f$ to two contact positions within the switch $sw^{44}$. It will be noted that the bulb 62$^r$ is never lighted and, therefore, it is not necessary to include a lead wire to it. The bulb 62$^c$ is lighted for all of the digits and, therefore, it is connected by a separate or independent lead wire $l^c$ directly to ground in common with the lead from the negative terminal of the bulb 62$^z$, which represents the decimal-point. The remaining eighteen bulbs, namely, 62$^b$, 62$^e$, 62$^h$, 62$^i$, 62$^j$, 62$^k$, 62$^l$, 62$^m$, 62$^n$, 62$^o$, 62$^p$, 62$^q$, 62$^s$, 62$^t$, 62$^u$, 62$^v$, 62$^w$, 62$^x$, are respectively by lead wires $l^b$, $l^e$, $l^h$, $l^i$, $l^j$, $l^k$, $l^l$, $l^m$, $l^n$, $l^o$, $l^p$, $l^q$, $l^s$, $l^t$, $l^u$, $l^v$, $l^w$, $l^x$, to the various contact positions in the various switches $sw^{44}$–$sw^{51}$, inclusive, as shown in FIG. 130.

For purposes of circuit simplification, the lead wires $l^b$, $l^q$, $l^v$, $l^w$ are connected to normally open single pole, single throw switches within the relay $k^7$, and the lead wire $l^k$ is connected to a normally closed single pole, single throw switch within the relay $k^7$. The negative terminal of the coil 2200 in the relay $k^7$ is connected to the second, sixth, and eighth contact positions in the switch $sw^{44}$, the zero or home contact position of the switch $sw^{49}$, and the third and fifth contact positions of the switch $sw^{50}$. Consequently, whenever the dimes-charging stepper 900$^{c1}$ is in its second, third, fifth, sixth, eighth, or home contact position, the relay $k^7$ will pull in and complete circuits to the bulbs 62$^b$, 62$^q$, 62$^v$, 62$^w$. Contrariwise, whenever the dimes-charging stepper 900$^{c1}$ is in the first, fourth, seventh, or ninth contact position, the coil 2200 of the relay $k^7$ will be de-energized and the circuits to the bulbs 62$^b$, 62$^q$, 62$^v$, 62$^w$, will be open on the negative side, but a circuit will be completed to the negative side of the bulb 62$^k$ through the normally closed switch in the relay $k^7$. It will, therefore, be evident that when the dimes-charging stepper 900$^{c1}$ is in its first contact position, ground circuits will be completed to the negative terminals of the nine bulbs designated in the first column of Table XII, namely, bulbs 62$^c$, 62$^f$, 62$^g$, 62$^k$, 62$^o$, 62$^s$, 62$^v$, 62$^w$, 62$^x$. Since the bulb 62$^k$ is the only bulb of the five relay-control bulbs which is needed to effect a visual display of the digit "1," the relay $k^7$ will not be pulled in when the dimes-charging stepper 900$^{c1}$ is in its first position.

When the dimes-charging stepper 900$^{c1}$ is in its second position, the eleven bulbs designated in the second column of Table XII will be lighted, namely, 62$^b$, 62$^c$, 62$^e$, 62$^h$, 62$^k$, 62$^n$, 62$^q$, 62$^u$, 62$^v$, 62$^w$, 62$^x$. In this bulb-configuration, the relay-control bulbs 62$^b$, 62$^q$, 62$^v$, 62$^w$, are used. Therefore, the relay $k^7$ will be pulled in when the dimes-charging stepper 900$^{c1}$ is in its second position. It will be noted that the bulb 62$^k$ is also needed for this bulb-configuration and, since the relay $k^7$ is pulled in, the ground circuit to the negative side of the bulb 62$^k$ cannot be completed through the normally closed switch within the relay $k^7$. For this reason, the lead wire $l^k$ is also connected to the second contact position of the switch $sw^{51}$.

As the dimes-charging stepper 900$^{c1}$ occupies its various other contact positions, circuits will be completed to the negative terminals of the various light bulbs 62 through the various lead wires depicted in FIG. 130 in accordance with Table XII, so that the various digits will be visually displayed in lights.

The nickels-display unit is merely required to display either the digit "0" or the digit "5". Therefore, the bulbs in this particular display-light unit, namely, the light bulbs 62$^a$, 62$^b$, 62$^d$, 62$^e$, 62$^i$, 62$^j$, 62$^k$, 62$^p$, 62$^q$, 62$^t$, 62$^v$, 62$^w$ are connected by a lead wire $l^5$ to the odd-numbered contact positions of switch $sw^{39}$ in the nickels-charging stepper 900$^{b3}$. Similarly, the bulbs 62$^b$, 62$^e$, 62$^h$, 62$^i$, 62$^l$, 62$^m$, 62$^p$, 62$^q$, 62$^t$, 62$^v$, 62$^w$ (which display the digit "0") are connected by the lead wire $l^{10}$ to the even-numbered positions in the switch $sw^{39}$ of nickels-charging stepper 900$^{b3}$. Here, also, the light bulb 63$^c$ is lighted in both configurations and, therefore, it is connected directly to group in the same way as the light bulb 62$^c$ in the other display light units. The light bulb 62$^r$ is, of course, never lighted and, therefore, has no lead wire at all. Thus, when the nickels-charging display stepper 900$^{b3}$ is in an odd-numbered position, the digit "5" will be exhibited in the nickels-display light unit and, when the nickels-charging stepper 900$^{b3}$ is in an even-numbered position, the digit "0" will be exhibited in the nickels-display light unit.

It will thus be apparent that at the end of Mode 10, the charging display steppers 900$^{b3}$, 900$^{c1}$, 900$^{c2}$, 900$^{c3}$ will have been moved into the various positions requisite for displaying the numbers corresponding to the final amount to be charged to the customer and, accordingly, the negative side of the light circuits will be conditioned so that the necessary light-configurations will be lighted as soon as the circuit through the contactor 2602, contact 2603 of the time-delay relay $k^{11}$, and the contact 1610 and contactor 1605 of the reader relay $k^1$ is completed, as above described in Mode 11. This circuit will be held closed on the positive side by the duration of the time-delay interval established by the time-delay relay $k^{11}$ or until a subsequent ticket T is inserted in the ticket module E, as previously described in connection with the discussion of Mode 1. When either of these latter two events occurs, the various lights will go out and the circuitry of the computer device A will remain in the circuit-configuration of Mode 11 until the next succeeding computing cycle is initiated by the insertion of another ticket T into the reading module E, whereupon the circuitry will immediately move into the circuit-configuration of Mode 1, as previously described and will again pass in successive order through the Modes 1 to 11, inclusive.

MODIFICATIONS

The previously described computer device A is a preferred embodiment of the present invention and constitutes a wholly self-contained unit which can be installed at the common entrance-exit of a parking-lot having such a type of layout or may be installed in any other convenient location. It is entirely possible, however, to subdivide the computer-device by placing the ticket punching module D and ticket reading module E in separate housings for installation respectively at the entrance and exit of a parking-lot in which such entrance and exit are widely separated. It is also possible to enclose the computing components in a separate housing for installation in a location which is remote from the ticket punching module D and the ticket reading module E so long as overhead or underground cable facilities can be provided to interconnect the ticket reading module and the computing components.

Although not specifically illustrated, it is obvious that a ticket printing mechanism of the type described in connection with the ticket punching module can also be used in conjunction with the ticket reading module so that a "time-out" record, an elapsed-time record, a total charge record, or any one or more of such records can be imprinted on the ticket for record purposes or for a customer's receipt if that should be desired.

It is also possible to utilize notching punches such as the punch 735 in conjunction with all of the switches 718, 719, 720, 721, instead of just the switch 719 so that one ticket can be punched in and out along successive lines progressing away from the inserted margin of the ticket, so that the computer can be used as a time-card computer for recording successive daily or weekly periods of elapsed time, such as would be required in connection with the fiscal operations in a payroll department. In this connection, it should be noted that, by making obvious modifications in the rate-circuitry and counting circuitry, the time-base of the computer device can be changed so that computations can be made in terms of quarter-hourly intervals, ten-minutes intervals, or some other desired subdivision of the hour.

It should be understood that changes and modifications in the form, construction, arrangement, and combination of the several parts of the computer devices may be made and substituted for those herein shown and described without departing from the nature and principle of our invention.

Having thus described our invention, what we claim and desire to secure by Letters Patent is:

1. A computer device for computing and recording elapsed-time intervals upon a ticket at variable rates, said computer device comprising support means, in the nature of a structural chassis, time-controlled means, ticket-receiving means carried by and associated with the chassis for supporting the ticket, means operatively mounted on said chassis in proximity to said ticket-receiving means for applying to a ticket a record of the time at the beginning of an interval, means operatively mounted on said chassis in proximity to said ticket-receiving means for also imprinting said record upon the ticket in chronological notation feeler, means operatively mounted on said chassis in proximity to said ticket-receiving means for sensing such record and, interval-determination means adapted for operation in strict chronological consonance with said time-controlled means for subtracting said record as sensed by the feeler-means from the time at the end of the interval to establish the quantity of elapsed time in the interval, rate-establishing means operatively mounted on said chassis and including means for storing selected multipliers to be used as a predetermined rate during the computation, calculating means operatively mounted on said chassis and being operatively interconnected between internal determination means and the rate-establishing means for multiplying said quantity of elapsed time by said predetermined rate, accumulator means operatively associated with said calculating means for totalizing the product, and means carried by said chassis and operatively associated with said accumulator means for visually displaying said product.

2. A computer device for computing and recording elapsed-time intervals at variable rates according to claim 1 in which the means for visually displaying the product includes electrical light means operatively associated with time-delay means for shutting off the electrical light means after a predetermined on-period.

3. A computer device for computing and recording elapsed-time intervals at variable rates, said computer device comprising support means in the nature of a structural chassis, time controlled means, ticket-receiving means carried by and associated with the chassis for supporting the ticket, means operatively mounted on said chassis in proximity to said ticket-receiving means for applying to a ticket a coded record of the time at the beginning of an interval, means operatively mounted on said chassis in close proximity to said ticket-receiving means for imprinting said record upon said ticket in chronological notation, feeler means operatively mounted on said chassis in proximity to said ticket-receiving means for sensing such record, internal-determination means adapted for operation in strict chronological consonance with said time controlled means for subtracting said record as sensed by the feeler means from the time at the end of the interval to establish the quantity of elapsed time in the interval, said time controlled means including a plurality of stepping switch calculating means operatively mounted on said chassis and being operatively associated with said internal determination means for multiplying said quantity of elapsed time by a predetermined rate, means operatively associated with said calculating means for maintaining surveillance over the multiplying operations to insure corrections thereof, and accumulator means operatively associated with said calculating means for totalizing the product.

4. A computer device for computing and recording elapsed-time intervals upon a ticket at variable rates, said computer device comprising time-controlled means, support means, in the nature of a structural chassis, time-controlled means, ticket-receiving means carried by and associated with the chassis for supporting the ticket, means operatively mounted on said chassis in proximity to said ticket-receiving means for punching into a ticket a binarily coded record of the time at the beginning of an interval, means operatively mounted on said chassis in proximity to said ticket-receiving means for also imprinting said record upon the ticket in chronological notation, feeler means operatively mounted on said chassis in proximity to said ticket-receiving means for sensing such record, electrical sensing circuit means operatively associated with said feeler means and including a plurality of first switches adapted to be opened and closed in a variable configuration responsive to said feeler means, a plurality of second switches, means operatively mounted on said chassis in proximity to said ticket-receiving means and actuated by the ticket for opening and closing various second switches in an initial configuration matching the configuration of the first switches, electrical comparator-circuit means operatively associated with said electrical sensing circuit means including a plurality of third switches, interval-determination means adapted for operation in strict chronological consonance with said time-controlled means, said interval-determination means including clock-controlled means for opening and closing the third switches in a variable configuration which represents time at the end of the interval, means operatively mounted on said chassis for changing the configuration of the second switches in a series of discrete steps through a series of predetermined successive configurations until the configuration is reached which matches the configuration of the third switches, counting means for counting said discrete steps whereby to subtract the time at the beginning of the interval from time at the end of the interval whereby to establish the quantity of elapsed time in the interval, rate establishing means operatively mounted on said chassis and including means for storing multipliers be used as a predetermined rate during the computation, calculating means operatively mounted on said chassis and being operatively interconnected between said counting means and said rate establishing means for multiplying said quantity of elapsed time by said predetermined rate, and accumulator means operatively associated with said multiplying means for totalizing the product.

5. A computer device for computing and recording elapsed-time intervals at variable rates according to claim 4 and further characterized by means carried by said chassis and operatively associated with said accumulator means for visually displaying said product.

6. A computer device for computing elapsed-time intervals at variable rates from a ticket carrying a record of the time at the beginning of an interval, said computer device comprising support means in the nature of a structural chassis, ticket-receiving means carried by and associated with the chassis for supporting the ticket, detecting means mounted on said chassis in proximity to said ticket-receiving means, means for sensing such record, electrical sensing circuit means operatively associated with said detecting means and including a plurality of first switches adapted to be opened and closed in a variable configuration responsive to said detecting means, a plurality of second switches, means operatively mounted on said chassis in proximity to said ticket-receiving means and actuated by the ticket for opening and closing various second switches in an initial configuration matching the configuration of the first switches, electrical comparator-circuit means operatively associated with said electrical sensing circuit means including a plurality of third switches, clock-controlled means operatively mounted on said chassis for opening and closing the third switches in a variable configuration which represents time at the end of the interval, means operatively mounted on said chassis for changing the configuration of the second switches in a series of discrete steps through a series of predetermined successive configurations until the configuration is reached which matches the configuration of the third switches, counting means for counting said discrete steps whereby to subtract the time at the beginning of the interval from time at the end of the interval whereby to establish the quantity of elapsed time in the interval, said last-named means consisting of a plurality of stepping switches, rate establishing means operatively mounted on said chassis and including means for storing selected multipliers to be used as a predetermined rate during the computation, calculating means operatively mounted on said chassis and being operatively interconnected between said counting means and said rate establishing means for multiplying said quantity of elapsed time by said predetermined rate, and accumulator means operatively associated with said calculating means for totalizing the product.

7. A computer device for computing and recording elapsed-time intervals at variable rates from a ticket carrying a coded record of the time of the beginning of an interval, said computer device comprising support means in the nature of a structural chassis, ticket-receiving means carried by and associated with the chassis for supporting the ticket, detecting means operatively mounted on said chassis and associated with said ticket-receiving means for sensing such record subtracting means associated with said detecting means for subtracting the time at the beginning of the interval from the time at the end of the interval to establish the quantity of elapsed time in the interval, manually adjustable first rate establishing means operatively mounted on said chassis and including means for storing selected multipliers to be used as a first predetermined rate during the computation, manually adjustable second rate establishing means operatively mounted on said chassis and including means for storing selected multipliers to be used as a second predetermined rate, calculating means operatively mounted on said chassis and being operatively interconnected between said subtracting means and said first and second rate establishing means for multiplying said quantity of elapsed time by said predetermined rates in successive order to obtain a first type of product, and accumulator means operatively associated with said calculating means for totalizing the product.

8. A computer device for computing and recording elapsed-time intervals at variable rates from a ticket carrying a coded record of the time at the beginning of an interval, said computer device comprising support means in the nature of a structural chassis, ticket-receiving means carried by and associated with the chassis for supporting the ticket, detecting means operatively mounted on said chassis and associated with said ticket-receiving means for sensing such record subtracting means associated with said detecting means for subtracting the time at the beginning of the interval from the time at the end of the interval to establish the quantity of elapsed time in the interval, manually adjustable first rate establishing means operatively mounted on said chassis and including means for storing selected multipliers to be used as a first predetermined rate during the computation, manually adjustable second rate establishing means operatively mounted on said chassis and including means for storing selected multipliers to be used as a second predetermined rate, calculating means operatively mounted on said chassis and being operatively interconnected between said subtracting means and said first and second rate establishing means for multiplying said quantity of elapsed time by said first and second predetermined rates in successive order to obtain a first type of product, manually adjustable third rate establishing means operatively mounted on said chassis and including means for storing selected multipliers to be used as a third predetermined rate during the computation, manually adjustable fourth rate establishing means operatively mounted on said chassis and including means for storing selected multipliers to be used as a fourth predetermined rate during the computation, said calculating means being also associated with said third and fourth rate establishing means and adapted to multiply said quantity of elapsed time by said third and fourth predetermined rates in successive order to obtain a second type of product, means associated with said calculating means for establishing a predetermined condition under which the calculating means will optionally select between the combination of the first and second predetermined rates and the combination of the third and fourth predetermined rates, and accumulator means operatively associated with said calculating means for totalizing the product.

9. A computer device for computing and recording elapsed-time intervals at variable rates from a ticket carrying a record of the time at the beginning of an interval, said computer device comprising means for sensing such record and substracting it from the time at the end of the interval to establish the quantity of elapsed time in the interval, means for calculating a product by multiplying said quantity in successive order by a plurality of predetermined rates, means for stopping a calculation in said successive order when the product reached therein equals the rate of the next calculation in said successive order, and means for cumulatively totalizing the product.

10. A computer device for computing and recording elapsed-time intervals at variable rates from a ticket carrying a record of the time at the beginning of an interval, said computer device comprising support means in the nature of a structural chassis, ticket-receiving means carried by and associated with the chassis for supporting the ticket, detecting means operatively mounted on said chassis and associated with said ticket-receiving means for sensing such record subtracting means associated with said detecting means for subtracting the time at the beginning of the interval from the time at the end of the interval to establish the quantity of elapsed time in the interval, calculating means operatively mounted on said chassis and being operatively associated with said subtracting means for establishing a product by multiplying said quantity of elapsed time in successive order by a plurality of predetermined rates, means associated with said calculating means for stopping a calculation in said successive order when the product reached therein equals the rate of the next calculation in said successive order accumulator, means operatively associated with said calculating means for cumulatively totalizing the product, and means carried by said chassis and operatively associated with said accumulator means for visually displaying said totalized product.

11. A computer device for computing and recording elapsed-time intervals at variable rates from a ticket carrying a record of the time of the beginning of an interval, said computer device comprising support means in the nature of a structural chassis, ticket-receiving means carried by and associated with the chassis for supporting the ticket, detecting means operatively mounted on said chassis and associated with said ticket-receiving means for sensing such record subtracting means associated with said detecting means for subtracting the time at the beginning of the interval from the time at the end of the interval to establish the quantity of elapsed time in the interval, calculating means operatively mounted on said chassis and being, operatively associated with said subtracting means for establishing a product by multiplying said quantity of elapsed time in successive order by a plurality of predetermined rates, means associated with said calculating means for stopping a calculation in said successive order when the product reached therein equals the rate of the next calculation in said successive order, means associated with said calculating means for maintaining surveillance over the multiplying operations to insure correctness thereof, said last-named means comprising a plurality of double-pole, double-throw switches, and accumulator means operatively associated with said calculating means for totalizing the product.

12. A computer device for computing and recording elapsed-time intervals at variable rates from a ticket carrying a record of the time at the beginning of an interval, said computer device comprising means for sensing such record and subtracting it from the time at the end of the interval to establish the quantity of elapsed time in the interval in terms of an hours component and a days component, first means for multiplying said hours component by one predetermined rate to obtain an initial product, second means for subsequently multiplying said days component by another predetermined rate to obtain a second product which is cumulatively added to the initial product, and means for stopping the multiplying operation of the first means when and if the initial product equals the other predetermined rate.

13. A computer device for computing and recording elapsed-time intervals at variable rates from a ticket carrying a record of the time at the beginning of an interval, said computer device comprising support means in the nature of a structural chassis, ticket-receiving means carried by and associated with the chassis for supporting the ticket, detecting means operatively mounted on said chassis and associated with said ticket-receiving means for sensing such record subtracting means associated with said detecting means for subtracting the time at the beginning of the interval from the time at the end of the interval to establish the quantity of elapsed time in the interval in terms of an hours component, a days component, and a weeks component, manually setable rate establishing means operatively mounted on said chassis and including a means for storing multipliers to be used as a preselected hours-rate, a preselected days-rate, and a preselected weeks-rate, the days-rate being monetarily larger than the hours-rate and the weeks-rate being monetarily larger than the days-rate, calculating means operatively mounted on said chassis and being operatively interconnected between said subtracting means and said rate establishing means for first multiplying the hours component by the hours-rate to obtain an initial product, then multiplying the days component by the days-rate to obtain a second product which is added to the first product, and finally multiplying the weeks component by the weeks-rate to obtain a third product which is the sum of the first two products, and means associated with said calculating means for stopping the first multiplying operation when and if the initial product equals the days-rate and also thereafter stopping the second multiplying operation when and if the second product equals the weeks-rate.

14. A computer device for computing and recording elapsed-time intervals at variable rates from a ticket carrying a record of the time at the beginning of an interval, said computer device comprising support means in the nature of a structural chassis, ticket-receiving means carried by and associated with the chassis for supporting the ticket, detecting means operatively mounted on said chassis and associated with said ticket-receiving means for sensing such record subtracting means associated with said detecting means for substracting the time at the beginning of the interval from the time at the end of the interval to establish the quantity of elapsed time in the interval in terms of an hours component, a days component, and a weeks component, manually setable rate establishing means operatively mounted on said chassis and including a means for storing multipliers to be used as a preselected hours-rate, a preselected days-rate, and a preselected weeks-rate, the days-rate being monetarily larger than the hours-rate and the weeks-rate being monetarily larger than the days-rate, said rate establishing means consisting of a plurality of rotatable switches having a plurality of rotatable drums which are operatively adjustable to various positions corresponding to selected rates, calculating means operatively mounted on said chassis and being operatively interconnected between said subtracting means and said rate establishing means for first multiplying the hours component by the hours-rate to obtain an initial product, then multiplying the days component by the days-rate to obtain a second product which is added to the first product, and finally multiplying the weeks component by the weeks-rate to obtain a third product which is the sum of the first two products, means associated with said calculating means for stopping the first multiplying operation when and if the initial product equals the days-rate and also thereafter stopping the second multiplying operation when and if the second product equals the weeks-rate accumulator means operatively associated with said calculating means for totalizing the products, and means carried by said chassis and operatively associated with said accumulator means for displaying the totalized product.

15. A computer device for computing elapsed-time intervals at variable rates from a ticket carrying a record of the time at the beginning of an interval, said computer device comprising support means in the nature of a structural chassis, ticket-receiving means carried by and associated with the chassis for supporting the ticket, detecting means mounted on said chassis in proximity to said ticket-receiving means for sensing such record, electrical sensing circuit means operatively associated with said detecting means and including a plurality of first switches adapted to be opened and closed to form various unique circuit-configurations responsive to said detecting means, a counting circuit operatively associated with said electrical sensing circuit and consisting of a plurality of stepping mechanisms each including a plurality of cam-actuated switches, some of which are closed and some of which are open, to establish a unique circuit configuration for each successive stepped-position, means operatively mounted on said chassis in proximity to said ticket-receiving means and actuated by the ticket for causing the stopping mechanisms to move through successive stepped positions into an initial circuit-configuration matching the circuit-configuration of the first switches, electrical comparator-circuit means operatively associated with said electrical sensing circuit means including a plurality of third switches, clock-controlled means operatively mounted on said chasis for opening and closing the third switches to form various unique circuit-configurations which represent time at the end of the interval, means operatively mounted on said chassis for changing the circuit-configuration of the cam-operated switches in a series of discrete steps through a series of predetermined successive circuit-configurations until a circuit-configuration is reached which matches the circuit-configuration of the third switches, counting means for counting said discrete steps whereby to subtract the time at the beginning of the interval from time at the end of the interval whereby to establish the quantity of elapsed time in the interval, calculating means operatively mounted on said chassis and associated with said counting means for multiplying said quantity of elapsed time by a predetermined rate, means associated with said calculating means for maintaining surveillance over the multiplying operations to insure correctness thereof, said last-named means comprising a plurality of double-pole, double-throw switches, and accumulator means operatively associated with said calculating means for totalizing the product.

16. A computer device for computing elapsed-time intervals at variable rates from a ticket carrying a record of the time of the beginning of an interval, said computer device comprising support means in the nature of a structural chassis, ticket-receiving means carried by and associated with the chassis for supporting the ticket, detecting means mounted on said chassis in proximity to said ticket-receiving means for sensing such record, electrical sensing circuit means operatively associated with said detecting means and including a plurality of first switches adapted to be opened and closed to form various unique circuit-configurations responsive to said detecting means, a counting circuit operatively associated with said electrical sensing circuit and consisting of a plurality of stepping mechanisms each including a plurality of cam-actuated switches, some of which are closed and some of which are open, to establish a unique circuit configuration for each successive stepped-position, means operatively mounted on said chassis in proximity to said ticket-receiving means and actuated by the ticket for causing the stepping mechanisms to move through successive stepped positions into an initial circuit-configuration matching the circuit-configuration of the first switches, electrical comparator-circuit means operatively associated with said electrical sensing circuit means including a plurality of third switches, clock-controlled means operatively mounted on said chassis for opening and closing the third switches to form various unique circuit-configurations which represent time at the end of the interval, means operatively mounted on said chassis for changing the circuit-configuration of the cam-operated switches in a series of discrete steps through a series of predetermined successive circuit-configurations until a circuit-configuration is reached which matches the circuit-configuration of the third switches, counting means for counting said discrete steps whereby to subtract the time at the beginning of the interval from time at the end of the interval whereby to establish the quantity of elapsed time in the interval, calculating means operatively mounted on said chassis and associated with said counting means for multiplying said quantity of elapsed time by a predetermined rate, means associated with said calculating means for maintaining surveillance over the multiplying operations to insure correctness thereof, said last-named means comprising a plurality of double-pole, double-throw switches, accumulator means operatively associated with said calculating means for totalizing the product, and means carried by said chassis and operatively associated with said accumulator means for visually displaying such product.

17. In a computer device for computing elapsed-time intervals at variable rates from a ticket having a record of the time at the beginning of an interval, support means in the nature of a structural chassis, ticket-receiving means carried by and operatively associated with said chassis for supporting said ticket, detecting means for sensing such record, electrical sensing circuit means operatively associated with said detecting means and including a plurality of first switches adapted to be opened and closed in a variable configuration responsive to said record, a plurality of second switches, means operatively mounted in proximity to said ticket actuated by the ticket for opening and closing various second switches in an initial configuration matching the configuration of the first switches, electrical comparator-circuit means including a plurality of third switches, clock-controlled means operatively mounted on said chassis for opening and closing the third switches in a variable configuration which represents time at the end of the interval, means for changing the configuration of the second switches in a series of discrete steps through a series of predetermined successive configurations until the configuration is reached which matches the configuration of the third switches, counting means for counting said discrete steps whereby to subtract the time at the beginning of the interval from time at the end of the interval whereby to establish the quantity of elapsed time in the interval, said last-named means consisting of a plurality of stepping switches, and calculating means operatively mounted on said chassis and being operatively associated with said counting means for multiplying said quantity by a predetermined rate.

18. In a computer device for computing elapsed-time intervals at variable rates from a ticket having a record of the time at the beginning of an interval, support means in the nature of a structural chassis, ticket-receiving means carried by and operatively associated with said chassis for supporting said ticket, detecting means for sensing such record, electrical sensing circuit means operatively associated with said detecting means and including a plurality of first switches adapted to be opened and closed in a variable configuration responsive to said record, a plurality of second switches, means operatively mounted in proximity to said ticket actuated by the ticket for opening and closing various second switches in an initial configuration matching the configuration of the first switches, electrical comparator-circuit means including a plurality of third switches, clock-controlled means operatively mounted on said chassis for opening and closing the third switches in a variable configuration which represents time at the end of the interval, means for changing the configuration of the second switches in a series of discrete steps through a series of predetermined successive configurations until the configuration is reached which matches the configuration of the third switches, counting means for counting said discrete steps whereby to subtract the time at the beginning of the interval from time at the end of the interval whereby to establish the quantity of elapsed time in the interval, and calculating means operatively mounted on said chassis and being operatively associated with said counting means for multiplying said quantity by a predetermined rate.

19. In a computer device for computing elapsed-time intervals at variable rates from a ticket having a plurality of holes enclosing a record of the time at the beginning of an interval, support means in the nature of a structural chassis, ticket receiving means carried by and operatively associated with said chassis for supporting said ticket, detecting means for sensing the holes in said ticket electrical sensing circuit means operatively associated with said detecting means and including a plurality of first switches adapted to be opened and closed in a variable configuration responsive to said record, a plurality of second switches, means operatively mounted in proximity to said ticket-receiving means and actuated by the ticket for opening and closing various second switches in an initial configuration matching the configuration of the first switches, electrical comparator-circuit means operatively associated with said electrical sensing circuit means including a plurality of third switches, clock-controlled means operatively mounted on said chassis for opening and closing the third switches in a variable configuration which represents time at the end of the interval, and means for changing the configuration of the second switches in a series of discrete steps through a series of predetermined successive configurations until the configuration is reached which matches the configuration of the third switches.

References Cited by the Examiner
UNITED STATES PATENTS

| | | | |
|---|---|---|---|
| 1,520,571 | 12/1924 | Indahl | 234—107 |
| 1,520,632 | 12/1924 | Elliot | 234—107 |
| 2,113,634 | 4/1938 | Tauscher | 235—61.11 |
| 2,468,335 | 4/1949 | Lasker | 235—61.11 |
| 2,536,591 | 1/1951 | Luhn | 235—61.6 |
| 2,545,460 | 3/1951 | Hall | 235—61.8 |
| 2,591,448 | 4/1952 | Lorenz | 235—61.8 |
| 2,746,679 | 5/1956 | Stratton | 235—61.6 |
| 2,755,995 | 7/1956 | Black | 235—61.8 |
| 2,898,775 | 8/1959 | Reid | 74—435 |
| 2,902,878 | 9/1959 | Cupak | 74—435 |
| 2,913,172 | 11/1959 | Stedelin | 235—61.8 |

ROBERT C. BAILEY, *Primary Examiner.*

WALTER W. BURNS, JR., MALCOLM A. MORRISON,
*Examiners.*